United States Patent [19]
Houlberg et al.

[11] Patent Number: 5,307,505
[45] Date of Patent: Apr. 26, 1994

[54] RAPID REPROGRAMMING TERMINAL

[75] Inventors: Christian L. Houlberg, Ventura, Calif.; George B. Brown, Stafford, Va.

[73] Assignee: The United States of America as represented by the Secretary of the Navy, Washington, D.C.

[21] Appl. No.: 878,704

[22] Filed: May 5, 1992

[51] Int. Cl.⁵ .............................................. G06F 13/00
[52] U.S. Cl. .................................. 395/800; 370/85.13; 364/423
[58] Field of Search ...................... 370/85.13; 364/423; 395/800

[56] References Cited

U.S. PATENT DOCUMENTS

| | | | |
|---|---|---|---|
| 4,805,137 | 2/1989 | Grant et al. | 364/900 |
| 5,001,704 | 3/1991 | Narup et al. | 370/85.13 |
| 5,036,466 | 7/1991 | Fitzgerald et al. | 364/423 |

OTHER PUBLICATIONS

Friedman, S. N., "A Multiprotocol Multiplexed Superhybrid Terminal", Proceedings of the IEEE 1990 National Aerospace & Electronics Conference, vol. 1, pp. 157-162, 1990.

*Primary Examiner*—Alyssa H. Bowler
*Assistant Examiner*—Valerie Darbe
*Attorney, Agent, or Firm*—David S. Kalmbaugh; Melvin J. Sliwka; John L. Forrest, Jr.

[57] ABSTRACT

A rapid reprogramming terminal (RRT) adapted for communication with military aircraft MIL-STD-1553 multiplex data bus which includes generally four avionics and one electronic warfare bus on board each aircraft. The RRT may be used to reprogram all electronic warfare and avionics systems aboard and aircraft including the bus controllers for each avionics or electronic warfare bus and the remote terminals connected to each bus. The RRT includes a high speed digital signal processor which executes functions required to reprogram a remote terminal or bus controller through software stored in an electrically erasable programmable read only memory (EEPROM). The information required to reprogram a remote terminal or bus controller is stored on an IC memory card which is electrically coupled to the digital signal processor. When the RRT establishes communications with either an avionics bus or electronic warfare bus, the digital data required to reprogram, for example, a remote terminal is transferred from the IC memory card through the digital signal processor in a serial format to an encoder/decoder which converts the digital data to Manchester encoded differential data for transfer via the MIL-STD-1553 multiplex data bus to the remote terminal or bus controller being reprogrammed. The present invention also provides for a verify operation whereby the data stored in the IC memory card is compared with the data in the bus controller or remote terminal being reprogrammed to verify that the data is identical.

14 Claims, 37 Drawing Sheets

Fig. 1.

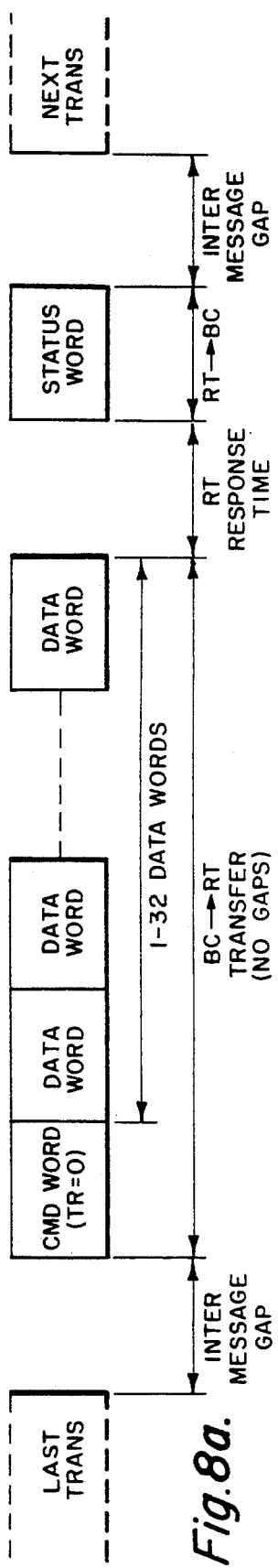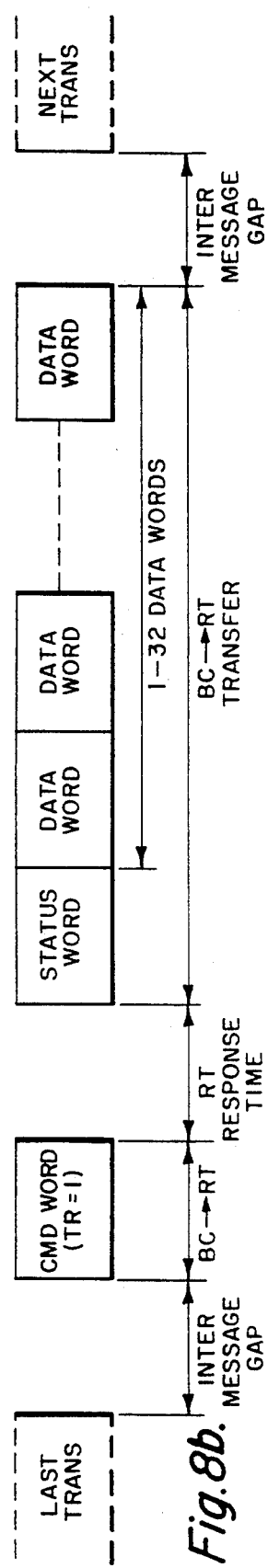

Fig. 9C.

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | X | X | X | X | X | X | X | X | X | X | X | X | X | X | X |

MEMORY CONFIGURATION MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 1 | 0 | 0 | 1 | 1 | 0 | 0 | 0 | 1 | 0 |
| S | Y | Y | Y | Y | Y | ME | X | X | X | X | X | X | BSY | X | X | X |
| D1 | MEMORY AREA 1 CONFIGURATION | | | | | | | | | | | | | | | |
| D2 | MEMORY AREA 2 CONFIGURATION | | | | | | | | | | | | | | | |

Fig. 9D.

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |

REPROGRAM CONTROL MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 0 | 1 | 1 | 1 | 0 | 1 | 0 | 0 | 1 | 0 | 0 |
| D1 | TYPE | | | | | | | | TYPE | | | | | | | |
| D2 | NUMBER | | | | | | | | NUMBER | | | | | | | |
| D3 | NUMBER | | | | | | | | NUMBER | | | | | | | |
| D4 | FILL | | | | | L/V | | | CONTROL CODE | | | | | | | |
| S | Y | Y | Y | Y | Y | ME | X | X | X | X | X | X | BSY | X | X | X |

Fig. 9E.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |
| HEADER MESSAGE | | | | | | | | | | | | | | | | |
| C | Y | Y | Y | Y | Y | 0 | 1 | 0 | 1 | 0 | 0 | 0 | 0 | 1 | 0 | 0 |
| D1 | TM | | HT | | | BUFFER TRANSFER COUNT | | | | | | | | | | |
| D2 | INITIAL LOAD ADDRESS | | | | | | | | | | | | | | | |
| D3 | PROGRAM ENTRY ADDRESS | | | | | | | | | | | | | | | |
| D4 | PAGE NUMBER | | | | | | | | | | | | | | | |
| S | Y | Y | Y | Y | Y | ME | X | X | X | X | X | X | BSY | X | X | X |

Fig. 9F.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |
| MEMORY DATA LOAD MESSAGE | | | | | | | | | | | | | | | | |
| C | Y | Y | Y | Y | Y | 0 | 1 | 0 | 1 | 0 | 1 | WORD COUNT 1-32 | | | | |
| D1 | DATA | | | | | | | | | | | | | | | |
| D2 | DATA | | | | | | | | | | | | | | | |
| DN | DATA | | | | | | | | | | | | | | | |
| S | Y | Y | Y | Y | Y | ME | X | X | X | X | X | X | BSY | X | X | X |

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |

MEMORY DATA LOAD MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 1 | 0 | 1 | 0 | 1 | \multicolumn{5}{c} WORD COUNT 1-32 |||||
| S | Y | Y | Y | Y | Y | ME | X | X | X | X | X | X | BSY | X | X | X |
| D1 | | | | | | | | DATA | | | | | | | | |
| D2 | | | | | | | | DATA | | | | | | | | |
| DN | | | | | | | | DATA | | | | | | | | |

Fig. 9G.

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |

TRAILER MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Y | Y | Y | Y | Y | 0 | 1 | 0 | 1 | 1 | 0 | 0 | 0 | 0 | 1 | 0 |
| D1 | SUB-PAGE/REGISTER COUNT |||||||| FIRST SUB-PAGE/REGISTER ||||||||
| D2 | CHECKSUM ||||||||||||||||
| S | Y | Y | Y | Y | Y | ME | X | X | X | X | X | X | BSY | X | X | X |

Fig. 9H.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 1 | 1 | 0 | 1 | 1 | 1 | 0 | 0 | 0 | 0 | 1 |
| REPROGRAM STATUS MESSAGE | | | | | | | | | | | | | | | | |
| C | Y | Y | Y | Y | Y | 1 | 1 | 0 | 1 | 1 | 1 | 0 | 0 | 0 | 0 | 1 |
| S | Y | Y | Y | Y | Y | ME | X | X | X | X | X | X | BSY | X | X | X |
| D | SF | SI | | | | | SC (STATUS CODE) | | | | | | | | | |

Fig. 9I.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |
| MLV ERROR MESSAGE | | | | | | | | | | | | | | | | |
| C | Y | Y | Y | Y | Y | 0 | 1 | 0 | 1 | 1 | 1 | 0 | 0 | 0 | 0 | 1 |
| D | 0 | 0 | 0 | 0 | 0 | 0 | 0 | 0 | 0 | 0 | 0 | 0 | 0 | A | C | T |
| S | Y | Y | Y | Y | Y | ME | X | X | X | X | X | X | BSY | X | X | X |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |
| S | Z | Z | Z | Z | Z | ME | 0 | SR | 0 | 0 | 0 | 0 | 0 | 0 | 0 | TF |
| D | BSY | 0 | 0 | 0 | 0 | TR | SUBADDRESS | | | | | WORD COUNT | | | | |

Fig.11B.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| S | TERMINAL ADDRESS | | | | | ME | | SR | | | | BSY | | | | TF |
| | Z | Z | Z | Z | Z | | 0 | | 0 | 0 | 0 | 0 | | 0 | 0 | |

Fig.11C.

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 0 | 1 | 0 | 0 | 1 | 1 | 1 | 0 | 0 | 1 | 0 |

MEMORY CONFIGURATION MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 0 | 1 | 0 | 0 | 1 | 1 | 1 | 0 | 0 | 0 | 1 | 0 |
| D1 | MEMORY AREA 1 CONFIGURATION | | | | | | | | | | | | | | | |
| D2 | MEMORY AREA 2 CONFIGURATION | | | | | | | | | | | | | | | |
| S | Z | Z | Z | Z | Z | ME | 0 | 0 | 0 | 0 | 0 | 0 | BSY | 0 | 0 | TF |

Fig. 11D.

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |

| | | | | | | | | | | | | | | | | |
|---|---|---|---|---|---|---|---|---|---|---|---|---|---|---|---|---|
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 1 | 1 | 1 | 0 | 1 | 0 | 0 | 1 | 0 |

REPROGRAM CONTROL MESSAGE

| | | | | | | | | | | WORD COUNT | | | | | | |
|---|---|---|---|---|---|---|---|---|---|---|---|---|---|---|---|---|
| C | Z | Z | Z | Z | Z | 1 | 1 | 1 | 1 | 1 | 0 | 1 | 0 | 0 | 1 | 0 |

| | | | | | | | | | | | | | | | | |
|---|---|---|---|---|---|---|---|---|---|---|---|---|---|---|---|---|
| S | Z | Z | Z | Z | Z | ME | 0 | 0 | 0 | 0 | 0 | 0 | 0 | 0 | 0 | TF |
| D1 | TYPE | | | | | | | | TYPE | | | | | | | |
| D2 | NUMBER | | | | | | | | NUMBER | | | | | | | |
| D3 | NUMBER | | | | | | | | NUMBER | | | | | | | |
| D4 | FILL | | | | L/V | | | | CONTROL CODE | | | | | | | |

Fig. 11E.

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 1 | 1 |

| | | | | | | | | | | | | | | | | |
|---|---|---|---|---|---|---|---|---|---|---|---|---|---|---|---|---|
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 0 | 0 | 0 | 0 | 1 | 0 | 0 |

HEADER MESSAGE

| | | | | | | | | | | | | | | | | |
|---|---|---|---|---|---|---|---|---|---|---|---|---|---|---|---|---|
| C | Z | Z | Z | Z | Z | 1 | 1 | 0 | 1 | 0 | 0 | 0 | 0 | 1 | 0 | 0 |

| | | | | | | | | | | | | | | | | |
|---|---|---|---|---|---|---|---|---|---|---|---|---|---|---|---|---|
| S | Z | Z | Z | Z | Z | ME | 0 | 0 | 0 | 0 | 0 | 0 | 0 | 0 | 0 | TF |
| D1 | TM | | HT | | BUFFER TRANSFER COUNT | | | | | | | | | | | |
| D2 | INITIAL LOAD ADDRESS | | | | | | | | | | | | | | | |
| D3 | PROGRAM ENTRY ADDRESS | | | | | | | | | | | | | | | |
| D4 | PAGE NUMBER | | | | | | | | | | | | 0 | | TC | |

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 1 | 0 | 0 | 0 | 0 | 1 | 0 |

TRAILER MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 1 | 0 | 1 | 1 | 0 | 0 | 0 | 0 | 1 | 0 |
| S | Z | Z | Z | Z | Z | ME | 0 | 0 | 0 | 0 | 0 | 0 | 0 | 0 | 0 | TF |
| D1 | SUB-PAGE/REGISTER COUNT | | | | | | | | FIRST SUB-PAGE/REGISTER | | | | | | | |
| D2 | CHECKSUM | | | | | | | | | | | | | | | |

*Fig.11H.*

REPROGRAM STATUS MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 0 | 1 | 0 | 1 | 1 | 1 | 0 | 0 | 0 | 0 | 1 |
| D | SF | SI | | | | | | SC (STATUS CODE) | | | | | | | | |
| S | Z | Z | Z | Z | Z | ME | 0 | 0 | 0 | 0 | 0 | 0 | 0 | 0 | 0 | TE |

*Fig.11I.*

ACTIVITY MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 1 | 0 | 0 | 0 | 0 | 1 | 1 |

MLV ERROR MESSAGE

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| C | Z | Z | Z | Z | Z | 1 | 1 | 0 | 1 | 1 | 1 | 0 | 0 | 0 | 0 | 1 |
| S | Z | Z | Z | Z | Z | ME | 0 | 0 | 0 | 0 | 0 | 0 | 0 | 0 | 0 | TF |
| D | 0 | 0 | 0 | 0 | 0 | 0 | 0 | 0 | 0 | 0 | 0 | 0 | 0 | A | C | T |

*Fig.11J.*

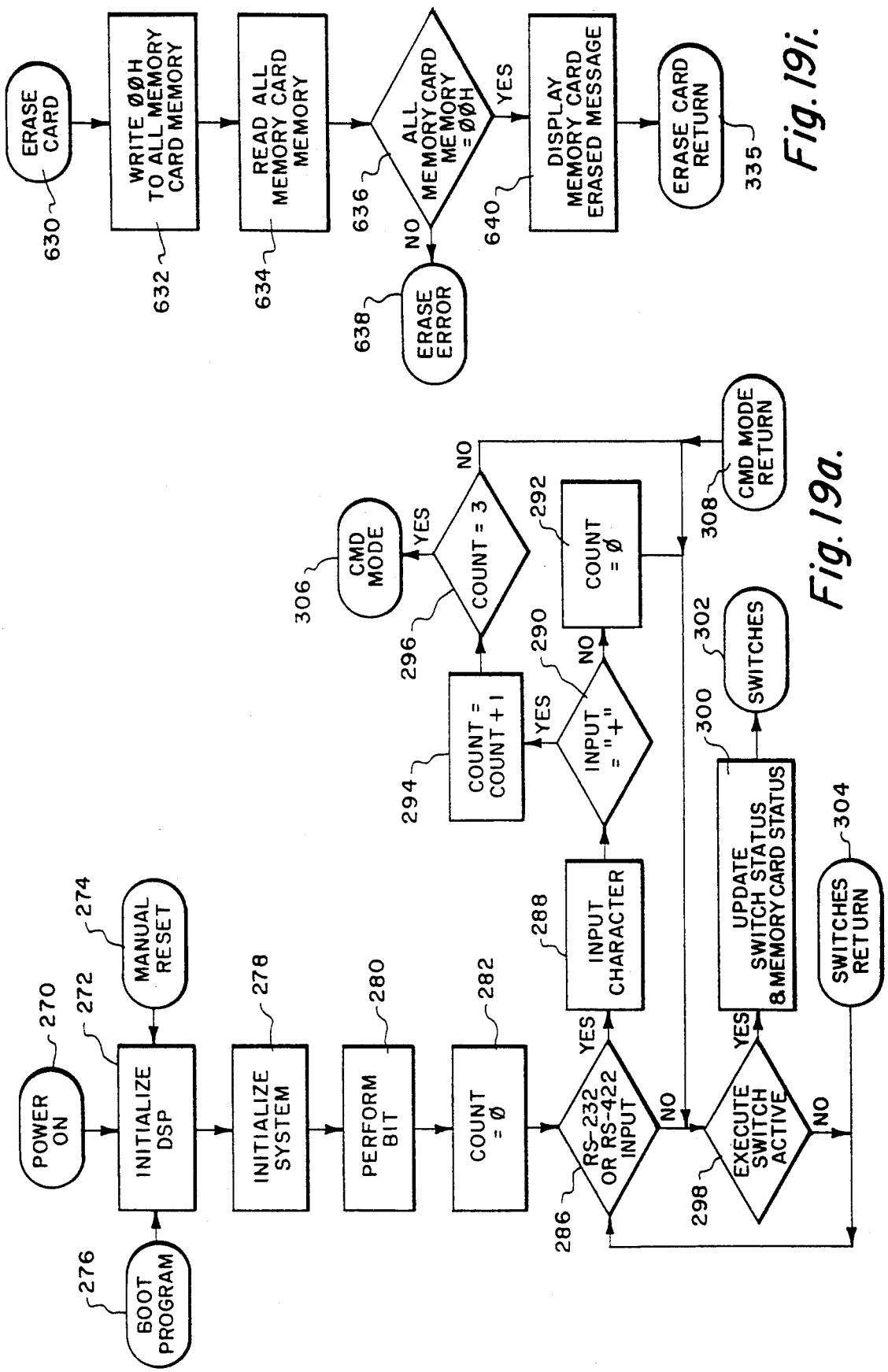

RAPID REPROGRAMMING TERMINAL

BACKGROUND OF THE INVENTION

1. Field of the Invention

This invention relates generally to memory loading apparatus and, in particular, to a light weight portable reprogramming and data verifier apparatus which may be used to load data into aircraft avionics and electronic warfare and countermeasure systems and then verify the accuracy of the data.

2. Description of the Prior Art

In the prior art there are memory loader and data verifier systems which provide the means for loading data into the avionics aboard military aircraft and thereby reprogram the aircraft avionics. In addition, these prior art systems will verify that the data is loaded correctly into these aircraft avionics and electronic warfare and countermeasure systems. One such device of the prior art is the Memory Loader Verifier, Model ASM-607MLV manufactured by Texas Instruments, while another such device of the prior art is the Advanced Memory Loader Verifier, Model ASM-607AMLV also manufactured by Texas Instruments.

Each of these prior art devices load new data into the avionics and electronic warfare systems aboard aircraft and then verify that the memories have been correctly loaded. The new data is loaded via an aircraft multiplex data bus which generally meets the design requirements of military standard (MIL-STD)-1553. This, in turn, allows for the reprogramming of aircraft on-board avionics and electronic warfare systems.

While satisfactory for their intended purpose that of reprogramming military aircraft on board avionics and electronic warfare and countermeasures systems, these multiple loader verifier (MLV) systems of the prior art leave something to be desired in that they often do not make use of state of the art high speed electronics which results in these prior art MLV systems having a slow operating speed, being susceptible to failure, and being bulky in size. Further, these prior art MLV systems are very expensive to produce.

With the above and other disadvantages known to prior art multiple loader verifier systems the present invention was conceived and one of its objects is to provide a means whereby the avionics aboard an aircraft can be reprogrammed.

Another object of the present invention is to provide a means whereby the electronic warfare and countermeasures systems aboard a military aircraft can be reprogrammed.

It is yet another object of the present invention to provide a portable, inexpensive and compact reprogramming terminal for reprogramming the avionics and electronic warfare and countermeasures systems aboard an aircraft.

It is still another object of the present invention to verify that the data loaded from the reprogramming terminal is correctly loaded into the avionics and electronic warfare and countermeasures systems aboard an aircraft.

A further object of the present invention is to provide a reprogramming terminal which uses high speed, state of the art electronics technology to allow for the rapid reprogramming of the avionics and electronic warfare and countermeasures systems aboard an aircraft.

Various other objects and advantages of the present invention will become apparent to those skilled in the art as a more detailed description of the invention is set forth below.

SUMMARY OF THE INVENTION

The aforesaid and other objects of the invention are accomplished by a rapid reprogramming terminal adapted for communication with military aircraft MS-1553 multiplex data bus which includes generally four avionics and one electronic warfare bus on board each aircraft. The rapid reprogramming terminal of the present invention may be used to reprogram all electronic warfare and avionics systems aboard the aircraft including the bus controllers for each avionics or electronic warfare bus on the aircraft and the remote terminals connected to each bus on the aircraft. The rapid reprogramming terminal includes a high speed digital signal processor which executes the functions required to reprogram a remote terminal or bus controller through software stored in an electrically erasable program read only memory (EEPROM). The information required to reprogram a remote terminal or bus controller is stored on an IC memory card which is electrically coupled to the digital signal processor. When rapid reprogramming terminal establishes communications with either an avionics bus or electronic warfare bus by enabling certain discretes associated with the bus, the digital data required to reprogram for example a remote terminal is transferred from the IC memory card through the digital signal processor in a serial format to an encoder/decoder. The encoder/decoder converts the digital data to Manchester encoded differential data for transfer via the MS-1553 multiplex data bus to the remote terminal or bus controller being reprogrammed. The rapid reprogramming terminal of the present invention also provides for a verify operation whereby the data stored in the IC memory card is compared with the data in the bus controller or remote terminal being reprogrammed to verify that the bus controller or remote terminal being reprogrammed is identical to the data in the IC memory card.

BRIEF DESCRIPTION OF THE DRAWINGS

FIG. 8(A) illustrates rapid reprogramming terminal to remote terminal data transfers;

FIG. 8(B) illustrates remote terminal to rapid reprogramming terminal data transfers;

FIG. 9(A) illustrates the format of activity message transfers via the 1553 multiplex data bus to and from a remote terminal being reprogrammed;

FIG. 9(B) illustrates the status response word format provided by a remote terminal for each message transaction via the 1553 multiplex data bus;

FIG. 9(C) illustrates the format of memory configuration messages transferred via the 1553 multiplex data bus to a remote terminal being reprogrammed;

FIG. 9(D) illustrates the format of enter load, exit load, enter verify and exit verify messages transferred via the 1553 multiplex data bus to a remote terminal being reprogrammed;

FIG. 9(E) illustrates the format of a header message transferred via the 1553 multiplex data bus to a remote terminal being reprogrammed;

FIG. 9(F) illustrates the format of a memory data load message transferred via the 1553 multiplex data bus to a remote terminal being reprogrammed;

FIG. 9(G) illustrates the format of a memory data verify message transferred via the 1553 multiplex data bus to a remote terminal being reprogrammed;

FIG. 9(H) illustrates the format of a trailer message transferred via the 1553 multiplex data bus to a remote terminal being reprogrammed;

FIG. 9(I) illustrates the format of a reprogram status message transferred via the 1553 multiplex data bus from a remote terminal being reprogrammed;

FIG. 9(J) illustrates the format of a RRT error message transferred via the 1553 multiplex data bus to a remote terminal being, reprogrammed;

FIG. 11(A) illustrates the format of activity message transfers via the 1553 multiplex data bus to and from a bus controller being reprogrammed;

FIG. 11(B) illustrates the status response word format provided by a bus controller terminal for each message transaction via the 1553 multiplex data bus;

FIG. 11(C) illustrates the format of memory configuration messages transferred via the 1553 multiplex data bus to a bus controller being reprogrammed;

FIG. 11(D) illustrates the format of enter load, exit load, enter verify and exit verify messages transferred via the 1553 multiplex data bus to a bus controller being reprogrammed;

FIG. 11(E) illustrates the format of a header message transferred via the 1553 multiplex data bus to a bus controller being reprogrammed;

FIG. 11(H) illustrates the format of a trailer message transferred via the 1553 multiplex data bus to a bus controller being reprogrammed;

FIG. 11(I) illustrates the format of a reprogram status message transferred via the 1553 multiplex data bus from a bus controller being reprogrammed;

FIG. 11(J) illustrates the format of a RRT error message transferred via the 1553 multiplex data bus to a remote terminal being reprogrammed;

DETAILED DESCRIPTION OF THE PREFERRED EMBODIMENT

Figure 1:
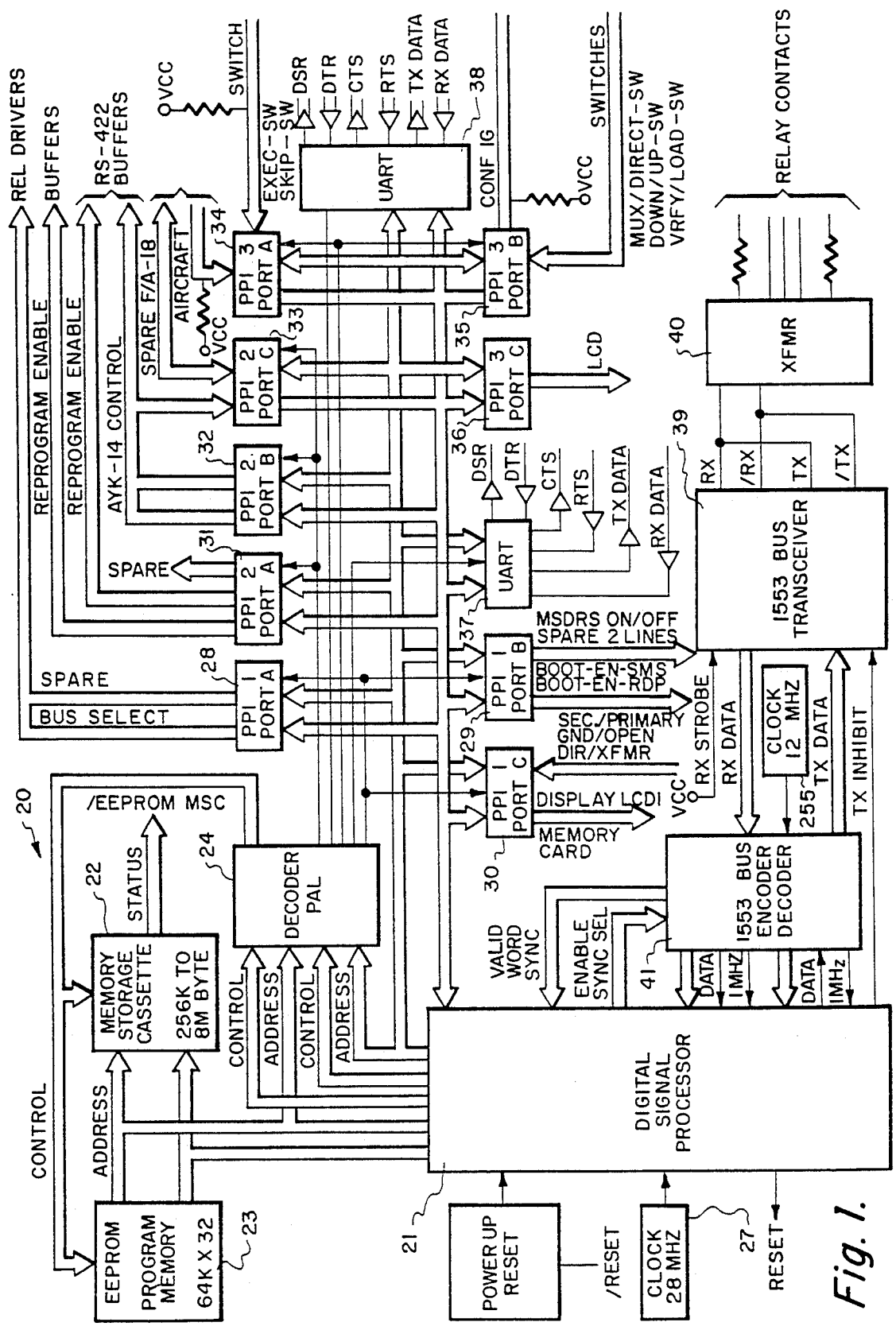
FIG. 1 is a system block diagram of the rapid reprogramming terminal constituting the present invention.
Figure 3:
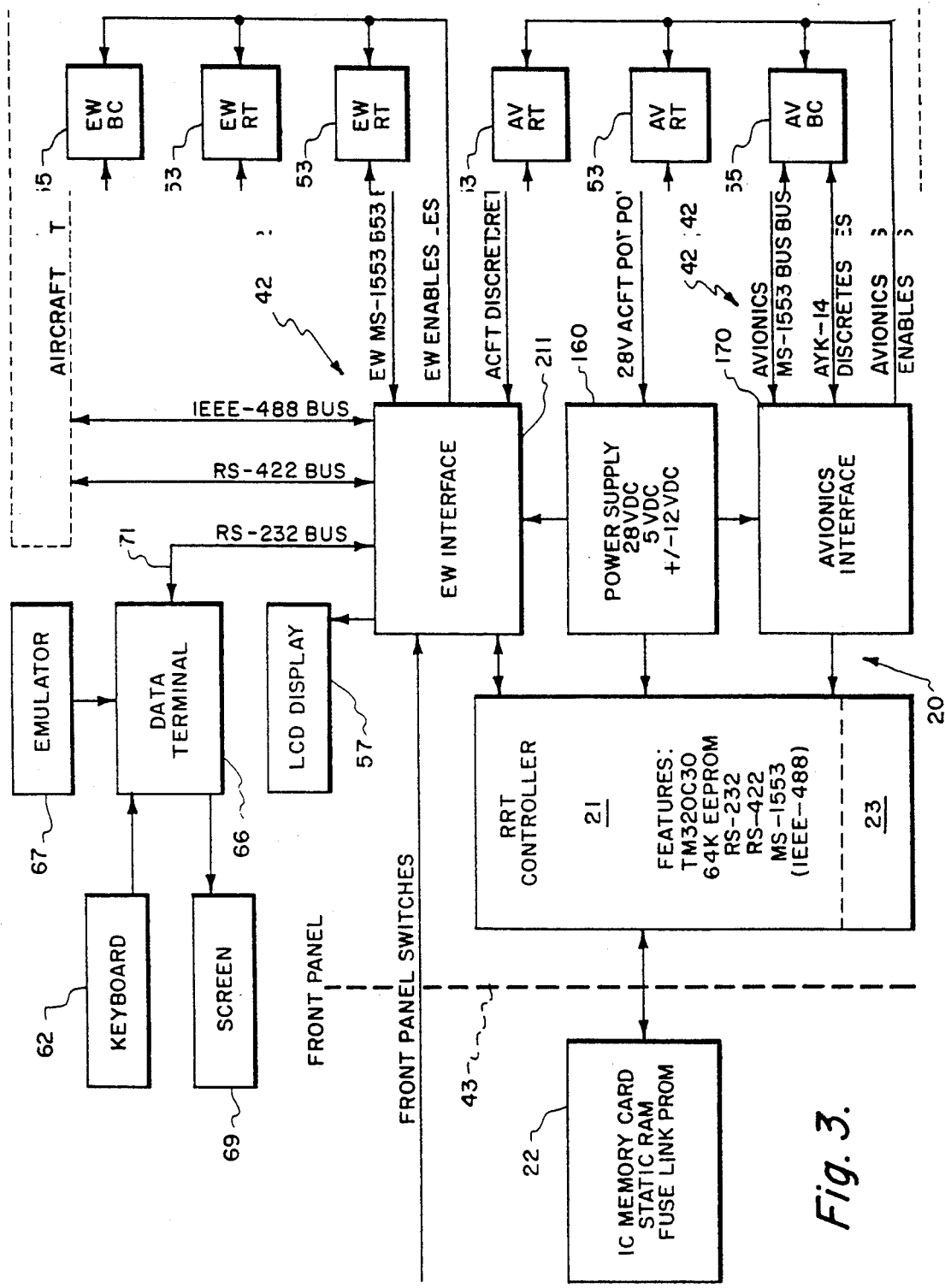
FIG. 3 is a block diagram illustrating rapid reprogramming terminal interfacing with the 1553 multiplex data bus on board an aircraft.

Referring to FIGS. 1 and 3, there is shown a system block diagram of the rapid reprogramming terminal 20 constituting the present invention. Rapid reprogramming terminal 20 comprises a digital signal processor 21 which controls the communications interfaces of rapid reprogramming terminal 20, controls the discrete signals provided by and supplied to rapid reprogramming terminal 20 and effects the transfer of digital data to and from an IC memory card 22. Digital signal processor 21, in turn, receives it instructions from an EEPROM 23, provides addressing to EEPROM 23 and utilizes an internal RAM as storage for certain software and temporary storage of data and status bits. EEPROM 23 consist of four 64K × 8 bit EEPROMs 240, 242, 244 and 246, FIG. 16(B) configured in parallel which function as a single 64K × 32 bit EEPROM. Programs are loaded into EEPROM memory under software control of digital signal processor 21, that is digital signal processor 21 provides addressing, data and control signals to EEPROM 23 under the direction of software stored in the internal random access memory of digital signal processor 21. Rapid reprogramming terminal 20 also includes a memory storage cassette which is IC memory card 22 which stores the digital data required to reprogram the aircraft on board avionics and electronic warfare and countermeasures systems. Data read from IC memory card 22 is masked to the least eight significant bits of each word since the remaining bits are floating and would be read as noise.

A programmable array logic device 24 functions as a decoder for address and control signals supplied thereto to direct the operation of all external devices to digital signal processor 21. Decoder 24 is programmed to convert a primary address line input (A22 input) of decoder 24 and the control line inputs (/STRB and R/W inputs) into control signals (/EEPROM, MCS, /RD and /WR) that control EEPROM 23 and IC memory card 22. Decoder 24 is programmed to convert alternate control signals /IOSTRB and XR/W provided by processor 21 into control signals that operate the parallel peripheral interface (PPI) ports 28 though 36 and the universal asynchronous receiver transceiver (UART) circuits 37 and 38 of rapid reprogramming terminal 20. Software within processor 21 extends access time for parallel peripheral interface ports 28 through 36 and universal asynchronous receiver transceiver circuits 37 and 38 since processor 21 operates at a processing speed that is too fast for parallel peripheral interface ports 28 through 36 and universal asynchronous receiver circuits 37 and 38.

PPI port 28 is an output port designated to send control signals selecting the 1553 multiplex data bus 42 aboard the aircraft. The logic signals EW, AV1, AV2, AV3 and AV4 select which bus rapid reprogramming terminal 20 will pass data through. PPI port 29 is an output port which is utilized to configure and turn on the 1553 multiplex data bus avionics and electronic warfare equipment, that is remote terminals 53 and bus controllers 55. PPI port 30 is an input port as well as an output port which provides output signals to control liquid crystal display 57 and accepts input signals from IC memory card 22.

PPI port 31 is an output port which provides control signals to a predetermined device within the aircraft's avionics or electronic warfare systems enabling access to the memory of the device to which data is being transferred.

PPI port 32 is an output port which is designated to send control signals to the avionics bus controller of 1553 multiplex data bus 42 preparing the bus controller for reprogramming by rapid reprogramming terminal 20. PPI port 32 also provides rapid reprogramming terminal generated control signals which power down the avionics bus controller allowing rapid reprogramming terminal 20 to download data into the aircraft avionics and thereby reprogram the avionics.

PPI port 33 is an input port which monitors fail signals provided by the aircraft avionics bus controller to determine whether the data has been correctly loaded into the avionics bus controller, that is PPI port 33 is used to indicate an error in loading.

PPI port 34 is an input port used to monitor the aircraft type and thereby prevent data which is designated for loading in one type of aircraft from being loaded in a different type of aircraft. PPI port 35 is an input port used to monitor configuration of the aircraft to prevent data which is designated for loading in one configuration of the aircraft from being loaded in a different aircraft configuration. PPI ports 34 and 35 together monitor the state of the switches on front panel 43, FIG. 2.

Figure 2A:
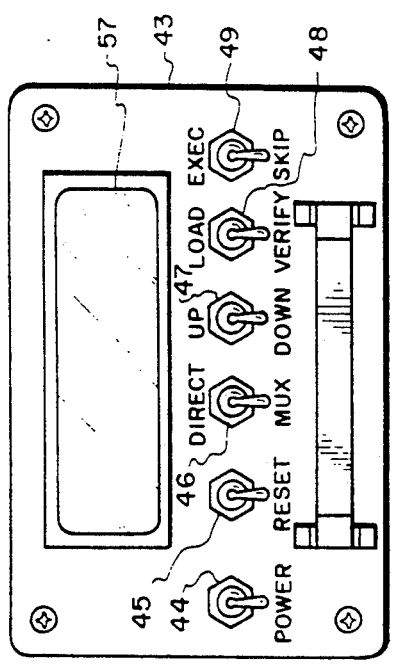
FIG. 2(A) and 2(B) illustration the front panel and front panel electrical wiring diagram for rapid reprogramming terminal.
Figure 2B:
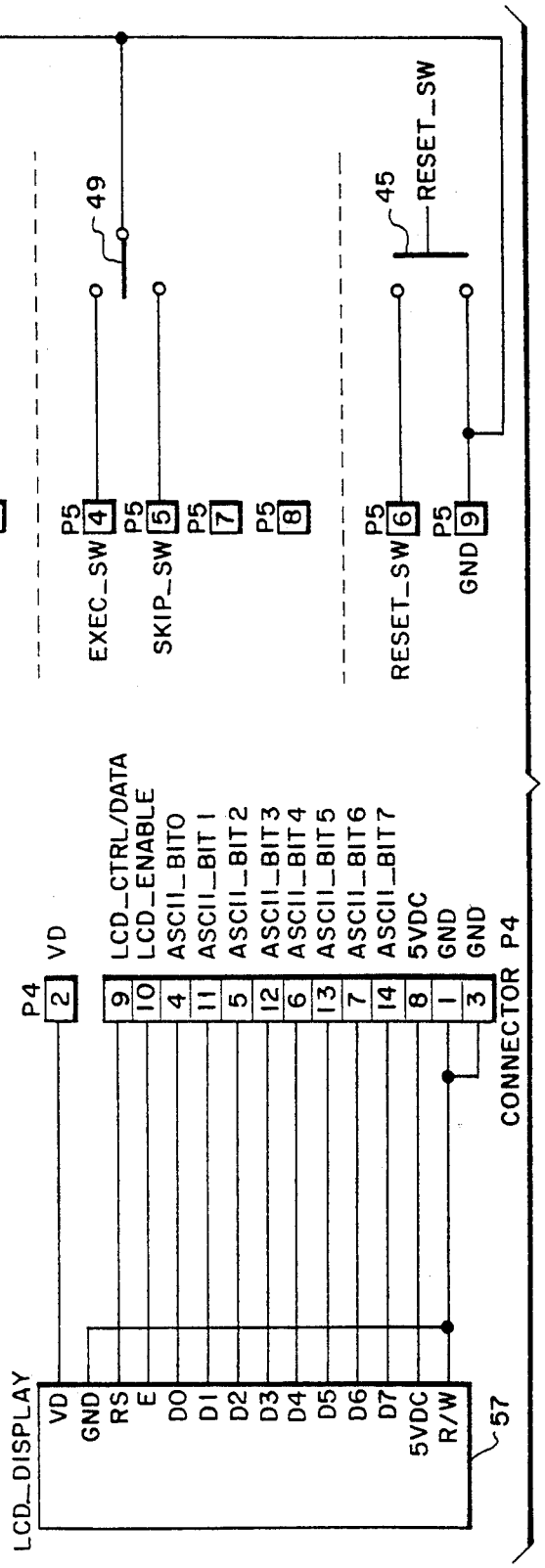

PPI port 36 is an output port for supplying ASCII characters to liquid crystal display 57 on front panel 43, FIG. 2.

The UART circuits 37 and 38 of rapid reprogramming terminal 20 respectively communicate with any RS-232 communications bus 71 and any RS-422 communications bus for the transfer of data to and from the IC memory card 22 via the rapid reprogramming terminal 20. As is best illustrated in FIG. 1, UART circuits 37 and 38 are connected to drivers and receivers which match the interface characteristics of RS-232 and 422 buses.

Rapid reprogramming terminal also includes a bus transceiver 39 used to drive a bus transformer 40 which, in turn, is used to isolate the 1553 multiplex data bus 42 aboard the aircraft from rapid reprogramming terminal 20. There is also electrically coupled between processor 21 and transceiver 39 a bus encoder/decoder 41 which is used to translate the sixteen bit data words provided by processor 21 into Manchester mark encoded Military Standard 1553 signals for use by 1553 multiplex data bus 42 and also to decode Manchester mark signals provided by bus 4 into sixteen bit data words supplied to processor 21.

Referring to FIG. 2, there is shown the front panel 43 which includes a power switch 44, a reset switch 45, a mux/direct switch 46, a down/up switch 47, a verify/load switch 48 and an execute/skip 49. The power switch 44 when in the up position turns power on to rapid reprogramming terminal 20, reset switch 45 when pressed down resets rapid reprogramming terminal 20 and mux/direct switch 46 when in the mux position directs the loading of data into the on board aircraft avionics and electronic warfare and countermeasures systems via the 1553 multiplex data bus 42 aboard the aircraft. When in the direct position mux/direct switch 46 allows for loading of data directly into an aircraft or electronic system or subsystem. The down/up switch 47 when in the up position allows data to be loaded from rapid reprogramming terminal 20 to the aircraft avionics or electronic warfare system and when in the down position allows data to be loaded from the avionics or electronic warfare systems to rapid reprogramming terminal 20. The verify/load switch 48 when in the load position allows data to be either up loaded from rapid reprogramming terminal 20 or down loaded to rapid reprogramming terminal 20 depending on the position of switch 47 and when in the down position allows for data already in the aircraft avionics and electronic warfare systems to be verified by rapid reprogramming terminal 20. When the message "Exec to continue" is displayed by liquid crystal display 57, execute/skip switch 44 is a momentary contact switch which when activated to the Exec position allows rapid reprogramming terminal 20 to begin operation loading data files. When in the manual mode and it is desired to load or skip a data file, that is load or not load the data file, an operator can press the exec/skip switch to the exec position to load the data file or skip position to not load the data file.

Figure 17:
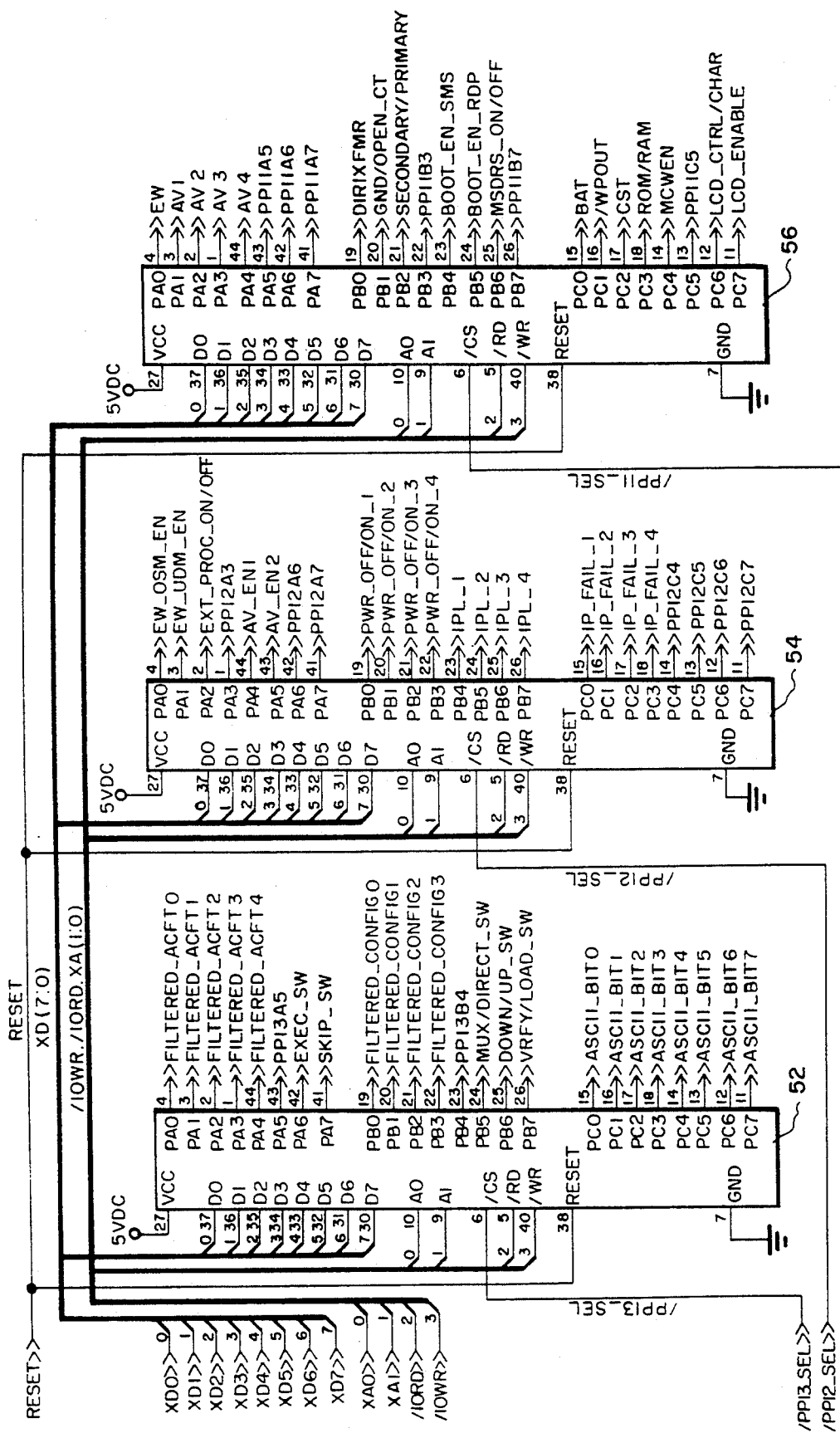
FIG. 17 is an electronics circuit diagram of the discrete interface of the present invention.

Referring now to FIG. 17 there is shown the discrete interface circuit 50 which comprises three programmable peripheral interfaces 52, 54 and 56 with interfaces 52, 54 and 56 providing an interface for the discrete logic signals to be provided by rapid reprogramming terminal 20 to the aircraft on board avionics and electronic warfare and countermeasures systems via the 1553 multiplex data bus 42 as well as the discrete logic signals provided from the avionics and electronic warfare and countermeasures systems to rapid reprogramming terminal 20.

The programmable interfaces 52, 54 and 56 may be a performance CMOS version of the industry standard 8255A general purpose programmable input/output device with any general purpose microprocessor. For example a Model 82C55A CMOS Programmable Peripheral Interface manufactured by Harris Corporation may be used as programmable interfaces 52, 54 and 56.

Referring to FIGS. 1, 2, 3 and 17, the EW output of programmable interface 56 electrically couples the electronic warfare bus of 1553 multiplex data bus 42 to rapid reprogramming terminal 20 when the EW output of programmable interface 56 is at the logic one. Similarly, the AV1, AV2, AV3 and AV4 outputs of interface 56 electrically couple the four avionics buses bus interface 56 to rapid reprogramming terminal 20. It should be noted that a data transfer from rapid reprogramming terminal 2 to the EW bus, the AV1 bus, the AV2 bus, the AV3 bus or the AV4 bus of the aircraft can occur only when the EW, AV1, AV2, AV3 or AV4 output from interface 56 is at the logic one state. Outputs PPI-1A5, PPI1A6 and PPI1A7 are spares.

The DIR/XFMR output configures the 1553 multiplex data bus 42 such that coupling is either provided directly as is best illustrated by FIG. 4(a) or via a center tap transformer 60 as is best illustrated by FIG. 4(b). When the DIR/XFMR output is at the logic one state the rapid reprogramming terminal 20 is coupled directly to the aircraft on board avionics and electronic warfare systems. When the DIR/XFMR output is at the logic zero the coupling is through transformer 60. The GND/OPEN_CT output of interface 56 when at the logic one state grounds the center tap of the transformer 40 while a logic 0 at the GND/OPEN_CT output removes the ground from the center tap of the transformer 40. The SECONDARY/PRIMARY output of interface 56 enables either the primary or secondary avionics bus connections of 1553 multiplex data bus 42. When the SECONDARY/PRIMARY output of interface 56 is at the logic one state the secondary avionics one through four 1553 multiplex data bus connections are utilized, while a logic zero means that the primary one through four bus connections are being utilized. The PPI1B3 output of interface 56 is a spare.

The MSDRS_OFF/ON Output of interface 56 enables the Maintenance Signal Data Recording Set (MSDRS) line aboard an aircraft with a logic zero enabling the MSDRS line and a logic one disabling the MSDRS line. This output is also currently being utilized with only the F/A-18 fighter aircraft. The PPI1B7 line of interface 56 is a spare.

When the BAT input of interface 56 is at the logic one state the battery in IC memory card 22 is sufficiently charged to operate properly while a logic zero indicates that the battery is discharged. The /WPOUT and MCWEN inputs when at the logic one state indicates that write is enabled for IC memory card 22 and when either are at the logic zero state indicates that write is disabled for IC memory card 22.

At this time, it should be noted that the memory card used in the preferred embodiment of the present invention may be any forty pin, eight bit wide, Mixed CMOS SRAM Memory Device manufactured by Seiko Epson Corporation which have storage capacities from 32K to 8M. It should further be understood that the memory storage capacity of IC memory card 22 may range from 256K to 8M.

The CST input indicates the presence or absence of the IC memory card 22. When the CST input is low card 22 is absent, when the CST input is high card 22 is present.

The ROM/RAM input indicates whether IC memory card 22 is a ROM or a RAM device. When the ROM/RAM input is at the logic one state a ROM is being utilized with rapid reprogramming terminal 20 while a logic zero indicates that a RAM is being utilized. The PPI1C5 output is a spare.

The LCD_CTRL/CHAR output of interface 56 is the register select for the liquid crystal display 57. When the LCD_CTRL/CHAR output is at a logic zero state a control register for liquid crystal display 57 is selected, while a logic zero at the LCD_CTRL/CHAR output selects a character register for liquid crystal display 57.

The BOOT_EN_SMS output is utilized with an aircraft having a stores management system (SMS) requiring an input to enable a boot strap load operation. A logic one at this output enables the SMS line to the electronic warfare system bus allowing data to be transferred from rapid reprogramming terminal 20 to the stores management system while a logic zero disables the SMS system.

The BOOT_EN_RDP output enables the radar data processor (RDP) aboard an aircraft and is currently being utilized with only the F/A-18 fighter aircraft. When the BOOT_EN_RDP output is at the logic one state the radar data processor is enabled allowing data to be transferred from rapid reprogramming terminal 20 to radar data processor, while a logic zero disables the processor.

The electronic warfare user data memory program enable discrete of interface 54 enables the erase and write functions of all user data memories, for examples EEPROMS, of all the electronic warfare equipment on the electronic warfare multiplex bus. In addition, upon initial activation the electronic warfare user data memory program enable discrete, if required, will cause the bus controller for the electronic warfare multiplex bus to start polling rapid reprogramming terminal 20 and upon deactivation will cause the bus controller to stop polling rapid reprogramming terminal 20. Further this program enable discrete is used to indicate to the bus controller that it is to resume its bus controller functions when the enable is released, that is driven to the logic zero state. The electronic warfare operating system memory has the same functions with respect to reprogrammable operating system memories in devices connected to the electronic warfare multiplex bus.

A logic one at the EW-OSM_EN output of interface 54 enables the operating system memory of the electronic warfare system on board the aircraft, that is data may be down loaded into the operating system software memory. Similarly, when the EW-UDM_EN output of interface 54 is at the logic one state data is down loaded into the user data memory of the electronic warfare system on board the aircraft.

The AV-EN1 and AV_EN2 outputs (AV Program Enable discretes) of interface 54, which are used for the four avionics buses in the aircraft, may be connected to individual avionics equipment to control two program memory areas or the AV-EN1 and AV_EN2 outputs may be routed separately to avionics equipment on board the aircraft which does not require control of two memory areas. When the AV_EN1 output of interface 54 is at a logic one state the first memory areas of the aircraft avionics system are enabled, while a logic one at the AV_EN2 output of interface 54 enables the second memory areas of the aircraft avionics system. The PPI-2A3, PPI2A6 and PPI2A7 are spares.

The bus controller for the aircraft avionics is an AN-/AYK-14 computer with each aircraft avionics system having up to four AN/AYK-14 computers. The Initiate Program Load (IPL), Initiate Program load Fail (IPL_F) and Power Off/On (PWR OFF/ON) discretes, which are used to control an AN/AYK-14, are implemented between each AN/AYK-14 computer on board the aircraft and rapid reprogramming terminal 20. It should be noted that the AV reprogram enable discretes are not used with the AN/AYK-14 computers.

A logic one at the IPL_1 output of programmable interface 54 initiates program loading of the AN/AYK-14 avionics computer via avionics bus number one of 1553 multiplex data bus 42. When this output goes to a logic zero state data is loaded into the AN/AYK-14 avionics computer. The IPL_2 through IPL_4 outputs operate in a similar manner with respect to avionics buses two through four bus of the 1553 multiplex data bus 42. A logic one at the IPL_FAIL_1 input of programmable interface 54 indicates that the initiate program load one has failed. Similarly, logic ones at the IPL_FAIL_2 through IPL_FAIL_4 inputs indicate that initiate program loads 2 through 4 have failed. The PPI2C4 through PPI2C7 outputs are spares.

Logic ones at the PWR_OFF/ON 1, PWR_OFF/ON 2, PWR_OFF/ON 3 or PWR_OFF/ON 4 outputs of interface 52 will turn off one or more of the four AN/AYK-14 Avionics computer bus controllers, while a logic zero at one or more of these outputs will turn on one or more of the controllers. To transfer data to one or more remote terminals 53, that is one or more avionics devices on board the aircraft, on any of the four avionics buses aboard the aircraft, power to the AN/AYK-14 controlling the bus must be turned off.

A logic one at the EXT_PROC_ON/OFF output of interface 54 enables the external processor of an AN/ALQ-165 radar jammer on board the aircraft. The purpose of the AN/ALQ-165 external processor discrete is to limit power on time to less than one minute for load/verify of 32K data words of user data memory. It should be noted that the AN/ALQ-165 processor is currently incorporated on only the F/A-18C/D fighter aircraft.

When there is a logic one state the LCD_EN output of 56 interface, liquid crystal display 57 is enabled. The data bits for liquid crystal display 57 are provided through the ASCII_BIT0 through ASCII_BIT7 outputs of programmable interface 52.

The FILTERED_ACFT0 through FILTERED_ACFT4 inputs of interface 52 provide signals from the aircraft to the rapid reprogramming terminal 20 which indicate the aircraft type. The FILTERED_ACFT0 input is the least significant bit provided by the aircraft, while the FILTERED_ACFT4 input is the most significant bit provided by the aircraft. For example a 1, 0, 1, 1, 0 respectively at the FILTERED_ACFT0 through FILTERED_ACFT4 inputs indicates that the aircraft is an F/A-18 fighter aircraft.

The FILTERED_CONFIG0 through FILTERED_CONFIG3 inputs of interface 52 provide signals from the aircraft to rapid reprogramming terminal 20 which indicate the aircraft avionics configuration such as whether the aircraft is an F/A-18A/B or F/A-18C/D.

When the MUX/DIRECT_SW input of programmable interface 52 is at the logic zero state switch 46 is at the DIRECT position while a logic one indicates that switch 46 is at the MUX position. Similarly, when the DOWN/UP_SW input of programmable interface 52 is at the logic zero state switch 47 is at the UP position while a logic one indicates that switch 47 is at the DOWN position. Likewise, the VRFY/LOAD_SW input of programmable interface 52 is at the logic zero state switch 48 is at the LOAD position while a logic one indicates that switch 48 is at the VRFY position.

Switch 49 has a pair of momentary contacts, the first contact of which is connected to EXEC_SW input of interface 52 and the second contact of which is connected to SKIP_SW input of interface 52. When switch 49 is activated to the EXEC position a logic zero pulse is provided to the EXEC_SW input of interface 52, while activation of switch 49 to the SKIP position will result in a logic zero pulse at the SKIP_SW input of interface 52.

Figure 6:
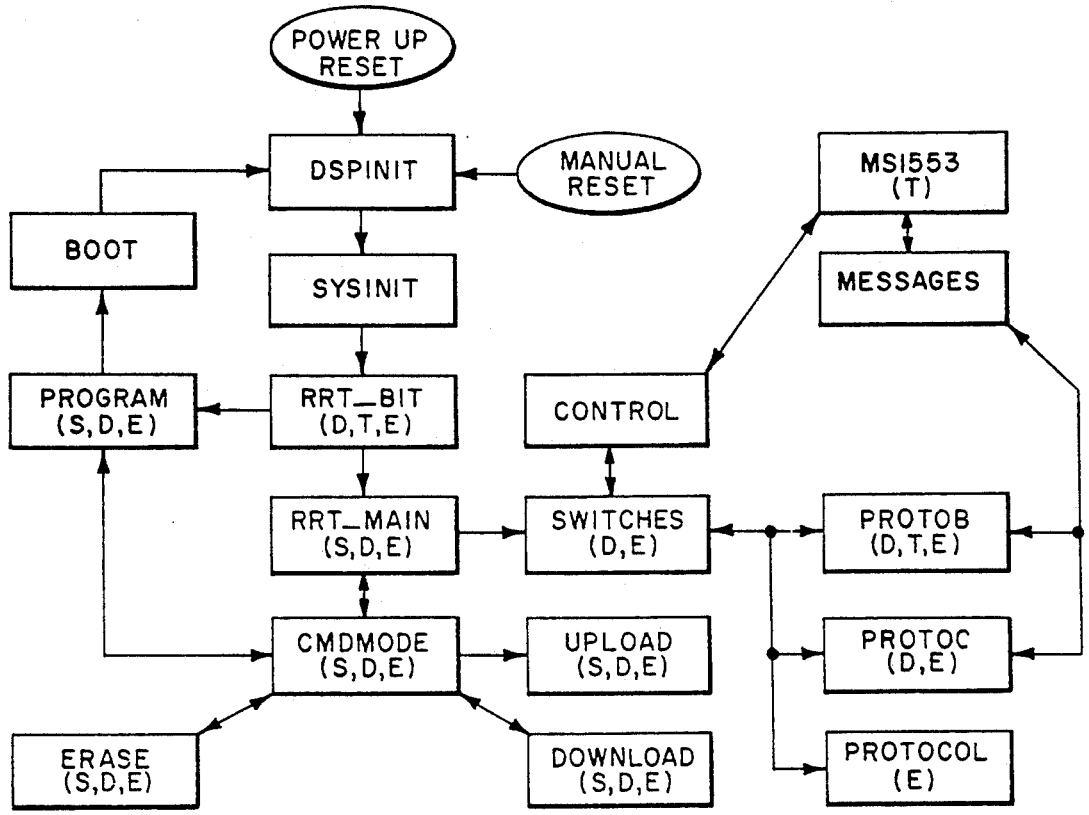
FIG. 6 is a simplified flow diagram illustrating the sequence of operation of the program modules for the software used by rapid reprogramming terminal of FIG. 1.

Rapid reprogramming terminal 20 utilizes a software program which comprises the modules illustrated in FIG. 6 and set forth in the table below:

TABLE I

| BOOT.C | PROGRAM.C | CMDMODE.C |
|---|---|---|
| UPLOAD.C | DOWNLOAD.C | ERASE.C |
| MS1553.C | RRT_BIT.C | RRT_MAIN.C |
| PROTOCOL.C | PROTOB.C | PROTOC.C |
| MESSAGES.C | SWITCHES.C | ERROR.C |
| SERIALIO.C | TIMER.C | DSPINIT.ASM |
| SYSINIT.ASM | INTERPTS.ASM | CONTROL.C |
| DISPLAY.C | | |

The BOOT.C module along with the PROGRAM.C module are the update modules for the rapid reprogramming terminal program. The BOOT.C module of the rapid reprogramming terminal software functions to transfer data from a serial port such as the RS-232 port into the EEPROM 23 of rapid reprogramming terminal 20 and also reboots or starts the program. The PROGRAM.C module displays an update prompt on a video screen 64, transfers the BOOT.C code into RAM of processor 21 for execution and then proceeds to upload a new program into program memory (the EEPROM 23) by executing the BOOT.C code using a modified form of the Hex-32 format designed by Intel Corporation. The data contained in the modified Intel Hex-32 format represents 32 bit words with the most significant byte coming first. Once a proper record is received the word oriented data record (type 00) is transferred to program memory.

Figure 5:
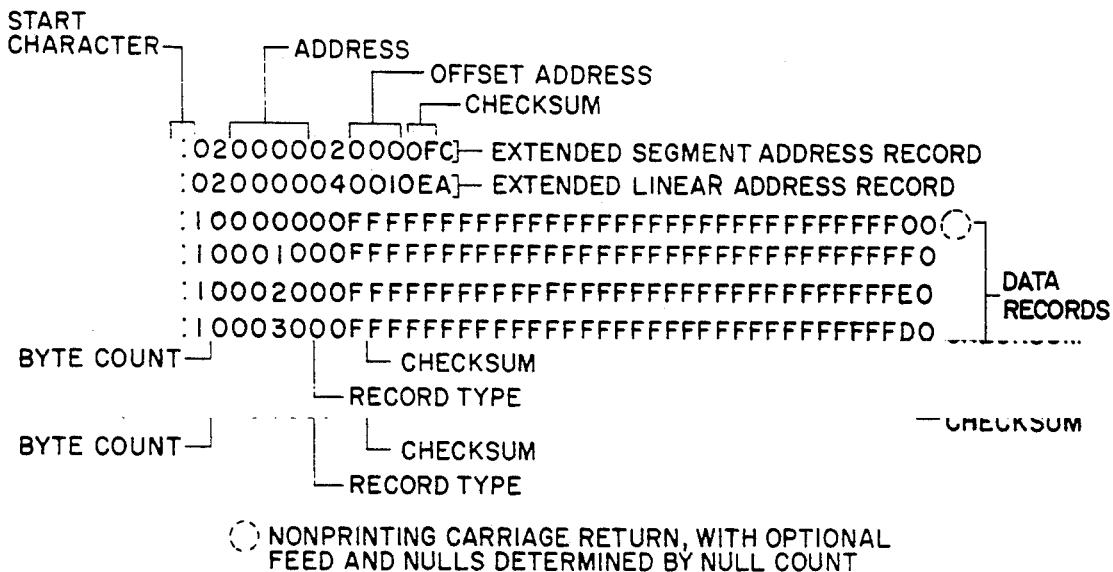
FIG. 5 is an example illustrating the Intel 32 bit Hexadecimal Object File Record Format used with the present invention.

It should be noted that for the purpose of loading the rapid reprogramming terminal software into rapid reprogramming terminal 20, the Intel format illustrated in FIG. 5 is modified by replacing the byte count with a word count. The Intel format of FIG. 5 is used as illustrated for all upload and download functions.

Referring to FIG. 5, the Intel 32-bit Hexadecimal Object file record format or the modified format each have a nine character (four field) prefix that defines the start of record, byte count or word count, load address, and record type and a two character checksum suffix. FIG. 5 illustrates the sample records of the Intel format. The six record types for the Intel HEX-32 format are 00 (data record), 01 (end of file record), 02 (extended segment address record), 03 (start segment address record), 04 (extended linear address record) and 05 (start linear address record).

The data record begins with a colon start character, which is followed by the word or byte count which is in hexadecimal notation, the address of the first data word or byte, and the record type which is "00". The data bytes are next in the data record. The checksum follows the data bytes and is the two's complement in binary of the preceding bytes in the record, including the word or byte count, address, record type and data bytes.

The end-of-file record also begins with the colon start character and is followed by the word or byte count (equal to "00"), the address (equal to "0000"), the record type (equal to "01") and the checksum, "FF".

The extended segment address record is added to the offset address to determine the absolute destination address. The address field for this record must contain ASCII zeros (Hexadecimal 30's). The extended segment address record defines bits 4 to 19 of the segment base address. This record type can appear randomly anywhere within the object file and affects the absolute memory address of subsequent data records in the file.

The start segment address record, which specifies bits 4-19 of the execution start address for the object file, is not used by rapid reprogramming terminal 20.

The extended linear address record specifies bits 16-31 of the destination address for the data records that follow. This record is added to the offset address to determine the absolute destination address, and can appear randomly anywhere within the object file. The address field for this record must contain ASCII zeros (Hexadecimal 30's).

The start linear address record, which specifies bits 16-31 of the execution start address for the object file, is not used by rapid reprogramming terminal 20.

The CMDMODE.C module interfaces a keyboard 62 with rapid reprogramming terminal 20 to allow a user/operator to enter commands into the rapid reprogramming terminal 20. When the user enters "+++" into rapid reprogramming terminal 20 via keyboard 62 a Command Mode menu will appear on video screen 64. The Command Mode menu includes the following UPLOAD (U), DOWNLOAD (D), ERASE (E), PROGRAM (P) and ESCAPE. When the user enters a "U" via the keyboard 62, digital data is transferred from an external computer 66 through either the RS-232 or RS-422 interfaces to IC memory card 22. Similarly, when the user enters a "D" via the keyboard 62, digital data is transferred from IC memory card 22 through either the RS-232 or RS-422 interfaces to external computer 66.

An "E" entered by the user via keyboard 62 erases IC memory card 22. Entering a "P" via keyboard 62 allows the user to enter a new program into EEPROM 23. The PROGRAM command functions in the same manner as the UPLOAD command. The Escape key on keyboard 62 allows the user to escape the Command Mode menu.

The RRT_MAIN.C module is an untimed background executor module looking for inputs such as the "+++" command entered via keyboard 62.

The RRT_BIT.C module is a software built in test routine which when power is turned on for rapid reprogramming terminal 20 test the communications interfaces of rapid reprogramming terminal 20. The RRT_BIT.C module first tests the liquid crystal display 57 by activating the display elements to ensure they are functioning with the elements display 57 remaining active until the module completes its function. The duration of the test provides an indication of the operation of the MS-1553 encoder shift clock within bus encoder/decoder 41, FIG. 1. Next UART circuits 37 and 38 are tested using an internal loop test subroutine Then the MS-1553 encoder/decoder 41 and transceiver 39 are tested using a hardwired "echo" characteristic of transformer 40, that is a signal is provided to transformer 40 and the echo return of the signal provided from transformer 40 is used to test decoder 41 and transceiver 39. Next the EXEC/SKIP switch 49, FIG. 2, is tested to ensure it is not stuck. Finally, the presence of the IC memory card 22 is tested. If IC memory card 22 is present, that is the IC memory card 22 is inserted into rapid reprogramming terminal 20 and the card is a RAM card the battery of IC memory card 22 is tested. If any of these tests fail the display elements of liquid crystal display 57 will remain active until they pass or the RESET switch 45 is pressed to begin another software built in test.

UART activity is tested for in both UART circuits 37 and 38 of rapid reprogramming terminal 20 to process any digital data/characters being received. If a "+++" character sequence occurs from either UART circuit 37 or UART circuit 38 the program will enter the Command Mode and display on video screen 64 the Command Menu. All other character sequences are echoed with no further processing taking place.

Switch 49 on front panel 43 is tested for the EXEC position. If switch 49 is in the EXEC position and IC memory card 22 is present the SWITCHES.C module is called to setup and control the loading process of IC memory card 22.

The UPLOAD.C module is the module which uploads data from processor 21 to IC memory card 22. An upload prompt message is displayed on video screen 64 at the beginning of this module. The module tests the status of IC memory card 22 for changes, that is IC memory card 22 must be operating properly and the battery for IC memory card 22 must be sufficiently charged. The UPLOAD.C module then enters an infinite loop to process incoming records in an Intel Hex-32 format. All Intel Hex-32 record types are supported except types 03 and 05. Once a proper data record (type 00) is received the byte oriented data record is transferred to IC memory card 22. The UPLOAD.C module is exited with the proper receipt of a type 01 record, that is an end of data record, and returns to the command mode.

The DOWNLOAD.C module is the module during which data is down loaded from IC memory card 22 to digital signal processor 21. The DOWNLOAD.C module displays a download prompt message on video screen 64 asking for the location of the data to download and then proceeds to download the data in the Intel Hex-32 format of FIG. 5. Upon completion of the down loading of data this module returns to the Command Mode.

The SWITCHES.C module is the switch test and the interactive reprogram control module. The mux/direct switch 46, down/up switch 47, and vrfy/load switch 48 of front panel 43 comprise the mode of operation of rapid reprogramming terminal 20, while the EXEC/SKIP switch 49 determines whether a data file is to be loaded/verified or skipped. The SWITCHES.C module updates the status of switches 46 through 49 and test whether the current data file should be loaded/verified or skipped. If the data file is to be loaded/verified it selects the proper bus, bus characteristics, and executes a protocol based upon the contents of a lookup table in IC memory card 22.

Switch status is first tested for switch 49 to determine whether switch 49 has been activated to the EXEC position. Next all the proper pointers are set to point to file headers in IC memory card 22. Finally the mux/direct switch 46 is tested to see if a load is to be performed through the aircraft 1553 multiplex data bus. If the 1553 multiplex data bus is to be used, then the aircraft identification is tested and verified.

The data bus and bus characteristics are obtained from a lookup table stored in IC memory card 22 and selected once it is determined that a data file should be loaded. The Protocol is also obtained from the lookup table and executed. Once data is loaded/verified pointers are set to the next file and the operation is repeated until no further file names are found.

The PROTOCOL.C module contains the protocol identified in Military Standard 2217 that are not yet implemented in the rapid reprogramming terminal 20.

This PROTOB.C module is the Protocol B module of the rapid reprogramming terminal's software which directs the loading and verifying of digital data to and from a remote terminal 53 aboard the aircraft. Loading of the remote terminal 53 is preformed by first sending an activity message to ensure that the remote terminal 53 is not busy. After a short delay rapid reprogramming terminal 20 sends a memory configuration message to see if the data was already loaded. If the data was not previously loaded, rapid reprogramming terminal 20 sends a load message to begin the process of loading the remote terminal 53. Next a header message is sent to pass on the size and location of the data to be loaded, followed by data load messages which are sent to the remote terminal 53 until all the data is transferred. A trailer message is then sent to the remote terminal 53 containing a checksum so that the data transferred to the remote terminal 53 can be validated. Finally an exit load message is sent by rapid reprogramming terminal 20 to the remote terminal 53 to terminate the load process.

The verification process is performed by first sending an activity message to ensure the remote terminal 53 is not busy. After a short delay rapid reprogramming terminal 20 sends an enter verify message to the remote terminal 53 followed by a header message to pass on the size and location of the data to be verified. The data is down loaded a message block at a time until all the data is received by rapid reprogramming terminal 20. As each data message is received the down/up 47 and vrfy/load 48 switch status is checked to determined if rapid reprogramming terminal 43 is performing a download into IC memory card 21 or a verify of the data in the IC memory card 21. When all the data is received and processed a trailer message is sent followed by an exit verify message to terminate the verification process.

The PROTOC.C module of the rapid reprogramming terminal's software is similar to PROTOB.B module except that the PROTOC.C module directs the loading and verifying of digital data to and from a bus controller aboard the aircraft.

The MESSAGES.C module is the message module for the rapid reprogramming terminal software and contains all the messages used by all protocols of the software. The MESSAGES.C module directs the proper sending and receiving of these messages and returns an indication of the nature of any failure occurring during the transfer or processing of the message. The messages used by rapid reprogramming terminal 20 are the following:

TABLE II

| Activity message | Exit Load message |
|---|---|
| Memory Configuration message | Memory Data Verify message |
| Enter Load message | Enter Verify message |
| Header message | Exit Verify message |
| Memory Data Load message | Reprogram Status message |
| Trailer message | RRT Error message |

The MS1553.C module is the MS-1553 driver module which contains routines used to transfer data to and from the MS-1553 data bus on board the aircraft. When rapid reprogramming terminal 20 is performing as a bus controller, the routines are an MS-1553 Send routine which outputs messages to the 1553 data bus and an MS-1553 Receive routine which inputs messages from the 1553 data bus. When rapid reprogramming terminal 20 is performing as a remote terminal, the routine used to send and receive data is an MS-1553 Respond routine.

When rapid reprogramming terminal 20 is performing as a bus controller, these messages are contained in a message buffer and the returned status message is put in a status buffer. The first word of a message is put in the serial port 0 output shift register of digital signal processor 21 after the register is verified empty. A command sync signal and an encode enable signal are then set. When digital data is being shifted out of the serial port 0 output shift, the sync and enable signals are cleared. This process is repeated for each of the remaining data words with the sync signal always cleared until all the data is sent to the 1553 data bus. The echoed data received from transformer 40 through transceiver 39 and bus encoder/decoder 41 is next flushed. Status is received by waiting for a valid sync signal and then inputting the word contained in the serial port 0 receive shift register of digital signal processor 21 into internal RAM of processor 21.

The MS-1553 Receive routine inputs messages from the 1553 data bus to digital signal processor 21. The command word that initiates a receive data message is stored in a command status buffer. The messages are stored in a software storage array indicated by a passed pointer. Once the command word is sent to the 1553 data bus all echos are flushed prior to waiting for the receive message. Each word is input after a valid sync signal is received and when valid data is indicated. The MS-1553 Respond routine, which is used when rapid reprogramming terminal 20 is a remote terminal, provides for a pointer to the command expected by rapid reprogramming terminal 20, that is rapid reprogramming terminal 20 request a command word from the bus controller 55. When the bus controller 55 polls rapid reprogramming terminal 20 with activity messages, rapid reprogramming terminal 20 through its response to the activity message can request a command or service request from the bus controller 55. The MS-1553 Respond routine also has a message pointer which points to the data and status information which are provided by rapid reprogramming terminal in response to the command word supplied by the bus controller.

The TIMER.C module of the rapid reprogramming terminal software is the timer module which contains the timer routines used to set delays or timeouts.

The ERROR.C module of the rapid reprogramming terminal software contains routines that display error messages such as the voltage on the battery of IC memory card 22 is low.

The ERASE.C module clears IC memory card 22 by writing logic zeros in each location in the memory of IC memory card 22.

The SERIALIO.C module of the rapid reprogramming software is the RS-232 and RS-422 driver modules which contains routines used to transfer data to and from the RS-232 and RS-422 data buses.

The EIA RS-232 data bus protocol or interface is a conventional, well known, widely used and popular data bus protocol which provides an interface between data terminal equipment and data communications equipment using serial binary data exchange. It may typically be used to interface a computer and a peripheral device such as a modem, mouse, drawing tablet or printer and typically uses a 25 pin DB-25 or a 9 pin DB-9 connector. It normally has a cable length limitation of 50 feet. The RS-232 interface standard specifies the electrical signal characteristics, connector pin assignments and functional interchange circuit descriptions for serial binary exchange.

The RS-422 is an EIA standard for serial transmission that extends the distances and speeds beyond the RS-232 standard.

The routines used by the SERIALIO.C module for the RS-232 interface are a Get Byte routine which inputs data bytes by constructing the byte from nybles obtained from the Get Nyble routine; a Get Nyble routine which inputs data nybles obtained from ASCII characters returned by an RS232 Receive routine; a Put Byte routine which outputs bytes by constructing nybles and sending them through a Put Nyble routine; a Put Nyble routine which outputs nybles by constructing ASCII characters and then outputs the nybles through the RS232 Send routine; a RS232 Receive routine which inputs ASCII characters by first testing the UART status until a character is received and then getting the character from the RS232 Data routine and an RS232 Data routine which inputs ASCII characters directly from the UART receive register without testing any UART status bits other that those indicating if an error (overrun, parity, etc.) has occurred. Further, the SERIALIO.C module for the RS-232 interface uses a RS232 Send routine which outputs ASCII characters by first testing for a busy (the RS-232 interface might be sending data) and if busy prevents a receive overrun and when not busy a receive is enabled and data is sent. The SERIALIO.C module for the RS-232 interface also uses a String Send routine which outputs ASCII strings by first testing the busy status to ensure that each character can be sent.

The DSPINIT.ASM module is the entry point for the rapid reprogramming terminal program. The DSPINIT.ASM module establishes interrupt vectors, initializes internal registers within digital signal processor 21, performs an auto-initialization which moves variables from ROM to RAM within digital signal processor 21 for usage by processor 21, initializes internal control registers within processor 21, and calls a system initialization routine for rapid reprogramming terminal 20 prior to calling RRT_BIT.C. A description of each section of the DSPINIT.ASM module follows.

The Processor Global Declarations contain declarations of two types, defined globals which are labels defined by the DSPINIT.ASM module and used by other modules and referenced globals which are labels used by the DSPINIT.ASM module that were defined by another module.

The reset and interrupt vector specification contains values or references used to established vectored entry points throughout the rapid reprogramming terminal program. This section's "int-vecs" (interrupt vectors) are mapped into the lower part of program memory by a linker through its interpretation of the linker command file (LNK30.EXE program for digital signal processor 21).

The Stack, DMA, Timer 0, Timer 1, Serial Port 0 and Serial Port 1 sections of DSPINIT.ASM contain references used to establish the location of internal registers of digital signal processor throughout the program. These register locations are defined in a linker command file.

The data constants define values used in initializing the internal registers of the Digital Signal Processor 21 with the specific function of each value being described in the module.

Once the stack pointer, frame pointer, cache, and interrupts are established for digital signal processor 21 an auto-initialization takes place. Auto-initialization is the process of moving variables defined in the ROM of processor 21 into the RAM of processor 21 where these variables can be manipulated. The location in the internal digital signal processor 21 RAM is established in the linker command file.

The defined data constants are then stored into their appropriate locations, completing the process of initializing the various Digital Signal Processor 21 internal control registers leaving only the initialization of the external system components prior to entering the main program.

The SYSINIT.ASM module is the system initialization routine which performs a hardware reset and initializes the registers of all peripheral devices.

Hardware Reset is performed by taking a dedicated output discrete high (active high reset) for approximately 16 microseconds and then low again. This discrete is connected to UARTS 37 and 38, and all three programmable peripheral interfaces 52, 54 and 56 reset pins.

The initialization of these peripherals configures the peripherals to accomplish specific functions. UART 37 is initialized as RS-232 Data Set Equipment (DSE) for the fastest baud rate the Data Terminal Equipment (DTE) will operate at. The second UART 38 is initialized as RS-422 Data Set Equipment also for the fastest baud rate the terminal will operate at. Both UARTs 37 and 38 may be reconfigured for equipment loading, as specified by the IC memory card's contents, for those loads not transpiring over the MS-1553 bus. Programmable peripheral interfaces 52, 54 and 56 are configured to support discrete input or output functions as described in the rapid reprogramming terminal program.

The INTERRUPT.ASM module provides for interrupt routines and is currently not being utilized by rapid reprogramming terminal 20.

The CONTROL.C module is used to detect and to establish control of the 1553 multiplex data bus 42. The CONTROL.C module performs a bus polling function which determines if rapid reprogramming terminal 20 is being polled by a bus controller 55 on the 1553 multiplex data bus 42. The second function performed by the CONTROL.C module is that of converting rapid reprogramming terminal 20 to a bus controller and also converts the bus controller to a remote terminal. The third function performed by the CONTROL.C module is to quiet or inactivate the bus controller for the purpose of reprogramming a remote terminal 53. For example, if rapid reprogramming terminal 20 is to reprogram an AN/ALQ-126B Defensive Electronic Counter Measures Set (a remote terminal on the electronics warfare bus) and the AN/ALR-67 Radar Warning Receiver (the bus controller on the electronic warfare bus) is active, the CONTROL.C module will quiet the AN/ALR-67 Radar Warning Receiver to allow rapid reprogramming terminal 20 to reprogram the AN/ALQ-126B Defensive Electronic Counter Measures Set. The fourth function performed by the CONTROL.C module is to enable a bus controller which was previously quieted by the CONTROL.C. For example, if it is now required to reprogram the AN/ALR-67 Radar Warning Receiver the CONTROL.C module will enable the AN/ALR-67 Radar Warning Receiver for the purpose of reprogramming. The fifth function performed by the CONTROL.C module takes the bus controller that was previously converted to a remote terminal by the CONTROL.C module and reconverts it to a bus controller and also reconverts rapid reprogramming terminal 20 from a bus controller to its initial RT status.

The DISPLAY.C module performs two functions with respect to liquid crystal display 57 in that it provides for the initialization (LCD_initialization) of liquid crystal display 57 and for the alpha numeric display (LCD_display) provided to the operator by liquid crystal display 57. The initialization function of the DISPLAY.C module clears liquid crystal display 57 and sets up display 57. It should be noted that liquid crystal display 57 provides two lines of alpha numeric display characters with each line having twenty alpha numeric characters for display. The display function provides for two arguments for the function call, the first argument being the string of alpha numeric characters to be displayed by liquid crystal display and the second argument being the starting location of the string of alpha numeric characters to be displayed by liquid crystal display 57. If the value of the starting location is zero LCD_display clears display 57 prior to displaying the string of alphanumeric characters. If the value of the starting location is other than zero LCD_display causes liquid crystal display 57 to display the string of alpha numeric characters for viewing by the operator without clearing display 57.

Figure 7:
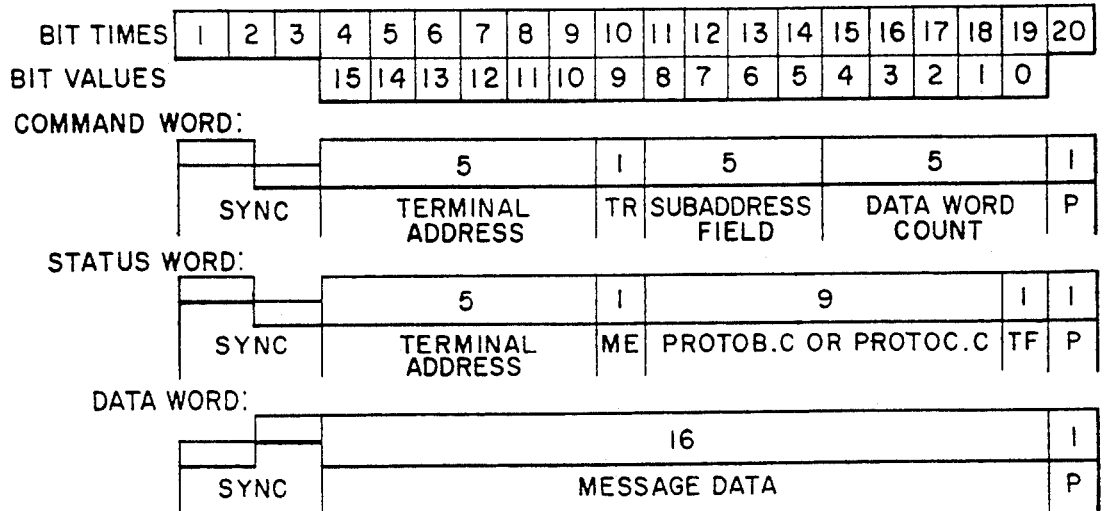
FIG. 7 illustrates the format of message transfers via the 1553 multiplex data bus interface aboard an aircraft.

Referring to FIG. 7, the format of message transfers on the 1553 multiplex data bus 42 will now be discussed. Encoder/decoder 41 is used to translate sixteen bit data words provided by processor 21 into Manchester mark encoded Military Standard 1553 signals for use by 1553 multiplex data bus 42 and also to decode Manchester mark signals provided by bus 42 into sixteen bit data words supplied to processor 21. A logic one is transmitted as a bipolar coded signal 1/0 or 0/1, occurring during on the falling edge of the data clock (either the one megahertz ESCLK signal or either one megahertz DSCLK signal provided by encoder/decoder 41). A logic zero is the absence of a bipolar coded signal transition occurring during the falling edge of the data clock. A transition always occurs during the rising edge of the data clock. An absence of either pulse within a bit time is a Manchester error. The transmission rate is set at one megahertz.

The encoder/decoder 41 used in the preferred embodiment of the present invention is a Model No. HD-15530 CMOS Manchester Encoder-Decoder manufactured by Harris Corporation, although it should be understood that any integrated circuit device which functions in accordance with the requirements of Manchester encoded time division multiplexed serial data protocols may be used with the present invention. The transceiver 39 used in the preferred embodiment of the present invention is a Model No. 63102 II Military Standard 1553 data bus transceiver manufactured by ILC Data Device Corporation, although it should be understood that any integrated circuit device which functions in accordance with the requirements of Manchester encoded time division multiplexed serial data protocols may be used with the present invention. The transformer 40 used in the preferred embodiment of the present invention is a Military Standard 1553 data bus isolation transformer manufactured by ILC Data Device Corporation.

As is best illustrated by FIG. 7, the Command Word format for each Command Word transmitted by rapid reprogramming terminal 20 consist of a command sync waveform which is an invalid Manchester waveform. The width of the waveform is three bit times with the waveform being positive for the first one and one-half bit times, and then negative for the following one and one-half bit times.

The next five bits (Bit times 4 to 8, bits 11-15) following the sync waveform is the remote terminal address, with there being thirty addressable units per bus since the digital codes 00000 and 11111 are not used. The type of avionics or other equipment defined by these addresses vary by aircraft and selected bus.

Following the remote terminal address is the transmit/receive bit (Bit time 9, bit 10) which indicates the action required of the remote terminal 53. A logic zero indicates that the remote terminal 53 is to receive data, while a logic one indicates that the remote terminal 53 is to transmit data.

The subaddress field (Bit time 10 to 14, bits 5-9) follows the transmit/receive bit and identifies the type of message, for example an activity message. The subaddress values 00000 and 11111 are used for mode commands.

The data word count (Bit times 15 to 19, bits 0-4) follows the subaddress field and is a binary number indicating the data words to be either sent or received by the remote terminal 53. The remote terminal 53 may either send or receive a maximum of thirty two words in any one message block with all ones indicating a decimal count of thirty one and all zeros indicating a decimal count of thirty two.

The P bit (Bit time 20) of the command word is used for parity over the preceding sixteen bits and utilizes odd ones parity.

Status words are transmitted by a remote terminal 53 after receipt of rapid reprogramming terminal generated Command Word or following a rapid reprogramming terminal to remote terminal transfer.

The Status Word format for each Status Word transmitted by a remote terminal 53 consist of a status sync waveform which is an invalid Manchester waveform identical to the command sync waveform.

The next five bits (Bit times 4 to 8, bits 11-15) following the sync waveform is the address of the remote terminal 53 which is transmitting a status word.

Following the remote terminal 53 address is a message error bit (Bit time 9, bit 10) which is not currently used by rapid reprogramming terminal 20.

The status code field (Bit times 10 to 18, bits 1-9) follows the message error bit and is used to convey remote terminal status information to rapid reprogramming terminal 20.

The terminal flag (Bit time 19, bit 0) follows the status code and will be set to one to indicate that the status code field should be examined by rapid reprogramming terminal 20.

The P bit (Bit time 20) of the status word is used for parity over the preceding sixteen bits and utilizes odd ones parity.

Sequences of up to thirty two data words may be sent from a remote terminal 53 to rapid reprogramming terminal 20 or from rapid reprogramming terminal 20 to a remote terminal 53. Each data word consist of a data sync waveform (Bit times 1 to 3) which is an invalid Manchester waveform. The width of the waveform is three bit time with the waveform being negative for the first one and one-half bit times, and then positive for the following one and one-half bit times.

The sixteen message data bits (Bit times 4 to 19, bits 0-15) following the sync waveform are used for message data transmission.

The P bit (Bit time 20) of the data word is used for parity over the preceding sixteen bits and utilizes odd ones parity.

Referring to FIG. 8(A) during the transfer sequence from rapid reprogramming terminal 20 to a remote terminal 53, terminal 20 transmits a command word with its TR bit set to zero, followed immediately by from one to thirty two data words also generated by terminal 20. The remote terminal 5 next responds with a status word.

Referring to FIG. 8(B) during the transfer sequence from a remote terminal 53 to rapid reprogramming terminal 20, rapid reprogramming terminal 20 transmits a command word with its TR bit set to one. The remote terminal 53 responds with a status word followed by one to thirty two data words.

The messages of Table II utilized by rapid reprogramming terminal 20 to communicate with a remote terminal 53 being reprogrammed via the 1553 multiplex data bus 42 will now be discussed. It should be understood that the messages used by rapid reprogramming terminal 20 to communicate with any remote terminal 53 aboard the aircraft via the 1553 data bus are required to follow the message formats set forth in FIGS. 7 and 9.

The Activity Message of FIG. 9(A) is utilized by rapid reprogramming terminal 20 when reprogramming a remote terminal 53 to determine whether the remote terminal 53 is ready to receive data and allows the remote terminal 53 a request to send information to rapid reprogramming terminal 20 or receive information from rapid reprogramming terminal 20.

Referring to FIG. 9(A) the Command Word for the activity message follows the format set forth in FIG. 7. Bits 11-15 provide the address of the remote terminal 53 to receive the message, bit 10 is set at a logic one, the subaddress (bits 5-9) is set at 07 hexadecimal and the word count (bits 0-5) is one.

The status word response to the activity message as well as the other messages of Table II follows the general format set forth in FIG. 7 supplemented by FIG. 9(B). A status response word to any of the messages set forth in Table II is provided by a remote terminal 53 for each message transaction. The status response word follows data on a remote terminal receive type transaction and precedes the data on a remote terminal transmit type transaction. The rapid reprogramming terminal 20 allows a response time gap of approximately 12 usec. from the end of the last transmitted command word (transmit type message) or the end of the last transmitted data word (receive type message), to the start of the remote terminal status response word before declaring a no response error. The remote terminal 53 begins the status response word within a time period of approximately 2-10 usec. from the receipt of the end of the command word (transmit type message) or the receipt of the end of the last data word (receive type message). The software for rapid reprogramming terminal ensures that the time from the end of the remote terminal transmission of the last data word (transmit type message) or the end of the last status response word (receive type message) to the beginning of the next command word is at least 8 usec.

Referring to FIG. 9(B), the status response word bits for each of the messages of Table II comprise a terminal address (bits 11-15) which is remote terminal address of the remote terminal 53 being reprogrammed (referred to as YYYYY); a message error bit (bit 10) which is not used; a service request bit (bit 8) and a busy bit (bit 3).

The busy bit is utilized by rapid reprogramming terminal 20 if it is set and when the remote terminal being reprogrammed is compatible with setting the busy bit, that is the remote terminal recognizes the busy bit. The setting of this bit to a logic one indicates to the rapid reprogramming terminal 20 that it is necessary to suspend or slow down communications with the remote terminal 53. The first status response word received by the rapid reprogramming terminal 20 with the busy bit set to a logic one causes the rapid reprogramming terminal 20 to send only activity messages (normally every 10 msec.) until the busy bit is cleared (logic 0). As long as the busy bit is clear in the status response word from a remote terminal 53, rapid reprogramming terminal 20 assumes that the remote terminal 53 can support a continuous stream of identical messages within a 2 msec. time period from the end of one message to the start of the next command word. The continuous stream of identical messages is assumed to be either memory data load or memory data verify messages.

This continuous stream is maintained for a time period compatible with IC Memory Card 22 and remote terminal 53 data transfer capabilities and at a minimum, rapid reprogramming terminal 20 is capable of transferring 2K data words (in memory data load or memory data verify messages) per second when remote terminal 53 does not indicate a busy status during the transfer. Any data word transmitted after a status word with the busy bit set is ignored by rapid reprogramming terminal 20. If the remote terminal 53 being reprogrammed cannot set the busy bit in the remote terminal status response, then prior to each message transmission other than an activity message transmission, rapid reprogramming terminal 20 will command an activity message from the remote terminal 53 being reprogrammed and inspect the busy bit in the data word following the status response word to determine if the remote terminal 53 is ready to communicate with rapid reprogramming terminal 20.

The operation of rapid reprogramming terminal 20 after the busy bit has been set to a logic one and then cleared varies depending on the operation of the remote terminal 53. If the busy bit was set in the status response word for a transmit type command, after the busy bit is cleared (in the response to the activity message) the last transmit command will be repeated so that rapid reprogramming terminal 20 can receive data words that were ignored when the busy bit was set.

If the busy bit was set in the data word of the activity message which is only applicable when the busy bit is not set in the status response word, the data word for the first activity message with the busy bit cleared will be processed normally.

If the busy bit is set in the status response word for a receive type command, then two options (selectable by a flag in the look up table for the remote terminal being reprogrammed) are allowed. Rapid reprogramming terminal 20 assumes that the data words were not received by the remote terminal 52 and when the busy bit is cleared in the status response word for the activity message, the last received message will be repeated or rapid reprogramming terminal assumes that the data words were received by the remote terminal 53 and when the busy bit is cleared in the status response word for the activity message, the last received message will not be repeated.

Referring again to FIG. 9(A), the remote terminal address (bits 11-15) for the status word response to the activity message is the address of the remote terminal 53 being reprogrammed. The message error bit (bit 10) may be a one or a zero since this bit is not utilized. The service request bit (bit 8) may normally be a one or zero since this bit is not utilized unless a data transfer is in progress. When the service request bit is not used, rapid reprogramming terminal 20 determines that the remote terminal 53 is requesting a message transaction based on the fact that the contents of bits 0 through 10 of the data word that follows are non-zero.

The busy bit (bit 3) if set to a logic one is used to indicate that the remote terminal 53 is not ready to process any messages from terminal 20 other than the activity message. Prior to the transmission of any other type messages to the remote terminal 53, rapid reprogramming terminal 20 will continue to send Activity Messages (approximately every 10 msec.) to the remote terminal 53 until the busy bit is cleared, or the number of sequential Activity Messages is exhausted as determined from a lookup table or a Reprogram Status Message is requested. Remote terminal 53 will respond to the busy bit (bit 15) in the data word that follows only when the busy bit in the status word is not set. Bits 9, 7, 6, 5, 4, 2 and 1 of the status word are not utilized and therefore may be either a one or a zero.

The terminal flag bit (bit 0) of the status word is used only when a data transfer from rapid reprogramming terminal 20 to a remote terminal 53 is in progress. Following a header message and preceding an exit load message during a data transfer, if the terminal flag bit and the service request bit of the status word are set at a logic one state, rapid reprogramming terminal 20 will extract from a data word sent by the remote terminal 53 to rapid reprogramming terminal 20 the next command word to be sent by rapid reprogramming terminal 20 to the remote terminal 53. This command word is the command word for the reprogram status message of Table II.

Rapid reprogramming terminal will ignore the data word of the activity message when the busy bit is set to a logic one in the status response word provided by remote terminal 53; thus, the remote terminal 53 need not transmit the data word.

The busy bit (bit 15) in the data word for the activity message functions identically to the busy bit in the status word (bit 3). This bit is provided to accommodate a remote terminal 53 that does not utilize bit 3 of the status word to indicate it is busy. The busy bit and the remote terminal request bits (bits 0-10) of the data word will not be set simultaneously unless the remote terminal 53 requires sending a reprogram status message to rapid reprogramming terminal 20. The busy bit need not be set to a logic one state in order to send a reprogram status message to rapid reprogramming terminal 20. Rapid reprogramming terminal 20 will not honor the reprogram status message request until an activity message containing the request with the busy bit clear or at the logic zero state is received by terminal 20.

The request bits (bits 0-10) of the data word are utilized to allow the remote terminal 53 to request that rapid reprogramming terminal 20 send a specific command to the remote terminal 53. As a result of the remote terminal request, rapid reprogramming terminal 20 will transmit a command word with the remote terminal address defined in bits 11 through 15 of the command word and the contents of the activity message remote terminal request in bits 0-10 of the data word. The TR bit (bit 10) is set to 1 if remote terminal 53 is to transmit a message and will be set to 0 if remote terminal 53 is to receive a message. The subaddress bits (bits 5-9) of the data word indicate the subaddress of the message to be sent. The word count bits (bits 0-4) indicate the data word count for the message. Bits 11-14 are equal to a logic 0.

The activity messages prior to rapid reprogramming terminal 20 beginning a Load/Verify operation or a Verify operation will now be discussed. After the setting of the discrete, that is the setting of the outputs of programmable peripheral interfaces 52, 54 and 56 and the expiration of a 10 msec. wait period, the first messages commanded by rapid reprogramming terminal 20 are activity messages regardless of whether or not a lookup table for the remote terminal 53 indicates that activity messages are required for each and every transaction. A transaction, in turn, comprises a header message followed by a number of data transfer messages as indicated by the header message and a trailer message. Bits 11-14 of the activity message data word are never used by rapid reprogramming terminal 20. The digital information received in bits 0-10 of the data word for all activity messages commanded by rapid reprogramming terminal 20 before the first message of FIG. 9(D) ar ignored by terminal 20. This operation is implemented to permit use of the activity message subaddress for other uses when reprogramming is not being performed, that is rapid reprogramming terminal 20 only assumes the activity message data is valid after reprogramming of a remote terminal 53 has begun by the setting of discretes and receipt of a valid load/verify message, FIG. 9(D). The information received in bit 15 (busy bit) of the data word for all activity messages commanded by rapid reprogramming terminal 20 before the load/verify message, FIG. 9(D), will only be used if the lookup table for the remote terminal 53 indicates that activity messages are required for every transaction and the busy bit is not set to a logic one in the status word response to the activity message. In this case the remote terminal 53 must ensure that bit 15 of the data word is valid or set to zero prior to receipt of the load/verify message, FIG. 9(D).

In the manual mode, if the remote terminal lookup table indicates that memory configuration messages are supported, then there will be a memory configuration message commanded before the load/verify message, FIG. 9(D), and rapid reprogramming terminal 20 will expect valid memory configuration data. Ignoring the activity message data word bits 0-14 precludes a remote terminal 53 from sending a reprogram status message prior to receipt of the load/verify message, FIG. 9(D), from rapid reprogramming terminal 20; however, a reprogram status message would not be valid before reprogramming is initiated. Therefore a remote terminal 53 should not request a reprogram status message until after the remote terminal 53 receives a load/verify message, FIG. 9(D).

Referring to FIG. 9(C), the data word in the activity message provided prior to a memory configuration message is processed only when rapid reprogramming terminal 20 is required to check the busy bit status (check bit 15 of the data word of the activity message) of remote terminals 53 that do not use the busy bit in the status response word. The memory configuration message is utilized to read the current memory configuration of remote terminals 53. This message is only used when its use is indicated in a lookup table for the remote terminal 53. The command word and status word for the memory configuration message follow the format of FIG. 7. Each remote terminal 53 aboard an aircraft has up to two memories designated memory area one and memory area two. Data bits 0-15 of data word one of the memory configuration message represent the configuration of the data stored in memory area one. Unused data bits equal zero. Similarly, data bits 0-15 of data word two of the memory configuration message represent the configuration of the data stored in memory area two. Unused data bits equal zero. In the automatic mode of operation this message is used for the purpose of comparing a remote terminal's configuration stored in the IC memory card 22 with reported remote terminal configuration. If the reported value is the same as the value stored in the IC memory card 22, rapid reprogramming terminal 20 will not perform a load operation. However, if the reported value is different from the value stored in the IC memory card 22, rapid reprogramming terminal 20 will proceed with a load operation.

Referring to FIG. 9(D), there is shown the format for the enter load, exit load, enter verify and exit verify messages of Table II. For the first enter load, exit load, enter verify or exit verify message, the data word in the activity message provided prior to a enter load, exit load, enter verify or exit verify message will be processed only when rapid reprogramming terminal 20 is required to check the busy bit status (check bit 15 of the data word of the activity message) of remote terminals 53 that do not use the busy bit (bit 3) in the status response word and in this case bits 0-14 of the data word will be ignored.

The transmit/receive bit (bit 10) in the command word for the enter load, exit load, enter verify and exit verify messages is a logic zero since the remote terminal 53 is to receive data. The terminal subaddress field (bits 5-9) in the command word is set at 1D hexadecimal. Each message enter load, exit load, enter verify and exit verify requires that an enable signal be provided by rapid reprogramming terminal 20 before a load or verify may be executed. A logic one at the EW_OSM_EN output of interface 54 enables the operating software memory of the electronic warfare system on board the aircraft. Similarly, a logic one at the EW-UDM_EN output of interface 54 enables the user data memory of the electronic warfare system on board the aircraft. When the AV_EN1 output of interface 54 is at a logic one state the first memory areas of the aircraft avionics system are enabled, while a logic one at the AV_EN2 output of interface 54 enables the second memory areas of the aircraft avionics system.

Each field in the data is checked by the remote terminal 53 for compliance with the following prior to execution of a load or verify. The type and number fields are defined based on WRA nomenclature (e.g., RT-1079); however, if this creates a conflict, the system nomenclature (e.g., ALQ-126) is utilized instead. The preferred embodiment of the present invention uses WRA nomenclature.

Data word one (bits 0-15) is the type field consisting of the first two eight bit ASCII characters that represent the nomenclature of the remote terminal 53 being controlled. For example, for RT-1079 the two characters would be "R", "T".

Data word two (bits 0-15) is a number field for consisting of the third and fourth eight bit ASCII characters that represent the nomenclature of the remote terminal 53 being controlled. For example, for RT-1079 the two characters would be "1", "0".

Data word three (bits 0-15) is a number field two consisting of the last two eight bit ASCII characters that represent the nomenclature of the remote terminal 53 being controlled. For example, for RT-1079 the two characters would be "7", "9".

Data word four (bits 10-15) is the fill field which may be any bit pattern including zero and is to be defined by the individual remote terminal 53 being controlled. The fill field is required to be checked even if the field is defined as zero. The fill field is contained in a look up table for the remote terminal 53 being reprogrammed.

The load/verify bits (bits 8-9) are used to described whether a Load, Verify, or other type transaction will follow. The load/verify bits are coded as follows: L/V=01 indicates that a memory load follows; L/V=10 indicates that a memory verify follows; L/V=11 is not used and L/V=00 indicates that a enter load, enter verify, exit load or exit verify message is being sent for some reason other than a load or verify such as to quiet the bus controller for the remote terminal 53 being reprogrammed.

The control code (bits 0-7) of data word four are set as follows: bit 7 is a reprogram enable for memory area one and is equal to 80 hexadecimal; bit 6 is a reprogram enable for memory area two and is equal to 40 hexadecimal; bit 5 is a reprogram disable for memory area one and is equal to 20 hexadecimal and bit 4 is a reprogram disable for memory area two and is equal to 10 hexadecimal. Bit 3 of the control code (08 hexadecimal) indicates to the bus controller for a remote terminal 53 being reprogrammed to convert to a remote terminal so as to allow the remote terminal 53 to be reprogrammed. In addition, bit 3 converts a bus controller 55 which may only be reprogrammed as a remote terminal to a remote terminal for reprogramming. Bit 2 of the control code which is 04 hexadecimal tells the bus controller for remote terminal 53 to stop transmitting or receiving information so as to allow the remote terminal to be reprogrammed. The use of bit 2 of the control code in this manner is required because some bus controllers can not be converted to a remote terminal when reprogramming a remote terminal 53. Bit 1 of the control code which is 02 hexadecimal is utilized to have a bus controller when converted to a remote terminal revert back to a bus controller. Bit 0 of the control code which is 01 hexadecimal causes the remote terminal to begin executing starting at the address previously supplied via data word three or data word four of a header message.

The control code field is valid only if all other fields are correct and only if either the Avionics Reprogram Enable 1 (AV_EN1 output of interface 54); or the EW UDM Reprogram Enable discrete (the EW-UDM_EN output of interface 54) is present or the Avionics Reprogram Enable 2 (AV_EN2 output of interface 54) or the EW OSM Reprogram Enable discrete (EW-OSM_EN output of interface 54) is present. At the end of reprogramming, rapid reprogramming terminal 20 will maintain the active discrete for at least 100 msec after the transmission of a exit load or exit verify message that ends the reprogramming mode.

The following are the only valid control codes that can occur when rapid reprogramming terminal 20 is functioning as a bus controller during a load or verify. Any other code shall cause the remote terminal to not execute a load or verify.

Code 00000000 which is 00 hexadecimal indicates that no load or verify control action is to be taken.

Code 00000001 which is 01 hexadecimal will cause the remote terminal 53 to begin execution starting at the address previously supplied via data word three and data word four of the header message.

Code 00000010 which is 02 hexadecimal will cause the remote terminal 53 to revert back to a bus controller. Upon execution of this Code the message traffic shall be for rapid reprogramming terminal 20 functioning as a remote terminal.

Code 00010000 which is 10 hexadecimal will cause the remote terminal 53 to exit the reprogramming mode for memory area two. This code is only valid if the Avionics Reprogram Enable 2 or the EW OSM Reprogram Enable discrete is active.

Code 00100000 which is 20 hexadecimal will cause the remote terminal to exit the reprogramming mode for memory area one. This code shall only be valid if the Avionics Reprogram Enable 1 or EW UDM Reprogram Enable discrete is active.

Code 00110000 which is 30 hexadecimal is a combination of 10 hexadecimal and 20 hexadecimal for simultaneous memory areas one and two exit reprogramming mode.

Code 01000000 which is 40 hexadecimal will cause the remote terminal 53 to enter the reprogramming mode for memory area two. This code shall only be valid if the Avionics Reprogram Enable 2 or the EW OSM Reprogram Enable discrete is active.

Code 10000000 which is 80 hexadecimal will cause the remote terminal 53 to enter the reprogramming mode for memory area one. This code shall only be valid if the Avionics Reprogram Enable 1 or the EW UDM Reprogram Enable discrete is active.

Code 11000000 which is CO hexadecimal is a combination of 40 H and 80 H for simultaneous memory areas one and two enter reprogramming mode.

Referring to FIG. 9(E) there is shown the format for a header message which is used to pass load and verify parameters to the remote terminal 53 being reprogrammed. The data word in the activity message provided prior to a header message is processed only when rapid reprogramming terminal 20 is required to check the busy bit status (check bit 15 of the data word of the activity message) of remote terminals 53 that do not use the busy bit (bit 3) in the status response word.

The transmit/receive bit (bit 10) in the command word is at the logic zero state since the remote terminal 53 is to receive data and the terminal subaddress field (bits 5-9) is set at 14 hexadecimal. The transfer mode (bits 14-15) are used to describe the memory data load or memory data verify message data word content. The transfer mode bits are binary coded as follows: TM=00; TM=01; TM=10 and TM=11. When TM=00 which is the no transfer mode, the buffer transfer count contained in data word one and the initial load address contained in data word two have no meaning. This mode is used to transfer the program entry address contained in data word three and Page Number contained in data word four or is used as a preamble to the trailer message.

When TM=01, each sixteen bits of data transmitted in a data word will contain only eight bits of information in bits 0-7. When TM=10, each sixteen bits of data transmitted in a data word will contain sixteen bits of information in bits 0-15. When TM=11, the sixteen bits of data transmitted in each odd word (first is odd) contains the sixteen least significant bits of data in bits 0-15 and each even word (second is even) contains the sixteen most significant bits of data in bits 0-15.

The header type bits (bits 12-13) are used to describe the header and have no meaning when the transfer mode is 00. The header type are binary coded as follows: HT=00, HT=01, HT=10 and HT=11. When HT=00, the buffer transfer count equals the number of words to be transferred. When HT=01, the buffer transfer count equals number of messages to be transferred. HT=10 is undefined, while HT=11 reserved for internal use by digital signal processor 21 and therefore will not be transmitted on the 1553 multiplex data bus 42 aboard the aircraft.

The buffer transfer count (bits 0-11) is used to indicate the amount of data that will follow the header message. The buffer transfer count has no meaning when the transfer mode is 00. The range of the buffer transfer count is from one to four thousand ninety six words.

When HT=00, the buffer transfer count is the total number of data words that will be transmitted in a transaction which includes the header message and trailer message. The data words are transmitted in 32-word messages since each transfer sequence is limited to thirty two data words (see FIG. 8) with the last message containing from one to thirty two data words. The maximum transfer for HT=00 is four thousand ninety six words using one hundred twenty eight memory data load or memory data verify messages.

When HT=01, the buffer transfer count is the number of memory data load or memory data verify messages that will follow the header message. Thus, the maximum data transfer per header message is 4096×32 data words per memory data load or memory data verify message which equals 131,072 sixteen bit words (128K). If paging (data word four, bits 0-1) is utilized for transfer modes 01 or 10, the maximum value of the buffer transfer count will be 2048 which results in 65,536 sixteen bit data words (64K) for transfer modes 01 and 10.

Data word two is the initial load address (bits 0-15) which is the sixteen or less least significant bits of the point in memory into which data is to be loaded or read. The maximum value (number of bits) used in the initial load address is compatible with the page size of remote terminals using paging. Unused bits equal zero.

Data word three is program entry address (bits 0-15) which has meaning only for transfer mode=00. The program entry address is the sixteen or less least significant bit of the point in memory at which the remote terminal 53 being reprogrammed is to begin execution after receipt of an execute command in a load/verify message, FIG. 9(D), or when a transfer control is indicated in data word four. The load/verify message, FIG. 9(D), is only used with remote terminals which require this command. The maximum value (number of bits) used in the program entry address is compatible with the page size of remote terminals using paging. Unused bits equal zero.

Data word four is the page number (bits 3-15) representing up to the thirteen most significant bits for a paged memory address within the remote terminal 53. The page number applies to the program entry address for transfer mode=00 or the initial load address for transfer modes=01, 10 or 11. Unused bits shall equal 0. It should be noted that a page comprises 65,536 addresses in memory.

The transfer control bits 0-1 may be used to transfer control to a loaded program after a verify is processed or to an unaltered memory area after a load is completed, that is a remote terminal 53 has been reprogrammed. When the transfer control bits equal 01 this indicates to the remote terminal 53 being reprogrammed that this is the last header, memory data load or verify (up to 4096 messages), trailer or header, trailer transaction. When the transfer control bits equal 01 this indicates to the remote terminal 53 being reprogrammed that more data is to follow the current header, memory data load or verify (up to 4096 messages), trailer transaction or header, trailer transaction and control should not be transferred. For remote terminals 53 using paging and the program entry address, the transfer control will remain equal to 01 even for the last data transaction, until a transfer mode equals 00 message is used to supply the program entry address and page number. Transfer control equal to 10 indicates that control is to be transferred to the program entry address of data word three. When control is transferred, the transfer does not take place until after the trailer message and control is transferred only to non-reprogrammed areas or verified areas in memory. Transfer control equals 11 is invalid and bit 2 equals zero.

Referring to FIG. 9(F) there is shown the format for a memory data load message which is used to transfer the data to be loaded into the memory of a remote terminal 53 being reprogrammed. The data word in the activity message provided prior to a memory data verify message is processed only when rapid reprogramming terminal 20 is required to check the busy bit status (check bit 15 of the data word o the activity message) of remote terminals 53 that do not use the busy bit (bit 3) in the status response word.

The transmit/receive bit (bit 10) in the command word is at the logic zero state since the remote terminal 53 is to receive data and the terminal subaddress field (bits 5-9) is set at 15 hexadecimal, while the word count may vary from one to thirty two.

If the busy bit (bit 3) is set to a logic one in the status response word for a memory data load message and the remote terminal 53 is of the type that requires retransmission of the message, the memory data load message for which the busy bit has previously been set will be repeated after the busy bit (bit 15 of the data word) in the activity message is cleared or at the logic zero state. The number of data words will equal the word count in the memory data load message command word.

Referring to FIG. 9(G), there is shown the format for a memory data verify message which is used to pass the data that rapid reprogramming terminal 20 will compare to the data stored in IC memory card 22. The data word in the activity message provided prior to a header message is processed only when rapid reprogramming terminal 20 is required to check the busy bit status (check bit 15 of the data word of the activity message) of remote terminals 53 that do not use the busy bit (bit 3) in the status response word.

The transmit/receive bit (bit 10) in the command word is at the logic zero state since the remote terminal 53 is to receive data and the terminal subaddress field (bits 5-9) is set at 15 hexadecimal, while the word count may vary from one to thirty two.

If the busy bit (bit 3) is set to a logic on in the status response word for a memory data verify message then any data words transmitted by the remote terminal 53 are ignored. After the busy bit is cleared in the status response word for the activity message, rapid reprogramming terminal 20 recommends a memory data verify message. The remote terminal 53 ensures that the data words transmitted are for the memory data verify message for which the busy bit was set, even if the data words were previously transmitted.

The number of data words will equal the word count in the memory data verify message command word.

Referring now to FIG. 9(H), the trailer message is used to pass the data checksum and additional load or verify parameters to the remote terminal 53 being reprogrammed. The activity message shown prior to the trailer message will only be present when rapid reprogramming terminal 20 is required to check the busy bit status of remote terminals 53 that do not use the busy bit in the status response word.

The transmit/receive bit (bit 10) in the command word for the trailer message is a logic zero since the remote terminal 53 is to receive data and the terminal subaddress field (bits 5-9) in the control word is set at 16 hexadecimal.

Data word one contains the number of sub-pages and the first sub-page for remote terminals 53 utilizing paging or sub-paging. This word may also be used for internal register control. The fields of data word one represent the values to be used in the next header, memory data load or verify (up to 4096 messages), trailer transaction. For the first header, memory data load or verify (up to 4096 messages), trailer transaction the information will be transmitted prior to the memory data transaction via a header message, trailer message transaction in which the TM (transfer mode) field in data word one of the header is 00.

The sub-page/register count (bits 8-15) field in data word one may be used in lieu of or in conjunction with the page number field in data word four of the header message and is individual user definable. Unused bits equal zero. In the preferred embodiment of the present invention the sub-page field in data word one of the trailer message is used in conjunction with the data word four of the header message of FIG. 9(E).

For purpose of illustrating the use of the sub-page field in the trailer message the following example is provided. In order to load 256K of memory into a remote terminal 53 with bank switching, 64K of address capability and a page size definition of 2048 words, the following approach may be used. To load 256K with sub-pages 2048 words long requires 128 header, memory data, memory data, trailer transactions (256K/2048=128). The 128 transactions consist of 32 transactions for each of the four banks of switching in remote terminal 53. Thus, for each 32 transactions the header message, data word four page number, FIG. 9(E), equals the bank number which would be incremented from zero to three. Within each group of 32 transactions the sub-page count would increment every transaction from zero to thirty one. For each transaction (assuming HT=01 for buffer transfer count equals the number of messages) the header data one buffer transfer count would be 64 (2048 words/32 words per message).

The first sub-page/register (bits 0-7) field may be used in lieu of or in conjunction with the page number field in data word four of the header message and may be defined by the user. Unused bits equal zero. Examples of use of this field are: specifying a processor register into which the page number field in data word four of the header message is to be loaded or specifying the initial sub-page count in the example set forth above to one so as to not reprogram the first 2048 memory locations (the first group of transactions would only be 31 transactions long (1 to 31) and the sub-page count for the first transaction would be set to one to indicate a starting address of 2048).

The data word two checksum (bits 0-15) is the checksum of an entire transaction, i.e., header, memory data, trailer transaction (when TM in header data word one is not equal to zero) or header, trailer transaction (when TM in header data one is equal to zero). The checksum is derived by a two's complement sixteen bit addition of every data word in the transaction (i.e., header, memory data, and trailer data words) with the exception of the checksum data word which is data word two of the trailer message. The two's complement sixteen bit addition is binary addition with the carry discarded, that is there is no end around carry (e.g., FFFF (hexadecimal)+1=0).

The remote terminal 53 being reprogrammed is responsible for comparing the checksum received from rapid reprogramming terminal 20 with the data words for both load and verify functions. The checksum value in data word two of the trailer message is the checksum that should be computed by the remote terminal 53. If the value computed does not match the value received from processor 21 for either a load or verify operation, an error is declared and a reprogram status message is requested by the remote terminal 53 being reprogrammed.

Referring to FIG. 9(I), the activity message illustrated prior to the reprogram status message indicates that remote terminal 53 wants to provide to rapid reprogramming terminal 20 a reprogram status message (bits 5-9 of the data word of the activity message).

During a reprogramming operation the remote terminal 53 being reprogrammed may halt the operation and notify rapid reprogramming terminal 20 of an error by setting the busy bit (bit 3) in the status response word or the busy bit (bit 15) in the Activity Message data word. When rapid reprogramming terminal 20 receives the busy bit from remote terminal 53, it will continue to transmit activity messages until the busy bit is cleared. The service request by remote terminal 53 to transmit a reprogram status message will be honored after the first activity message response with the busy bit cleared. By this means remote terminal 53 can notify rapid reprogramming terminal 20 of the error.

The transmit/receive bit (bit 10) of the command word of the reprogram status message is set at a logic one since remote terminal 53 is to transmit and the subaddress (bits 5-9 of the command word) for this message is 17 hexadecimal.

The status flag (bit 15) of data word one is set to a logic one to indicate that the remainder of the data word should be processed by rapid reprogramming terminal 20, that is the reprogram status message contains valid data. If this bit is set to a logic zero, the reprogram status message will be ignored by rapid reprogramming terminal 20.

The status indicator (bit 14) defines the meaning of the remainder of the data word, that is an error code or a status code to be displayed by rapid reprogramming terminal 20.

When the status indicator equals zero this indicates that an error has occurred and the error code will be processed by rapid reprogramming terminal 20.

When the status indicator equals one this indicates that no error has occurred and the status code in bits 13-0 are to be displayed on liquid crystal display 57 as 4 hexadecimal characters (bits 15 and 14 of the display value are 0). With the status indicator equal to one the values of bits 13-0 will be used to indicate status or progress through the load or verify operation.

When SF equals one and SI equals one the status code bits 0-13 are display characters. When SF equals one and SI equals zero bits 0-13 represent error codes and the desired rapid reprogramming terminal 20 action. The error codes are 0001 (hexadecimal) which is an abort; 0002 (hexadecimal) which is a restart; 0003 (hexadecimal) which is a retry and 0004 (hexadecimal) which is a automatic retry.

The abort error code indicates to rapid reprogramming terminal 20 that the load operation or verify operation has been aborted and should not be retried. Rapid reprogramming terminal 20 will display the error code and wait for an operator response. On receiving the response from the operator, rapid reprogramming terminal 20 will abort the load of the remote terminal 53 being reprogrammed and continue with the load of the next remote terminal or bus controller to be reprogrammed if there is a requirement to reprogram another remote terminal or bus controller.

The restart status code indicates that an unrecoverable error has occurred in loading a remote terminal 53 and a reload of remote terminal 53 is desired. Rapid reprogramming terminal 20 will display the error code and wait for an operator response. On receiving the response from the operator, rapid reprogramming terminal 20 will restart the load of the remote terminal 53 being reprogrammed.

The retry status code indicates that an error has occurred in the last message sequence transaction and a repeat of the sequence is desired. Rapid reprogramming terminal 20 will display the error code and wait for an operator response. On receiving the response from the operator, rapid reprogramming terminal 20 will repeat the last transaction.

The automatic retry status code indicates that an error has occurred in the last message sequence transaction. After three consecutive retries, rapid reprogramming terminal 20 will display the error code and wait for an operator response. However, if the retry is successful before reception of the third consecutive error, an error message will not be displayed and operation will continue as normal. On receiving the response from the operator, rapid reprogramming terminal 20 will abort the load of the remote terminal 53 being reprogrammed and continue with the load of the next remote terminal or bus controller to be reprogrammed.

Referring to FIG. 9(J), the activity message shown prior to the RRT error message is present only when rapid reprogramming terminal 20 is required to check the busy bit status of remote terminals 53 that do not use the busy bit in the status response word.

The RRT error message is utilized to inform the remote terminal 53 being reprogrammed that rapid reprogramming terminal 20 has detected an error in the load or verify. Data word one, bit 2 is an abort which is set to a logic one by rapid reprogramming terminal 2 to notify the remote terminal 53 that the load or verify has been aborted and no further retries will be made.

Bit 1 is a complete restart which is set to a logic one by rapid reprogramming terminal 2 to notify the remote terminal 53 that an unrecoverable error has occurred and all memory data load or memory data verify transactions will be restarted. Bit 0 is the transaction bit which is set to a logic one by rapid reprogramming terminal 20 to notify the remote terminal 53 that there was an error detected in the last header, memory data, trailer or header, trailer transaction and that the transaction will be repeated. The remaining bits (bits 3-15) of the data word are a logic zero.

Figure 10:
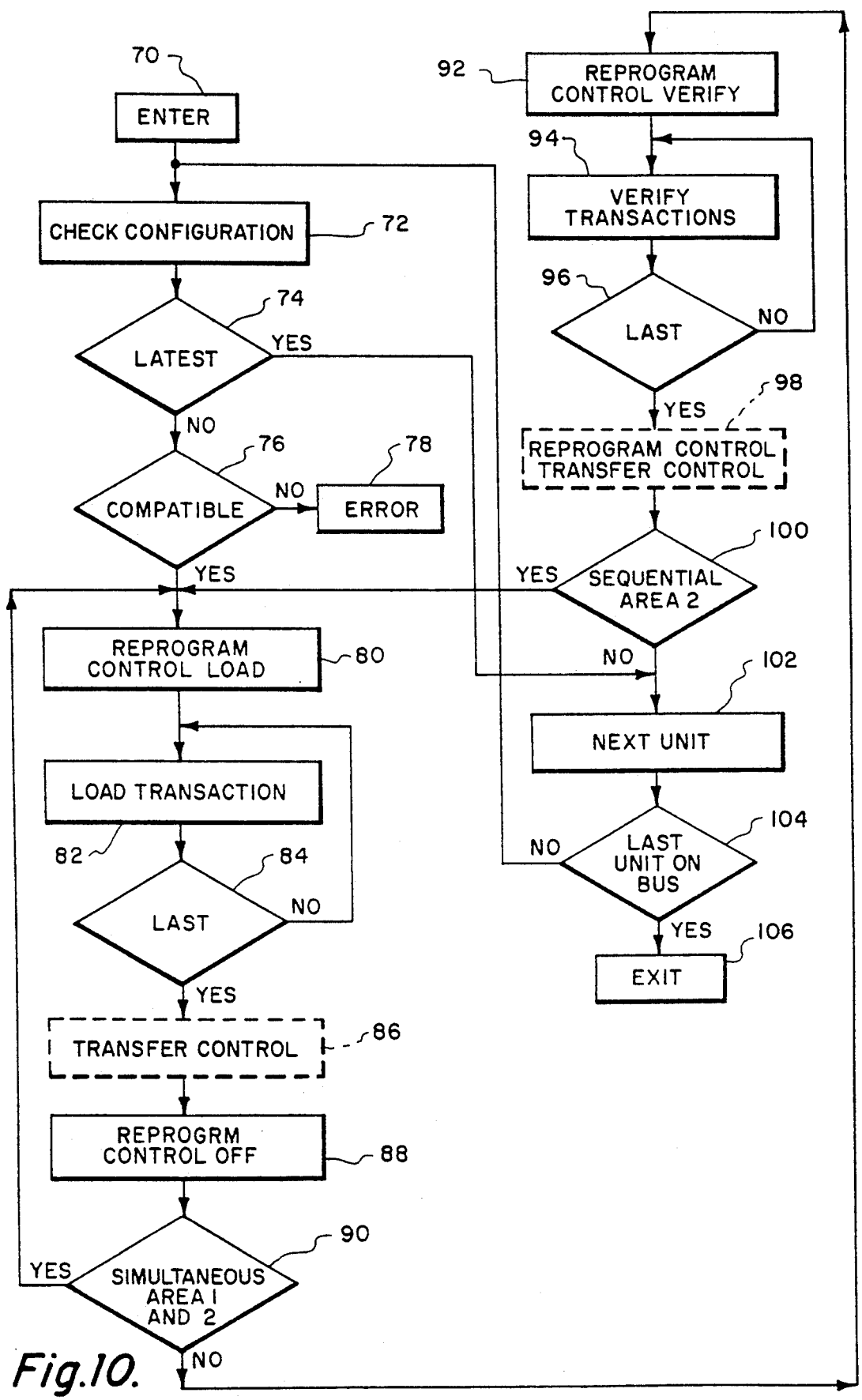
FIG. 10 is a flow chart illustrating the PROTOB.C module of the rapid reprogramming terminal software.

Referring now to FIG. 10, the operation of rapid reprogramming terminal 20 when reprogramming a remote terminal 53 or a bus controller which reverts to a remote terminal during reprogramming will now be discussed.

When the lookup table indicates that the remote terminal 53 supports memory configuration as identified by the remote terminal's software, rapid reprogramming terminal 20 request a memory configuration message, FIG. 9(C), from the remote terminal 53 being programmed. The memory configuration message describes the current memory contents for one or two memory areas of the remote terminal 53 being reprogrammed. Rapid reprogramming terminal 20 compares the received memory configuration to the current memory configuration for the remote terminal 53 stored in IC memory card 22 (program step 72). In automatic mode, if the remote terminal 53 already contains the current memory configuration, rapid reprogramming terminal 20 continues on to the next remote terminal 53 to be processed (program step 102). If the memory configuration message is not usable, rapid reprogramming terminal 20 will assume that the remote terminal 53 requires reprogramming. In manual mode, rapid reprogramming terminal 20 will display the memory configuration data and continue reprogramming for the selected remote terminal 53.

If the remote terminal 53 requires reprogramming of either or both memory areas, rapid reprogramming terminal 20 checks the old and new memory configurations to determine if the information in the IC memory card 22 is compatible with updating the old memory (program step 76) and will use a patch file if it exists. If a patch file does not exist or is not usable, rapid reprogramming terminal 20 checks to see if a complete file exists and checks to determine if this file will result in a newer revision level for the memory configuration. If the configuration message is not usable, no patch file should exist and rapid reprogramming terminal 20 uses the complete file for reprogramming the remote terminal 53. Rapid reprogramming terminal 20 will declare an error if the IC memory card 22 information is insufficient (program step 78). If the IC memory card 22 information is correct for reprogramming, rapid reprogramming terminal 20 sends a load message, FIG. 9(D) to enable the reprogramming function for either or both memory areas and depending upon remote terminal requirements memory areas one and two will be enabled simultaneously or sequentially (program step 80). The remote terminal 53 will next check the validity of the message utilizing internally stored information and the reprogram enable discretes if required.

Once the reprogramming mode is entered (program step 82 and 84), rapid reprogramming terminal 20 proceeds to load the new memory contents in blocks of varying size depending on the remote terminal 53 and update requirements. There will be no specific erasure commands from rapid reprogramming terminal 20. The remote terminal 53 being reprogrammed is responsible for erasure based on the directed write information. The reprogramming of a remote terminal 53 is conducted by a series of one or more header message (FIG. 9(E)), memory data load message (FIG. 9(F)), trailer message (FIG. 9(H)) transactions. If required, a header message, trailer message transaction will also be provided for paging or transfer of control functions. If the remote terminal 53 being reprogrammed is required to keep track of how many times a particular memory area has been reprogrammed, the remote terminal 53 being reprogrammed shall declare an abort error (bits 0-13 of the data word of the reprogram status message of FIG. 9(I)) if the predetermined memory write capability of the remote terminal 53 has been exceeded. The storage of this information within the remote terminal's memory shall not affect the validity of a memory verify procedure that is the remote terminal 53 being reprogrammed shall mask out this information during a verify operation.

After completion of the load (program step 84), rapid reprogramming terminal 20 will, if required, then provide transfer of control information to the remote terminal 53 using a header message, trailer message transaction (program step 86). Transfer of control prior to a verify via the control code bits (bits 0-7) of the data word four of FIG. 9(I) is not permitted. The transfer of control prior to a verify is not used to transfer control to a memory area of remote terminal 53 that has been loaded but not verified. If it is necessary to transfer control prior to the completion of a memory area load/verify, the two parts of the memory area are loaded/verified separately using the same technique as for sequentially loading memory areas 1 and 2. The transfer of control via the header message of FIG. 9(E) may be inhibited during the load.

After all required data for a particular memory area have been transferred rapid reprogramming terminal 20 will, via bit 4 or 5 of data word four of FIG. 9(D) disable the reprogramming function for that memory area.

When simultaneous reprogramming of memory areas one and two of a remote terminal 53 is utilized (program step 88), rapid reprogramming terminal loads the second memory area prior to the verify operation. When sequential memory area reprogramming or single memory area reprogramming is utilized, rapid reprogramming terminal 20 will at this time verify (program steps 92-96) the previously loaded memory area one load prior to the memory area two load operation. Rapid reprogramming terminal 20 performs the memory verify utilizing the same message transactions that are used for the memory load except that the rapid reprogramming terminal 20 receives the data from the remote terminal 53 being reprogrammed and compares the received data with memory configuration data stored in IC memory card 22. The automatic verify after a load may be inhibited.

After completion of the verify (program step 96) rapid reprogramming terminal 20 will, if required, provide transfer of control information to the remote terminal 53 (program step 98) using either a header message, trailer message transaction or via the control code bits (bits 0-7) of the data word four of FIG. 9(I). When sequential reprogramming of memory areas one and two is utilized, rapid reprogramming terminal 2 repeats the load/verify operations (program step 100) for the second memory area after reprogramming of the first memory area is complete.

Assuming there were no errors in reprogramming, rapid reprogramming terminal 20 will continue (program step 102) and reprogram the next remote terminal 53 on the 1553 multiplex data bus 42. If an error did occur, operator intervention is requested by a fault display.

There is an individual memory file describing the operation of rapid reprogramming terminal 20 and containing the necessary data to reprogram each remote terminal 53 and each bus controller 55 on the 1553 multiplex data bus 42. The memory file contains a lookup table and reprogramming data for each remote terminal 53 and bus controller 55. A memory file is wholly contained in IC memory card 22.

The lookup table contains the digital information necessary for rapid reprogramming terminal 20 to communicate with the remote terminal 53 or bus controller 55 being reprogrammed. Unless otherwise specified all bits set to a logic one are active (i.e., RRT output is to be active) and all bits set to a logic zero are inactive (i.e., RRT output is to be inactive).

Figure 4:
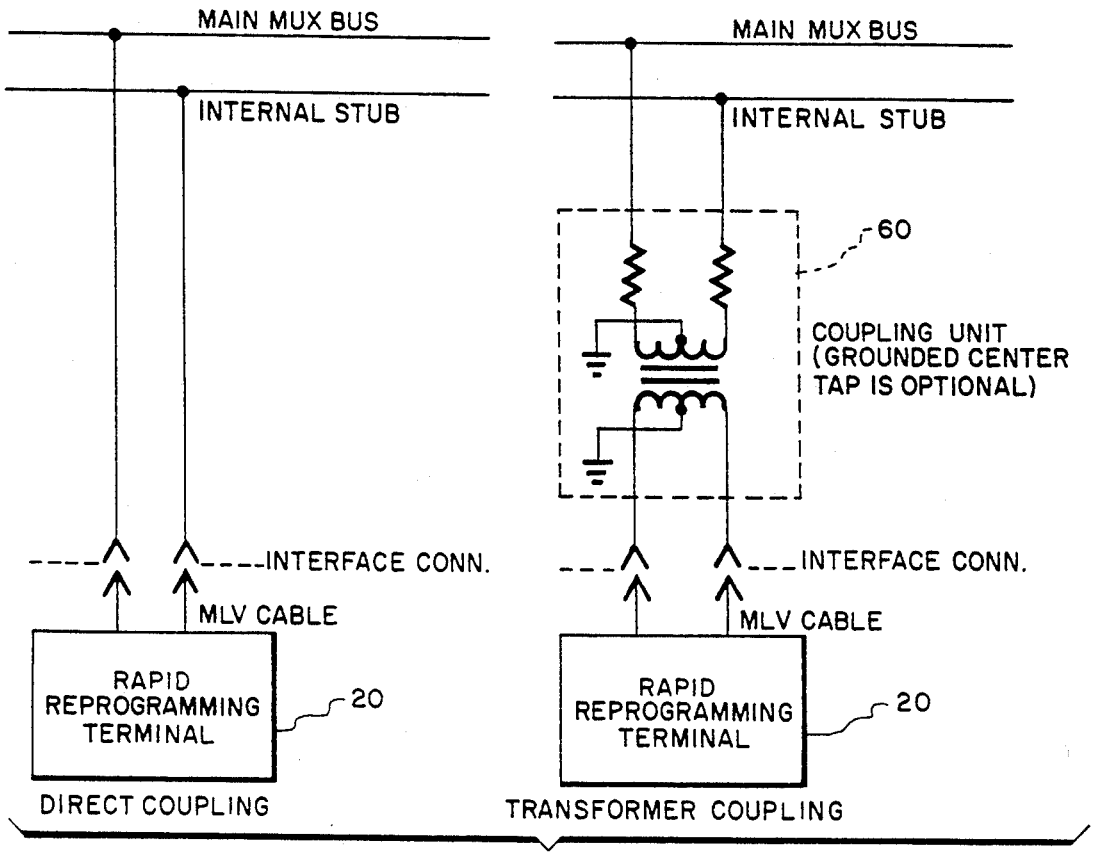
FIG. 4 illustrates the bus coupling methods of the 1553 multiplex data bus to which the rapid reprogramming terminal is connected.

Referring to FIGS. 3 and 4, the specific bus connection for rapid reprogramming terminal 20 is a function of the type of aircraft on board avionics or electronic warfare equipment being reprogrammed. When rapid reprogramming terminal 20 selects a bus for connection terminal 20 will, based on aircraft type and configuration, select the type of multiplex bus connection to be utilized.

Referring now to the RRT program section MEMCARD.H MODULE as well as FIGS. 3 and 4, the first three bits (bits 2–0) of the first thirty two bit word (defined as Aircraft Bus Specification in MEMCARD.H MODULE of the RRT program) in the lookup table describe the aircraft multiplex bus to which rapid reprogramming terminal 20 will couple. When bits 2–0 are respectively 0,0,1, rapid reprogramming terminal 20 couples to primary Avionics Bus Number One; 0,1,0 couples rapid reprogramming terminal 20 to primary Avionics Bus Number Two; 0,1,1 couples rapid reprogramming terminal 20 to primary Avionics Bus Number Three; 1,0,0 couples rapid reprogramming terminal 20 to primary Avionics Bus Number Four and 1,0,1 couples rapid reprogramming terminal 20 to the Electronic Warfare Bus.

Bits 4,3 of the first word in the lookup table are the secondary bus identifiers with 0,0 coupling rapid reprogramming terminal 20 to secondary Avionics Bus Number One; 0,1 coupling rapid reprogramming terminal 20 to secondary Avionics Bus Number Two; 1,0 coupling rapid reprogramming terminal 20 to secondary Avionics Bus Number Three and 1,1 coupling rapid reprogramming terminal 20 to secondary Avionics Bus Number Four.

Bit 5 of the first word indicates whether the secondary avionics buses aboard the aircraft are usable with a logic one indicating that the buses are usable.

When bit 6 of the first word is a logic zero the aircraft uses a coupling transformer 60, FIG. 4, between the aircraft buses and rapid reprogramming terminal interface connectors. A logic one indicates that the aircraft uses direct coupling as is illustrated in FIG. 4. Data bit 7 of the first word is reserved for the center tap on data bus isolation transformer 40 with zero being an open center tap and one being a grounded center tap.

The first four bits (bits 3–0) of the second thirty two bit word (discrete one in MEMCARD.H MODULE of RRT program) in the lookup table set the PWR_OFF/ON_1 through PWR_OFF/ON_4 outputs of interface 54. Bit zero set at a logic one turns off the AYK-14 computer bus controller connected to avionics bus one, bit one set at a logic one turns off the AYK-14 computer bus controller connected to avionics bus two, bit two set at a logic one turns off the AYK-14 computer bus controller connected to avionics bus three and bit three set at a logic one turns off the AYK-14 computer bus controller connected to avionics bus four.

Bit four of the second word is used for enabling the external processor of the AN/ALQ-165 radar jammer on board the F/A-18C/D fighter aircraft. The AN/ALQ-165 radar jammer is an electronic warfare bus controller which may be reprogrammed either in the aircraft or when removed from the aircraft. When the AN/ALQ-165 is removed from the aircraft, the power on time for example is generally limited to less than one minute for a load/verify of 32K data words of user data memory, since the aircraft's air conditioning system is not available to cool the AN/ALQ-165. The lookup table provides for reprogramming of the AN/ALQ-165 when removed from the aircraft by allowing for a maximum on time of between ten seconds and thirty minutes for the AN/ALQ-165, although it is desirable to allow the AN/ALQ-165 to be enabled for not more than two minutes.

Bit five is used for turning off the Maintenance Signal Data Recording Set on board the F/A-18 aircraft; bit six is used for turning off the radar data processor currently being utilized with only the F/A-18 fighter aircraft and bit seven is used for turning off the stores management system aboard the aircraft. These bits when set at a logic one state allow other remote terminals 53 or bus controllers 55 aboard the aircraft to be reprogrammed since the Maintenance Signal Data Recording Set, the radar data processor and/or the stores management system will no longer be communicating with the remote terminal 53 or the bus controller 55 being reprogrammed.

The first four bits (bits 3–0) of the third thirty two bit word (discrete two in the MEMCARD.H MODULE) in the lookup table set the IPL_1 through IPL_4 outputs of interface 54 for reprogramming the AYK-14 computers. When bit zero of the third word is a logic one the AYK-14 computer on avionics bus one is to be reprogrammed; when bit one of the third word is a logic one the AYK-14 computer on avionics bus two is to be reprogrammed; when bit two of the third word is a logic one the AYK-14 computer on avionics bus three is to be reprogrammed; and when bit three of the third word is a logic one the AYK-14 computer on avionics bus four is to be reprogrammed. To reprogram any of the AYK-14 computers aboard an aircraft it is first required to turn off the power to the AYK-14 to be reprogrammed and then activate the initiate program load output of interface 54 to the AYK-14 of the computer to be reprogrammed before turning on the power to the AYK-14 computer to be reprogrammed. The AYK-14 will sense the initiate program load output is active which initiates the reprogramming of the AYK-14. A failure in the reprogramming of the AYK-14 results in a logic one at the initiate program load input of interface 54 connected to the AYK-14 being reprogrammed.

Bits four and five of the third word are respectively used for enabling the first and second memory areas of the remote terminals 53 within the aircraft avionics system; bit six is used for enabling the user data memories of all remote terminals 53 communicating on the electronic warfare multiplex bus and bit seven is used for enabling the operating software memories in remote terminals 53 connected to the electronic warfare multiplex bus.

The first four bits (bits 3-0) of the fourth word (AYK-14 Discrete Bus Correlation)) in the look up table determine which of the AYK-14 will be reprogrammed. When bit zero is a logic one the AYK-14 computer on avionics bus number one is to be reprogrammed; when bit one is a logic one the AYK-14 computer on avionics bus number two is to be reprogrammed; when bit two is a logic one the AYK-14 computer on avionics bus number three is to be reprogrammed and when bit three is a logic one the AYK-14 computer on avionics bus number four is to be reprogrammed.

The first three bits (bits 2-0) of the fifth word (RRT Operational Status) in the look up table determine the operational status of rapid reprogramming terminal 20. When bits 2-0 are respectively 0,0,1 rapid reprogramming terminal 20 operates as a remote terminal 53, the bus controller 55 converts to a remote terminal 53 and rapid reprogramming terminal 20 converts to the bus control 55. When bits 2-0 are respectively 0,1,0 rapid reprogramming terminal 20 operates as the bus controller 55. When bits 2-0 are respectively 0,1,1 rapid reprogramming terminal 20 operates as a remote terminal 53. When bits 2-0 are respectively 1,0,0 rapid reprogramming terminal 20 operates as a remote terminal 53, the bus controller 55 is quieted and rapid reprogramming terminal 20 converts to the bus control 55. Bits 6-3 are unused and bit 7 indicates that the AYK-14 computer is the normal bus controller 55.

Bits 4-0 of the sixth word (Remote Terminal Address) provide the address of the remote terminal being reprogrammed.

Bits 3-0 of the seventh word (Operational Mode) describe the operational mode of rapid reprogramming terminal. For example, when bits 3-0 are respectively 0,0,0,1 rapid reprogramming terminal 20 is in an operational mode by which rapid reprogramming terminal 20 is reprogramming a remote terminal 53 or a bus controller 55 which when being reprogrammed functions as a remote terminal 53. Likewise, when bits 3-0 are respectively 0,0,1,0 rapid reprogramming terminal 20 is in an operational mode by which rapid reprogramming terminal 20 is reprogramming a bus controller 55 such as the AN/ALR-67 Radar Warning Receiver which does not convert to a remote terminal.

When bits 3-0 of the seventh word in the lookup table are respectively 0,0,1,1 rapid reprogramming terminal 20 may reprogram an AYK-14 computer having a serial interface module type B acting as a remote terminal; when bits 3-0 are respectively 0,1,0,0 rapid reprogramming terminal 20 may reprogram an AYK-14 computer having a serial interface module type B acting as a bus controller; when bits 3-0 are respectively 0,1,1,0 rapid reprogramming terminal 20 may reprogram an AYK-14 computer having a serial interface module type A and when bits 3-0 are respectively 0,1,1,1 rapid reprogramming terminal 20 may reprogram the High Speed Anti-Radiation Missile (HARM) Command Launch Computer. Likewise, when bits 3-0 are respectively 1,0,0,0 rapid reprogramming terminal 20 may reprogram the AYQ-9 and AYQ-15 Stores Management Systems' core memory; when bits 3-0 are respectively 1,0,0,1 rapid reprogramming terminal 20 may reprogram the AYQ-9 and AYQ-15 Stores Management Systems' EEPROM memory and when bits 3-0 are respectively 1,0,1,0 rapid reprogramming terminal 20 may reprogram the CP-1726/ASQ-194 Signal Data Computer.

The first eight bits (bits 7-0) of the eighth word (Additional delay between Activity Messages) in the look up table provide for a delay of between 0 and 255 milliseconds between activity messages.

The first bit (bit 0) of the ninth word (Busy Bit Usage) in the lookup table determines whether the busy bit in the status word, FIG. 9(A), provided by the remote terminal 53 is usable with a logic one indicating that the busy bit is usable. If the busy bit in the status word is usable then rapid reprogramming terminal 20 will monitor the status word provided by remote terminal 53 to determine whether remote terminal 53 can receive data from rapid reprogramming terminal 20. If the busy bit in the status word is not usable rapid reprogramming terminal 20 will issue activity messages, FIG. 9(A) to the remote terminal 53 to determine the busy status of the remote terminal 53, that is whether or not the remote terminal 53 can receive data from rapid reprogramming terminal 20. The seventh bit (bit 6) provides for a pause after rapid reprogramming terminal 20 sends a command word to the remote terminal 53. The eighth bit (bit 7) when at the logic zero state causes rapid reprogramming terminal 20 when functioning as a bus controller to repeat the last message whenever remote terminal 53 is busy.

Bits 7-0 of the tenth and eleventh words (Automatic Busy Retry Count Before Error) in the lookup table provide respectively for the least significant byte and the most significant byte of the automatic mode retry count which is the number of times (between 0 and 65,535) rapid reprogramming terminal 20 can send activity messages to the remote terminal 53 being reprogrammed before rapid reprogramming terminal 20 declares an error. The sixteen bit value of the tenth and eleventh words is the total count of busy bits that may occur during a message transaction.

Bits 7-0 of the twelfth and thirteenth words (Manual Busy Retry Count Before Error) in the lookup table provide respectively for the least significant byte and the most significant byte of the manual mode retry count which is the number of times (between 0 and 65,535) rapid reprogramming terminal 20 can send activity messages to the remote terminal 53 being reprogrammed before rapid reprogramming terminal 20 declares an error. The sixteen bit value of the twelfth and thirteenth words is the total count of busy bits that may occur during a message transaction.

It should be noted that the busy count for the manual retry mode is typically 3 and the busy count for the automatic retry mode is typically 256. It should also be noted that the MEMCARD.H MODULE includes a definitions section which pertains to the contents of IC memory card 22. This definition section of MEMCARD.H MODULE has a thirty two bit word (unsigned loading card) which determines whether an automatic load to a remote terminal 53 or bus controller is permitted. Specifically, if bit 1 of this word is at the logic one state an automatic load is permitted. In addition, bit 0 of this thirty bit word when at the logic zero state indicates that a data load to IC memory card 22 is complete and when at the logic one state indicates that a data load has been interrupted; bit 2 prevents a download IC memory card 22; bit 3 prevents a download to external computer 66; bit 4 prevents an upload to IC memory card 22 and bit 7 determines whether the information in IC memory card 22 has been tested, verified and is releasable.

Bits 7-0 of the fourteenth, fifteenth, sixteenth, seventeenth, eighteenth and nineteenth words (Nomenclature of RT) in the lookup table provide for the WRA nomenclature (e.g., RT-1079) of the remote terminal 53 being reprogrammed.

Bits 7-0 of the twentieth and twenty first words (Memory Configuration Word 1) in the lookup table represents the configuration of the data stored in memory area one of the remote terminal 53 being reprogrammed. Similarly, bits 7-0 of the twenty second and twenty third words (Memory Configuration Word 2) in the lookup table represents the configuration of the data stored in memory area two of the remote terminal 53 being reprogrammed. The twentieth, twenty first, twenty second and twenty third words in the lookup table contain the memory configuration message, FIG. 9(C), data word one and data word two comparison information and are only used for remote terminals 53 and bus controllers 55 that allow the memory configuration message of FIG. 9(C). At this time, the user data memory in electronic warfare devices is equivalent to memory area one and operating software memory in electronic warfare devices is equivalent to memory area two.

Bits 1-0 of the twenty fourth word (Memory Configuration Message Implementation) in the lookup table represent a code which when zero indicates that the memory configuration message of FIG. 9(C) will not be utilized. When bits 1-0 are one only memory area one is verified; when bits 1-0 are two only memory area two is verified and when bits 1-0 are three both memory areas one and two are verified. When bit 7 of the twenty fourth word is a logic zero the memory configuration message of FIG. 9(C) is not utilized.

Bits 7-2 of the twenty fifth word (Memory Area 1 REPROGRAM CONTROL Message Data Word 4) in the lookup table provide the fill data bits (bits 15-10 of data word four) of the load/verify message of FIG. 9(D) with respect to memory area one.

Bit 0 of the twenty sixth word (Memory Area 1 Control Transfer) in the lookup table allows for the transfer of data from a temporary storage register within the remote terminal 53 being reprogrammed to memory area one within the remote terminal 53 once the data is verified as being loaded correctly. Bits 5-4 of the twenty sixth word provide a code which indicates whether either memory area one or memory area two or both memory areas are to be disabled, while bits 7-6 provide a code which indicates whether either memory area one or memory area two or both memory areas are to be enabled. It should be understood that bits 7-6 and 5-4 are software controlled enables and disables which are provided by the load/verify message of FIG. 9(D).

The twenty seventh word (Memory Area 2 REPROGRAM CONTROL Message Data Word 4) in the lookup table functions in the same manner as the twenty sixth word with respect to memory area two, while the twenty eighth word (Memory Area 2 Control Transfer) in the lookup table functions in the same manner as the twenty sixth word with respect to memory area two.

Bits 1-0 of the twenty ninth word (Sequential or Simultaneous File Type) in the lookup table represent a code which indicates whether a single memory area is to be loaded or whether memory areas one and two are to be loaded in sequence or simultaneously. When bit 2 of the twenty eighth word is zero a verify is not permitted. When bit 3 of the twenty eighth word is a logic one a verify operation may be performed without a data load. Bits 7-4 provide for the aircraft configuration.

Bits 4-0 of the thirtieth word (RT address of BC that can convert to RT) in the lookup table provide the remote terminal address for a bus controller 55 which can convert to a remote terminal when being reprogrammed.

Bits 4-0 of the thirty first word (RT address of RRT) in the lookup table provide the address for rapid reprogramming terminal 20 when terminal 20 converts to a bus controller 55.

The thirty second through thirty seventh word (Nomenclature of unit when RRT is an RT) in the lookup table provide for the WRA nomenclature (six ASCII characters) for rapid reprogramming terminal 20 when terminal 20 is a remote terminal 53 during reprogramming of a bus controller 55.

The thirty eighth word (Fill Field of REPROGRAM CONTROL Message when RRT is an RT) in the lookup table provide the fill data for the message of FIG. 11(D).

The messages of Table II utilized by rapid reprogramming terminal 20 to communicate with a bus controller 55 being reprogrammed via the 1553 multiplex data bus 42 will now be discussed. It should be understood that the messages used by rapid reprogramming terminal 20 to communicate with any bus controller 55 aboard the aircraft via the 1553 data bus are required to follow the message formats set forth in FIGS. 7 and 11.

Figure 11F:
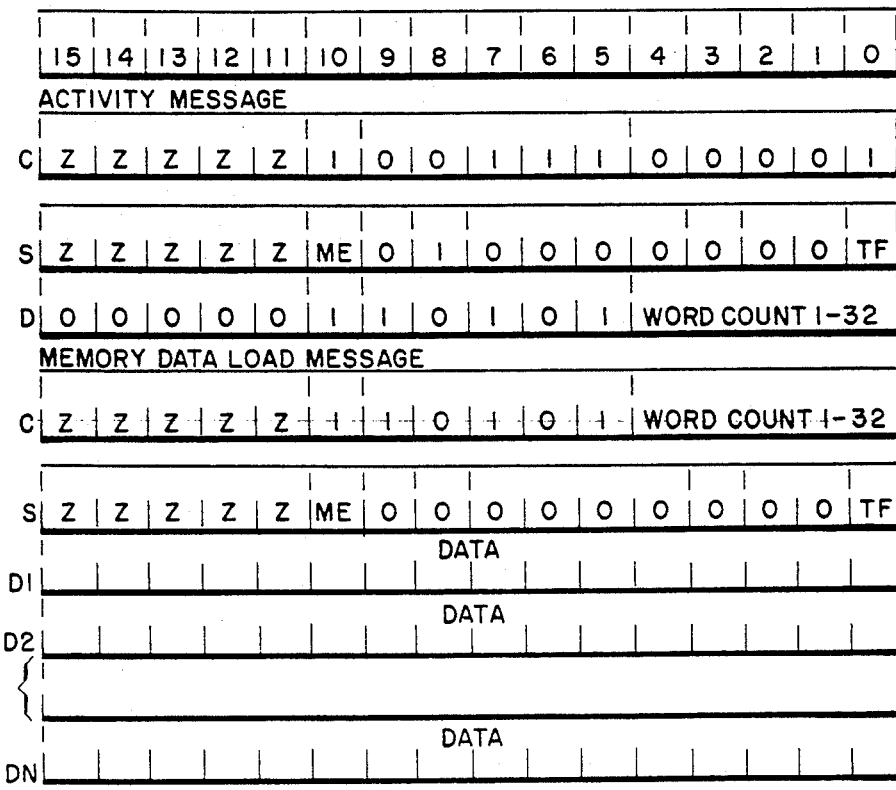
FIG. 11(F) illustrates the format of a memory data load message transferred via the 1553 multiplex data bus to a bus controller being reprogrammed.

The Activity Message of FIG. 11(A) is utilized by bus controller 55 when being reprogrammed to determine whether rapid reprogramming terminal 20 (which is operating as a remote terminal) is ready to receive data and allows rapid reprogramming terminal 20 a request to send information to bus controller 55 or receive information from bus controller 55. The Activity Message of FIG. 11(A) allows rapid reprogramming terminal 20 to control the loading sequence when functioning as a remote terminal. The bus controller 55 commands this message at a periodic rate until a Header Message, FIG. 11(E), Memory Data Message, FIG. 11(F), Trailer Message, FIG. 11(H) transaction is begun. After receipt of a Header Message requiring data transfer (TM is not equal to zero), the bus controller 55 may utilize the Activity Message to control the transfer of Memory Data Messages or the bus controller 55 may utilize the Header Message information to internally control the number of Header Data Messages so long as the busy bit (bit 3) in the rapid reprogramming terminal Status Response Word, FIG. 11(B), is checked by the bus controller 55. The bus controller 55 may also control the load or the verify (all the Header Message, Memory Data Message, Trailer Message transactions) without the use of the Activity Message by monitoring the TC bits (bits 0-1 of data word four) in the Header Message.

Referring to FIG. 11(A) the Command Word for the Activity Message follows the format set forth in FIG. 7. Bits 11-15 provide the address for rapid reprogramming terminal 20, bit 10 is set at a logic one, the subaddress (bits 5-9) is set at 07 hexadecimal and the word count (bits $0 \propto 15$) is one.

The status word response to the Activity Message as well as the other messages of Table II follows the general format set forth in FIG. 7 supplemented by FIG. 11(B). A Status Response Word to any of the messages set forth in Table II is provided by a rapid reprogramming terminal 20 for each message transaction. The status response word follows data on a rapid reprogramming terminal receive type transaction and precedes the data on a rapid reprogramming terminal transmit type transaction. The bus controller 55 allows a response time gap of approximately 6.5 usec. from the end of the last transmitted command word (transmit type message) or the end of the last transmitted data word (receive type message), to the start of the rapid reprogramming terminal status response word before declaring a no response error. Rapid reprogramming terminal 20 begins the status response word within a time period of approximately 2-5 usec. from the receipt of the end of the last command word (transmit type message) or the receipt of the end of the last data word (receive type message). The bus controller 55 ensures that the time from the end of the rapid reprogramming terminal transmission of the last data word (transmit type message) or the end of the last status response word (receive type message) to the beginning of the next command word is at least 2 usec.

Referring to FIG. 11(B), the status response word bits for each of the messages of Table II comprise a terminal address (bits 11-15) which is remote terminal address of the remote terminal 53 being reprogrammed (referred to as ZZZZZ); a message error bit (bit 10) which is not used; a service request bit (bit 8) and a busy bit (bit 3).

The service request bit (bit 8) is set to one by rapid reprogramming terminal 20 in response to an activity message from the bus controller 55, otherwise this bit is zero.

The busy bit (bit 3) may be utilized by rapid reprogramming terminal 20 for the status response word for any command word from the bus controller 55. The setting of this bit to a logic one means that a message previously received by rapid reprogramming terminal 20 or internal rapid reprogramming terminal 20 requirements necessitates suspension or slow down communications with the bus controller 55. If rapid reprogramming terminal 20 sets the busy bit in the status response word, it may suppress transmission of the data words associated with each message. All additional message traffic other than the activity message is suspended until the busy bit is cleared (logic 0). While the bus controller 55 is waiting for the busy bit to clear, the activity message is sent every 10 to 100 milliseconds. As long as the busy bit is clear the bus controller 55 assumes that rapid reprogramming terminal 20 can support a continuous stream of identical messages within a 2 msec. time period from the end of one message to the start of the next command word. The continuous stream of identical messages is assumed to be either memory data load or memory data verify messages.

This continuous stream is maintained for a time period compatible with IC Memory Card 22 and internal memory capabilities of rapid reprogramming terminal 20. Rapid reprogramming terminal 20 utilizes the busy bit to suspend the continuous stream when required. As a minimum rapid reprogramming terminal 20 provides 2K data words in memory data load or memory data verify messages per second. Any data word transmitted after a status word with the busy bit set is ignored by rapid reprogramming terminal 20. The bus controller 55 ensures that the message for which rapid reprogramming terminal 20 initially replied with the bus bit set in the status response word will be transferred once the busy bit is cleared.

The Terminal Flag bit (bit 0) is set to a logic one by rapid reprogramming terminal if bit 10, 8 or 3 is set to one. Bits 9, 7, 6, 5, 4, 2 and 1 will always be zero in the status response word provided by rapid reprogramming terminal 20.

Referring again to FIG. 11(A), the address (bits 11-15) for the status word response to the activity message is the address of rapid reprogramming terminal 20 when reprogramming a bus controller 55. The rapid reprogramming terminal address is the address assigned to each individual aircraft on the particular bus selected by the rapid reprogramming terminal switching network.

The status word response to the activity message includes the service request bit (bit 8) which rapid reprogramming terminal 20 sets to a logic one whenever the contents of bits 0 through 10 of the data word are other than zero. The bus controller 55 may utilize the service request bit to determine if it is necessary to examine bits 0 through 10 of the data word that follows. Since the contents of bits 0 through 10 of the data word control the state of the service request bit, it is not necessary for the bus controller 55 to process the service request bit.

The busy bit (bit 3) in the status response word when at the logic one state indicates that rapid reprogramming terminal 20 is not ready to process any message from the bus controller 55 other than the activity message. Prior to transmission of any other messages to rapid reprogramming terminal 20, the bus controller 55 will continue to send activity messages to rapid reprogramming terminal 20 every 10 to 100 milliseconds until the busy bit is cleared. The busy bit and the service request bit are not set simultaneously by rapid reprogramming terminal 20.

The data word in the activity message is transmitted by rapid reprogramming terminal 20 even when the busy bit (bit 3) is set in the status response word. The busy bit (bit 15) in the data word in the activity message is used to completely implement the busy response.

Bits 0-10 are utilized to allow rapid reprogramming terminal 20 to request that the bus controller 55 being reprogrammed send a specific message to rapid reprogramming terminal 20. As a result of this request by rapid reprogramming terminal 20 the bus controller 55 will transmit a command word with the address of rapid reprogramming terminal 20 in bits 11-15 of the command word.

The transmit/receive bit (bit 10 of the data word) is set to one when rapid reprogramming terminal 20 is to transmit a message and is set to zero when rapid reprogramming terminal 20 is to receive a message. The subaddress bits (bits 5-9) indicates the subaddress of the message to be provided by bus controller 55 to rapid reprogramming terminal 20, while the word count bits (bits 0-4) indicate the data word count for the message. The remaining bits (bits 11-14) of the data word are zero.

Referring to FIG. 11(C), the activity message provided prior to the memory configuration message requests that the bus controller 55 provide to rapid reprogramming terminal 20 the memory configuration message. The memory configuration message is utilized to read the current memory configuration of the bus controller 55 being reprogrammed. This message is only used when its use is indicated in a lookup table for the bus controller 55. The command word and status word for the memory configuration message follow the format of FIG. 7. Each bus controller 55 aboard an aircraft has up to two memories designated memory area one and memory area two. Data bits 0-15 of data word one of the memory configuration message represent the configuration of the data stored in memory area one. Unused data bits equal zero. Similarly, data bits 0-15 of data word two of the memory configuration message represent the configuration of the data stored in memory area two. Unused data bits also equal zero. In the automatic mode of operation this message is used for the purpose of comparing a bus controller's configuration stored in the IC memory card 22 with reported bus controller configuration. If the reported value is the same as the value stored in the IC memory card 22, rapid reprogramming terminal 20 will not perform a load operation. However, if the reported value is different from the value stored in the IC memory card 22, rapid reprogramming terminal 20 will proceed with a load operation.

Referring to FIG. 11(D), there is shown the format for the enter load, exit load, enter verify and exit verify messages of Table II. The activity message provided prior to the enter load, exit load, enter verify and exit verify messages requests that the bus controller 55 provide to rapid reprogramming terminal 20 the required enter load, exit load, enter verify or exit verify message.

The transmit/receive bit (bit 10) in the command word for the enter load, exit load, enter verify and exit verify messages is a logic one since rapid reprogramming terminal 20 which is operating as a remote terminal is to transmit data to the bus controller 55 being reprogrammed. The terminal subaddress field (bits 5-9) in the control word is set at 1D hexadecimal. Each message enter load, exit load, enter verify and exit verify requires that an enable signal be provided by rapid reprogramming terminal 20 before a load or verify may be executed. A logic one at the EW_OSM_EN output of interface 54 enables the operating software memory of the electronic warfare system on board the aircraft. Similarly, a logic one at the EW-UDM_EN output of interface 54 enables the user data memory of the electronic warfare system on board the aircraft. When the AV_EN1 output of interface 54 is at a logic one state the first memory areas of the aircraft avionics system are enabled, while a logic one at the AV_EN2 output of interface 54 enables the second memory areas of the aircraft avionics system.

Each field in the data is checked by the remote terminal 53 for compliance with the following prior to execution of a load or verify. The type and number fields are defined based on WRA nomenclature (e.g., CP-1293); however, if this creates a conflict, the system nomenclature (e.g., ALR-67) is utilized instead. The preferred embodiment of the present invention uses WRA nomenclature.

Data word one (bits 0-15) is the type field consisting of the first two eight bit ASCII characters that represent the nomenclature of the bus controller 55 being controlled. For example, for CP-1293 the two characters would be "C", "P".

Data word two (bits 0-15) is a number field for consisting of the third and fourth eight bit ASCII characters that represent the nomenclature of the bus controller 55 being controlled. For example, for CP-1293 the two characters would be "1", "2".

Data word three (bits 0-15) is a number field two consisting of the last two eight bit ASCII characters that represent the nomenclature of the bus controller 55 being controlled. For example, for CP-1293 the two characters would be "9", "3".

Data word four (bits 10-15) is the fill field which may be any bit pattern including zero and is to be defined by the individual bus controller 55 being controlled. The fill field is required to be checked even if the field is defined as zero. The fill field is contained in a look up table for the bus controller 55 being reprogrammed.

The load/verify bits (bits 8-9) are used to describe whether a Load, Verify, or other type transaction will follow. The load/verify bits are coded as follows: L/V=01 indicates that a memory load follows; L/V=10 indicates that a memory verify follows; L/V=11 is not used and L/V=00 indicates that a enter load, enter verify, exit load or exit verify message is being sent for some reason other than a load or verify such as to quiet a bus controller.

The control code (bits 0-7) of data word four are set as follows: bit 7 is a reprogram enable for memory area one and is equal to 80 hexadecimal; bit 6 is a reprogram enable for memory area two and is equal to 40 hexadecimal; bit 5 is a reprogram disable for memory area one and is equal to 20 hexadecimal and bit 4 is a reprogram disable for memory area two and is equal to 10 hexadecimal. Bit 3 of the control code is not used by rapid reprogramming terminal 20 when reprogramming bus controllers function as bus controllers. Bit 2 of the control code which is 02 hexadecimal tells the bus controller 55 to stop transmitting or receiving information on the bus so as to allow the bus controller 55 to be reprogrammed. The use of bit 2 of the control code in this manner is required because some bus controllers can not be converted to a remote terminal when reprogramming a remote terminal 53. Bit 1 of the control word which is 02 hexadecimal is utilized to have a bus controller when converted to a remote terminal revert back to a bus controller. Bit 0 of the control code which is 01 hexadecimal causes the bus controller 55 to begin executing starting at the address previously supplied via data word three or data word four of a header message.

The control code field is valid only if all other fields are correct and only if either the Avionics Reprogram Enable 1 (AV_EN1 output of interface 54); or the EW UDM Reprogram Enable discrete (the EW-UDM_EN output of interface 54) is present or the Avionics Reprogram Enable 2 (AV_EN2 output of interface 54) or the EW OSM Reprogram Enable discrete (EW-OSM_EN output of interface 54) is present. At the end of reprogramming, rapid reprogramming terminal 20 will maintain the active discrete for at least 100 msec after the transmission of a exit load or exit verify message that ends the reprogramming mode.

The following are the only valid control codes that can occur when rapid reprogramming terminal 20 is functioning as a remote terminal during a load or verify. Any other code shall cause the bus controller to not execute a load or verify.

Code 00000000 which is 00 hexadecimal indicates that no load or verify control action is to be taken.

Code 00000001 which is 01 hexadecimal will cause the bus controller 55 to begin execution starting at the address previously supplied via data word three and data word four of the header message.

Code 00000100 which is 04 hexadecimal will cause the bus controller 55 to stop communications on the bus. Once the bus controller 55 stops communications on the bus, communications activity on the bus will remain stopped until the Avionics Reprogram Enable 1/EW UDM Reprogram Enable discrete and the Avionics Reprogram Enable 2/EW OSM Reprogram Enable discrete are inactive.

Code 00001000 which is 08 hexadecimal will cause the bus controller 55 being reprogrammed to revert to a remote terminal. Upon execution of this reprogram control code the message traffic shall be for rapid reprogramming terminal 20 functioning as a bus controller using the messages illustrated in FIG. 9.

Code 00010000 which is 10 hexadecimal will cause the bus controller to exit the reprogramming mode for memory area two. This code shall only be valid if the Avionics Reprogram Enable 2 or EW OSM Reprogram Enable discrete is active.

Code 00100000 which is 20 hexadecimal will cause the bus controller to exit the reprogramming mode for memory area one. This code shall only be valid if the Avionics Reprogram Enable 1 or EW UDM Reprogram Enable discrete is active.

Code 00110000 which is 30 hexadecimal is a combination of 10 hexadecimal and 20 hexadecimal for simultaneous memory areas one and two exit reprogramming mode.

Code 01000000 which is 40 hexadecimal will cause the bus controller 55 to enter the reprogramming mode for memory area two. This code shall only be valid if the Avionics Reprogram Enable 2 or the EW OSM Reprogram Enable discrete is active.

Code 10000000 which is 80 hexadecimal will cause the bus controller 55 to enter the reprogramming mode for memory area one. This code shall only be valid if the Avionics Reprogram Enable 1 or the EW UDM Reprogram Enable discrete is active.

Code 11000000 which is CO hexadecimal is a combination of 40 H and 80 H for simultaneous memory areas one and two enter reprogramming mode.

Referring to FIG. 11(E) there is shown the format for a header message which is used to pass load and verify parameters to the bus controller 55 being reprogrammed. The activity message shown prior to the header message request that the bus controller 55 being reprogrammed command the header message from rapid reprogramming terminal 20. The activity message will not be used by bus controllers 55 which keep track of header, memory data, trailer message sequence, that is the bus controller automatically commands this message sequence without rapid reprogramming terminal 20 requesting each message.

The transmit/receive bit (bit 10) in the command word is at the logic one state since rapid reprogramming terminal 20 which is functioning as a remote terminal is to transmit data and the terminal subaddress field (bits 5-9) is set at 14 hexadecimal. The transfer mode (bits 14-15) are used to describe the memory data load or memory data verify message data word content. The transfer mode bits are binary coded as follows: TM=00; TM=01; TM=10 and TM=11. When TM=00 which is the no transfer mode, the buffer transfer count contained in data word one and the initial load address contained in data word two have no meaning. This mode is used to transfer the program entry address contained in data word three and Page Number contained in data word four or is used as a preamble to the trailer message.

When TM=01, each sixteen bits of data transmitted in a data word will contain only eight bits of information in bits 0-7. When TM=10, each sixteen bits of data transmitted in a data word will contain sixteen bits of information in bits 0-15. When TM=11, the sixteen bits of data transmitted in each odd word (first is odd) contains the sixteen least significant bits of data in bits 0-15 and each even word (second is even) contains the sixteen most significant bits of data in bits 0-15.

The header type bits (bits 12-13) are used to describe the header and have no meaning when the transfer mode is 00. The header type are binary coded as follows: HT=00, HT=01, HT=10 and HT=11. When HT=00, the buffer transfer count equals the number of words to be transferred. When HT=01, the buffer transfer count equals number of messages to be transferred. HT=10 is undefined, while HT=11 reserved for internal use by digital signal processor 20 and therefore will not be transmitted on the 1553 multiplex data bus 42 aboard the aircraft.

The buffer transfer count (bits 0-11) is used to indicate the amount of data that will follow the header message. The buffer transfer count has no meaning when the transfer mode is 00. The range of the buffer transfer count is from one to four thousand ninety six words.

When HT=00, the buffer transfer count is the total number of data words that will be transmitted in a transaction which includes the header message and trailer message. The data words are transmitted in 32-word messages since each transfer sequence is limited to thirty two data words (see FIG. 8) with the last message containing from one to thirty two data words. The maximum transfer for HT=00 is four thousand ninety six words using one hundred twenty eight memory data load or memory data verify messages.

When HT=01, the buffer transfer count is the number of memory data load or memory data verify messages that will follow the header message. Thus, the maximum data transfer per header message is 4096×32 data words per memory data load or memory data verify message which equals 131,072 sixteen bit words (128K). If paging (data word four, bits 0-1) is utilized for transfer modes 01 or 10, the maximum value of the buffer transfer count will be 2048 which results in 65,536 sixteen bit data words (64K) for transfer modes 01 and 10.

Data word two is the initial load address (bits 0-15) which is the sixteen or less least significant bits of the point in memory into which data is to be loaded or read. The maximum value (number of bits) used in the initial load address is compatible with the page size of remote terminals using paging. Unused bits equal zero.

Data word three is program entry address (bits 0-15) which has meaning only for transfer mode=00. The program entry address is the sixteen o less least significant bits of the point in memory at which the bus controller 55 being reprogrammed is to begin execution after receipt of an execute command in the load/verify message of FIG. 11(D) or when a transfer control is indicated in data word four. The load/verify message, FIG. 9(D) is only used with remote terminals which require this command. The maximum value (number of bits) used in the program entry address is compatible with the page size of remote terminals using paging. Unused bits equal zero.

Data word four is the page number (bits 3-15) representing up to the thirteen most significant bits for a paged memory address within the bus controller 55. The page number applies to the program entry address for transfer mode=00 or the initial load address for transfer modes=01, 10 or 11. Unused bits shall equal 0.

It should be noted that a page comprises 65,536 addresses in memory.

The transfer control bits 0-1 may be used to transfer control to a loaded program after a verify is processed or to an unaltered memory area after a load is completed, that is a bus controller 55 has been reprogrammed. When the transfer control bits equal 01 this indicates to the bus controller 55 being reprogrammed that this is the last header, memory data load or verify (up to 4096 messages), trailer or header, trailer transaction. When the transfer control bits equal 00 this indicates to the bus controller 55 being reprogrammed that more data is to follow the current header, memory data load or verify (up to 4096 messages), trailer transaction or header, trailer transaction and control should not be transferred. For bus controllers 55 using paging and the program entry address, the transfer control will remain equal to 01 even for the last data transaction, until a transfer mode equals 00 message is used to supply the program entry address and page number. Transfer control equal to 10 indicates that control is to be transferred to the program entry address of data word three. When control is transferred, the transfer does not take place until after the trailer message and control is transferred only to non-reprogrammed areas or verified areas in memory. Transfer control equals 11 is invalid and bit 2 equals zero.

Referring to FIG. 11(F) there is shown the format for a memory data load message which is used to transfer the data to be loaded into the memory of a bus controller 55 being reprogrammed. The activity message provided prior to a memory data load message is used only for bus controllers 55 that do not keep track of the number of memory data load messages required for each header, memory data, trailer transaction or for bus controllers that do not check the busy bit in the status response word, FIG. 11(B), provided by rapid reprogramming terminal 20.

The transmit/receive bit (bit 10) in the command word is at the logic one state since the rapid reprogramming terminal 20 is to transmit and the terminal subaddress field (bits 5-9) is set at 15 hexadecimal, while the word count may vary from one to thirty two.

If the busy bit (bit 3) is set to a logic one in the status response word for a memory data load message, no data words would be required to be sent by rapid reprogramming terminal 20. After the busy bit is cleared in the status response word of the activity message, the bus controller 55 commands the memory data load message for which no data was received. The number of data words will equal the word count in the memory data load message command word.

Figure 11G:
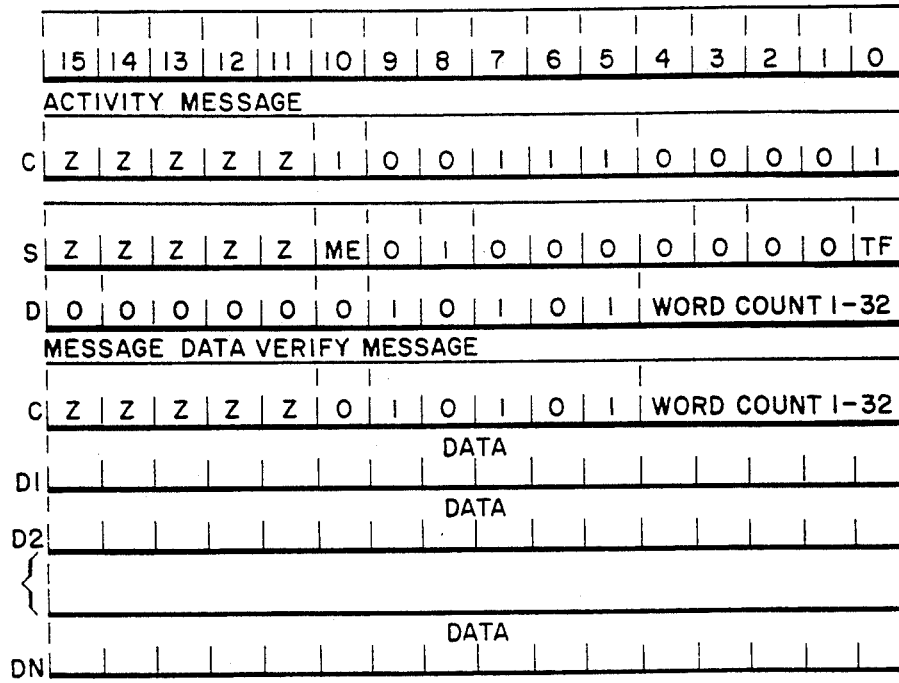
FIG. 11(G) illustrates the format of a memory data verify message transferred via the 1553 multiplex data bus to a bus controller being reprogrammed.

Referring to FIG. 11(G) there is shown the format for a memory data verify message which is used to transfer the data that rapid reprogramming terminal 20 will compare to the data stored in IC memory card 22.

The transmit/receive bit (bit 10) in the command word is at the logic zero state since the rapid reprogramming terminal 20 is to transmit data and the terminal subaddress field (bits 5-9) is set at 15 hexadecimal, while the word count may vary from one to thirty two.

If the busy bit (bit 3) is set to a logic one in the status response word for a memory data verify message then bus controller 55 will retransmit the memory data verify message (i.e., same data words) after the busy bit is cleared in the status response word of the activity message.

The number of data words will equal the word count in the memory data verify message command word.

Referring now to FIG. 11(H), the trailer message is used to pass the data checksum and additional load or verify parameters to the bus controller 55 being reprogrammed. The activity message shown prior to the trailer message request that the bus controller 55 command the trailer message. The activity message provided prior to a trailer message is used only for bus controllers 55 that keep track of the header, memory data, trailer transaction, that is the bus controller 55 automatically commands this message sequence without rapid reprogramming terminal 20 requesting each message.

The transmit/receive bit (bit 10) in the command word for the trailer message is a logic one since rapid reprogramming terminal 20 is to receive data and the terminal subaddress field (bits 5-9) in the command word is set at 16 hexadecimal.

Data word one contains the number of sub-pages and the first sub-page for bus controllers 55 utilizing paging or sub-paging. This word may also be used for internal register control. The fields of data word one represent the values to be used in the next header, memory data load or verify (up to 4096 messages), trailer transaction. For the first header, memory data load or verify (up to 4096 messages), trailer transaction the information will be transmitted prior to the memory data transaction via a header message, trailer message transaction in which the TM (transfer mode) field in data word one of the header is 00.

The sub-page/register count (bits 8-15) field in data word one may be used in lieu of or in conjunction with the page number field in data word four of the header message and is individual user definable. Unused bits equal zero. In the preferred embodiment of the present invention the sub-page field in data word one of the trailer message is used in conjunction with the data word four of the header message of FIG. 11(E).

For purpose of illustrating the use of the sub-page field in the trailer message the following example is provided. In order to load 256K of memory into a bus controller 55 with bank switching, 64K of address capability and a page size definition of 2048 words, the following approach may be used. To load 256K with sub-pages 2048 words long requires 128 header, memory data, memory data, trailer transactions (256K/2048 = 128). The 128 transactions consist of 32 transactions for each of the four banks of switching in bus controller 55. Thus, for each 32 transactions the header message, data word four page number, FIG. 9(E), equals the bank number which would be incremented from zero to three. Within each group of 32 transactions the sub-page count would increment every transaction from zero to thirty one. For each transaction (assuming HT=01 for buffer transfer count equals the number of messages) the header data one buffer transfer count would be 64 (2048 words/32 words per message).

The first sub-page/register (bits 0-7) field may be used in lieu of or in conjunction with the page number field in data word four of the header message and may be defined by the user. Unused bits equal zero. Examples of use of this field are: specifying a processor register into which the page number field in data word four of the header message is to be loaded or specifying the initial sub-page count in the example set forth above to one so as to not reprogram the first 2048 memory locations (the first group of transactions would only be 31 transactions long (1 to 31) and the sub-page count for the first transaction would be set to one to indicate a starting address of 2048).

The data word two checksum (bits 0-15) is the checksum of an entire transaction, i.e., header, memory data, memory data, trailer transaction (when TM in header data word one is not equal to zero) or header, trailer transaction (when TM in header data one is equal to zero). The checksum is derived by a two's complement sixteen bit addition of every data word in the transaction (i.e., header, memory data, and trailer data words) with the exception of the checksum data word which is data word two of the trailer message. The two's complement sixteen bit addition is binary addition with the carry discarded, that is there is no end around carry (e.g., FFFF (hexadecimal)+1=0).

The bus controller 55 being reprogrammed is responsible for comparing the checksum received from rapid reprogramming terminal 20 with the data words for both load and verify functions. The checksum value in data word two of the trailer message is the checksum that should be computed by the bus controller 55. If the value computed does not match the value received from processor 21 for either a load or verify operation, an error is declared and a reprogram status message is sent by bus controller 55.

Referring to FIG. 11(I), the reprogram status message is used by the bus controller 55 to inform rapid reprogramming terminal 20 of an error condition.

The transmit/receive bit (bit 10) of the command word of the reprogram status message is set at a logic zero since rapid reprogramming terminal 55 is to receive information and the subaddress (bits 5-9 of the command word) for this message is 17 hexadecimal.

The status flag (bit 15) of data word one is set to a logic one to indicate that the remainder of the data word should be processed by rapid reprogramming terminal 20, that is the reprogram status message contains valid data. If this bit is set to a logic zero, the reprogram status message will be ignored by rapid reprogramming terminal 20.

The status indicator (bit 14) defines the meaning of the remainder of the data word, that is an error code or a status code to be displayed by rapid reprogramming terminal 20.

When the status indicator equals zero this indicates that an error has occurred and the error code will be processed by rapid reprogramming terminal 20.

When the status indicator equals one this indicates that no error has occurred and the status code in bits 13-0 are to be displayed on liquid crystal display 57 as 4 hexadecimal characters (bits 15 and 14 of the display value are 0). With the status indicator equal to one the values of bits 13-0 will be used to indicate status or progress through the load or verify operation.

When SF equals one and SI equals one the status code bits 0-13 are display characters. When SF equals one and SI equals zero bits 0-13 represent error codes and the desired rapid reprogramming terminal 20 action. The error codes are 0001 (hexadecimal) which is an abort; 0002 (hexadecimal) which is a restart; 0003 (hexadecimal) which is a retry and 0004 (hexadecimal) which is a automatic retry.

The abort error code indicates to rapid reprogramming terminal 20 that the load operation or verify operation has been aborted and should not be retried. Rapid reprogramming terminal 20 will display the error code and wait for an operator response. On receiving the response from the operator, rapid reprogramming terminal 20 will abort the load of the bus controller 55 being reprogrammed and continue with the load of the next bus controller or remote terminal to be reprogrammed if there is a requirement to reprogram another bus controller or remote terminal.

The restart status code indicates that an unrecoverable error has occurred in loading a bus controller 55 and a reload of bus controller 55 is desired. Rapid reprogramming terminal 20 will display the error code and wait for an operator response. On receiving the response from the operator, rapid reprogramming terminal 20 will restart the load of the bus controller 55 being reprogrammed.

The retry status code indicates that an error has occurred in the last message sequence transaction and a repeat of the sequence is desired. Rapid reprogramming terminal 20 will display the error code and wait for an operator response. On receiving the response from the operator, rapid reprogramming terminal 20 will repeat the last transaction.

The automatic retry status code indicates that an error has occurred in the last message sequence transaction. After three consecutive retries, rapid reprogramming terminal 20 will display the error code and wait for an operator response. However, if the retry is successful before reception of the third consecutive error, an error message will not be displayed and operation will continue as normal. On receiving the response from the operator, rapid reprogramming terminal 20 will abort the load of the bus controller 55 being reprogrammed and continue with the load of the next bus controller or remote terminal to be reprogrammed.

Referring to FIG. 11(J), if an RRT error message occurs, the rapid reprogramming terminal 20 sets the busy bit in the status response word for all messages and may suppress transmission of any data words. The bus controller 55 will then poll rapid reprogramming terminal 20 with activity messages. When rapid reprogramming terminal 20 is ready for the bus controller 55 to command the RRT error message, it will clear the busy bit, set the service request bit in the status response to the activity message and transmit the data word requesting that the bus controller 55 command the RRT error message.

Data word one, bit 2 is an abort which is set to a logic one by rapid reprogramming terminal 20 to notify the bus controller 55 that the load or verify has been aborted and no further retries will be made.

Bit 1 is a complete restart which is set to a logic one by rapid reprogramming terminal 20 to notify the bus controller 55 that an unrecoverable error has occurred and all memory data load or memory data verify transactions will be restarted. Bit 0 is the transaction bit which is set to a logic one by rapid reprogramming terminal 20 to notify the bus controller 55 that there was an error detected in the last header, memory data, trailer or header, trailer transaction and that the transaction will be repeated. The remaining bits (bits 3-15) of the data word are a logic zero.

Figure 12:
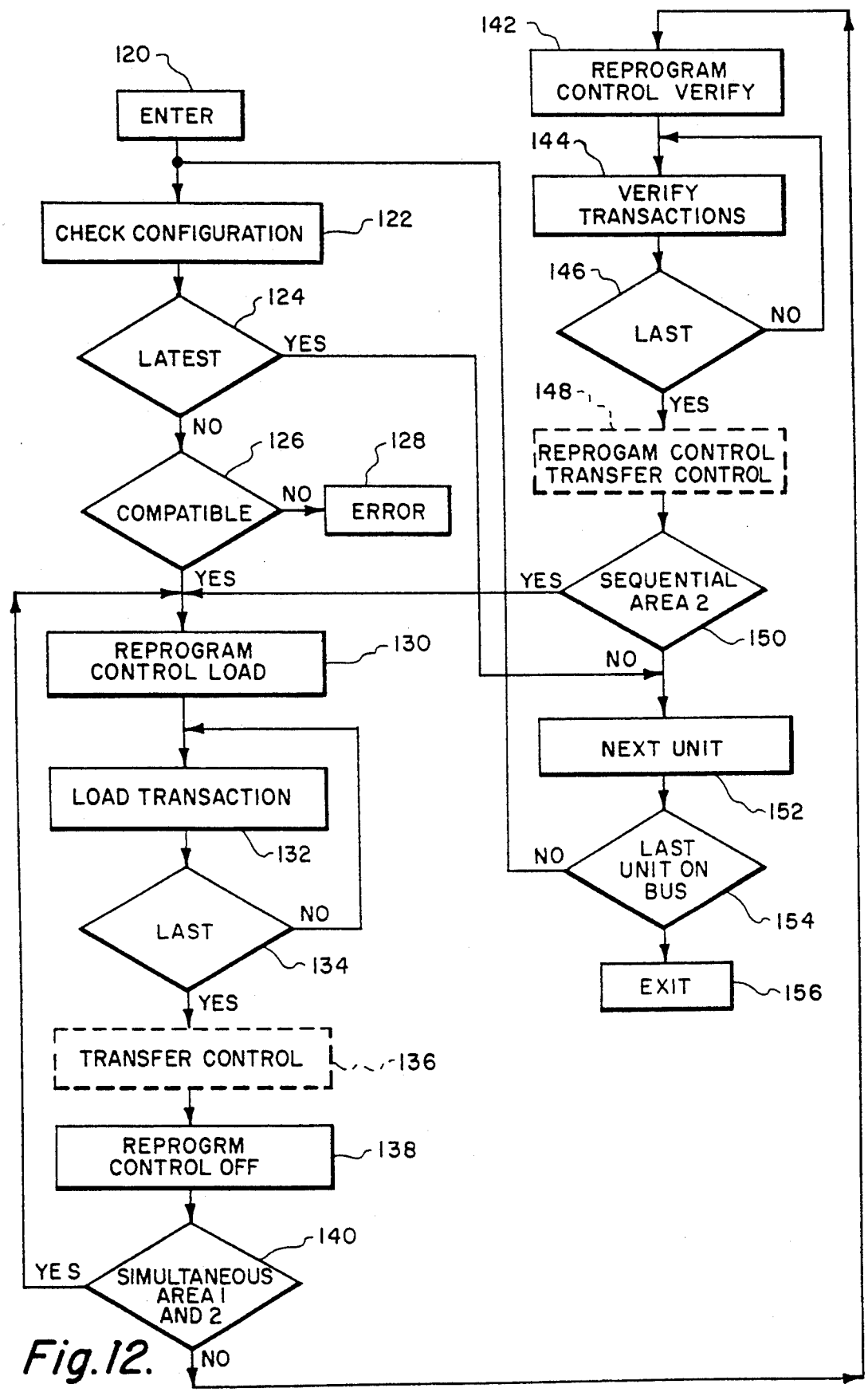
FIG. 12 is a flow chart illustrating the PROTOC.C module of the rapid reprogramming terminal software.

Referring now to FIG. 12, the operation of rapid reprogramming terminal 20 functioning as a remote terminal when reprogramming a bus controller 55 which does not revert to a remote terminal during reprogramming will now be discussed.

When the lookup table for the bus controller indicates that the bus controller 55 supports memory configuration as identified by the bus controller's software, rapid reprogramming terminal 20 request a memory configuration message, FIG. 11(C), from the bus controller 53 being programmed. The memory configuration message describes the current memory contents for one or two memory areas of the bus controller 55 being reprogrammed. Rapid reprogramming terminal 20 compares the received memory configuration to the current memory configuration for the bus controller 55 stored in IC memory card 22 (program step 122). In automatic mode, if the bus controller 55 already contains the current memory configuration, rapid reprogramming terminal 20 continues on to the next remote terminal 53 or bus controller 55 to be processed (program step 152). If the memory configuration message is not usable, rapid reprogramming terminal 20 will assume that the bus controller 55 requires reprogramming. In manual mode, rapid reprogramming terminal 20 will display the memory configuration data and continue reprogramming for the selected bus controller 55.

If the bus controller 55 requires reprogramming of either or both memory areas, rapid reprogramming terminal 20 checks the old and new memory configurations to determine if the information in the IC memory card 22 is compatible with updating the old memory (program step 126) and will use a patch file if it exists. If a patch file does not exist or is not usable, rapid reprogramming terminal 20 checks to see if a complete file exists and checks to determine if this file will result in a newer revision level for the memory configuration. If the configuration message is not usable, no patch file should exist and rapid reprogramming terminal 20 uses the complete file for reprogramming the bus controller 55. Rapid reprogramming terminal 20 will declare an error if the IC memory card 22 information is insufficient (program step 128). If the IC memory card 22 information is correct for reprogramming, rapid reprogramming terminal 20 sends a load message, FIG. 11(D), to enable the reprogramming function for either or both memory areas and depending upon bus controller requirements memory areas one and two will be enabled simultaneously or sequentially (program step 130). The bus controller 55 will next check the validity of the message utilizing internally stored information and the reprogram enable discretes if required.

Once the reprogramming mode is entered (program step 132 and 134), rapid reprogramming terminal 20 proceeds to load the new memory contents in blocks of varying size depending on the bus controller 55 and update requirements. There will be no specific erasure commands from rapid reprogramming terminal 20. The bus controller 55 being reprogrammed is responsible for erasure based on the directed write information. The reprogramming of a bus controller 55 is conducted by a series of one or more header message (FIG. 11(E)), memory data load message (FIG. 11(F)), trailer message (FIG. 11(H)) transactions. If required, a header message, trailer message transaction will also be provided for paging or transfer of control functions. If the bus controller 55 being reprogrammed is required to keep track of how many times a particular memory area has been reprogrammed, the bus controller 55 being reprogrammed shall declare an abort error (bits 0-13 of the data word of the reprogram status message of FIG. 11(I)) if the predetermined memory write capability of the bus controller 55 has been exceeded. The storage of this information within the bus controller's memory shall not affect the validity of a memory verify procedure that is the bus controller 55 being reprogrammed shall mask out this information during a verify operation.

After completion of the load (program step 134), rapid reprogramming terminal 20 will, if required, then provide transfer of control information to the bus controller 55 using a header message, trailer message transaction (program step 136). Transfer of control prior to a verify via the control code bits (bits 0-7) of the data word four of FIG. 11(I) is not permitted. The transfer of control prior to a verify is not used to transfer control to a memory area of bus controller 55 that has been loaded but not verified. If it is necessary to transfer control prior to the completion of a memory area load/verify, the two parts of the memory area are loaded/verified separately using the same technique as for sequentially loading memory areas 1 and 2. The transfer of control via the header message of FIG. 11(E) may be inhibited during the load.

After all required data for a particular memory area have been transferred rapid reprogramming terminal 20 will, via bit 4 or 5 of data word four of FIG. 11(D) disable the reprogramming function for that memory area.

When simultaneous reprogramming of memory areas one and two of a bus controller 55 is utilized (program step 138), rapid reprogramming terminal loads the second memory area prior to the verify operation. When sequential memory area reprogramming or single memory area reprogramming is utilized, rapid reprogramming terminal 20 will at this time verify (program steps 142-146) the previously loaded memory area one load prior to the memory area two load operation. Rapid reprogramming terminal 20 performs the memory verify utilizing the same message transactions that are used for the memory load except that the rapid reprogramming terminal 20 receives the data from the bus controller 55 being reprogrammed and compares the received data with memory configuration data stored in IC memory card 22. The automatic verify after a load may be inhibited.

After completion of the verify (program step 146) rapid reprogramming terminal 20 will, if required, provide transfer of control information to the remote terminal 53 (program step 148) using either a header message, trailer message transaction or via the control code bits (bits 0-7) of the data word four of FIG. 11(I). When sequential reprogramming of memory areas one and two is utilized, rapid reprogramming terminal 20 repeats the load/verify operations (program step 150) for the second memory area after reprogramming of the first memory area is complete.

Assuming there were no errors in reprogramming, rapid reprogramming terminal 20 will continue (program step 152) and reprogram the next remote terminal 53 or bus controller 55 on the 1553 multiplex data bus 42. If an error did occur, operator intervention is requested by a fault display.

Figures 13A, 13B:
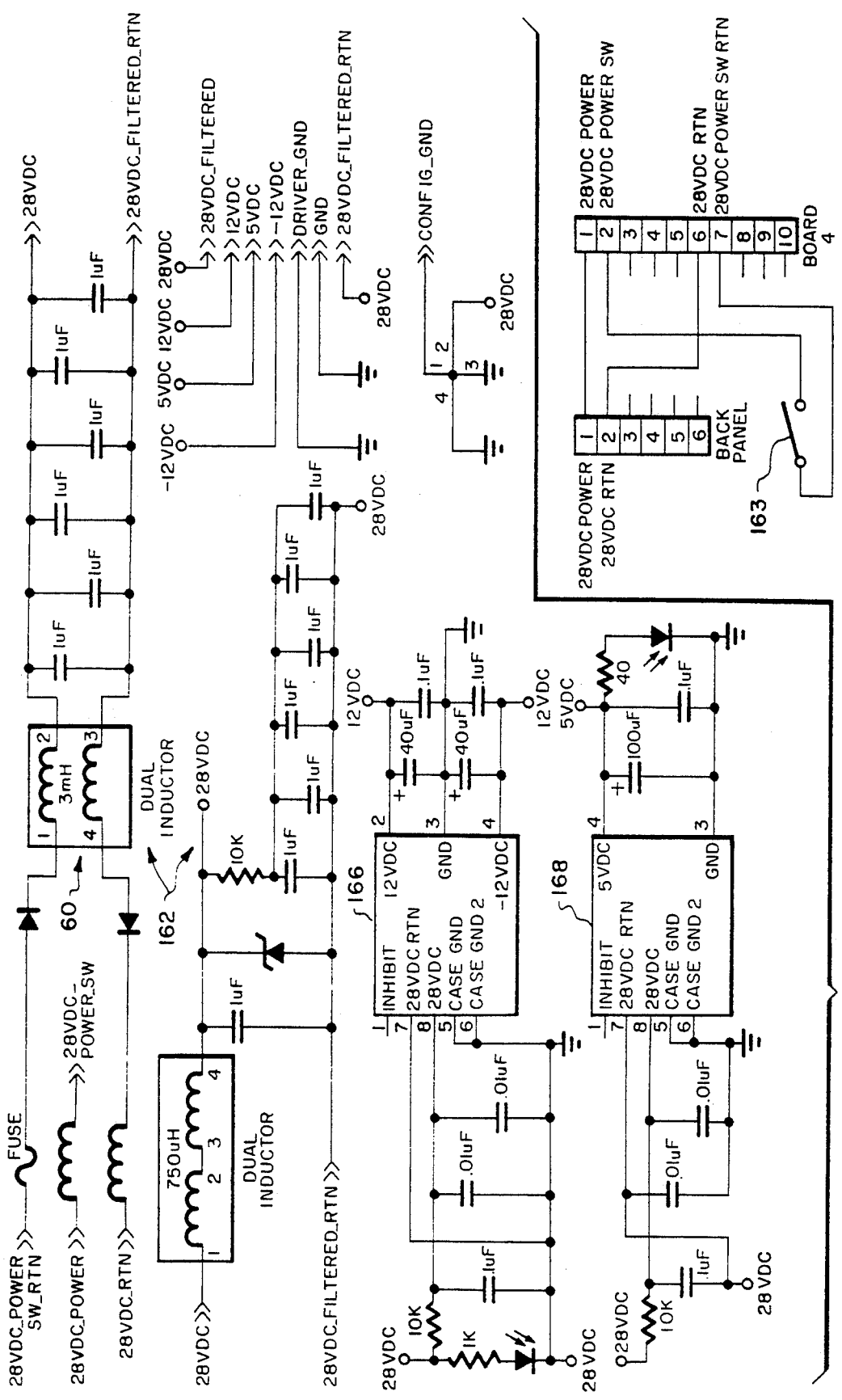
FIG. 13(A) and 13(B) is a detailed electrical schematic illustrating the power supply for rapid reprogramming terminal.

Referring now to FIG. 13, there is shown the power supply 160 for rapid reprogramming terminal 20 which includes an electromagnetic interference filter 162 for providing a filtered 28 VDC signal. Power supply 160 also includes a light emitting diode 164 which provides the back light for liquid crystal display 57 on front panel 43, FIG. 2. Power supply 160 further includes a pair of DC to DC converters 166 and 168 with power supply 166 providing plus and minus 12 VDC signal and power supply 168 providing a plus 5 VDC signal.

Figure 14A:
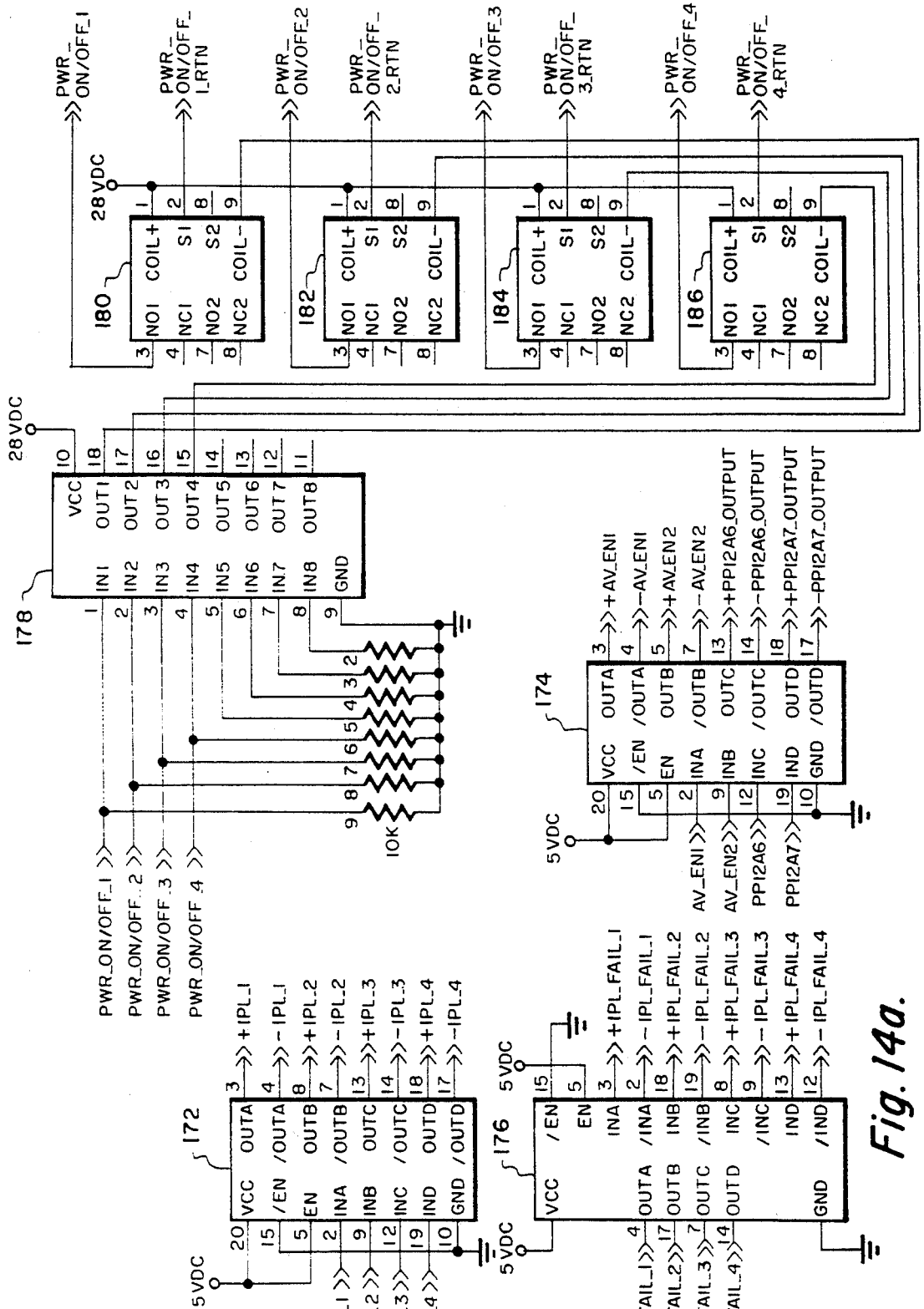
FIG. 14(A)-14(B) is a detailed electrical schematic of the avionics interface of rapid reprogramming terminal.

Referring to FIG. 14(A), there is shown the avionics interface 170 of rapid reprogramming terminal 20 which includes a pair differential line driver 172 and 174 with driver 172 providing the unipolar differential signals +IPL_1, −IPL_1 through +IPL_4, −IPL_4 to the 1553 avionics buses one through four to initiate program loading of the AN/AYK-14 avionics computers on buses one through four and driver 174 providing the unipolar differential signals +AV_EN1, −AV_EN1 and +AV_EN2, −AV_EN2 to enable memory areas one and two of remote terminals 53 and bus controllers on the 1553 avionics buses one through four. Avionics interface 170 also includes a differential line receiver 176 which receives the unipolar differential signals +IPL_FAIL_1, −IPL_FAIL_1 through +IPL_FAIL_4, −IPL_FAIL_4 (indicative of an initiate program load failure to an AN/AYK-14 computer) and converts the signals to binary signals IPL_FAIL_1 through IPL_FAIL_4. Avionics interface 170 further includes a power driver 178 which has four inputs PWR_OFF/ON_1 through PWR_OFF/ON_4 respectively connected to the PWR_OFF/ON_1 through PWR_OFF/ON_4 outputs of interface 54, FIG. 17. When a five volt logic one signal is applied to the PWR_OFF/ON_1 of driver 178 the OUT1 output of driver 178 is pulled to ground the coil in relay 180 is energized closing a normally open contact (NO1 to S1 is shorted) within relay 180 which turns off the AN/AYK-14 computer on avionics bus one. It should be noted that relays 182, 184 and 186 operate in a similar manner with respect to turning off the AN/AYK-14 computers on avionics buses two through four.

Figure 14B:
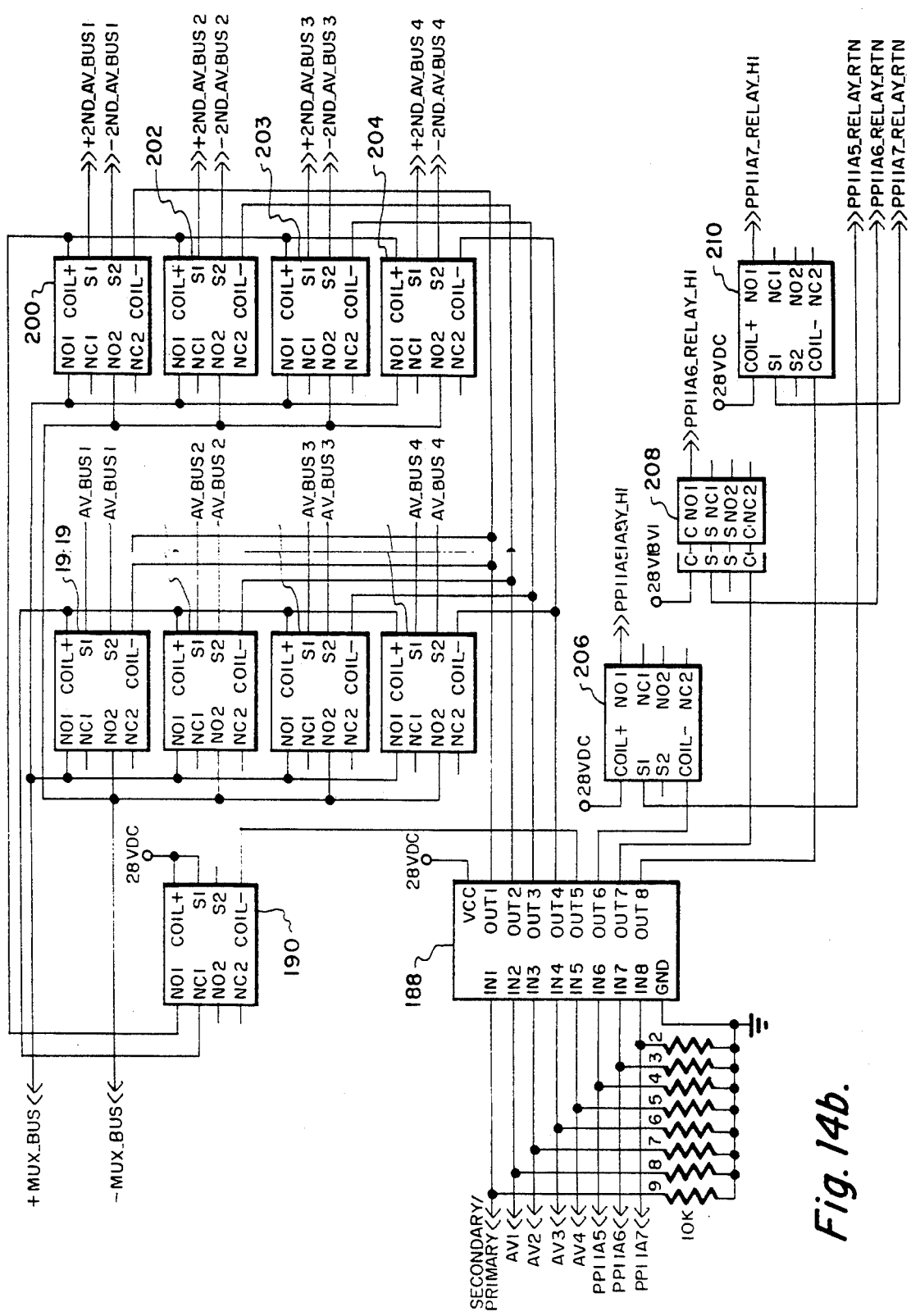

Referring to FIG. 14(B), when a logic one is provided from the AV1 output of interface 56, FIG. 17, to the AV1 input of power driver 188, the OUT1 output of driver 188 is driven to ground providing a ground to the coils of relays 192 and 200. When a logic zero is provided to the secondary/primary input of driver 188 the OUT5 output of driver is open, which leaves the coil of relay 190 in a deenergized state providing a 28 VDC signal through the NC1 output thereof to the coils of relays 192, 194, 196 and 198. Since only the coil of relay 192 is at ground, only relay 192 is energized activating the primary avionics bus one on the aircraft. It should be noted that the 1553 multiplex data bus 42 is a differential bus with differential data signals (+MUX_BUS, −MUX_BUS signals) that are Manchester mark encoded Military Standard 1553 signals. Thus, energizing any of the primary avionics bus relays 192 through 198 allows data to be transmitted to and from the avionics bus associated with that particular relay. For example, if the AN/AYK-14 computer on avionics bus number four is to be reprogrammed, a logic one would be provided to the AV4 input of driver 188 and a logic zero would be provided to the secondary/primary input of driver 188 resulting in relay 198 being energized which allows rapid reprogramming terminal 20 to communicate with the AN/AYK-14 computer on avionics bus number four so that this AN/AYK-14 may be reprogrammed.

Figure 15A:
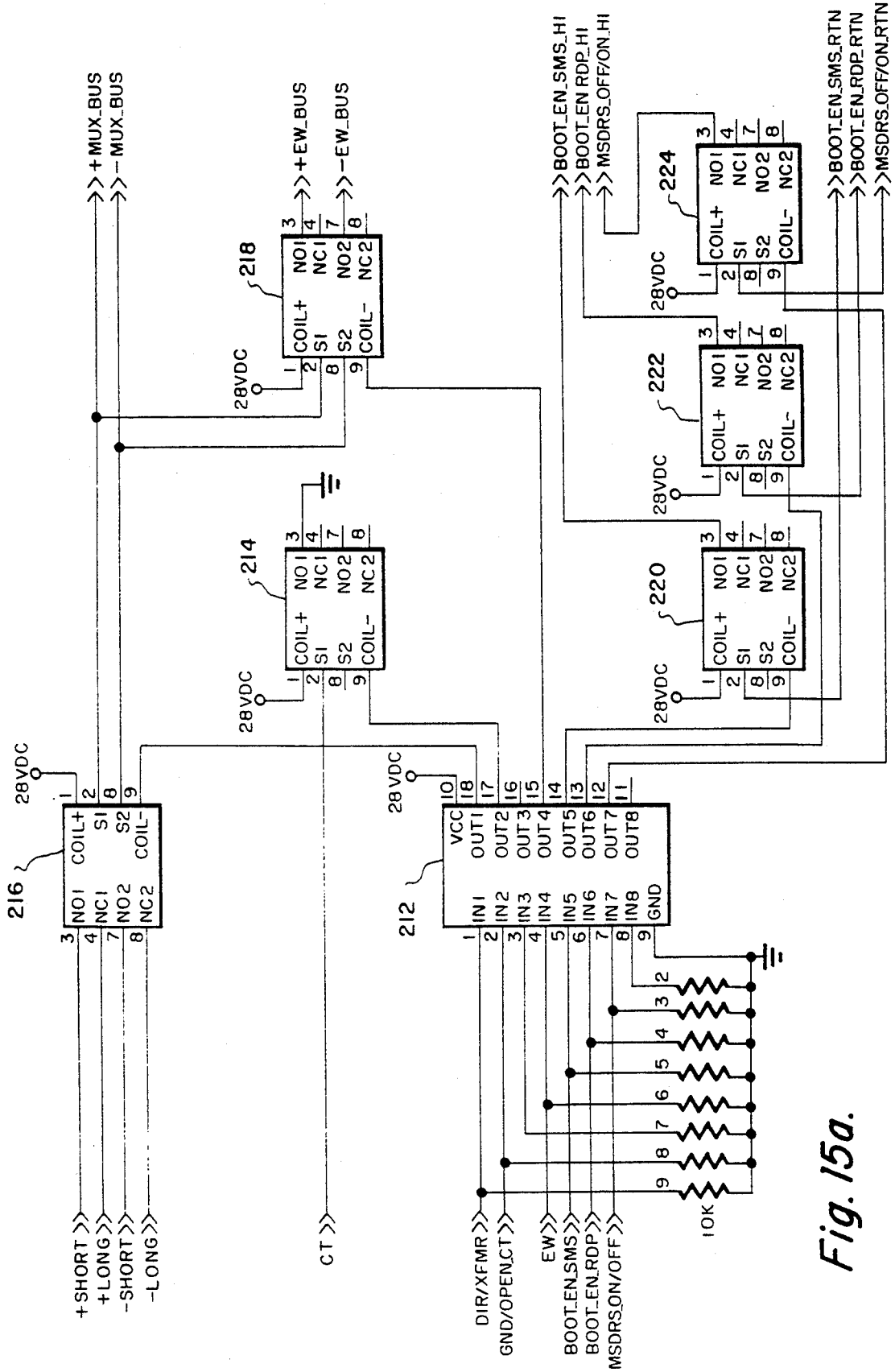
FIG. 15(A)-15(B) is a detailed electrical schematic of the electronic warfare interface of rapid reprogramming terminal.

Referring to FIG. 15(A), there is shown the electronic warfare interface 211 of rapid reprogramming terminal 20 which includes a power driver 212 having an EW input which when supplied a logic one from the EW output of interface 56 results in a logic zero at the OUT4 output of driver 212 energizing the coil of relay 214. When the DIR/XFMR output of interface 56 is at the logic one state the OUT1 output of driver 212 goes to ground energizing the coil of relay 216 closing normally open contacts one and two of relay 212 such that data provided from rapid reprogramming terminal 20 will pass through relays 216 and 218, a transformer coupled connection, FIG. 4, to a remote terminal 53 or bus controller 55 on the electronics warfare bus. Similarly, when the DIR/XFMR output of interface 56 is at the logic zero state the OUT1 output of driver 212 is open de-energizing the coil of relay 216 leaving the normally closed contacts one and two of relay 212 closed such that data provided from rapid reprogramming terminal 20 will pass through relays 216 and 218 directly to a remote terminal 53 or bus controller 55 on the electronics warfare bus.

It should be noted that whenever it is required to ground the center tap of transformer 40, a logic one will be supplied to the GND/OPEN_CT of driver 212 from interface 56. This results in a ground at the OUT2 output of relay 14 energizing the coil of relay 214 which closes the normally open contact one of relay 214 which brings the CT and GND terminals of transformer 40 to ground level, thus grounding the center tap of transformer 40. It should be further noted that the center tap of transformer 40 is generally grounded when coupling to the 1553 multiplex data bus 42 is through transformer 60 if the remote terminal 53 or bus controller 55 requires grounding.

Relays 220, 222 and 224 function in manner similar to relay 218. For example, if it is desired to reprogram the stores management system aboard an aircraft a logic one will be provided at the BOOT_EN_SMS output of interface 56. A logic one at this output is supplied to the IN5 input of driver 212 resulting in a ground at the OUT5 output of driver 212. This energizes the coil of relay 220 closing normally open contact one of relay 220 enabling the stores management system allowing data to be transferred from rapid reprogramming terminal 20 to the stores management system.

Figure 15B:
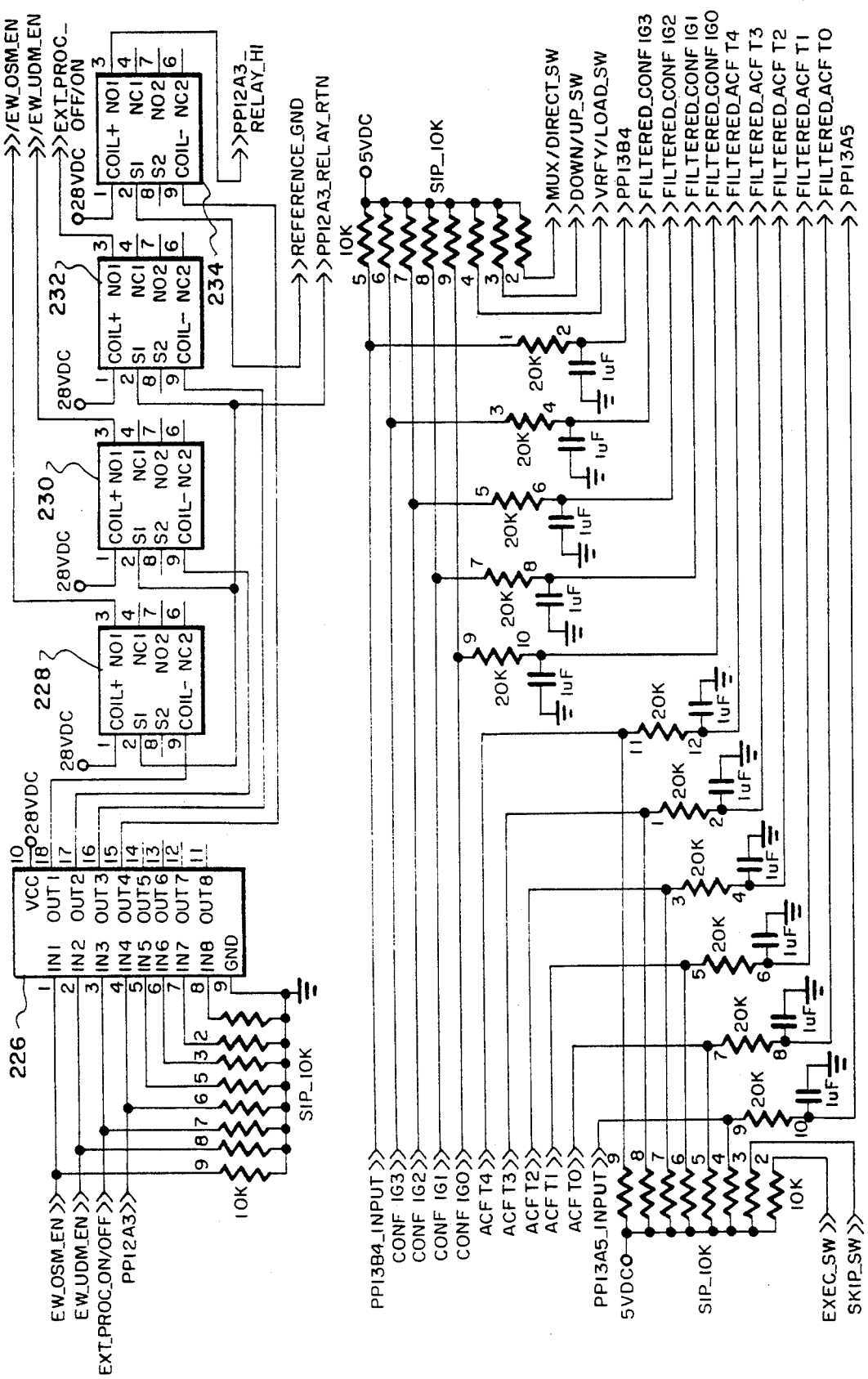

Referring to FIG. 15(B), operating software memory, user data memory and the AN/ALQ-165 radar jammer are respectively enabled by logic ones provided at the IN1, IN2 and IN3 inputs driver 226. This energizes either relay 228, 230 or 232, which respectively enables either the operating software memory, user data memory or the AN/ALQ-165 radar jammer in the electronic warfare system.

Figure 16A:
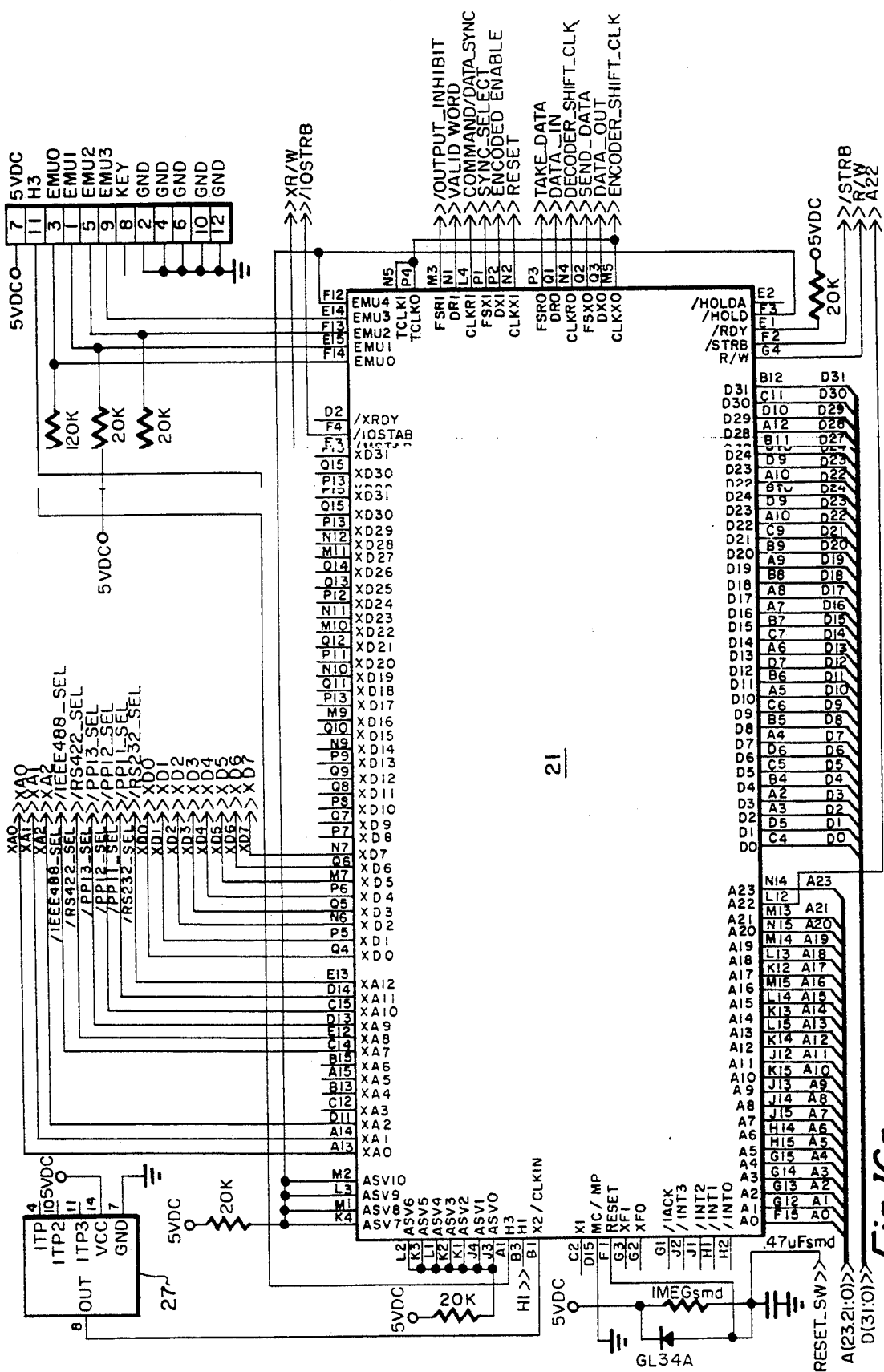
FIG. 16(A)-(D) is a detailed electrical schematic of the control circuitry of rapid reprogramming terminal.

Referring to FIGS. 3 and 16(A), digital signal processor 21 provides the eight bit data bytes, address and enable signals which selectively activate the outputs (PA0-PA7, PB0-PB7 and PC0-PC7) of programmable peripheral interfaces 52, 54 and 56. Specifically, the XD0-XD7 outputs of processor 21 provide digital data for the D0-D7 inputs of interfaces 52, 54 and 56, while the XA9 through XA11 outputs of processor 21 determine which interface 52, 54 or 56 is to be enabled by providing a logic zero to the /CS (chip select) input of interface 52, 54 or 56. For example, if interface 54 is to be enabled the XA10 output of processor 54 goes active low, that is logic zero. This logic zero is supplied to the /CS input of interface 5 enabling interface 54. Interface 54 includes three registers which are addressed by the XA0-XA1 outputs of digital signal processor 21. If the EW_OSM_EN output of interface 54 is to be enabled, logic zeros will be provided from the XA0 and XA1 outputs of processor 21 to the A0 and A1 inputs of interface 54 and the D0 input of interface 54 will be provided a logic one. Similarly, if the IP_1 output of interface 54 is to be enabled, a logic one will be provided from the XA0 output of processor 21 and a logic zero will be provided XA1 output of processor 21 respectively to the A0 and A1 inputs of interface 54 and the D0 input will provide the logic level of IPL_FAIL_1. Likewise, if the IPL_FAIL_1 input of interface 54 is to be read by digital signal processor 21, a logic zero will be provided from the XA0 output of processor 21 and a logic one will be provided XA1 output of processor 21 respectively to the A0 and A1 inputs of interface 54 and the D0 input will be provided the logic level of IPL_FAIL_1.

The read and write signals for interfaces 52, 54 and 56 are provided by programmable array logic device 24. The read and write inputs to interfaces 52, 54 and 56 are active low, that is for digital signal processor to read a logic signal provided to a programmable interface 52, 54 or 56 requires a logic zero at the /RD input of the interface, while a logic zero at the /WR input transfers the logic zeros and ones at D0–D7 inputs of the interface to the PA0–PA7, PB0–PB7 or PC0–PC7 outputs of the interface depending upon the logic signals at the A0 and A1 inputs of the interface.

Figure 16B:
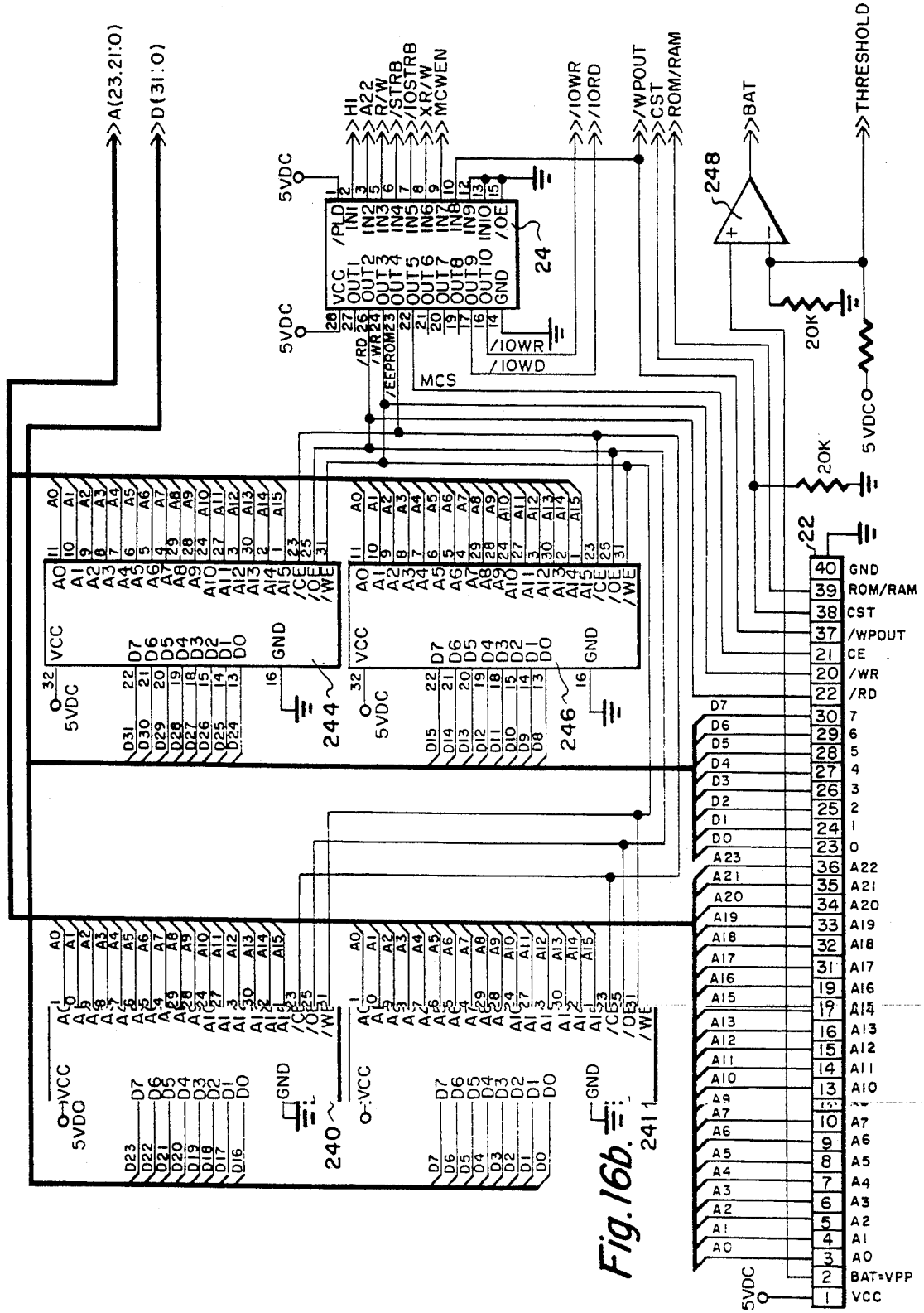

Referring now to FIG. 16(B), the read (/RD), the write (/WR) and the EEPROM select (/EEPROM) signals are provided by programmable array logic device 24 to the four 64K × 8 bit EEPROMs 240, 242, 244 and 246 of EEPROM 23 and the read (/RD), the write (/WR) and the memory card select (MCS) signals to IC memory card 22 are provided by programmable array logic device 24. The read, the write and the EEPROM select signals provided to EEPROM 23 are active logic zero signals. The read and the write signals provided to IC memory card 22 are active logic zero signals, while the memory card select signal provided to IC memory card is an active logic one signal. Addressing for IC memory card 22 is provided by digital signal processor 22 through the A0–A22 inputs of IC memory card 22, while digital information is either read from or written into IC memory card 22 through the D0–D7 terminals of IC memory card 22. Similarly, addressing for EEPROMs 240, 242, 244 and 246 is provided by digital signal processor 22 through A0–A15 inputs of EEPROMs 240, 242, 244 and 246, while digital information is either read from or written into through the D0–D7 terminals of EEPROMs 240, 242, 244 and 246. The /WPOUT signal provided by IC memory card 22 is supplied to the IN8 input of programmable array logic device 24 and the PC1 input of interface 56. This signal, which is active at the logic zero state, is used to prevent information from being written into IC memory card 22. When supplied to programmable array logic device 24 the /WPOUT signal prevents the /WR signal from going to the active zero state when the MCS signal is active logic one so that information may not be read into IC Memory Card 22. The CST output of IC memory card 22 indicates the presence or absence of the IC memory card 22. When the CST output is low card 2 is absent, when the CST input is high card 22 is present. The ROM/RAM output of IC memory card 22 indicates whether IC memory card 22 is a ROM or a RAM device. When the ROM/RAM input is at the logic one state a ROM is being utilized with rapid reprogramming terminal 20 while a logic zero indicates that a RAM is being utilized.

The BAT/VPP output of IC memory card indicates whether or not the battery for IC memory card 22 is sufficiently charged to operate properly. When this output exceeds 2.5 volts, the output of comparator 248 provides a logic one to the PC0 input of interface 56 indicting the battery in IC memory card 22 is charged.

The memory card write enable (MCWEN) signal provided by interface 56 when at the logic zero state prevents an inadvertent write to IC memory card 22 by insuring that the WR signal supplied by programmable array logic device 24 remains at the logic one state. When the memory card write enable (MCWEN) signal provided by interface 56 is at the logic one state data may be written into IC memory card 22. It should be noted that the MCWEN signal is under rapid reprogramming terminal software control.

The H1 signal provided by digital signal processor 21 to the IN1 input of programmable array logic device 24 is a 14 MHZ clock signal provided by digital signal processor 21. The A22 output of digital signal processor 21 provides a logic signal to the IN2 input of programmable array logic device 24 which determines whether IC memory card 22 or EEPROM 23 is being selected for a read or write operation with a logic zero indicating that the EEPROM 23 is selected and a logic one indicating that the IC memory card 22 is selected. The R/W signal provided by digital signal processor 21 to the IN3 input of programmable array logic device 24 indicates whether a read (logic one) or write (logic zero) operation is to be preformed by IC memory card 22 or EEPROM 23. The /STRB signal provided by digital signal processor 21 to the IN4 input of programmable array logic device 24 indicates whether the A22 and R/W signals are valid and is active at the logic zero state. Similarly, the /IOSTRB signal provided by digital signal processor 21 to the IN5 input of programmable array logic device 24 indicates whether the XR/W signal is valid and is active at the logic zero state. The XR/W signal which is provided by digital signal processor 21 to the IN6 input of programmable array logic device 24 indicates whether a read or write operation is to be performed by programmable peripheral interfaces 52, 54 and 56 and universal asynchronous receiver transceiver (UART) circuits 37 and 38. When the XR/W signal is a logic one a read operation is to be performed and when the XR/W signal is a logic zero a write operation is to be performed.

Figure 16C:
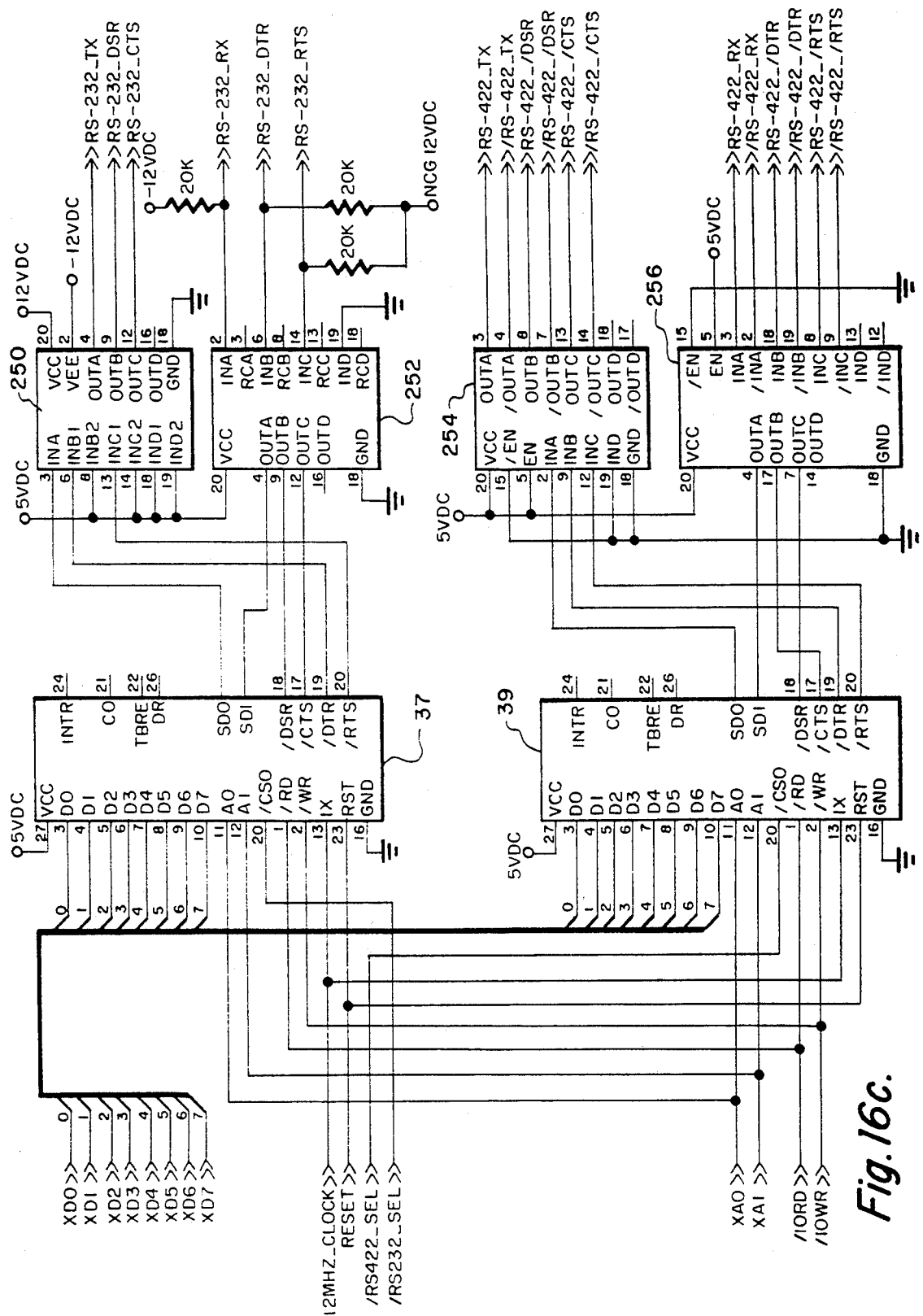

Referring now to FIG. 3 and 16(C), there is shown the universal asynchronous receiver transceiver (UART) circuits 37 and 38 which in the preferred embodiment of the present invention are model number 82C52 CMOS serial control interfaces manufactured by Harris Corporation although it should be understood that any controller interface which is compatible with standard RS-232-C baud rates may be used as UARTS 37 and 38. UARTS 37 and 38 are used to communicate with devices external to rapid reprogramming terminal such as computer 66 via the standard RS-232 and RS-422 serial communications protocol.

Digital data is supplied from the SD0 output of UART 37 through differential line driver 250 to computer 66 via the RS_232_TX data transmission line. Similarly, digital data is supplied from computer 66 via the RS_232_RX data receive line through differential line receiver 252 to the SDI input of UART 37. When rapid reprogramming terminal 20 is turned on, a data set ready signal (active logic one) is provided from the /DSR output of UART 37 through driver 250 via the RS_232_DSR data line to computer 66 indicating to computer 66 that rapid reprogramming terminal 20 is powered up. Computer 66 provides a data terminal ready signal (active logic one) via RS_232_DTR data line through receiver 252 to the /DTR input of UART 37 which indicates to rapid reprogramming terminal 20 that computer 66 is operational and ready to send or receive data. When computer 66 is ready to send data, computer 66 provides a request to send signal (active logic one) via RS_232_RTS data line through receiver 252 to the /DSR input of UART 37 which indicates to rapid reprogramming terminal 20 that computer 66 is ready to transmit data. Rapid reprogramming terminal 20 responds with a clear to send signal provided from the /CTS output of UART 37 through driver 250 via the RS-232_CTS data line to computer 66. When digital data from rapid reprogramming terminal 20 is to be provided to computer 66 the only signal required is that the data terminal ready signal be at the logic one state indicating that computer 66 is ready to receive data. The transmission of data to and from rapid reprogramming terminal 20 via the RS-422 data bus is similar to the transmission of data via the RS-232 data bus and therefore will not be discussed in detail.

UARTS 37 and 38 include read (/RD) and write (/WR) inputs and a chip select (/CS0) input. The read signal is provided by programmable logic array 24 to UARTS 37 and 38 to read the receiver registers of UARTS 37 and 38, while the write signal is provided by programmable logic array to UARTS 37 and 38 to write data into the transmitter register of UARTS 37 and 38. The /CS0 input when at the logic zero state acts as an enable signal for the read and write operations of UARTS 37 and 38. The read operation for UARTS 37 and 38 reads the digital data stored in the UART into digital signal processor 21, while the write operation writes digital data from digital signal processor 21 into the UART. UARTS 37 and 38 also receive a 12 MHZ clock signal provided by an oscillator 255. It should also be noted that UARTS 37 and 38 are provided logic signals to the A0 and A1 inputs thereof which when decoded address four internal registers within UARTS 37 and 38. Specifically, when A1, A0 is 0,0 the buffer register which receives and sends data is addressed; when A1, A0 is 0,1 the control register (write only register which configures the UART transmitter and receiver circuits) is addressed with a write and the status register (read only register that is examined by the UART to determine errors) is addressed with a read; when A1, A0 is 1,0 the modem control register is addressed and when A1, A0 is 1,1 the baud rate is selected with a write operation and the modem status register is addressed with a read operation.

Rapid reprogramming terminal 20 also has four terminals EMU0-EMU3 for communicating with an emulator 67 connected to external computer 66. Emulator 67 may be used for debugging rapid reprogramming terminal 2 and for the initial loading of the RRT software program into the EEPROM 23 of rapid reprogramming terminal 20. It should be noted that the emulator used in the preferred embodiment of the present invention is a Texas Instrument Model No. TMS 320C30 XDS500 Emulator, although any IBM PC-XT/AT compatible TMS320C30 emulator may be used in the preferred embodiment of the present invention. It should be further noted that external computer 66 may be any IBM PC-XT/AT compatible computer.

Figure 16D:
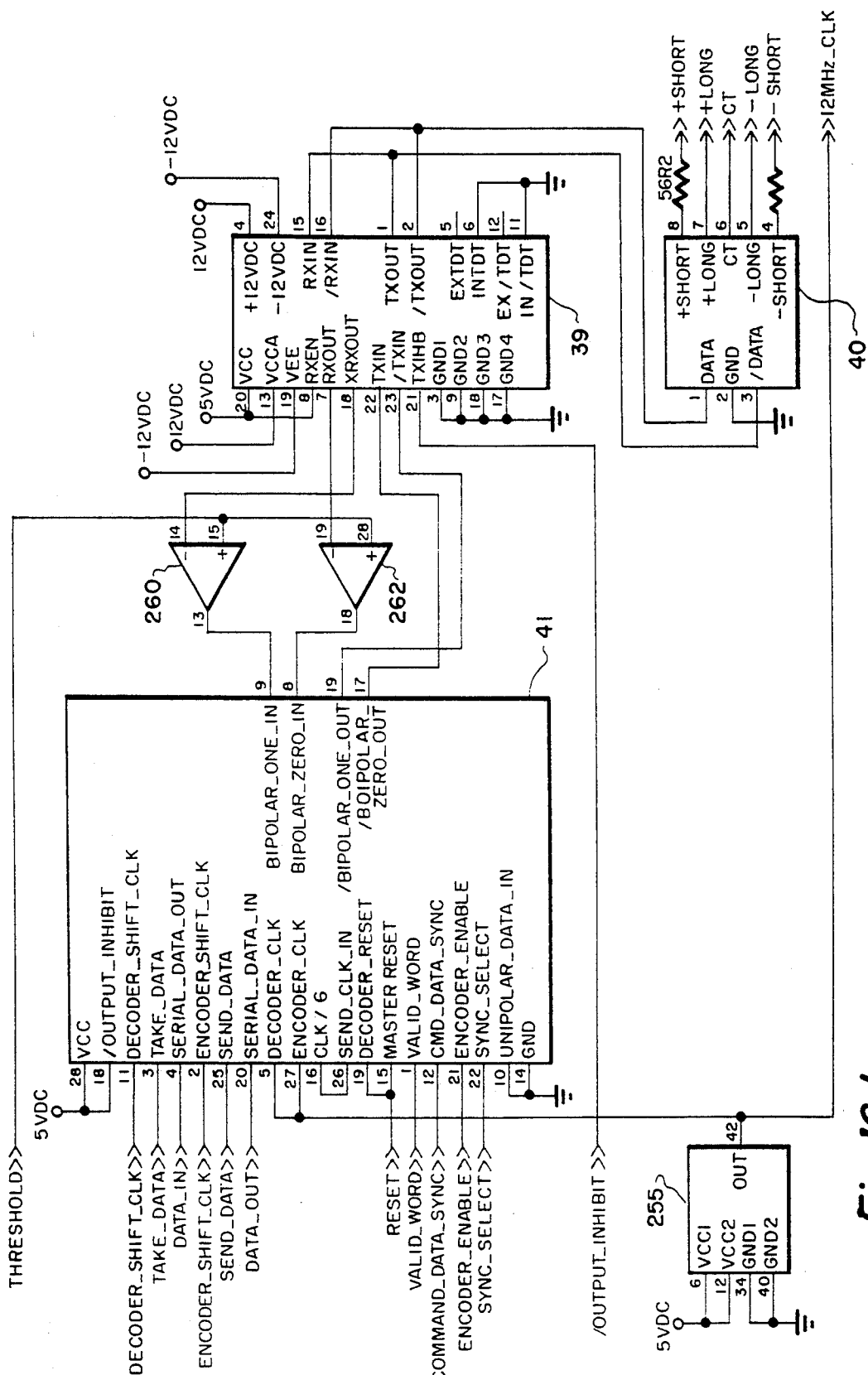

Referring to FIG. 16(D), the encoder shift clock is a one megahertz clock signal provided by encoder 41 to digital signal processor 21 to allow for communication with the digital signal processor 21 during data transfer from processor 21 to encoder 41. Encoder 41 also provides a send data signal (active logic one) to digital signal processor 21 to allow for gating of digital data from processor 21 to encoder 41. The Data Out line between processor 21 and encoder 41 transfers the data from processor 21 to encoder 41.

The decoder shift clock is a one megahertz clock signal provided by decoder 41 to digital signal processor 21 to allow for communication with the digital signal processor 21 during data transfer from decoder 41 to processor 21. Decoder 41 also provides a take data signal (active logic one) to digital signal processor 21 to allow for gating of digital data from decoder 41 to processor 21. The Data In line between processor 21 and encoder 41 transfers the data from decoder 41 to processor 21.

Decoder 41 provides a valid word signal (logic one) to digital signal processor 21 which indicates to processor 21 which is a parity check (active high) for each sixteen bit word transmitted between decoder 41 and digital signal processor 21. A Command Data Sync signal is provided from decoder 41 to digital signal processor 21 to inform the digital signal processor whether the word received by the decoder 41 via the 1553 multiplex data bus 42 is a command or status word (logic one) or is a data word (logic zero). When the encoder enable signal provided by digital signal processor 21 is a logic one, encoder 41 is informed that digital data is ready to be transmitted from digital signal processor 21 to encoder 41. A sync select signal is provided by digital signal processor 21 to encoder 41 which when at the logic one state indicates that a command data word is being sent by digital signal processor 21 to encoder 41 and when at the logic zero state indicates that a data word is being sent by processor 21 to encoder 41.

Comparators 260 and 262 are used as high speed inverters which allow Manchester encoded data to be transferred from transceiver 39 to encoder/decoder 41.

Referring again to FIG. 16(B), the control signals provided by programmable array logic device 24 are generated in accordance with the following boolean equations:

$$\overline{/IOWR} = x\overline{R/W} \cdot \overline{/IOSTRB} \quad (1)$$

$$\overline{/IORD} = xR/W \cdot \overline{/IOSTRB} \quad (2)$$

$$MCS = A22 \cdot \overline{/STRB} + A22 \cdot \overline{R/W} \quad (3)$$

$$\overline{/EEPROM} = \overline{A22} \cdot \overline{/STRB} + \overline{A22} \cdot R/\overline{W} \quad (4)$$

$$\overline{/WR} = \overline{R/W} \cdot \overline{/STRB} \cdot \overline{A22} + \overline{R/W} \cdot \overline{/STRB} \cdot A22 \cdot \quad (5)$$
$$MCWEN \cdot /WPOUT$$

$$\overline{/RD} = R/W \cdot \overline{/STRB} \quad (6)$$

Equations 1 and 2 are the write and read signals for UARTS 37 and 38 and the programmable peripherial interfaces 52, 54, and 56. Equation 3 provides the enable for IC memory card 22. Equation 4 is the enable for the read and write EEPROM 23. Equation 5 and 6 are the write and read signals for EEPROM 23 and the IC memory card 22.

Figure 18A:
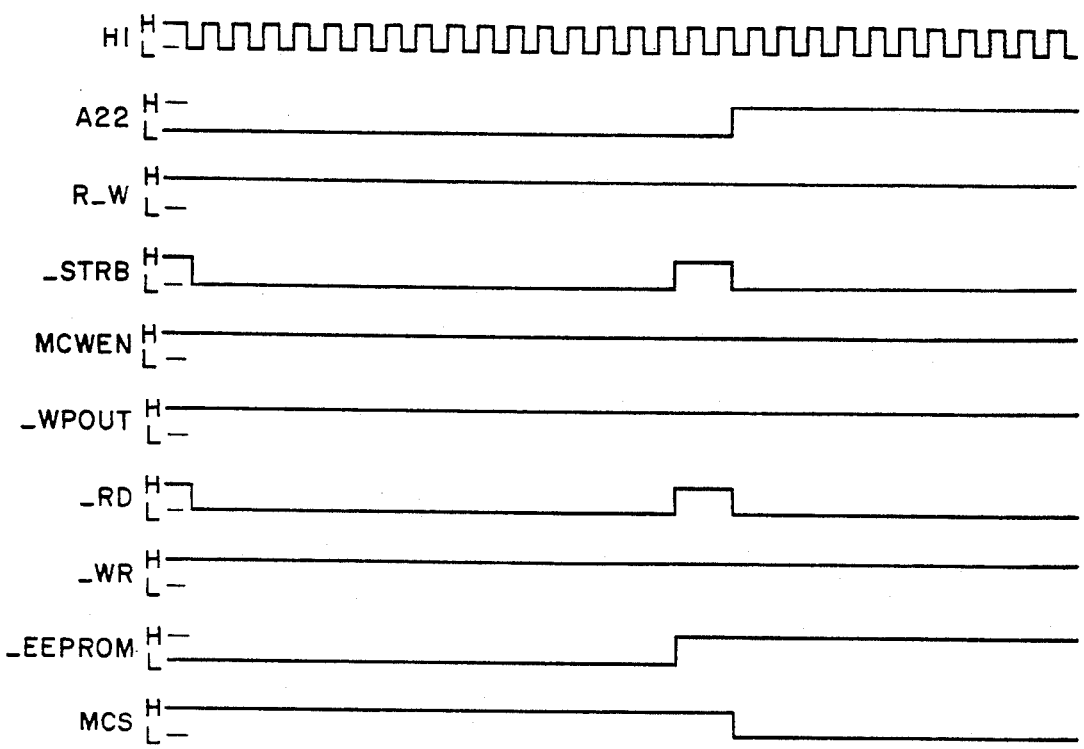
FIG. 18(A)-18(G) illustrates read and write timing signals for certain electrical devices of rapid reprogramming terminal.
Figure 18B:
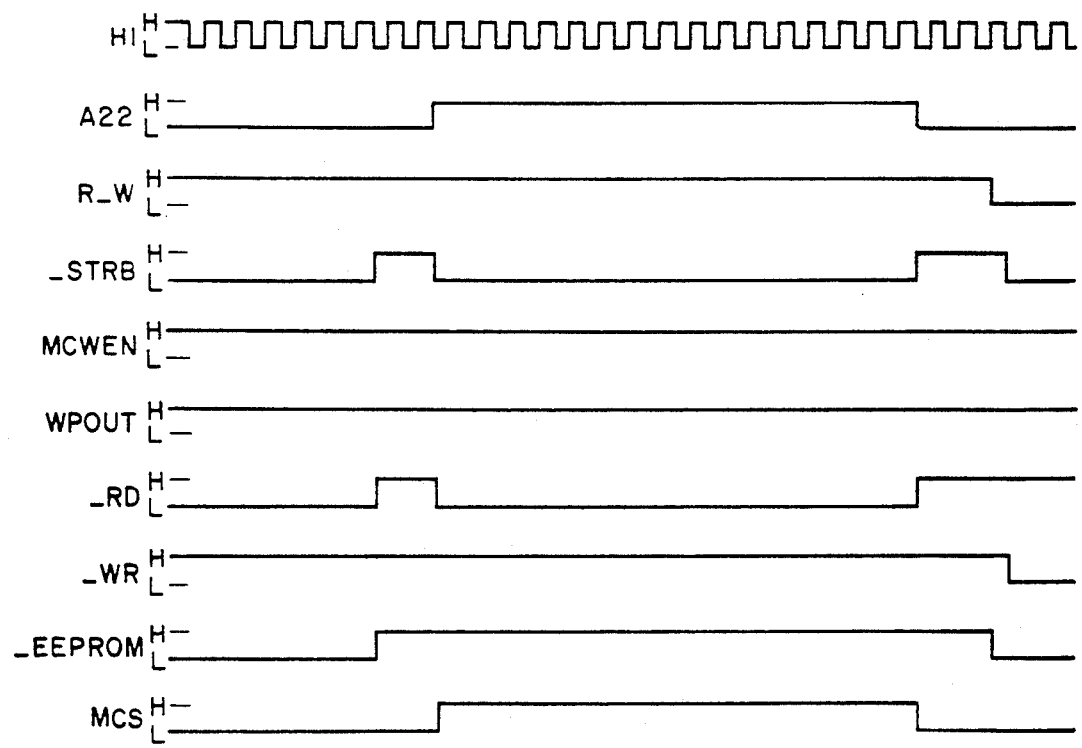
Figure 18C:
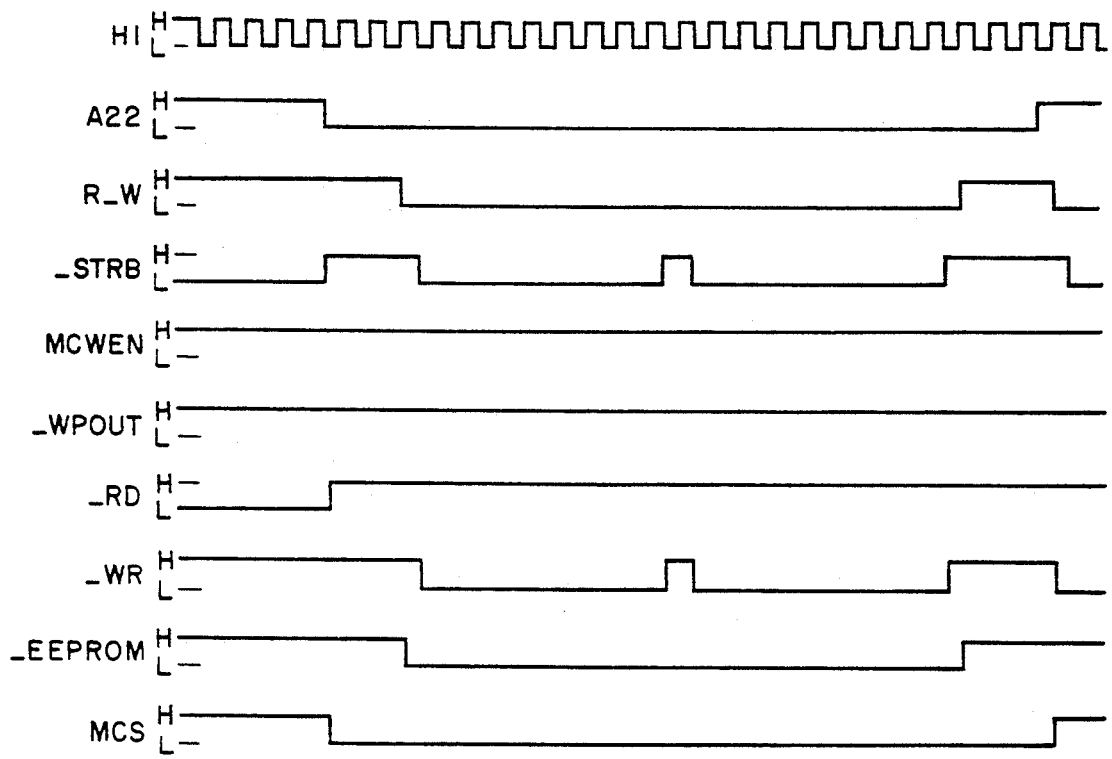
Figure 18D:
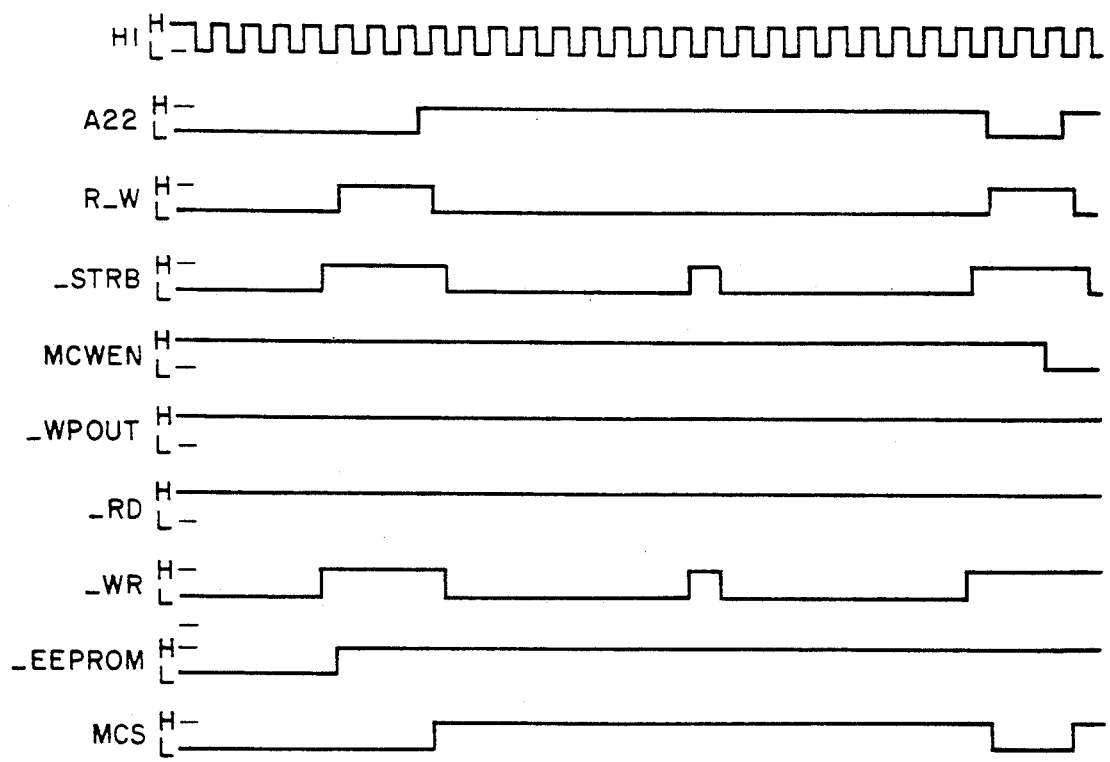
Figure 18E:
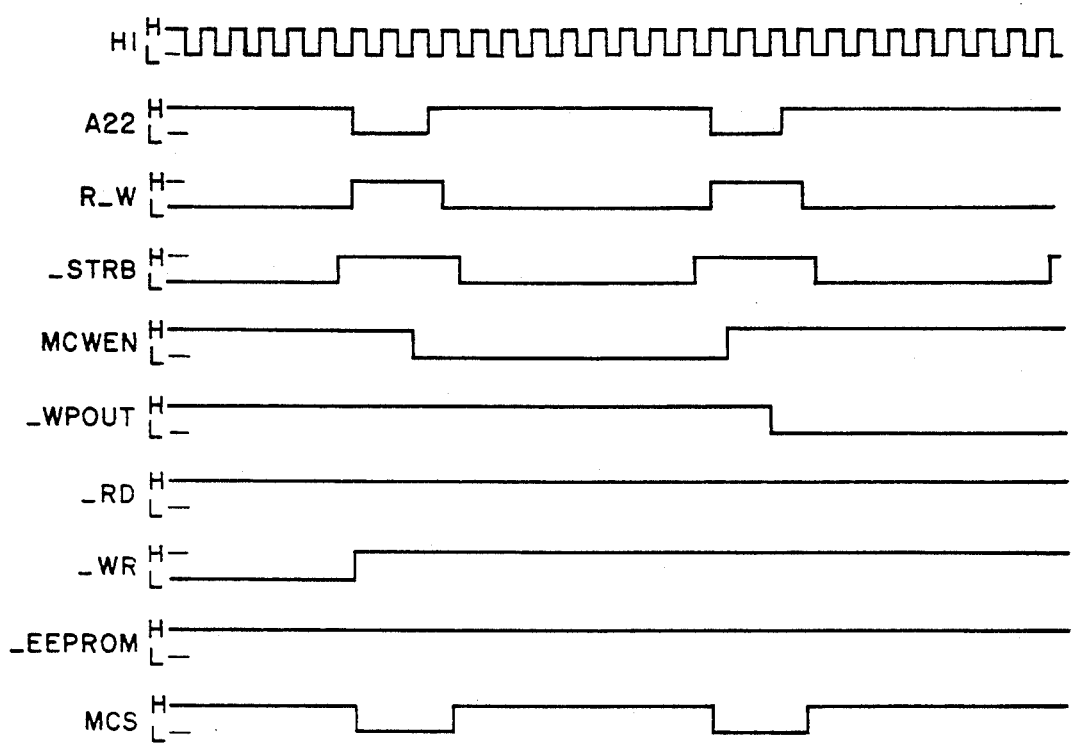
Figure 18F:
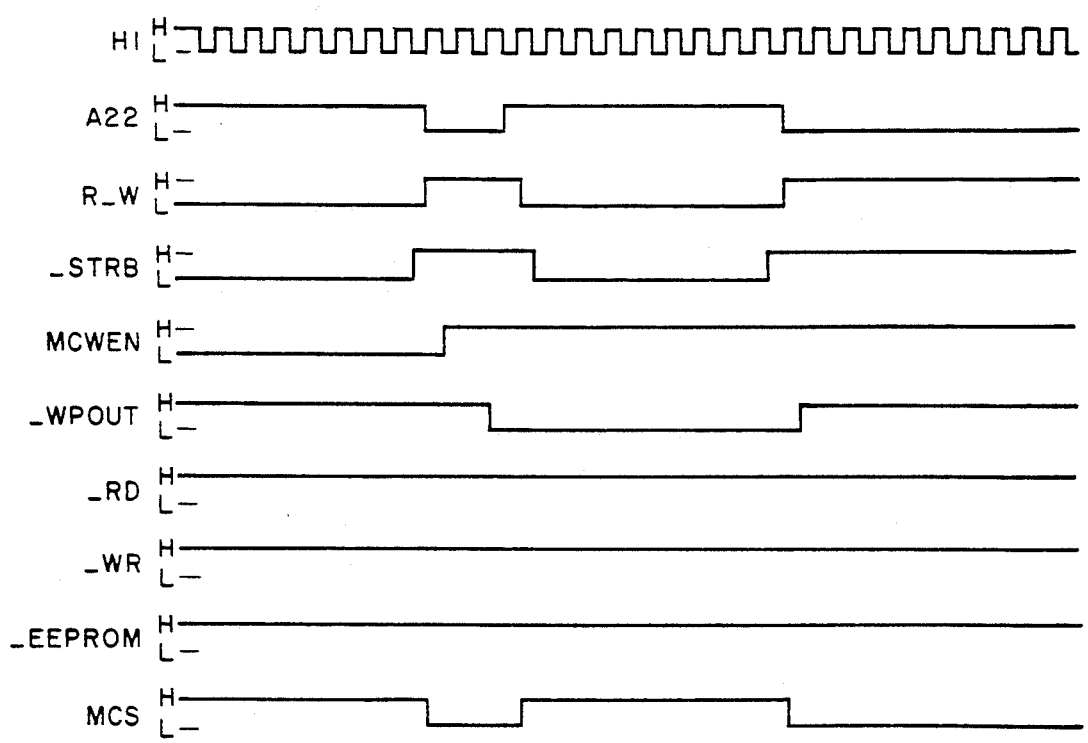
Figure 18G:
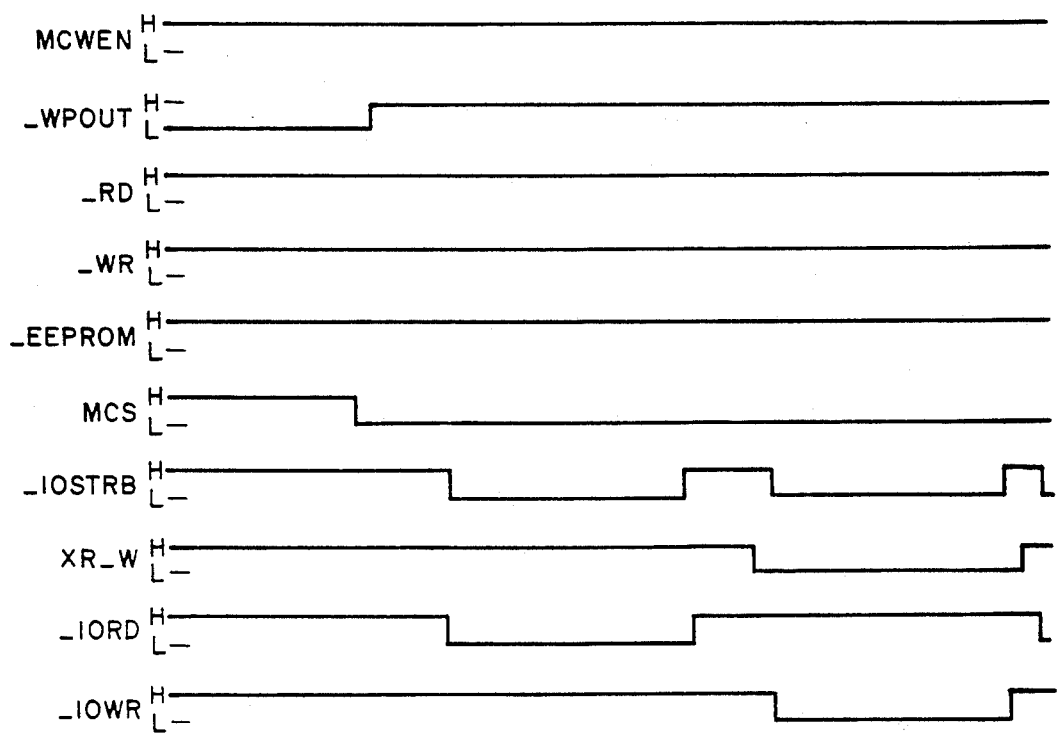

Referring to FIG. 19(A)-19(I), there is shown the timing diagrams for the read, write, protect and enable control signals for certain components of rapid reprogramming terminal 20. Specifically, FIG. 18(A) illustrates the timing of the read signal for EEPROM 23, while FIG. 18(C) illustrates the timing of the write signal for EEPROM 23. Likewise, FIG. 18(B) illustrates the timing of the read signal for IC memory card 22, while FIG. 18(D) illustrates the timing of the write signal for IC memory card 22. FIG. 18(E) illustrates the timing of the memory card select signal for IC memory card 22. FIG. 18(F) illustrates the timing of the write protect signal for IC memory card 22. FIG. 18(G) illustrates the read and write timing signals for programmable peripheral interfaces 52, 54 and 56 and universal asynchronous receiver transceiver (UART) circuits 37 and 38 of rapid reprogramming terminal 20.

Referring to FIG. 19(A)–19(I) there is shown a flow chart for the software used by rapid reprogramming terminal 20 to reprogram bus controllers 55 and remote terminals 53 connected to the 1553 multiplex data bus 42.

Figure 19H:
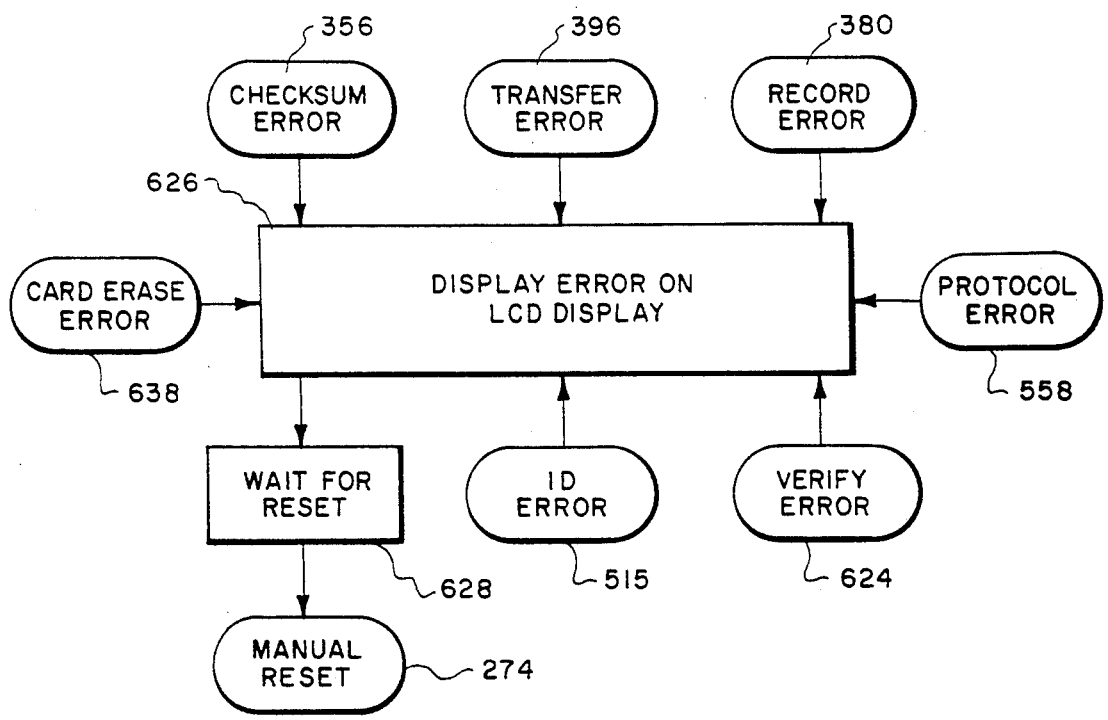
FIG. 19(A)-19(G) is a flow chart for the rapid reprogramming terminal software.
Figure 19B:
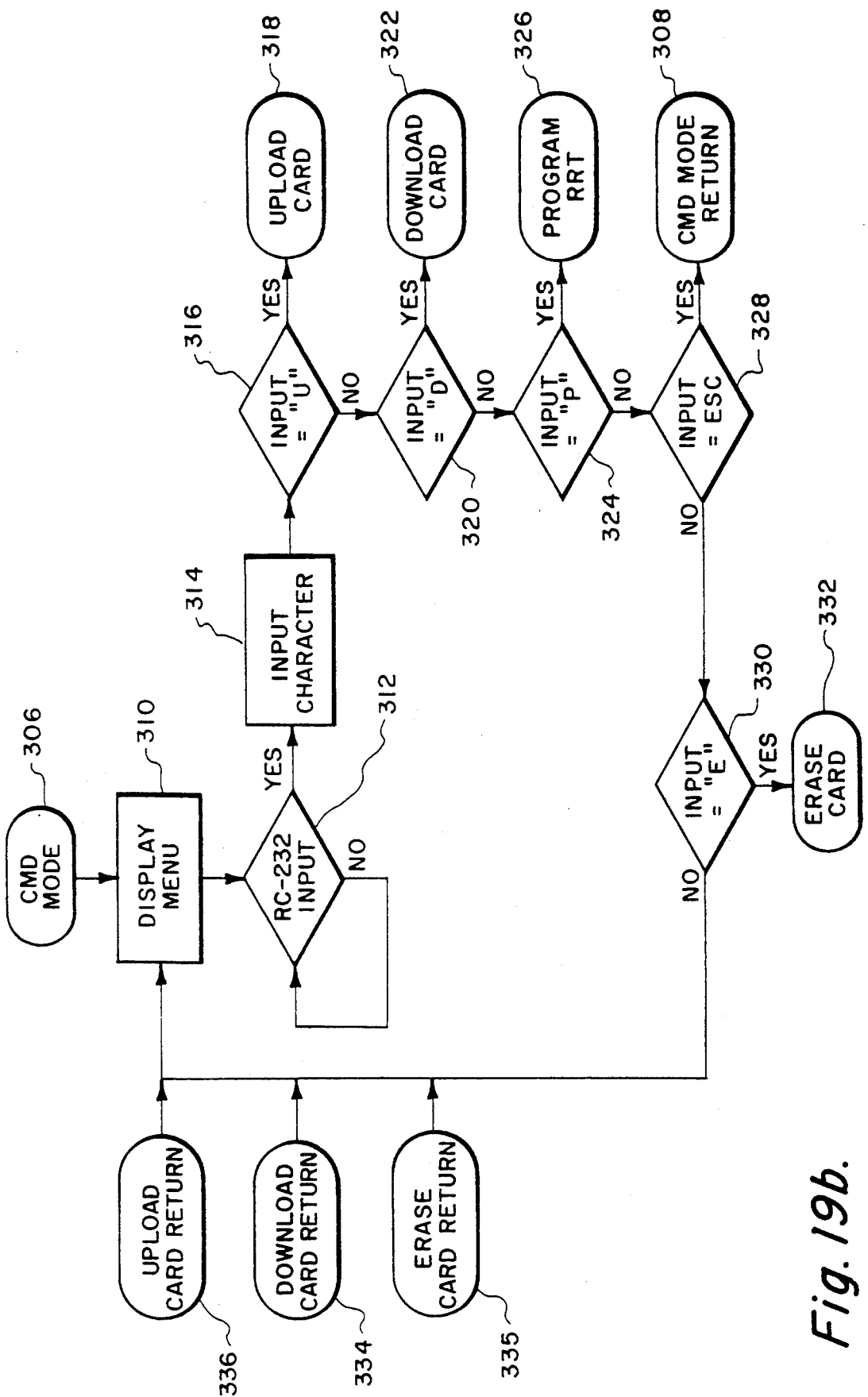

Referring to FIG. 19(A) and 19(B) power to rapid reprogramming terminal 20 is turned on by activating switch 163 (program step 272), rapid reprogramming terminal 20 including digital signal processor 21 is initialized during program step 272 and 278. A built in test is performed by rapid reprogramming terminal 20 during program step 280. An operator then enters "+++" via keyboard 62 to enter the command mode (program steps 282–306). The command menu is displayed on display screen 69 (program step 310). From the command mode menu, the operator has the option to upload the IC memory card 22 by typing the letter "U" on keyboard 62 (program steps 316–318) or download the IC memory card 22 by typing the letter "D" on keyboard 62 (program steps 320–322). From the command menu, the operator may also reprogram rapid reprogramming terminal by typing the letter "P" on keyboard (program steps 324–326) or erase IC memory card 22 by typing the letter "E" on keyboard 62 (program steps 330–332). The operator may also escape the command mode by striking the escape key on keyboard 62 (program step 308).

Figure 19C:
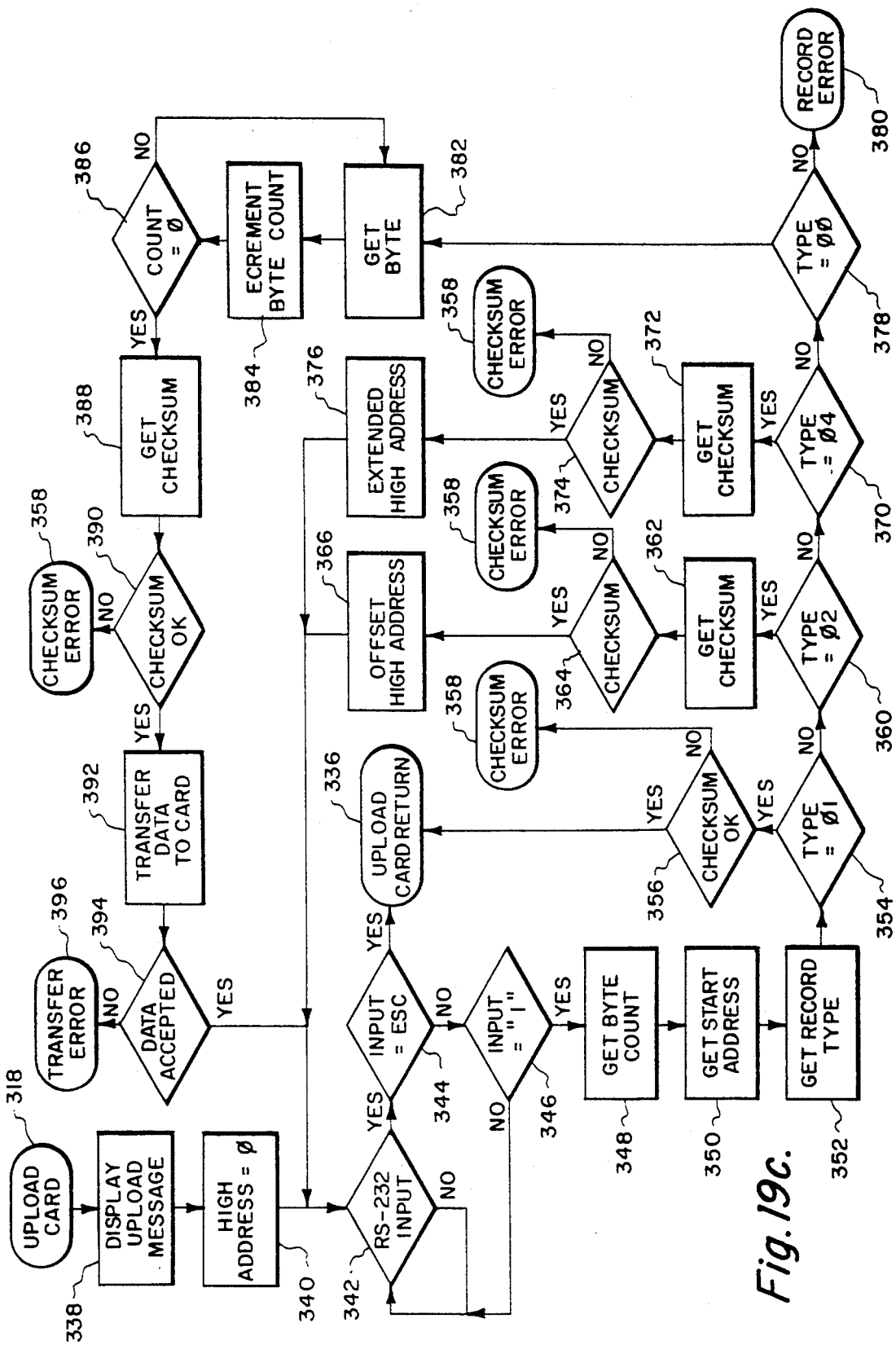

Referring to FIG. 19(B) and 19(C), the operator enters the upload card module of RRT software by typing the letter "U" on keyboard 62 (program steps 316–318). A message is displayed on liquid crystal display 57 and screen 69 which indicates to the operator that data from computer 66 is to be loaded into IC memory card 22 via the RS-232 communications bus 71. Program step 340 of the upload card routine initializes the address to zero which is the starting address in IC memory card 22 where data is to be stored (program step 340). The RRT software then looks for an input from computer 66 via the RS-232 communications bus 71 (program step 242). It should be noted that the format of the information transferred from computer 66 to IC memory card 22 is in the Intel 32 bit Hexadecimal Object File Record Format of FIG. 5.

Digital signal processor 21 next looks for a ":" (colon) which indicates information is to be transferred from computer 66 to IC memory card 22 via the RS-232 communications bus 71 (program steps 346). If digital signal processor 21 does not detect a colon the operator may strike the escape key to return to the command mode (program steps 344 and 336).

If digital signal processor 21 detects a colon then digital signal processor looks for the byte count, that is the total byte count of the data in the record (program step 348); start address, that is the starting address at which the data from computer 66 is to be stored in IC memory card 22 (program step 350) and record type (program step 352). In the preferred embodiment of the present invention, the upload card routine includes four of the six record types of the format of FIG. 5: data record (type 00); end of file record (type 01); offset high address/extended segment address record (type 02) and extended high address/extended linear address record (type 04).

Once digital signal processor 21 determines the type of record, digital signal processor 21 processes the record. For example, if digital signal processor 21 determines that the record type is type 04 (program step 356) then digital signal processor 21 processes the data to determine the extended high address (program step 376) which is utilized when the memory address count exceeds 64K, that is one page of memory which can store 64K eight bit bytes. It should be noted that while the format of FIG. 5 provides for 65,000 pages of memory storage capability, IC memory card 22 is limited to eight megabytes of memory storage capability. It should further be noted that the preferred embodiment of the present invention utilizes only the type 04 record to extend the address beyond 64K address locations in memory.

When the checksum is not verified as being valid (program step 356), the RRT software checksum error (program step 358) is utilized to enter the error routine of FIG. 9(H) being utilized by rapid reprogramming terminal 20.

Program steps 378–394 of the upload card routine transfer the data from computer 66 to IC memory card 22 with temporary storage in RAM of digital signal processor 21. Once the checksum is verified as being valid (program step 390) data is transferred from RAM in digital signal processor 21 to IC memory card 22 (program step 392) and accepted by IC memory card 22 (program step 394). When transfer of data is complete, the RRT software proceeds to program step 354 which is the end of the file record and then exits the upload card routine (program step 336) to the command mode.

Figure 19D:
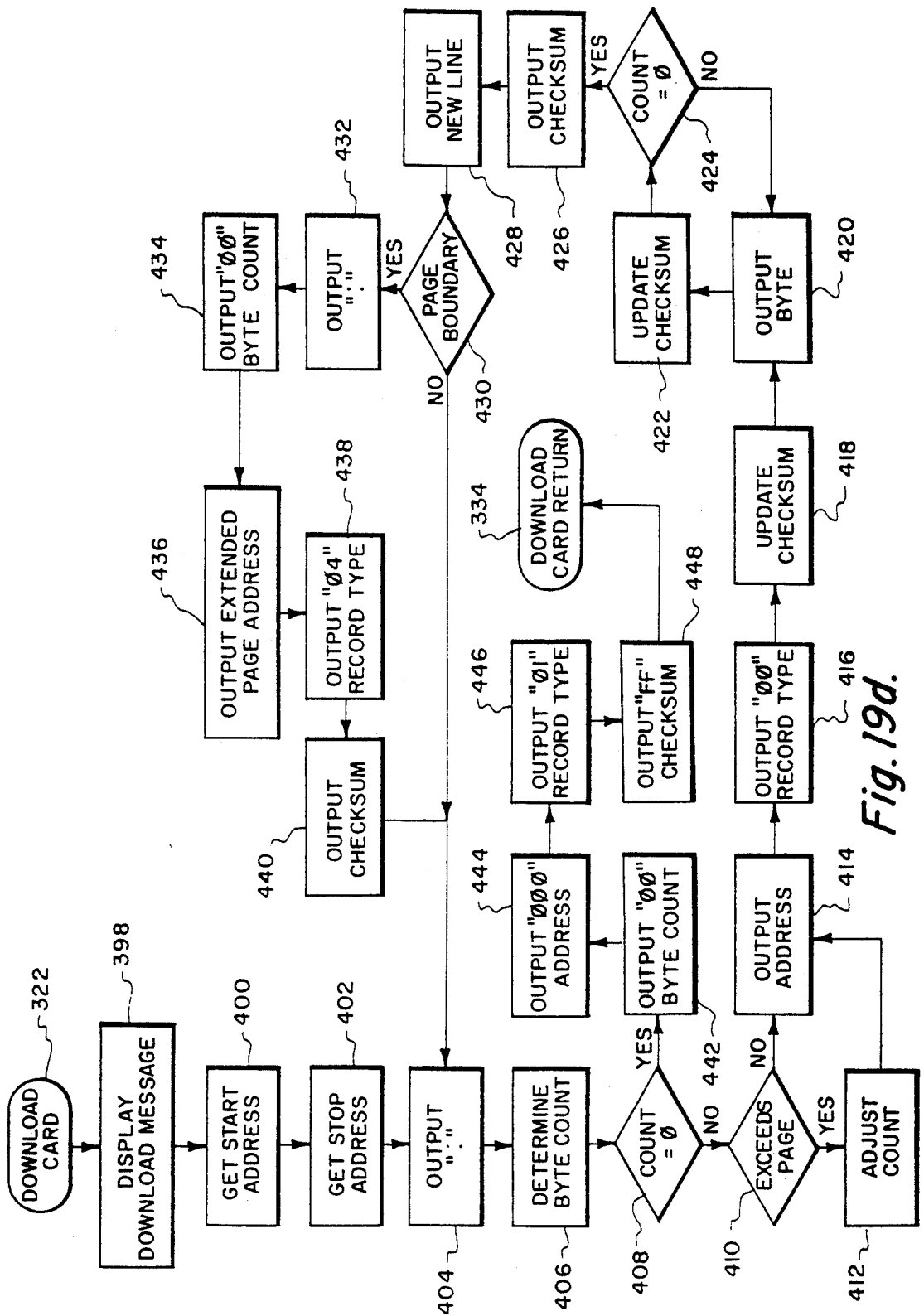

The download card routine of FIG. 19(D) is similar to the upload card routine of FIG. 19(C) and therefore will not be discussed in detail. During the download card routine data is down loaded from IC memory card 22 into computer 66 with digital signal processor 21 formatting the data in the Intel 32 bit Hexadecimal Object File Record Format of FIG. 5. When the operator enters the download routine by typing the letter "D" on the keyboard 62, a message is displayed on the screen 69 and the liquid crystal display 57. This message request that the operator provide via keyboard 62 the start address and the stop address or last address of the data to be down loaded from IC memory card 22. Rapid reprogramming terminal then downloads the data stored between the start and stop addresses via the RS-232 communications bus into computer 66 (program steps 400–448).

Figure 19E:
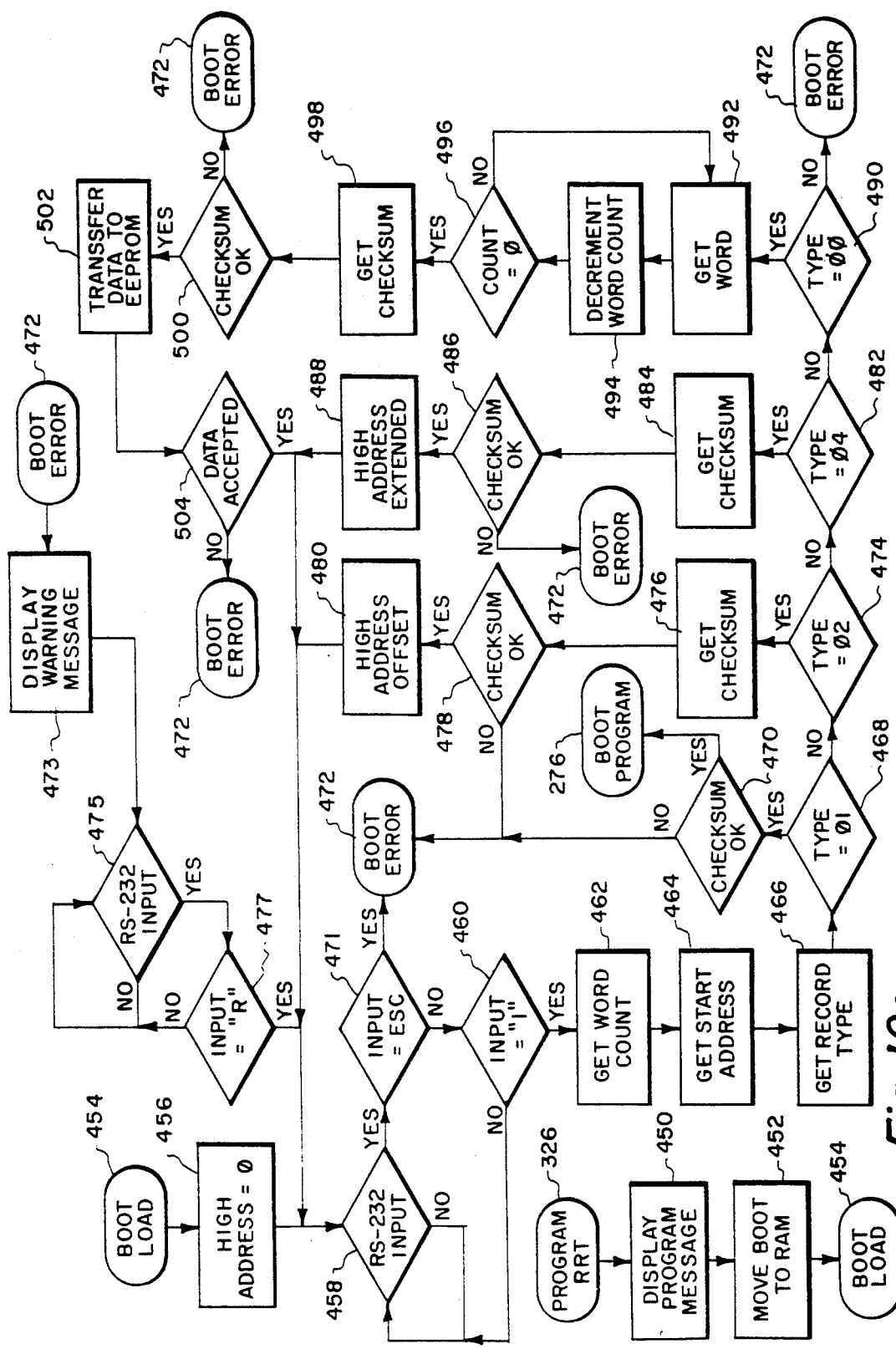

Referring to FIG. 19(E) the program RRT routine (program step 326) is entered when the operator types the letter "R" on keyboard 62. A message is displayed on screen 69 and liquid crystal display 57 indicating that the RRT software is the program RRT routine (program step 450). The BOOT.C module is next moved from EEPROM 23 into RAM of digital signal processor 21 for execution to allow for the loading of data into EEPROM 23. The boot load routine is entered (program step 454) which allows rapid reprogramming terminal to be reprogrammed from computer 66 via the RS-232 communications bus 71. When rapid reprogramming terminal 20 is being reprogrammed, the transfer of data from computer 66 to EEPROM 23 is similar to the transfer of data from computer 66 to IC memory card 22 during the upload card routine of FIG. 19(C). During the boat load routine data from computer 66 is temporarily stored in RAM of digital signal processor 21 and then permanently stored in EEPROM 23 in four byte words at each address in EEPROM 23. This is different from the transfer of data during the upload card routine during which data is stored in IC memory card 22 in eight bit bytes at each address in IC memory card 22. The boot load routine includes four of the six record types of the format of FIG. 5: data record (type 00); end of file record (type 01); offset high address/extended segment address record (type 02) and extended high address/extended linear address record (type 04) for the transfer of data from computer 66 to EEPROM 23.

During the boot error routine (program step 472) a message is provided to the operator via screen 69 (program step 473) indicating that an error has occurred in reprogramming rapid reprogramming terminal 20. Digital signal processor 21 then looks for the letter "R" entered by the operator using keyboard 62. If the digital signal processor 21 detects an "R" (program step 477) then boot load routine is repeated.

At this time it should be noted that the only modules transferred to RAM of digital signal processor 21 for execution are the BOOT.C module and the MS1553.C module. Digital signal processor 21 can, in turn, execute programs faster out of RAM than out of EEPROM 23.

Figure 19F:
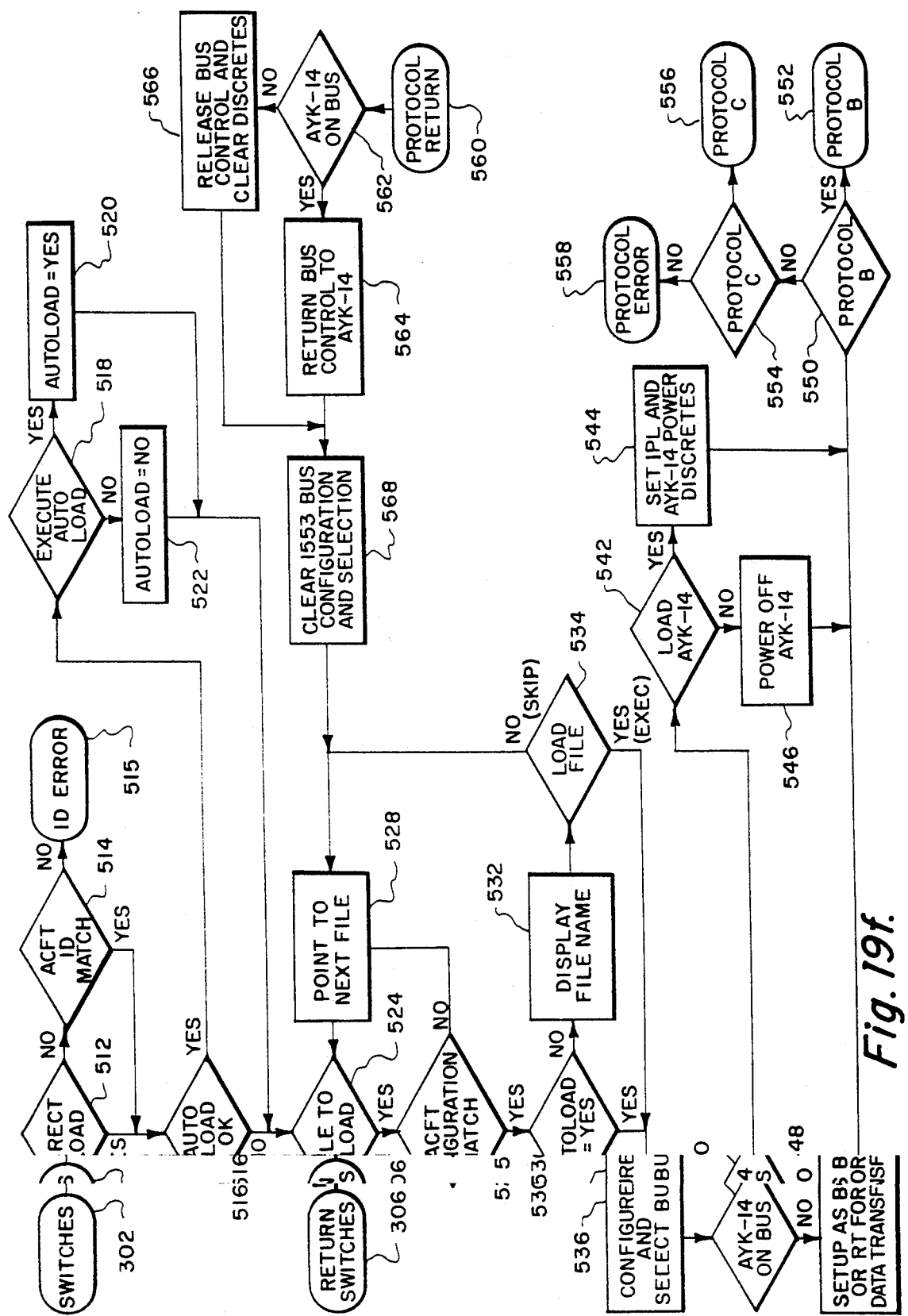

Referring to FIG. 19(F) the switches module (program step 302) is the module which allows for the execution of PROTOCOL B (program step 552) or PROTOCOL C (program step 556). Program step 512 is a test to determine whether a direct load is to be performed. For example, the AN/ALQ-165 radar jammer is an electronic warfare bus controller which may be reprogrammed either in the aircraft or when removed from the aircraft which is a direct load. If it is determined that the data load is to occur via the 1553 multiplex data bus 42 the aircraft identification is checked in program step 514. Program step 516 determines whether the data load is to be an auto load. A data bit in the card header for the remote terminal 53 or bus controller 55 being reprogrammed indicates whether or not an auto load is permitted (program step 518). If an auto load is permitted (program step 520) a message is provided to the operator via video screen 69 that an auto load is permitted. The operator may press the switch 49 to the execute position for auto load or the skip position for a manual load (program steps 520 and 522). Program step 524 test the most significant bit in the data file to be loaded from IC memory card 22 and if there is a file to load then the RRT software proceeds to program step 526 to determine whether there is a match between the aircraft configuration and the hardware configuration for the file to be loaded from IC memory card 22.

If an auto load is not permitted, the file name for the remote terminal 53 or the bus controller 55 to be reprogrammed is displayed (program step 532) on the liquid crystal display 57. The operator may then press switch 49 to the execute position or the skip position (program step 534). If the operator presses switch 49 to the skip position the RRT software proceeds to program step 528 which points to the next file in IC memory card 22.

If the operator presses switch 49 to the execute position the RRT software proceeds to program step 536 during which rapid reprogramming terminal 20 selects and configures the 1553 multiplex data bus 42 for reprogramming of a remote terminal 53 or bus controller 55 in accordance with the data contained in the lookup table for the remote terminal 53 or bus controller 55 to be reprogrammed. If a remote terminal 53 on the avionics 1553 bus, the RRT software proceeds through program steps 540 and 542 to program step 546 during which power to the AN/AYK-14 computer/bus controller 55 is turned off to allow for reprogramming of the remote terminal 53. The RRT proceeds to Protocol B (program step 552).

If an AN/AYK-14 computer is to be reprogrammed the appropriate power discretes are set (the Initiate Program Load (IPL), and Power Off/On (PWR_OFF-/ON) discretes, which are used to control an AN-/AYK-14 for reprogramming). For example if the AN-/AYK-14 on avionics bus number one is to be reprogrammed PWR_OFF/ON_1 and the IPL_1 discretes, FIG. 17, are set at a logic one. The PWR_OFF/ON_1 discrete is next set to logic zero to allow reprogramming of the AN/AYK-14 on bus number one (program step 544). Program step 548 provides for the conversion of rapid reprogramming terminal 20 to a bus controller for the purpose of reprogramming a remote terminal 53 or for the conversion of rapid reprogramming terminal 20 to a remote terminal for the purpose of reprogramming a bus controller 55 when an AN/AYK-14 is not on the bus.

Figure 19G:
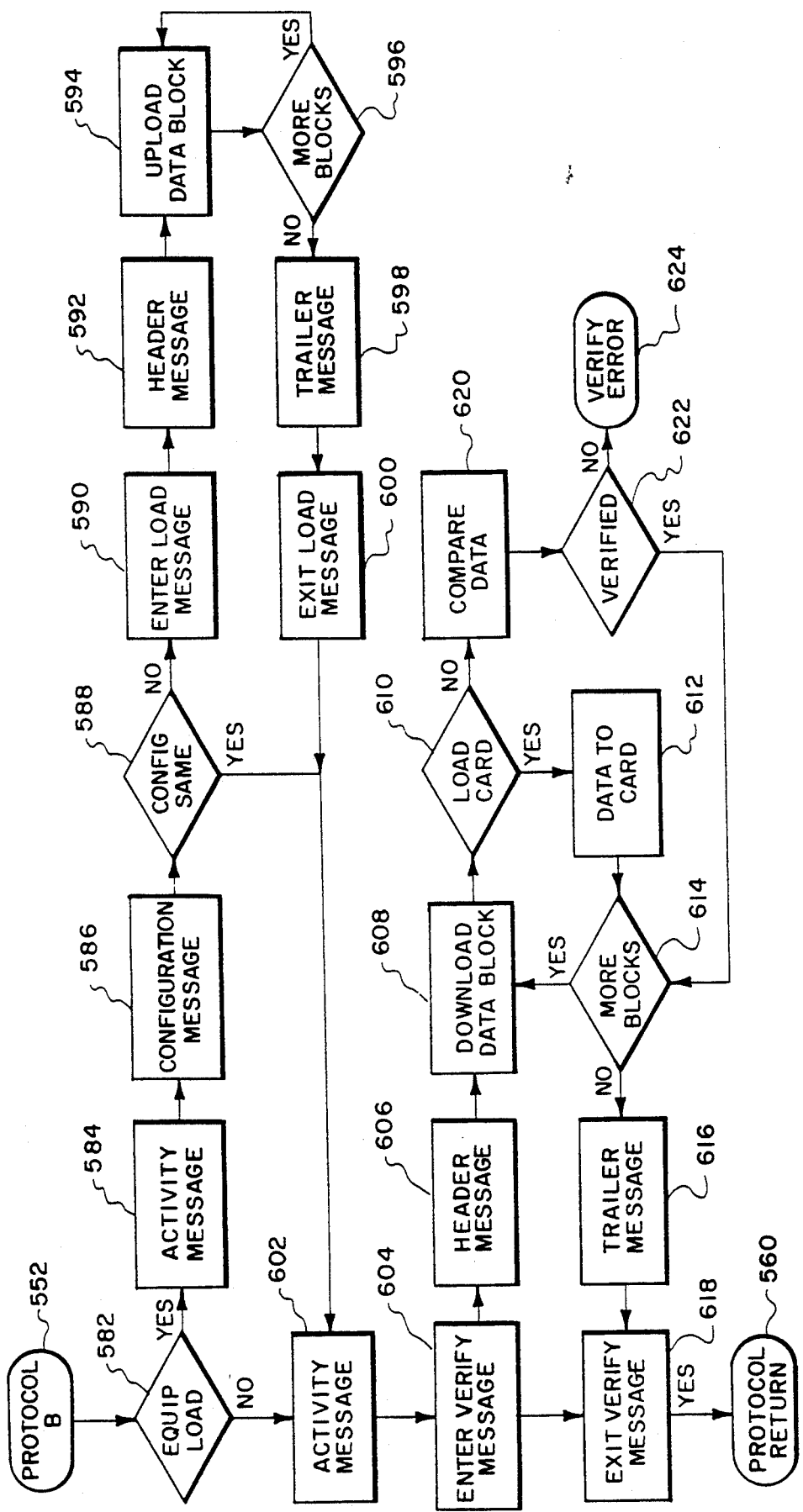

Referring to FIGS. 9 and 19(G) program step 552 is the PROTOB.C module of the RRT software which is used when a remote terminal 53 or a bus controller 55 which reverts to a remote terminal is being reprogrammed. Program step 582 determines whether rapid reprogramming terminal 20 will perform a data upload to remote terminal 53. If it is determined that an upload is to be performed rapid reprogramming terminal 20 will use the messages of FIG. 9 (program steps 584–600) to upload the data from IC memory card 22 into the remote terminal 53 being reprogrammed. When the load is complete, rapid reprogramming terminal 20 provides an activity message (program step 604), FIG. 9(A) to enter the verify procedure. The load procedure includes a program step 588 which determines whether the data in the remote terminal 53 is the same as the data in IC memory 22. If the data is identical a load procedure is not performed by rapid reprogramming terminal 20.

During the verify procedure each data block in the remote terminal 53 is down loaded into RAM in digital signal processor 21 using the message format of FIG. 9 (program steps 604–608). The data in RAM of processor 21 is compared (program step 620) and verified (program step 622) with the data in IC memory card 22. When the data in remote terminal 53 is verified RRT software proceeds through program steps 616 and 618 exiting the verify procedure. If the data is different a verify error message is provided for display by liquid crystal display 57 (program step 624). It should be noted that the verify procedure provides for a load card routine (program step 612) which allows data to be transferred from RAM in digital signal processor 21 to IC memory card 22.

When rapid reprogramming terminal 20 completes reprogramming of the remote terminal 53 the RRT software proceeds through a protocol return (program step 560) to program step 562 which determines whether there is an AN/AYK-14 on the bus 42 (program step 562). If there is an AN/AYK-14 on the bus 42 then control of the bus 42 is returned to the AN/AYK-14 by rapid reprogramming terminal 20. If the bus 42 is for example the electronic warfare bus then bus control is released by rapid reprogramming terminal 20 and the discretes associated with reprogramming a remote terminal 53 or a bus controller 55 on the bus 42 are cleared (program step 566). Program step 568 clears the 1553 multiplex data bus 42 which was configured for reprogramming of a remote terminal 53 or bus controller 55 by RRT software during program step 536. The RRT software then proceeds to the next file in IC memory card 22.

Referring now to FIG. 19(H), there is shown the flow chart for the checksum error, card erase error, record error, transfer error, protocol error, verify error and ID error. Each error is displayed on liquid crystal display 57 (program step 626). After a programmed wait time period (program step 628) the operator may again initialize digital signal processor 21 by pressing reset switch 45 (program steps 274 and 276).

Referring to FIG. 19(I), there is shown the erase card routine (program step 630) of the RRT software. During program step 632 rapid reprogramming terminal 20 writes 00 hexadecimal into the memory of IC memory card 22 (program step 632). Rapid reprogramming terminal 20 then reads all memory in IC memory card 22 (program step 636). If the memory in IC memory card 22 is not all 00 hexadecimal then an erase card error is declared (program step 638). If IC memory card 22 is completely erased a message will be provided via liquid crystal display 57 (program step 640).

In the best mode presently contemplated for the present invention, the program listings for the software modules of Table I are attached hereto and set forth as Appendix A. The Appendix A program listings are written in the C program language, a common, very popular and often used programming language.

From the foregoing description, it may readily be seen that the subject invention comprises a new, unique and exceedingly useful terminal for reprogramming the avionics and electronic warfare systems aboard an aircraft which constitutes a considerable improvement over the known prior art. Obviously many modifications and variations of the present invention are possible in light of the above teachings. It is, therefore, to be understood that within the scope of the appended claims, that the invention may be practiced otherwise than as specifically described.

```
/*************************************************/
/****       Specify the input files         ****/
/*************************************************/ boot.obj                    /* "C" source, RRT reproram function */ dspinit.obj                 /* Assembly source, DSP initialization */
sysinit.obj                 /* Assembly source, System initialization */
serialio.obj                /* "C" source, serial I/O functions */
display.obj                 /* "C" source, Display function */
program.obj                 /* "C" source, RRT load boot function */
rrt_bit.obj                 /* "C" source, RRT BIT function */ rrt_main.obj                /* "C" source, RRT Main program */
timer.obj                   /* "C" source, timer functions */
ms1553.obj                  /* "C" source, MS-1553 drivers */
cmdmode.obj                 /* "C" source, command mode processor */
upload.obj                  /* "C" source, upload memory card function */
download.obj                /* "C" source, download memory card function */
erase.obj                   /* "C" source, erase memory card function */
switches.obj                /* "C" source, switch processing function */
control.obj                 /* "C" source, controller control functions */
interpts.obj                /* Assembly source, Interrupt routines */
error.obj                   /* "C" source, error handler function */
protocol.obj                /* "C" source, unwritten protocols */
protob.obj                  /* "C" source, protocol B */
protoc.obj                  /* "C" source, protocol C */
messages.obj                /* "C" source, standard MS-1553 messages */

/*************************************************/
/****       Specify Linker Options          ****/
/*************************************************/

-o      rrt.out             /* Name of the output file */
-m      rrt.map             /* Create a load map */
-c                          /* Use ROM model */
-e      RRTINIT             /* Define the entry point */

/*************************************************/
/****   Specify the Memory Configuration    ****/
/*************************************************/

/*
        8Megs of continous IC Memory Card are addressable as
        2 4Meg sections (MEMORY_CARD_0 and MEMORY_CARD_1).
```

```
                        This was achieved by swaping A22 and A23.  The result
                        was the following mapping:

0400000h - 07FFFFFh ==> 0000000h - 03FFFFFh
                                0C00000h - 0FFFFFFh ==> 0400000h - 07FFFFFh
*/

MEMORY
{
        DMA_REGS:         origin = 0808000h        length = 10h
        TIMER0_REGS:      origin = 0808020h        length = 10h
        TIMER1_REGS:      origin = 0808030h        length = 10h
        SERIAL0_REGS:     origin = 0808040h        length = 10h
        SERIAL1_REGS:     origin = 0808050h        length = 10h BOOT_RAM:         origin = 0809800h        length = 580h
        BOOT_BUFFER:      origin = 0809D80h        length = 100h
        RAM_BSS:          origin = 0809E80h        length = 80h
        RAM_STACK:        origin = 0809F00h        length = 100h VECTORS:          origin = 0000000h        length = 000040h BOOT_ROM:         origin = 00000C0h        length = 000580h
        BOOT_SUPPORT:     origin = 0000640h        length = 000600h
        ROM:              origin = 0000C40h        length = 00F3C0h MEMORY_CARD_0:    origin = 0400000h        length = 400000h
        MEMORY_CARD_1:    origin = 0C00000h        length = 400000h RS232_REGS:       origin = 0804FFCh        length = 4h
        PPI1_REGS:        origin = 08057FCh        length = 4h
        PPI2_REGS:        origin = 0805BFCh        length = 4h
        PPI3_REGS:        origin = 0805DFCh        length = 4h
        RS422_REGS:       origin = 0805EFCh        length = 4h
        GPIB_REGS:        origin = 0805F70h        length = 10h
}

/************************************************/
        /****    Specify the Output Sections         ****/
        /************************************************/

SECTIONS
{
        int_vecs: {}       >VECTORS         /* Link all interrupts into VECTORS */ boot_rom: {}       >BOOT_ROM        /* Link all boot code into BOOT_ROM */ pgm_entry: {}      >BOOT_SUPPORT    /* Link all into BOOT_SUPPORT */

.text: {}          >ROM             /* Link all .text sections into ROM */

.data: {}          >ROM             /* Link all .data sections into ROM */

.cinit: {}         >ROM             /* Link all .cinit sections into ROM */ dma_regs: {}       >DMA_REGS        /* Link all dma_regs into DMAREGS */ t0_regs: {}        >TIMER0_REGS     /* Link all t0_regs into T0REGS */ t1_regs: {}        >TIMER1_REGS     /* Link all t1_regs into T1REGS */ s0_regs: {}        >SERIAL0_REGS    /* Link all s0_regs into S0REGS */ s1_regs: {}        >SERIAL1_REGS    /* Link all s1_regs into S1REGS */ boot_ram: {}       >BOOT_RAM        /* Link all into BOOT_RAM */ boot_buffer: {}    >BOOT_BUFFER     /* Link all into BOOT_BUFFER */

.bss: {}           >RAM_BSS         /* Link all remaining .bss sections */

.stack: {}         >RAM_STACK       /* Link from here on to DSP stack */ memcard0: {}       >MEMORY_CARD_0   /* Link into MEMORY_CARD_0(4Meg RAM) */
```

```
            memcard1: {}     >MEMORY_CARD_1   /* Link into MEMORY_CARD_1(4Meg RAM) */ uart1regs: {}    >RS232_REGS      /* Link all into RS-232 Registers */ ppi1regs: {}     >PPI1_REGS       /* Link all into PPI1 Registers */ ppi2regs: {}     >PPI2_REGS       /* Link all into PPI2 Registers */ ppi3regs: {}     >PPI3_REGS       /* Link all into PPI3 Registers */ uart2regs: {}    >RS422_REGS      /* Link all into RS-422 Registers */ gpibregs: {}     >GPIB_REGS       /* Link all into GPIB (IEEE-488) */
}

/***********************************************/
            /****           End of Command File         ****/
            /***********************************************/

*******************************************************
TMS320C30 Linker              Version 4.10
*******************************************************
Sun Nov 24 16:15:04 1991

OUTPUT FILE NAME:    <rrt.out>
ENTRY POINT SYMBOL: "_c_int00"  address: 00000640

MEMORY CONFIGURATION name        origin       length       attributes    fill
           --------    --------     --------     ----------    --------
           VECTORS     00000000     000000040    RWIX
           BOOT_ROM    000000c0     000000580    RWIX
           BOOT_SUP    00000640     000000600    RWIX
           ROM         00000c40     00000f3c0    RWIX
           MEMORY_C    00400000     000400000    RWIX
           RS232_RE    00804ffc     000000004    RWIX
           PPI1_REG    008057fc     000000004    RWIX
           PPI2_REG    00805bfc     000000004    RWIX
           PPI3_REG    00805dfc     000000004    RWIX
           RS422_RE    00805efc     000000004    RWIX
           GPIB_REG    00805f70     000000010    RWIX
           DMA_REGS    00808000     000000010    RWIX
           TIMER0_R    00808020     000000010    RWIX
           TIMER1_R    00808030     000000010    RWIX
           SERIAL0_    00808040     000000010    RWIX
           SERIAL1_    00808050     000000010    RWIX
           BOOT_RAM    00809800     000000580    RWIX
           BOOT_BUF    00809d80     000000100    RWIX
           RAM_BSS     00809e80     000000080    RWIX
           RAM_STAC    00809f00     000000100    RWIX
           MEMORY_C    00c00000     000400000    RWIX

SECTION ALLOCATION MAP output                                  attributes/
section     page   origin     length    input sections
--------    ----   --------   --------  -----------------
int_vecs    0      00000000   00000040
                   00000000   00000040  dspinit.obj (int_vecs)

boot_rom    0      000000c0   00000508
                   000000c0   00000508  boot.obj (boot_rom)

pgm_entr    0      00000640   00000543
                   00000640   00000050  dspinit.obj (pgm_entr)
                   00000690   00000040  sysinit.obj (pgm_entr)
                   000006d0   00000135  serialio.obj (pgm_entr)
                   00000805   00000141  display.obj (pgm_entr)
                   00000946   00000060  program.obj (pgm_entr)
                   000009a6   000001dd  rrt_bit.obj (pgm_entr)
```

| | | | | |
|---|---|---|---|---|
| .text | 0 | 00000c40 | 00002cca | |
| | | 00000c40 | 000000d3 | rrt_main.obj (.text) |
| | | 00000d13 | 00000024 | timer.obj (.text) |
| | | 00000d37 | 00000260 | ms1553.obj (.text) |
| | | 00000f97 | 0000015a | cmdmode.obj (.text) |
| | | 000010f1 | 00000271 | upload.obj (.text) |
| | | 00001362 | 00000254 | download.obj (.text) |
| | | 000015b6 | 0000027f | erase.obj (.text) |
| | | 00001835 | 000002a1 | switches.obj (.text) |
| | | 00001ad6 | 0000010d | control.obj (.text) |
| | | 00001be3 | 0000000e | interpts.obj (.text) |
| | | 00001bf1 | 0000079e | error.obj (.text) |
| | | 0000238f | 00000126 | protocol.obj (.text) |
| | | 000024b5 | 000007d6 | protob.obj (.text) |
| | | 00002c8b | 0000057c | protoc.obj (.text) |
| | | 00003207 | 00000703 | messages.obj (.text) |
| .data | 0 | 0000390a | 00000012 | |
| | | 0000390a | 00000012 | dspinit.obj (.data) |
| .cinit | 0 | 0000391c | 00000001 | |
| | | 0000391c | 00000001 | --HOLE-- [fill = 00000000] |
| memcard0 | 0 | 00400000 | 00400000 | UNINITIALIZED |
| | | 00400000 | 00400000 | sysinit.obj (memcard0) |
| uart1reg | 0 | 00804ffc | 00000004 | UNINITIALIZED |
| | | 00804ffc | 00000004 | sysinit.obj (uart1reg) |
| ppi1regs | 0 | 008057fc | 00000004 | UNINITIALIZED |
| | | 008057fc | 00000004 | sysinit.obj (ppi1regs) |
| ppi2regs | 0 | 00805bfc | 00000004 | UNINITIALIZED |
| | | 00805bfc | 00000004 | sysinit.obj (ppi2regs) |
| ppi3regs | 0 | 00805dfc | 00000004 | UNINITIALIZED |
| | | 00805dfc | 00000004 | sysinit.obj (ppi3regs) |
| uart2reg | 0 | 00805efc | 00000004 | UNINITIALIZED |
| | | 00805efc | 00000004 | sysinit.obj (uart2reg) |
| gpibregs | 0 | 00805f70 | 00000008 | UNINITIALIZED |
| | | 00805f70 | 00000008 | sysinit.obj (gpibregs) |
| dma_regs | 0 | 00808000 | 00000009 | UNINITIALIZED |
| | | 00808000 | 00000009 | dspinit.obj (dma_regs) |
| t0_regs | 0 | 00808020 | 00000009 | UNINITIALIZED |
| | | 00808020 | 00000009 | dspinit.obj (t0_regs) |
| t1_regs | 0 | 00808030 | 00000009 | UNINITIALIZED |
| | | 00808030 | 00000009 | dspinit.obj (t1_regs) |
| s0_regs | 0 | 00808040 | 0000000d | UNINITIALIZED |
| | | 00808040 | 0000000d | dspinit.obj (s0_regs) |
| s1_regs | 0 | 00808050 | 0000000d | UNINITIALIZED |
| | | 00808050 | 0000000d | dspinit.obj (s1_regs) |
| .bss | 0 | 00809e80 | 00000001 | UNINITIALIZED |
| | | 00809e80 | 00000001 | boot.obj (.bss) |
| memcard1 | 0 | 00c00000 | 00400000 | UNINITIALIZED |
| | | 00c00000 | 00400000 | sysinit.obj (memcard1) |
| boot_ram | 0 | 00809800 | 00000000 | UNINITIALIZED |
| boot_buf | 0 | 00809d80 | 00000000 | UNINITIALIZED |
| .stack | 0 | 00809f00 | 00000000 | UNINITIALIZED |

GLOBAL SYMBOLS

| address | name |
|---------|------|
| 00809e80 | .bss |
| 0000390a | .data |
| 00000c40 | .text |
| 0000000b | DINT |
| 00001be3 | DMA |
| 00000001 | INT0 |
| 00000002 | INT1 |
| 00000003 | INT2 |
| 00000004 | INT3 |
| 00001be4 | ISR0 |
| 00001be5 | ISR1 |
| 00001be6 | ISR2 |
| 00001be7 | ISR3 |
| 00001beb | RCV0 |
| 00001bed | RCV1 |
| 00000006 | RINT0 |
| 00000008 | RINT1 |
| 00808052 | SER1XCR |
| 00000690 | SYSINIT |
| 00001be8 | TIME0 |
| 00001be9 | TIME1 |
| 00000009 | TINT0 |
| 0000000a | TINT1 |
| 00000020 | TRAP0 |
| 00000021 | TRAP1 |
| 00000022 | TRAP2 |
| 00001bee | TRP0 |
| 00001bef | TRP1 |
| 00001bf0 | TRP2 |
| 00000005 | XINT0 |
| 00000007 | XINT1 |
| 00001bea | XMT0 |
| 00001bec | XMT1 |
| 000000c0 | _BOOT_LOCATION |
| 00809800 | _BOOT_RUN |
| 00809d80 | _BOOT_STORE |
| 00808000 | _DMAREGS |
| 00805f70 | _GPIBREGS |
| 00809aec | _LCD_boot_display |
| 000008a2 | _LCD_display |
| 00000805 | _LCD_initialize |
| 00400000 | _MEMCARD0 |
| 00c00000 | _MEMCARD1 |
| 008057fc | _PPI1 |
| 00805bfc | _PPI2 |
| 00805dfc | _PPI3 |
| 00000c40 | _REPROGRAM |
| 00000000 | _RESET |
| 00804ffc | _RS232 |
| 00805efc | _RS422 |
| 00808040 | _SERIAL0 |
| 00808050 | _SERIAL1 |
| 00808020 | _TIMER0 |
| 00808030 | _TIMER1 |
| 00003207 | _activity_busy |
| 00003241 | _activity_message |
| 000038e2 | _ascii_conversion |
| 00809e80 | _boot_error |
| 00809800 | _boot_main |
| 00809835 | _boot |
| 00001ad6 | _bus_polling |
| 00000640 | _c_int00 |
| 000034f5 | _command_message |
| 00000f97 | _command_mode |
| 00001af6 | _convert_to_BC |
| 00000d13 | _delay_timer |
| 00001362 | _download |
| 00000640 | _dspinit |
| 00001b76 | _enable_BC |
| 008099f9 | _enable_eeprom_write |
| 0000329e | _enter_load_message |

| address | name |
|---------|------|
| 00000000 | _RESET |
| 00000001 | INT0 |
| 00000002 | INT1 |
| 00000003 | INT2 |
| 00000004 | INT3 |
| 00000005 | XINT0 |
| 00000006 | RINT0 |
| 00000007 | XINT1 |
| 00000008 | RINT1 |
| 00000009 | TINT0 |
| 0000000a | TINT1 |
| 0000000b | DINT |
| 00000020 | TRAP0 |
| 00000021 | TRAP1 |
| 00000022 | TRAP2 |
| 000000c0 | _BOOT_LOCATION |
| 00000640 | _c_int00 |
| 00000640 | _dspinit |
| 00000690 | SYSINIT |
| 000006d0 | _serial_get_byte |
| 000006e6 | _serial_get_nyble |
| 00000709 | _serial_put_byte |
| 0000071f | _serial_put_nyble |
| 00000736 | _serial_receive |
| 0000075e | _serial_data |
| 0000077b | _serial_send |
| 000007d4 | _serial_send_string |
| 00000805 | _LCD_initialize |
| 000008a2 | _LCD_display |
| 00000946 | _program |
| 000009a6 | _rrt_bit |
| 00000a87 | _ms1553_test |
| 00000c40 | _REPROGRAM |
| 00000c40 | .text |
| 00000c40 | _rrt_main |
| 00000d13 | _delay_timer |
| 00000d20 | _msec_timer |
| 00000d37 | _ms1553_send |
| 00000dae | _ms1553_receive |
| 00000e11 | _ms1553_respond |
| 00000f97 | _command_mode |
| 000010f1 | _upload |
| 00001362 | _download |
| 000015b6 | _erase |
| 00001835 | _switches |
| 00001ad6 | _bus_polling |
| 00001af6 | _convert_to_BC |
| 00001b25 | _quiet_BC |
| 00001b76 | _enable_BC |
| 00001b82 | _return_to_RT |
| 00001be3 | DMA |
| 00001be4 | ISR0 |
| 00001be5 | ISR1 |
| 00001be6 | ISR2 |
| 00001be7 | ISR3 |
| 00001be8 | TIME0 |
| 00001be9 | TIME1 |
| 00001bea | XMT0 |
| 00001beb | RCV0 |
| 00001bec | XMT1 |
| 00001bed | RCV1 |
| 00001bee | TRP0 |
| 00001bef | TRP1 |
| 00001bf0 | TRP2 |
| 00001bf1 | _warning_bad_battery |
| 00001c08 | _error_hex_character |
| 00001c26 | _error_serial_input |
| 00001c90 | _error_checksum |
| 00001cb5 | _error_card_verify |
| 00001ccf | _error_end_record |
| 00001cf4 | _error_record_type |

```
000035d8 _enter_load_response          00001d19 _error_display
000033a0 _enter_verify_message         0000238f _protocol_d
0000376e _enter_verify_response        0000239b _protocol_e
000015b6 _erase                        000023a7 _protocol_f_core
00001cb5 _error_card_verify            000023b3 _protocol_f_eeprom
00001c90 _error_checksum               000023bf _protocol_f_sdc
00001d19 _error_display                000023cb _protocol_g
00001ccf _error_end_record             000023d7 _protocol_h
00001c08 _error_hex_character          000024b5 _protocol_b
00001cf4 _error_record_type            000025fd _reprogram_b
00001c26 _error_serial_input           000028e0 _verify_b
00003358 _exit_load_message            00002c8b _protocol_c
00003709 _exit_load_response           00002db4 _reprogram_c
0000340d _exit_verify_message          00002f75 _verify_c
00003802 _exit_verify_response         00003207 _activity_busy
00809a11 _fetch_byte                   00003241 _activity_message
00809a2a _fetch_nyble                  00003276 _memory_configuration_message
00809a4d _fetch_receive                0000329e _enter_load_message
000032ea _header_message               000032ea _header_message
00003641 _header_response              00003320 _memory_data_load_message
00003276 _memory_configuration_message 00003338 _trailer_message
0000359e _memory_configuration_response 00003358 _exit_load_message
00003320 _memory_data_load_message     000033a0 _enter_verify_message
00003694 _memory_data_load_response    000033e2 _memory_data_verify_message
000033e2 _memory_data_verify_message   0000340d _exit_verify_message
000037cd _memory_data_verify_response  0000344b _service_message
00000dae _ms1553_receive               0000348d _reprogram_status_message
00000e11 _ms1553_respond               000034de _rrt_error_message
00000d37 _ms1553_send                  000034f5 _command_message
00000a87 _ms1553_test                  0000359e _memory_configuration_respons
00000d20 _msec_timer                   000035d8 _enter_load_response
00000946 _program                      00003641 _header_response
000024b5 _protocol_b                   00003694 _memory_data_load_response
00002c8b _protocol_c                   000036cc _trailer_response
0000238f _protocol_d                   00003709 _exit_load_response
0000239b _protocol_e                   0000376e _enter_verify_response
000023a7 _protocol_f_core              000037cd _memory_data_verify_response
000023b3 _protocol_f_eeprom            00003802 _exit_verify_response
000023bf _protocol_f_sdc               0000385d _reprogram_status_response
000023cb _protocol_g                   000038ae _rrt_error_response
000023d7 _protocol_h                   000038e2 _ascii_conversion
00001b25 _quiet_BC                     0000390a .data
000025fd _reprogram_b                  0000390a etext
00002db4 _reprogram_c                  0000391c cinit
0000348d _reprogram_status_message     0000391c edata
0000385d _reprogram_status_response    00400000 _MEMCARD0
00001b82 _return_to_RT                 00804ffc _RS232
000009a6 _rrt_bit                      008057fc _PPI1
000034de _rrt_error_message            00805bfc _PPI2
000038ae _rrt_error_response           00805dfc _PPI3
00000c40 _rrt_main                     00805efc _RS422
00809a87 _send_message                 00805f70 _GPIBREGS
00809a9e _send_serial                  00808000 _DMAREGS
0000075e _serial_data                  00808020 _TIMER0
000006d0 _serial_get_byte              00808030 _TIMER1
000006e6 _serial_get_nyble             00808040 _SERIAL0
00000709 _serial_put_byte              00808050 _SERIAL1
0000071f _serial_put_nyble             00808052 SER1XCR
00000736 _serial_receive               00809800 _boot_main
000007d4 _serial_send_string           00809800 _BOOT_RUN
0000077b _serial_send                  00809835 _boot
0000344b _service_message              008099a4 _write_eeprom
00001835 _switches                     008099f9 _enable_eeprom_write
00003338 _trailer_message              00809a11 _fetch_byte
000036cc _trailer_response             00809a2a _fetch_nyble
000010f1 _upload                       00809a4d _fetch_receive
000028e0 _verify_b                     00809a87 _send_message
00002f75 _verify_c                     00809a9e _send_serial
00001bf1 _warning_bad_battery          00809aec _LCD_boot_display
008099a4 _write_eeprom                 00809d80 _BOOT_STORE
0000391c cinit                         00809e80 .bss
0000391c edata                         00809e80 _boot_error
00809e81 end                           00809e81 end
0000390a etext                         00c00000 _MEMCARD1

[145 symbols]
```

```c
/*******************************************
*              BOOT MODULE                 *
*******************************************/

/* filename: BOOT.C */

/*********************************************************************
    *          WARNING!!!       DANGER!!!      WARNING!!!                *
    *    This code MUST be compiled with the assembly language listing   *
    *    invoked.  The resulting assembly code MUST be edited to eliminate *
    *    the ".text" assembly directive preceeding the data and string   *
    *    constants at the end of the file.  If this is not done the data *
    *    constants will be located in the ROM section (.text section) that *
    *    can be overwritten when reprogramming the RRT.  This requirement *
    *    is necessary due to a short comming in the compiler that will not *
    *    allow the data and string constants to be directed to the       *
    *    "boot_rom" section.                                             *
    *********************************************************************/

/* Assigning the label "REPROGRAM" to the beginning of the reprogrammable
       section (.text) of ROM. */
    /* Boundary label, section command, section for boundary start */
    asm("_REPROGRAM    .sect      \".text\"");    /* Reprogram boundary */

/* Assigning the label "BOOT_STORE" to the beginning of the RAM storage
          area for the "boot.c" routine. */
    /* Storage location label, section command, section for storage */
    asm("_BOOT_STORE   .sect      \"boot_buffer\"");  /* Storage buffer */

/* Assigning the label "BOOT_RUN" to the beginning of RAM where the
         "boot.c" routine will be relocated for execution. */
    /* Run time label, section command, section stored, address executed */
    asm("_BOOT_RUN     .asect     \"boot_rom\", 0809800h");
    /* Assigning the label "BOOT_LOCATION" to the beginning of ROM where the
         "boot.c" routine will be stored. */
    /* label command, code location label */
    asm("              .label     _BOOT_LOCATION");

/*
    All definitions used by BOOT.C are defined in
        the following header files:
*/ include "rrt.h"           /* RRT configuration */
include "dsp.h"           /* DSP definitions */
#include "system.h"        /* System definitions */
include "timer.h"         /* LCD display definitions */ void boot_main(SERIAL_REG_TYPE *serial_reg);
void boot(SERIAL_REG_TYPE *serial_reg);
void write_eeprom(int word_count, int *data_store,
    int *data_buffer, SERIAL_REG_TYPE *serial_reg);
void enable_eeprom_write(void);
int fetch_byte(SERIAL_REG_TYPE *serial_reg);
int fetch_nyble(SERIAL_REG_TYPE *serial_reg);
int fetch_receive(SERIAL_REG_TYPE *serial_reg);
void send_message(char *string, SERIAL_REG_TYPE *serial_reg);
void send_serial(int data, SERIAL_REG_TYPE *serial_reg);
void LCD_boot_display(char *string, SERIAL_REG_TYPE *serial_reg);

/*
    Definitions of display control codes.
*/ define Control_Select    0x00    /* Clear control lines */
    #define Data_Select       0x04    /* Data Register Select */
    #define Control_Enable    0x08    /* Enable control signals to display */
    #define Data_Enable       0x0c    /* Enable data signals to display */ define Initialize        0x30    /* Initialize the display */
    #define Clear_Display     0x01    /* Clear display and return home */
    #define Entry_Mode_Set    0x06    /* Increment cursor, do not shift */
    #define Cursor_Off        0x0c    /* Cursor off */
    #define Function_Set      0x38    /* 2 lines of 5X7 dot characters */
```

```c
int boot_error;

/* Functions called */ void dspinit(void);                     /* Assembly routine */

/***********************************************
*                BOOT MAIN                     *
***********************************************/
void boot_main(SERIAL_REG_TYPE *serial_reg)
{
    int data;

send_message("\r\nWARNING!!, RRT Program will be Changed!!\r\n",
        serial_reg);
    send_message("\r\nContinue with Program Function (Y/N): ", serial_reg);
    data = 0;                                /* Clear data */
    while((data != 'y') && (data != 'Y'))    /* Wait for response */
    {
        if((data == 'n') || (data == 'N'))
            return;
        data = fetch_receive(serial_reg);
    } send_message("\r\n", serial_reg);        /* New line */

/* Ensure Serial I/O stopped */
    serial_reg->Control_Register = Stop_Mode;  /* Stop incoming data */ boot(serial_reg);                        /* Load the new program */

/* Reinitialize and restart */
    dspinit();                               /* Assembly routine */
}

/***********************************************
*                BOOT                          *
***********************************************/
/* writes RRT program code to EEPROM */
void boot(SERIAL_REG_TYPE *serial_reg)
{
    TIMER_REG_TYPE *timer;                   /* Pointer to timer counter register */ int i, data, byte_count;
    int high_address, medium_address, low_address;
    int record_type, checksum;
    int word_count, *data_buffer, *data_store, *buffer_start;

#ifdef LED_DISPLAY
        PPI3_REG_TYPE *display;              /* RRT Display pointer */
        display = (PPI3_REG_TYPE *) &PPI3;    /* Pointer to display */
    #endif timer = (TIMER_REG_TYPE *) &TIMER0;

data_buffer = (int *) &BOOT_STORE;       /* Pointer to storage buffer */ high_address = 0;
    medium_address = 0;
    data = 0;

for(;;)
    {
        boot_error = 0;                      /* Initially no error */ while(data != ':')                   /* Wait for start of record */
            data = fetch_receive(serial_reg); /* Get serial input */ byte_count = fetch_byte(serial_reg);  /* Record byte count */
        checksum = byte_count;
        if(!(boot_error))                     /* Execute if no error */
        {
            /* Get the record address */
            low_address = fetch_byte(serial_reg);
            checksum += low_address;
```

```
}
if(!(boot_error))                        /* Execute if no error */
{
    low_address = (low_address << 8) + fetch_byte(serial_reg);
    checksum += (0xff & low_address);
}
if(!(boot_error))                        /* Execute if no error */
{
    record_type = fetch_byte(serial_reg);   /* Get the record type */
    checksum += record_type;                /* Update the checksum */
} if(record_type == 0x00)                  /* Have a data record */
{
    #ifdef LED_DISPLAY
        display->RRT_Display |= LOAD_LED;   /* Indicate loading data */
    #endif ifndef LED_DISPLAY
        /* Loading record */
        LCD_boot_display("Loading Record", serial_reg);
    #endif word_count = (byte_count >> 2);         /* 4 bytes/word */
    for(i = 0; (i < word_count) && !(boot_error); i++)
    {
        data = fetch_byte(serial_reg);      /* Get data byte */
        checksum += data;                   /* Update the checksum */
        if(!(boot_error))                   /* Execute if no error */
        {
            /* 16 bits of word */
            data = (data << 8) + fetch_byte(serial_reg);
            checksum += (0xff & data);
        }
        if(!(boot_error))                   /* Execute if no error */
        {
            /* 24 bits of word */
            data = (data << 8) + fetch_byte(serial_reg);
            checksum += (0xff & data);
        }
        if(!(boot_error))                   /* Execute if no error */
        {
            /* 32 bit word */
            data = (data << 8) + fetch_byte(serial_reg);
            checksum += (0xff & data);
            *(data_buffer + i) = data;      /* Put data in buffer */
        }
    }
    if(!(boot_error))                       /* Execute if no error */
    {
        checksum += fetch_byte(serial_reg); /* Check checksum */
        /* Indicate verify (checksum) begins while
            load continues (EEPROM) */ ifdef LED_DISPLAY
            /* Indicate verify begins, EEPROM load proceeding */
            display->RRT_Display |= VERIFY_LED;
        #endif if(checksum & 0xff)                 /* Test for error */
        {
            send_message("\r\nChecksum Error\r\n", serial_reg);
            boot_error = 1;                 /* Boot error */
        }
        else
        {
            #ifndef LED_DISPLAY
                /* Indicate record verified */
                LCD_boot_display("Record Verified", serial_reg);
            #endif /* To store or not to store, that is the question */
            data_store = (int *) (high_address
                + medium_address + low_address);
            if(data_store < &REPROGRAM)
```

```c
        {
            if((data_store + word_count - 1) < &REPROGRAM)
            {
                word_count = 0;
                #ifdef LED_DISPLAY
                    display->RRT_Display &= ~LOAD_LED;
                    display->RRT_Display &= ~VERIFY_LED;
                #endif
                #ifndef LED_DISPLAY
                    LCD_display("");    /* Clear display */
                #endif
            }
            else    /* Partial record contains program update */
            {
                word_count = word_count -
                    (&REPROGRAM - data_store);
                buffer_start = data_buffer +
                    (&REPROGRAM - data_store);
                data_store = &REPROGRAM;
                write_eeprom(word_count, data_store,
                    buffer_start, serial_reg);
            }
        }
        else            /* Entire record contains program update */
            write_eeprom(word_count, data_store,
                data_buffer, serial_reg);
        }
    }
} else if(record_type == 0x01)        /* Have end of file record */
{
    if(!(boot_error))
    {
        checksum += fetch_byte(serial_reg);
        if(!(byte_count) && !(low_address) && !(checksum & 0xff))
        {
            send_message("\r\nUpdate completed\r\nProgram booted\r\n",
                serial_reg);
            /* Wait for message to get out */
            timer->Timer_Counter = HALFSEC;  /* half sec delay */
            while(timer->Timer_Counter);
            return;                 /* Properly completed Reprogram */
        }
        send_message("\r\nChecksum Error\r\n", serial_reg);
        boot_error = 1;             /* Improper termination */
    }
}

/* Have extended segment address record */
else if(record_type == 0x02)
{
    if(byte_count != 0x02)      /* Have 2 bytes for address */
        send_message("\r\nRecord Type Error\r\n", serial_reg);
        boot_error = 1;         /* Improper record length */
    if(!(boot_error))
    {
        medium_address = fetch_byte(serial_reg);
        checksum += medium_address;
    }
    if(!(boot_error))
    {
        medium_address = (medium_address << 8)
            + fetch_byte(serial_reg);
        checksum += (0xff & medium_address);
        medium_address = (medium_address << 4);
    }
    if(!(boot_error))
    {
        checksum += fetch_byte(serial_reg);     /* Get checksum */
        if(checksum & 0xff)
        {
            send_message("\r\nChecksum Error\r\n", serial_reg);
            boot_error = 1;         /* Checksum error */
        }
```

```
            }
        }

/* Have extended linear address record */
        else if(record_type == 0x04)
        {
            if(byte_count != 0x02)          /* Have 2 bytes for address */
                send_message("\r\nRecord Type Error\r\n", serial_reg);
                boot_error = 1;             /* Improper record length */
            if(!(boot_error))
            {
                high_address = fetch_byte(serial_reg);
                checksum += high_address;
            }
            if(!(boot_error))
            {
                high_address = (high_address << 8) + fetch_byte(serial_reg);
                checksum += (0xff & high_address);
                high_address = high_address << 16;
            }
            if(!(boot_error))
            {
                checksum += fetch_byte(serial_reg); /* Get checksum */
                if(checksum & 0xff)
                {
                    send_message("\r\nChecksum Error\r\n", serial_reg);
                    boot_error = 1;         /* Checksum error */
                }
            }
        } else
            boot_error = 1;

if(boot_error)                      /* If error wait here for retry */
        {
            #ifdef LED_DISPLAY
                display->RRT_Display |= ERROR_LED;   /* Indicate Error */
            #endif
            #ifndef LED_DISPLAY
                LCD_display("Boot Error");           /* Indicate Error */
            #endif send_message("\r\nWARNING!!, BOOT ERROR!!\r\n", serial_reg);
            send_message("To Retry the program function type R.\r\n",
                serial_reg);

while(data != 'R')              /* Wait for retry command */
                data = fetch_receive(serial_reg);

send_serial(data, serial_reg);   /* Echo "R" character */ send_message("\r\nProceed with Program Retry\r\n",
                serial_reg);

boot_error = 0;                 /* Reset error flag */
            high_address = 0;               /* Reset address pointers */
            medium_address = 0;

#ifdef LED_DISPLAY
                display->RRT_Display &= ~ALL_LEDS_ON;   /* LEDs off */
            #endif ifndef LED_DISPLAY
                LCD_boot_display("Boot Retry\rProceeding", serial_reg);
            #endif
        }
    }
}

/*********************************************
*              WRITE EEPROM                  *
*********************************************/
void write_eeprom(int word_count, int *data_store,
    int *data_buffer, SERIAL_REG_TYPE *serial_reg)
```

```
{
    int i;

#ifdef LED_DISPLAY
    PPI3_REG_TYPE *display;                     /* RRT Display pointer */
    display = (PPI3_REG_TYPE *) &PPI3;          /* Pointer to display */
endif enable_eeprom_write();
    for(i = 0; i < word_count; i++)
    {
        /* This loop cycle time must take 1 usec. to satisfy the
           minimum byte load cycle time of the EEPROM */

/* Crossing page boundary? */
        if(!((int)(data_store + i) & 0x3f) && i)
        {
            /* Data polling, wait for last written word to compare.
               This will take from 5 to 10 msecs. */ ifdef LED_DISPLAY
            /* Indicate EEPROM load suspended while verify continues */
            display->RRT_Display &= ~LOAD_LED;
endif /* Wait for EEPROM page transfer to complete */
            while(*(data_store + i - 1) != *(data_buffer + i - 1));

enable_eeprom_write();              /* Allow additional data writes */ ifdef LED_DISPLAY
            /* Indicate EEPROM load continues */
            display->RRT_Display |= LOAD_LED;
#endif
        }
        *(data_store + i) = *(data_buffer + i);
    }
#ifdef LED_DISPLAY
    /* Indicate EEPROM load completed, verify continues */
    display->RRT_Display &= ~LOAD_LED;
endif /* Data polling, wait for last written word to compare.
       This will take from 5 to 10 msecs. */ while(*(data_store + word_count - 1)
          != *(data_buffer + word_count - 1));

/* Verify data properly stored */
    for(i = 0; ((i < word_count) && !(boot_error)); i++)
        if(*(data_store + i) != *(data_buffer + i))
            boot_error = 1;
    if(!(boot_error))
    {
        /* Indicate EEPROM verify completed */
#ifdef LED_DISPLAY
        display->RRT_Display &= ~VERIFY_LED;
endif ifndef LED_DISPLAY
        LCD_boot_display("\rEEPROM Verified", serial_reg);
#endif
    }
}

/*********************************************
*           ENABLE EEPROM WRITE              *
*********************************************/
void enable_eeprom_write(void)
{
int *pointer;

pointer = (int *) 0x05555;
    *pointer = 0xaaaaaaaa;
```

```c
    pointer = (int *) 0x02aaa;
    *pointer = 0x55555555;

pointer = (int *) 0x05555;
    *pointer = 0xa0a0a0a0;
}

/*********************************************
*               FETCH BYTE                   *
*********************************************/
int fetch_byte(SERIAL_REG_TYPE *serial_reg)
{
    int data;

data = fetch_nyble(serial_reg);
    if(!(boot_error))
        data = (data << 4) + fetch_nyble(serial_reg);

return data;
}

/*********************************************
*               FETCH NYBLE                  *
*********************************************/
int fetch_nyble(SERIAL_REG_TYPE *serial_reg)
{
    int data;

data = fetch_receive(serial_reg);       /* Should be hex byte */
    if((data >= '0') && (data <= '9'))
        return (data - '0');
    else if((data >= 'A') && (data <= 'F'))
        return (data - 'A' + 0x0a);
    else
    {
        send_message("\r\nIllegal Character\r\n", serial_reg);
        boot_error = 1;
    }
}

/*********************************************
*               FETCH RECV                   *
*********************************************/
int fetch_receive(SERIAL_REG_TYPE *serial_reg)
{
    STATUS_REG_TYPE *status;
    int serial_status, data;

serial_status = serial_reg->Status_Register;
    status = (STATUS_REG_TYPE *) &serial_status;

if(!(status->Data_Ready))                   /* Might not have data yet */
    {
        /* Ensure ready to receive more data */
        serial_reg->Control_Register = CTS_Mode;
        while(!(status->Data_Ready))            /* Wait for received data */
            serial_status = serial_reg->Status_Register;
        /* Not ready to receive any more */
        serial_reg->Control_Register = Stop_Mode;
    } if(status->Error)                           /* Test for errors */
    {
        boot_error = 1;
        send_message("\r\nSerial Receive Error\r\n", serial_reg);
    }
    else
    {
        data = serial_reg->Data_Register;       /* data = received character */
        if(!(boot_error))           /* No echo if boot error recovery in process */
            send_serial(data, serial_reg);      /* Echo data (full duplex) */
    } return data;
}
```

```c
/**********************************************
*              SEND MESSAGE                   *
**********************************************/
/* Display string message */
void send_message(char *string, SERIAL_REG_TYPE *serial_reg)
{
    for(; *string != '\0'; string++)        /* Send message */
        send_serial(*string, serial_reg);
}

/**********************************************
*              SEND SERIAL                    *
**********************************************/
void send_serial(int data, SERIAL_REG_TYPE *serial_reg)
{
    STATUS_REG_TYPE *status;
    unsigned serial_status;

serial_status = serial_reg->Status_Register;
    status = (STATUS_REG_TYPE *) &serial_status;

serial_reg->Data_Register = data;    /* Send serial data */
    /* Check for controlled communications */
    if(serial_reg->Control_Register == Stop_Mode)
        /* Wait until through sending */
        while (!(status->Transmitter_Empty))
        {
            serial_status = serial_reg->Status_Register;
            if(status->Error)           /* Did an error occur while waiting? */
            {
                send_message("\r\nSerial Receive Error\r\n", serial_reg);
                boot_error = 1;         /* Flag error detected */
                return;
            }
        }
    else                                /* Free running communications */
    {
        /* Set RS-232 so not ready to receive */
        serial_reg->Control_Register = Stop_Mode;
        /* Wait until data is sent */
        while (!(status->Transmitter_Empty))
        {
            serial_status = serial_reg->Status_Register;
            if(status->Error)           /* Did an error occur while waiting? */
            {
                send_message("\r\nSerial Receive Error\r\n", serial_reg);
                boot_error = 1;         /* Flag error detected */
                return;
            }
        }
        /* Set RS-232 so ready to receive */
        serial_reg->Control_Register = CTS_Mode;
    }
}

/**********************************************
*           DISPLAY PROCESSING                *
**********************************************/
void LCD_boot_display(char string[], SERIAL_REG_TYPE *serial_reg)
{
    PPI1_REG_TYPE *control;            /* Pointer to LCD control lines */
    PPI3_REG_TYPE *display;            /* Pointer to LCD data lines */
    TIMER_REG_TYPE *timer;             /* Pointer to timer counter register */
    int i, serial_control;

/* Ensure a serial input overrun does not occur */
    serial_control = serial_reg->Control_Register;
    serial_reg->Control_Register = Stop_Mode;

control = (PPI1_REG_TYPE *) &PPI1;
    display = (PPI3_REG_TYPE *) &PPI3;
    timer = (TIMER_REG_TYPE *) &TIMER0;

/* Put display in control mode */
    control->LCD_Display_Control = Control_Select;
```

```c
    /* Clear the display */
    display->RRT_Display = Clear_Display;
    control->LCD_Display_Control = Control_Enable;
    control->LCD_Display_Control = Control_Select;

/* 2 msec delay for display to clear (typically takes 1.64 msecs) */
    for (i = 1; i <= 2; i++)
    {
        timer->Timer_Counter = MSEC1;      /* msec. delay */
        while(timer->Timer_Counter);       /* delay done when counter = 0 */
    }

/* Now to display the data */
    control->LCD_Display_Control = Data_Select;

for(i = 0; string[i] != '\0'; i++)   /* Send characters to display */
    {
        if(string[i] == '\r')              /* Test for line #2 */
        {
            control->LCD_Display_Control = Control_Select;
            display->RRT_Display = 0xc0;         /* Select line #2 */
            control->LCD_Display_Control = Control_Enable;
            control->LCD_Display_Control = Control_Select;
            control->LCD_Display_Control = Data_Select;
        }
        else
        {
            /* Output the character */
            display->RRT_Display = string[i];
            control->LCD_Display_Control = Data_Enable;
            control->LCD_Display_Control = Data_Select;
        }

/* 50 usec delay to next character (typically takes 40 usecs)*/
        timer->Timer_Counter = USEC50;
        while(timer->Timer_Counter);     /* Delay done when counter = 0 */
    }
    /* Zero LCD ASCII port */
    display->RRT_Display = 0;               /* Done so LEDs will not stay on */

/* Restore serial I/O control register */
    serial_reg->Control_Register = serial_control;
}

/* end */
```

```
;       *********************************************
;       *                                           *
;       *         PROCESSOR INITIALIZATION          *
;       *                                           *
;       *********************************************
;
;
;       This is the Rapid Reprogramming Terminal (RRT) TMS320C30 Digital
;Signal Processor (DSP) initialization routine.  This routine initializes
;all DSP internal registers prior to entering the RRT "C" program.  The
;linker command file (RRT.CMD) must specify the -e <global symbol> option
;where "global symbol" defines the entry point, "RRTINIT", to this routine.
;
;       To ensure the maximum size for the stack the stack section
;must be specified last in the linker command file.
;
;       This routine performs the following actions:
;
;       1) Establishes interrupt vectors
;       2) Initializes the system stack and Frame Pointer (FP = AR3)
;       3) Initialize internal processor registers (ST, IE, IF, IOF)
;       4) Initialize data memory to floating point zero
;       5) Perform auto-initialization ((.cinit) --> (.bss))
;       6) Initialize internal control registers
;               DMA, timer 0, timer 1, serial port 0,
;               serial port 1, and external buses
;       7) Initialize external peripherials (UART, PPI1, PPI2, PPI3)
;       8) Call the C program "_main" to start the RRT C program
;
```

```
;       ***** PROCESSOR GLOBAL DECLARATIONS *****
;
;       Defined globals
;
        .global _RESET, _c_int00, _dspinit
        .global INT0, INT1, INT2, INT3
        .global XINT0, RINT0, XINT1, RINT1, TINT0, TINT1, DINT
        .global TRAP0, TRAP1, TRAP2
;
        .global _DMAREGS, _TIMER0, _TIMER1, _SERIAL0, _SERIAL1
;
        .global SER1XCR                 ;Register used by SYSINIT for RESET
;
;       Referenced globals
;
        .global cinit, .bss, SYSINIT, _rrt_bit
        .global ISR0, ISR1, ISR2, ISR3
        .global XMT0, RCV0, XMT1, RCV1, TIME0, TIME1, DMA
        .global TRP0, TRP1, TRP2
;
;       ***** RESET AND INTERRUPT VECTOR SPECIFICATION *****
;
                .sect   "int_vecs"      ;Named section for interrupt vectors
;
_RESET          .word   _dspinit        ;_RESET- load address _dspinit to PC
;
INT0            .word   ISR0            ;INT0- loads address ISR0 to PC
INT1            .word   ISR1            ;INT1-    "        "    ISR1  "  "
INT2            .word   ISR2            ;INT2-    "        "    ISR2  "  "
INT3            .word   ISR3            ;INT3-    "        "    ISR3  "  "
;
XINT0           .word   XMT0            ;Serial port 0 transmit processing
RINT0           .word   RCV0            ;Serial port 0 receive processing
XINT1           .word   XMT1            ;Serial port 1 transmit processing
RINT1           .word   RCV1            ;Serial port 1 receive processing
TINT0           .word   TIME0           ;Timer 0 interrupt processing
TINT1           .word   TIME1           ;Timer 1 interrupt processing
DINT            .word   DMA             ;DMA interrupt
                .space  20              ;Reserved space
TRAP0           .word   TRP0            ;Trap 0 vector processing begins
TRAP1           .word   TRP1            ;   "  1     "        "       "
TRAP2           .word   TRP2            ;   "  2     "        "       "
                .space  29              ;Leave space for the other 29 traps
;
;       ***** STACK SECTION *****
;
STACK           .sect   ".stack"        ;Uninitialized section
;
;       ***** DMA SECTION *****
;
_DMAREGS        .usect  "dma_regs", 0   ;Location of DMA registers
DMAGCR          .usect  "dma_regs", 4   ;DMA Global Control Register
DMASAR          .usect  "dma_regs", 2   ;DMA Source Address Register
DMADAR          .usect  "dma_regs", 2   ;DMA Destination Address Register
DMATCR          .usect  "dma_regs", 1   ;DMA Transfer Counter Register
;
;       ***** TIMER 0 SECTION *****
;
_TIMER0         .usect  "t0_regs", 0    ;Location of Timer 0 registers
TIM0GCR         .usect  "t0_regs", 4    ;Timer 0 Global Control Register
TIM0CTR         .usect  "t0_regs", 4    ;Timer 0 Counter Register
TIM0PDR         .usect  "t0_regs", 1    ;Timer 0 Period Register
;
;       ***** TIMER 1 SECTION *****
;
_TIMER1         .usect  "t1_regs", 0    ;Location of Timer 1 registers
TIM1GCR         .usect  "t1_regs", 4    ;Timer 1 Global Control Register
TIM1CTR         .usect  "t1_regs", 4    ;Timer 1 CounTer Register
TIM1PDR         .usect  "t1_regs", 1    ;Timer 1 PerioD Register
;
;       ***** SERIAL PORT 0 SECTION *****
;
_SERIAL0        .usect  "s0_regs", 0    ;Location of Serial port 0 registers
SER0GCR         .usect  "s0_regs", 2    ;Serial port 0 Global Control Register
SER0XCR         .usect  "s0_regs", 1    ;Serial port 0 Xmit Control Register
```

```
SER0RCR         .usect  "s0_regs", 1        ;Serial port 0 Recv Control Register
SER0TCR         .usect  "s0_regs", 1        ;Serial port 0 Timer Control Register
SER0CTR         .usect  "s0_regs", 1        ;Serial port 0 timer CounTeR Register
SER0PDR         .usect  "s0_regs", 2        ;Serial port 0 timer PerioD Register
SER0DXR         .usect  "s0_regs", 4        ;Serial port 0 Data Xmit Register
SER0DRR         .usect  "s0_regs", 1        ;Serial port 0 Data Recv Register
;
;               ***** SERIAL PORT 1 SECTION *****
;
_SERIAL1        .usect  "s1_regs", 0        ;Location of Serial port 1 registers
SER1GCR         .usect  "s1_regs", 2        ;Serial port 1 Global Control Register
SER1XCR         .usect  "s1_regs", 1        ;Serial port 1 Xmit Control Register
SER1RCR         .usect  "s1_regs", 1        ;Serial port 1 Recv Control Register
SER1TCR         .usect  "s1_regs", 1        ;Serial port 1 Timer Control Register
SER1CTR         .usect  "s1_regs", 1        ;Serial port 1 timer CounTeR Register
SER1PDR         .usect  "s1_regs", 2        ;Serial port 1 timer PerioD Register
SER1DXR         .usect  "s1_regs", 4        ;Serial port 1 Data Xmit Register
SER1DRR         .usect  "s1_regs", 1        ;Serial port 1 Data Recv Register
;
;               ***** DATA CONSTANTS *****
;
                .data
;
STACK_ADDR      .word   STACK               ;address of stack
INIT_ADDR       .word   cinit               ;address of init tables
FP              .set    AR3                 ;frame pointer
;
MASK            .word   000003F0H           ;CPU interrupts (X---X3F0H) enabled.
                                            ;   0 => EINT3, EINT2, EINT1, EINT0
                                            ;   F => ERINT1, EXINT1, ERINT0, EXINT0
                                            ;   3 => XX, EDINT, ETINT1, ETINT0
                                            ;DMA interrupts (X000X---H) disabled.
                                            ;   0 => EINT3, EINT2, EINT1, EINT0
                                            ;   0 => ERINT1, EXINT1, ERINT0, EXINT0
                                            ;   0 => XX, EDINT, ETINT1, ETINT0
;
DMACTL          .word   00000050H           ;Init. for DMA control (0)
                                            ;   START = 00 => DMA will be completed
                                            ;   STAT  = 00 => DMA held between DMA
                                            ;         = 01 => Held in middle of DMA
                                            ;         = 10 => Reserved
                                            ;         = 11 => DMA busy
                                            ;  INCSRC =  1 => Source address...
                                            ;  DECSRC =  0 => ... incremented
                                            ;  INCDST =  1 => Destination address...
                                            ;  DECDST =  0 => ... incremented
                                            ;    SYNC = 00 => No synchronization
                                            ;      TC =  0 => Not terminated
                                            ;   TCINT =  0 => Interrupt not set
                                            ;      XX  = Rest reserved, read a 0
TIM0CTL         .word   00000081H           ;Init. of timer 0 control (32)
                                            ;Timer control (XXXXX081H)
                                            ;    FUNC = 1 => TCLK = Timer pin
                                            ;     I/O = 0 => TCLK = Input pin
                                            ;  DATOUT = TCLK output when in I/O mode
                                            ;   DATIN = TCLK input when in I/O mode
                                            ;      XX = Reserved
                                            ;      XX = Reserved
                                            ;      GO = 1 Starts timer (auto resets)
                                            ;    /HLD = 1 => Counter enabled
                                            ;     C/P = 0 => Output active for 1 H1
                                            ;  CLKSRC = 0 => TCLK increments counter
                                            ;     INV = 0 => TCLK not inverted
                                            ;   TSTAT = Uninverter TCLK pin
TIM1CTL         .word   00000081H           ;Init. of timer 1 control (48)
                                            ;   Same definitions as TIM0CTL
SERGLO0         .word   0C143300H           ;Init. of serial 0 glbl control (64)
                                            ;    RRDY = 1/0 => Yes/No new data
                                            ;    XRDY = 1/0 => Is/Not ready for data
                                            ;  FSXOUT =   0 => FSX Input mode
                                            ;XSREMPTY= 1/0 => XSR Is/Not empty
                                            ; RSRFULL= 1/0 => Yes/No RSR overrun
                                            ;      HS =   0 => No handshake mode
                                            ;XCLKSRCE=   0 => External Xmit clock
                                            ;RCLKSRCE=   0 => External Recv clock
```

```
                                        ; XVAREN =    1 => Variable data rate
                                        ; RVAREN =    1 => Variable data rate
                                        ;   XFSM =    0 => Standard sync mode
                                        ;   RFSM =    0 => Standard sync mode
                                        ;  CLKXP =    1 => Active low clock
                                        ;  CLKRP =    1 => Active low clock
                                        ;    DXP =    0 => Active high data
                                        ;    RXP =    0 => Active high data
                                        ;   FSXP =    0 => Active high FSX
                                        ;   FSRP =    0 => Active high FSR
                                        ;   XLEN =   01 => 16 bit word length
                                        ;   RLEN =   01 => 16 bit word length
                                        ;  XTINT =    0 => Timer INT disabled
                                        ;   XINT =    0 => Xmit INT disabled
                                        ;  RTINT =    0 => Timer INT disabled
                                        ;   RINT =    0 => Recv INT disabled
                                        ; XRESET =    1 => Xmit not reset
                                        ; RRESET =    1 => Recv not reset
                                        ;     XX = Rest reserved, read as 0
SERPTX0  .word    00000111H             ;Init of serial 0 xmt port control (66)
                                        ;CLKXFUNC =   1 => Serial port CLKX
                                        ; CLKXI/O = 1/0 =>Output/Input for CLKX
                                        ;CLKXDATOUT=1/0 => Data output on CLKX
                                        ;CLKXDATIN= 1/0 => Data input from CLKX
                                        ;  DXFUNC =    1 => Serial port DX
                                        ;   DXI/O = 1/0 => Output/Input for DX
                                        ;DXDATOUT = 1/0 => Data output on DX
                                        ; DXDATIN = 1/0 => Data input from DX
                                        ; FSXFUNC =    1 => Serial port FSX
                                        ;  FSXI/O = 1/0 => Output/Input for FSX
                                        ;FSXDATOUT= 1/0 => Data output on FSX
                                        ;FSXDATIN = 1/0 => Data input from FSX
                                        ;     XX = Rest reserved, read as 0
SERPTR0  .word    00000111H             ;Init. of serial 0 rcv port control (67)
                                        ;    Same definitions as with SERPTX0...
                                        ;... after replacing X with R.
SERTIM0  .word    00000082H             ;Init. of serial 0 timer control (68)
                                        ;    XGO =    1 starts Xmit timer count
                                        ;   /XHLD = 1/0 => Hold/Cont. count
                                        ;    XC/P = 1/0 => Clock/Pulse mode
                                        ;XCLKSRC = 1/0 => Internal/External CLK
                                        ;     XX = Reserved, read as 0
                                        ; XTSTAT = Uninverted CLKX pin
                                        ;    RGO =    1 starts Recv timer count
                                        ;   /RHLD = 1/0 => Hold/Cont. count
                                        ;    XC/P = 1/0 => Clock/Pulse mode
                                        ;RCLKSRC = 1/0 => Internal/External CLK
                                        ;     XX = Reserved, read as 0
                                        ; RTSTAT = Tracks uninverted CLKR pin
                                        ;     XX = Rest reserved and read as 0
SERGLO1  .word    0C000004H             ;Init. of serial 1 glbl control (80)
                                        ;   RRDY = 1/0 => Yes/No new data
                                        ;   XRDY = 1/0 => Is/Not ready for data
                                        ; FSXOUT =    1 => FSX Output mode
                                        ;XSREMPTY= 1/0 => XSR Is/Not empty
                                        ; RSRFULL= 1/0 => Yes/No RSR overrun
                                        ;     HS =    0 => No handshake mode
                                        ;XCLKSRCE=    0 => External Xmit clock
                                        ;RCLKSRCE=    0 => External Recv clock
                                        ; XVAREN =    0 => Fixed data rate
                                        ; RVAREN =    0 => Fixed data rate
                                        ;   XFSM =    0 => Standard sync mode
                                        ;   RFSM =    0 => Standart sync mode
                                        ;  CLKXP =    0 => Active high clock
                                        ;  CLKRP =    0 => Active high clock
                                        ;    DXP =    0 => Active high data
                                        ;    RXP =    0 => Active high data
                                        ;   FSXP =    0 => Active high FSX
                                        ;   FSRP =    0 => Active high FSR
                                        ;   XLEN =   00 => 8 bit word length
                                        ;   RLEN =   00 => 8 bit word length
                                        ;  XTINT =    0 => Timer INT disabled
                                        ;   XINT =    0 => Xmit INT disabled
                                        ;  RTINT =    0 => Timer INT disabled
                                        ;   RINT =    0 => Recv INT disabled
```

```
                                        ; XRESET =   1 => Xmit not reset
                                        ; RRESET =   1 => Recv not reset
                                        ;     XX = Rest reserved, read as 0
SERPTX1  .word   00000222H              ;Init of serial 1 xmt port control (82)
                                        ;CLKXFUNC =   0 =>General I/O port CLKX
                                        ; CLKXI/O =   1 => Output for CLKX
                                        ;CLKXDATOUT= 1/0 => Data output on CLKX
                                        ;CLKXDATIN= 1/0 => Data input from CLKX
                                        ;  DXFUNC =   0 => General I/O port DX
                                        ;   DXI/O =   1 => Output for DX
                                        ;DXDATOUT = 1/0 => Data output on DX
                                        ; DXDATIN = 1/0 => Data input from DX
                                        ; FSXFUNC =   0 => General I/O port FSX
                                        ;  FSXI/O =   1 => Output for FSX
                                        ;FSXDATOUT = 1/0 => Data output on FSX
                                        ;FSXDATIN = 1/0 => Data input from FSX
                                        ;     XX  = Rest reserved and read as 0
SERPTR1  .word   00000200H              ;Init of serial 1 rcv port control (83)
                                        ;Same definitions as with SERPTX1...
                                        ;... after replacing X with R.
SERTIM1  .word   00000082H              ;Init. of serial 1 timer control (84)
                                        ;    Same definitions as with SERTIM0
;
;        ***** EXTERNAL INTERFACE SECTION *****
;
XPANBCR  .word   00808060H              ;eXPANsion Bus Control Register
PRIMBCR  .word   00808064H              ;PRIMary Bus Control Register
XPANBUS  .word   000000E8H              ;Init. Expansion Bus control (96)
                                        ;    XX  = Reserved, read as 000
                                        ;    SWW = 01 => RDY wait count only
                                        ;  WTCNT = 111 => 7 Software waits,...
                                        ;                 ... 500ns access
                                        ;    XX  = Rest reserved and read as 0
PRIMBUS  .word   000000E8H              ;Init. Primary Bus control (100)
                                        ; HOLDST = 1/0 => Port Is/Not held
                                        ; NOHOLD =   0 => Port Not allowed held
                                        ;    HIZ =   0 => Not internally held
                                        ;    SWW =  01 => RDY wait count only
                                        ;  WTCNT = 111 => Software wait states
                                        ; BNKCMP =00000=> No memory banks
                                        ;     XX = Rest reserved and read as 0
;
         .sect   "pgm_entry"            ;Entry code for boot and rrt_main
;
;       .Program execution begins here as specified by the
;linker -e <global symbol> option.  When RESET is applied, the
;following registers are initialized to zero:
;
;              ST  --   CPU STATUS REGISTER
;              IE  --   CPU/DMA INTERRUPT ENABLE FLAGS
;              IF  --   CPU INTERRUPT FLAGS
;              IOF --   I/O FLAGS
;
;       The STATUS register has the following arrangement:
;
;       BITS:     31-14  13 12 11 10  9   8   7   6   5  4 3 2 1 0
;       FUNCTION: RESRV  GIE CC CE CF RES RM  OVM LUF LV UF N Z V C
;
_c_int00
;
_dspinit
;
;       Set up the initial stack pointer
;
         LDP     STACK_ADDR             ;Get page of stored address
         LDI     @STACK_ADDR,SP         ;Load the address into SP
         LDI     SP,FP                  ;  and into FP
;
         LDI     1800H,ST               ;Clear and enable cache, disable OVM
         LDP     MASK                   ;Get page of stored mask
         LDI     @MASK,IE               ;Unmask CPU interrupts
         LDI     00000000H,IF           ;CPU interrupts disabled (XXXXX000H)
                                        ;   0 => INT3, INT2, INT1, INT0
                                        ;   0 => RINT1, XINT1, RINT0, XINT0
                                        ;   0 => XX, DINT0 TINT1 TINT0
```

```
              LDI      00000000H,IOF              ;I/O pins defined (XXXXXX00H)
                                                  ;    XX   => Reserved, read as 0
                                                  ; I/OXF0 = 0 => XF0 configured as input
                                                  ; OUTXF0 => Data output on XF0
                                                  ;   INXF0 => Data input from XF0
                                                  ;    XX   => Reserved, read as 0
                                                  ; I/OXF1 = 0 => XF1 configured as input
                                                  ; OUTXF1 => Data output on XF1
                                                  ;   INXF1 => Data input from XF1
                                                  ;    XX   => Rest reserved, read as 0
;
;       Do the autoinitialization
;
              LDP      INIT_ADDR                  ;Get page of stored address
              LDI      @INIT_ADDR,AR0             ;Get address of .cinit tables
              CMPI     -1,AR0                     ;If RAM model, skip init
              BEQ      DONE
              LDI      *AR0++,R1                  ;Get first count
              BZD      DONE                       ;If 0, nothing to do
              LDI      *AR0++,AR1                 ;Get destination address
              LDI      *AR0++,R0                  ;Get first word
              SUBI     1,R1                       ;Count - 1
DO_INIT
              RPTS     R1                         ;Block copy
              STI      R0,*AR1++
    ||        LDI      *AR0++,R0
              LDI      R0,R1                      ;Move next count into R1
              BNZD     DO_INIT                    ;If there is more, repeat
              LDI      *AR0++,AR1                 ;Get next destination address
              LDI      *AR0++,R0                  ;Get next first word
              SUBI     1,R1                       ;Count - 1
DONE
;
;       Initialize the DMA section
;
              LDP      DMACTL                     ;Get page of stored data
              LDI      @DMACTL,R0                 ;Initial control word
              LDP      DMAGCR                     ;Get DMA Global Control Register page
              STI      R0,@DMAGCR                 ;Initialize
;
;       Initialize the timer 0 section
;
              LDP      TIM0CTL                    ;Get page of stored data
              LDI      @TIM0CTL,R0                ;Initial control word
              LDP      TIM0GCR                    ;Get TIM0 Global Control Register page
              STI      R0,@TIM0GCR                ;Initialize
;
;       Initialize the timer 1 section
;
              LDP      TIM0CTL                    ;Get page of stored data
              LDI      @TIM1CTL,R0                ;Initial control word
              LDP      TIM1GCR                    ;Get TIM1 Global Control Register page
              STI      R0,@TIM1GCR                ;Initialize
;
;       Initialize the serial port 0 section
;
              LDP      SERGL00                    ;Get page of stored data
              LDI      @SERGL00,R0                ;Initial control word
              LDP      SER0GCR                    ;Get SER0 Global Control Register page
              STI      R0,@SER0GCR                ;Initialize
;
              LDP      SERPTX0                    ;Get page of stored data
              LDI      @SERPTX0,R0                ;Initial control word
              LDP      SER0XCR                    ;Get SER0 Xmit Control Register page
              STI      R0,@SER0XCR                ;Initialize
;
              LDP      SERPTR0                    ;Get page of stored data
              LDI      @SERPTR0,R0                ;Initial control word
              LDP      SER0RCR                    ;Get SER0 Rcvr Control Register page
              STI      R0,@SER0RCR                ;Initialize
;
              LDP      SERTIM0                    ;Get page of stored data
              LDI      @SERTIM0,R0                ;Initial control word
              LDP      SER0TCR                    ;Get SER0 Timer Control Register page
              STI      R0,@SER0TCR                ;Initialize
```

```
;
;       Initialize the serial port 1 section
;
        LDP     SERGLO1                 ;Get page of stored data
        LDI     @SERGLO1,R0             ;Initial control word
        LDP     SER1GCR                 ;Get SER1 Global Control Register page
        STI     R0,@SER1GCR             ;Initialize
;
        LDP     SERPTX1                 ;Get page of stored data
        LDI     @SERPTX1,R0             ;Initial control word
        LDP     SER1XCR                 ;Get SER1 Xmit Control Register page
        STI     R0,@SER1XCR             ;Initialize
;
        LDP     SERPTR1                 ;Get page of stored data
        LDI     @SERPTR1,R0             ;Initial control word
        LDP     SER1RCR                 ;Get SER1 Rcvr Control Register page
        STI     R0,@SER1RCR             ;Initialize
;
        LDP     SERTIM1                 ;Get page of stored data
        LDI     @SERTIM1,R0             ;Initial control word
        LDP     SER1TCR                 ;Get SER1 Timer Control Register page
        STI     R0,@SER1TCR             ;Initialize
;
;       Initialize the external buses
;
        LDP     XPANBCR                 ;Get page of stored address
        LDI     @XPANBCR,AR0            ;Get address of Bus Control Register
        LDP     XPANBUS                 ;Get page of stored control word
        LDI     @XPANBUS,R0             ;Initial control word
        STI     R0,*AR0                 ;Initialize
;
        LDP     PRIMBCR                 ;Get page of stored address
        LDI     @PRIMBCR,AR0            ;Get address of Bus Control Register
        LDP     PRIMBUS                 ;Get page of stored control word
        LDI     @PRIMBUS,R0             ;Initial control word
        STI     R0,*AR0                 ;Initialize
;
;       Initialize the external peripherials
;
        CALL    SYSINIT                 ;Go to subroutine
;
;       Now to execute the C program "rrt_bit()"
;
        BR      _rrt_bit                ;rrt_bit never returns.
;
        .end ;       *****************************************
;       *                                       *
;       *       SYSTEM INITIALIZATION           *
;       *                                       *
;       *****************************************
;
;       ***** SYSTEM GLOBAL DECLARATIONS *****
;
        .global SYSINIT                 ;Defined globals
        .global _PPI1, _PPI2, _PPI3
        .global _RS232, _RS422, _GPIBREGS
        .global _MEMCARD0, _MEMCARD1
;
        .global SER1XCR                 ;Referenced global
;
;       ***** UNITIALIZED SECTIONS *****
;
_RS232          .usect  "uart1regs", 0  ;Location of RS-232 registers
UART1GCR        .usect  "uart1regs", 1  ;UART #1 Buffer Register
UART1CSR        .usect  "uart1regs", 1  ;UART #1 Control/Status Register
UART1MCR        .usect  "uart1regs", 1  ;UART #1 Modem Control Register
UART1BMR        .usect  "uart1regs", 1  ;UART #1 Baud rate/Modem status Reg.
;
_PPI1           .usect  "ppi1regs", 0   ;Location of PPI1 registers
PPI1A           .usect  "ppi1regs", 1   ;PPI #1 port A
PPI1B           .usect  "ppi1regs", 1   ;PPI #1 port B
PPI1C           .usect  "ppi1regs", 1   ;PPI #1 port C
PPI1CP          .usect  "ppi1regs", 1   ;PPI #1 Control register
```

```
;
_PPI2       .usect  "ppi2regs", 0    ;Location of PPI2 registers
PPI2A       .usect  "ppi2regs", 1    ;PPI #2 port A
PPI2B       .usect  "ppi2regs", 1    ;PPI #2 port B
PPI2C       .usect  "ppi2regs", 1    ;PPI #2 port C
PPI2CP      .usect  "ppi2regs", 1    ;PPI #2 Control register
;
_PPI3       .usect  "ppi3regs", 0    ;Location of PPI3 registers
PPI3A       .usect  "ppi3regs", 1    ;PPI #3 port A
PPI3B       .usect  "ppi3regs", 1    ;PPI #3 port B
PPI3C       .usect  "ppi3regs", 1    ;PPI #3 port C
PPI3CP      .usect  "ppi3regs", 1    ;PPI #3 Control register
;
_RS422      .usect  "uart2regs", 0   ;Location of RS-422 registers
UART2GCR    .usect  "uart2regs", 1   ;UART #2 Buffer Register
UART2CSR    .usect  "uart2regs", 1   ;UART #2 Control/Status Register
UART2MCR    .usect  "uart2regs", 1   ;UART #2 Modem Control Register
UART2BMR    .usect  "uart2regs", 1   ;UART #2 Baud rate/Modem status Reg.
;
_GPIBREGS   .usect  "gpibregs", 8    ;GPIB (IEEE-488) Register
;
_MEMCARD0   .usect  "memcard0", 400000H   ;Memory Card LSH (4Mbytes)
_MEMCARD1   .usect  "memcard1", 400000H   ;Memory Card MSH (4Mbytes)
;
;       ***** SYSTEM CONSTANTS *****
;
IORESET .set    0004H                   ;I/O reset
RDELAY  .set    00FFH                   ;Reset loop counter (pulse width)
;
;       ***** DEVICE CONTROL WORDS *****
;
WORD1N8 .set    3CH                     ;UART Control Register (00111100)
                                        ;   0 => 1 stop bit
                                        ;110 => Parity disabled
                                        ; 11 => 8 bit words
                                        ; 00 => Required by part
BAUD384 .set    98H                     ;UART Baud Rate Register (10011000)
BAUD96  .set    9AH                     ;Prescaler select =    00 => 1
                                        ;    (11,10,01,00 ==> 1/(5,4,3,1))
                                        ; Divisor select = 00110 => 58/3
                                        ;       CO select =    1 => BRG OUTPUT
                                        ; Acceptable Standard Baud Rates:
                                        ;   Rate    Error  Prescaler  Divisor
                                        ;  153600   2.34      11       11111
                                        ;   76800   2.34      11       00000
                                        ;   38400   1.02      00       00110
                                        ;   19200   2.34      11       00011
                                        ;    9600   1.02      10       00110
                                        ;    4800   2.34      11       01000
                                        ;    2400   2.34      11       01001
                                        ;    1200   2.34      11       01010
                                        ;     600   2.34      11       01100
                                        ;     300   2.34      11       01111
                                        ; Maximum Possible Baud Rate:
                                        ;  750000   0.00      00       11111
STOPMD  .set    22H                     ;Modem Control Register (00100010)
                                        ;   0 => Not clear to send data
                                        ;   1 => Data set is ready
                                        ;   0 => Interrupts are enabled
                                        ; 00 => Normal operation...
                                        ;       ... (11 => Loop test)
                                        ;   1 => Receiver enabled
                                        ;   0 => Modem interrupt enabled
                                        ;   0 => Required by part
CTSMD   .set    23H                     ;Clear to send data
TESTMD  .set    3AH                     ;UART self test mode
PPI1CTL .set    81H                     ;Control word (10000001)
                                        ;   1 => Port C (lower) input
                                        ;   0 => Port B output
                                        ;   0 => Mode 0
                                        ;   0 => Port C (upper) output
                                        ;   0 => Port A output
                                        ;  00 => Mode 0
                                        ;   1 => Mode set flag active
PPI1AO  .set    00H                     ;Port 1A Output Initialization
```

```
                                        ;   0 => EW bus not selected
                                        ;   0 => AV1 bus not selected
                                        ;   0 => AV2 bus not selected
                                        ;   0 => AV3 bus not selected
                                        ;   0 => AV4 bus not selected
                                        ;   0 => PPI1A5 low (spare)
                                        ;   0 => PPI1A6 low (spare)
                                        ;   0 => PPI1A7 low (spare)
PPI1BO   .set    00H                    ;Port 1B Output Initialization
                                        ;   0 => MS-1553 Long stub selected
                                        ;   0 => MS-1553 CT grounded
                                        ;   0 => MS-1553 Primary bus selected
                                        ;   0 => MS-1553 Transformer coupled
                                        ;   0 => BOOT_EN_SMS not enabled
                                        ;   0 => BOOT_EN_RDP not enabled
                                        ;   0 => MSDRS_ON/OFF off
                                        ;   0 => PPI1B7 spare relay open
PPI1CO   .set    0F0H                   ;Port 1C upper Output Initialization
                                        ;   1 => LCD ? not active
                                        ;   1 => LCD ? not active
                                        ;   1 => LCD ? not active
                                        ;   1 => LCD ? not active
PPI2CTL  .set    89H                    ;Control word (10001001)
                                        ;Port A: output
                                        ;Port B: output
                                        ;Port C (lower): input
                                        ;Port C (upper): input
PPI2AO   .set    00H                    ;Port 2A Output initialization
                                        ;   0 => EW_OSM_EN not enabled
                                        ;   0 => EW_UDM_EN not enabled
                                        ;   0 => EXT_PROC_ON/OFF not off
                                        ;   0 => PPI2A3 spare relay open
                                        ;   0 => AV_EN1 not enabled
                                        ;   0 => AV_EN2 not enabled
                                        ;   0 => PPI2A6 low (spare)
                                        ;   0 => PPI2A7 low (spare)
PPI2BO   .set    00H                    ;Port 2B Output initialization
                                        ;   0 => PWR_ON/OFF_1 not off
                                        ;   0 => PWR_ON/OFF_2 not off
                                        ;   0 => PWR_ON/OFF_3 not off
                                        ;   0 => PWR_ON/OFF_4 not off
                                        ;   0 => IPL_1 not selected
                                        ;   0 => IPL_2 not selected
                                        ;   0 => IPL_3 not selected
                                        ;   0 => IPL_4 not selected
PPI3CTL  .set    92H                    ;Control word (10010010)
                                        ;Port A: input
                                        ;Port B: input
                                        ;Port C (lower): output
                                        ;Port C (upper): output
PPI3CO   .set    00H                    ;Port 3C Output initialization
                                        ; LED Implementation
                                        ;   0 => ERROR_LED not on
                                        ;   0 => LOAD_LED not on
                                        ;   0 => NEXT_LED not on
                                        ;   0 => VRFY_LED not on
                                        ;   0 => DONE_LED not on
                                        ;   0 => PPI3C5 low (spare)
                                        ;   0 => PPI3C6 low (spare)
                                        ;   0 => PPI3C7 low (spare)
                                        ; LCD Implementation
                                        ;     => ASCII character
         .sect   "pgm_entry"            ;Entry code for boot and rrt_main
;
;        ***** INITIALIZE SYSTEM I/O DEVICES *****
;
SYSINIT
;
         LDP     SER1XCR                ;Get page of Xmit Control Register
         LDI     @SER1XCR,R0            ;Get contents of Xmit Control Register
         OR      IORESET,R0             ;Reset peripherial devices
         STI     R0,@SER1XCR            ;Reset active
         LDI     RDELAY,AR1             ;Delay for Reset pulse width
SYSRES   DB      AR1,SYSRES
         XOR     IORESET,R0
```

```
        STI    R0,@SER1XCR          ;Reset inactive

;
        LDI    WORD1N8,R0           ;Get stop bits, parity, and word length
        LDP    UART1CSR             ;Get page of UART #1 Control Register
        STI    R0,@UART1CSR         ;Set stop bits, parity, and word length
;
        LDI    BAUD96,R0            ;Get baud rate (9,600 baud)
        LDP    UART1BMR             ;Get page of UART #1 Baud Rate Register
        STI    R0,@UART1BMR         ;Set baud rate
;
        LDI    STOPMD,R0            ;Remote not Clear To Send
        LDP    UART1MCR             ;Get page of Modem Control Register
        STI    R0,@UART1MCR         ;Set UART #1 Control Register
;
        LDP    UART1CSR             ;Get page of UART #1 Status Register
        LDI    @UART1CSR,R0         ;Clear out residual status
        LDP    _RS232               ;Get page of UART #1 Buffer Register
        LDI    @_RS232,R0           ;Clear out residual data
        LDI    @_RS232,R0
;
        LDI    PPI1CTL,R0           ;Initialize PPI1
        LDP    PPI1CP               ;Get page of PPI1 control port
        STI    R0,@PPI1CP
        LDI    PPI1AO,R0            ;Initial Port A Output
        LDP    _PPI1
        STI    R0,@_PPI1
        LDI    PPI1BO,R0            ;Initial Port B Output
        LDP    PPI1B
        STI    R0,@PPI1B
        LDI    PPI1CO,R0            ;Initial Port C Output
        LDP    PPI1C
        STI    R0,@PPI1C
;
        LDI    PPI2CTL,R0           ;Initialize PPI2
        LDP    PPI2CP               ;Get page of PPI2 control port
        STI    R0,@PPI2CP
        LDI    PPI2AO,R0            ;Initial Port A Output
        LDP    _PPI2
        STI    R0,@_PPI2
        LDI    PPI2BO,R0            ;Initial Port B Output
        LDP    PPI2B
        STI    R0,@PPI2B
;
        LDI    PPI3CTL,R0           ;Initialize PPI3
        LDP    PPI3CP               ;Get page of PPI3 control port
        STI    R0,@PPI3CP
        LDI    PPI3CO,R0            ;Initial Port C Output
        LDP    PPI3C
        STI    R0,@PPI3C
;
        LDI    WORD1N8,R0           ;Get stop bits, parity, and word length
        LDP    UART2CSR             ;Get page of UART #2 Control Register
        STI    R0,@UART2CSR         ;Set stop bits, parity, and word length
;
        LDI    BAUD96,R0            ;Get baud rate (9,600 baud)
        LDP    UART2BMR             ;Get page of UART #2 Baud Rate Register
        STI    R0,@UART2BMR         ;Set baud rate
;
        LDI    STOPMD,R0            ;Remote not Clear To Send
        LDP    UART2MCR             ;Get page of Modem Control Register
        STI    R0,@UART2MCR         ;Set UART #2 Control Register
;
        LDP    UART2CSR             ;Get page of UART #2 Status Register
        LDI    @UART2CSR,R0         ;Clear out residual status
        LDP    _RS422               ;Get page of UART #2 Buffer Register
        LDI    @_RS422,R0           ;Clear out residual data
        LDI    @_RS422,R0
;
        RETS                        ;Return to calling routine
;
        .end
```

```
/*
    ******************************
    *                            *
    *    SERIAL I/O PROCESSING   *
    *                            *
    ******************************
*/

/* filename: SERIALIO.C */

/**************************************************************************
     *          WARNING!!!         DANGER!!!        WARNING!!!                 *
     *   This code MUST be compiled with the assembly language listing         *
     *   invoked. The resulting assembly code MUST be edited to eliminate      *
     *   the ".text" assembly directive preceeding the data and string         *
     *   constants at the end of the file. If this is not done the data        *
     *   constants will be located in the ROM section (.text section) that     *
     *   can be overwritten when reprogramming the RRT. This requirement       *
     *   is necessary due to a short comming in the compiler that will not     *
     *   allow the data and string constants to be directed to the             *
     *   "pgm_entry" section.                                                  *
     **************************************************************************/

/* Locating this code in the "pgm_entry" section. */
    asm("    .sect    \"pgm_entry\"");    /* boot and rrt_main entry */

/*
    All definitions used by SERIALIO.C are defined in the
        following header files:
*/ include "rrt.h"              /* RRT configuration */
include "system.h"           /* System definitions */
#include "error.h"            /* Error definitions */

/*
    SERIALIO.C contains the following functions:
*/ int serial_get_byte(SERIAL_REG_TYPE *serial_reg);
    int serial_get_nyble(SERIAL_REG_TYPE *serial_reg);
    void serial_put_byte(int data, SERIAL_REG_TYPE *serial_reg);
    void serial_put_nyble(int data, SERIAL_REG_TYPE *serial_reg);
    int serial_receive(SERIAL_REG_TYPE *serial_reg);
    int serial_data(SERIAL_REG_TYPE *serial_reg, STATUS_REG_TYPE *status);
    void serial_send(int data, SERIAL_REG_TYPE *serial_reg);
    void serial_send_string(char *string, SERIAL_REG_TYPE *serial_reg);

/******************************************
 *           SERIAL GET BYTE              *
 ******************************************/
int serial_get_byte(SERIAL_REG_TYPE *serial_reg)
{
    /*
        serial_reg->Status_Register must not be read since the
        reception of the last character. Reading
        serial_reg->Status_Register will clear all of its bits
        and cause the detected character to be lost.
    */
    int data;
    /* Get the most significant nyble */
    data = serial_get_nyble(serial_reg);
    /* Get the least */
    data = (data << 4) + serial_get_nyble(serial_reg);

return data;
}

/**********************************************
 *           SERIAL GET NYBLE                 *
 **********************************************/
int serial_get_nyble(SERIAL_REG_TYPE *serial_reg)
{
    /*
        serial_reg->Status_Register must not be read since the
```

```
        reception of the last character.  Reading
        serial_reg->Status_Register will clear all of its bits
        and cause the detected character to be lost.
    */
    int data;

data = serial_receive(serial_reg);        /* Should be hex byte */
    if((data >= '0') && (data <= '9'))        /* Data must be valid hex number */
        return (data - '0');
    else if((data >= 'A') && (data <= 'F'))   /* Upper case hex */
        return (data - 'A' + 0x0a);
    else if((data >= 'a') && (data <= 'f'))   /* Lower case hex */
        return (data - 'a' + 0x0a);
    else
        error_hex_character(serial_reg);
}

/*********************************************
*           SERIAL PUT BYTE                  *
*********************************************/
void serial_put_byte(int data, SERIAL_REG_TYPE *serial_reg)
{
    /* Send most significant nyble */
    serial_put_nyble((data & 0x0f0) >> 4, serial_reg);
    /* Now send the least */
    serial_put_nyble(data & 0x0f, serial_reg);
}

/*********************************************
*           SERIAL PUT NYBLE                 *
*********************************************/
void serial_put_nyble(int data, SERIAL_REG_TYPE *serial_reg)
{
    if(data <= 0x09)                          /* Must send ASCII hex value */
        serial_send(data + '0', serial_reg);
    else
        serial_send(data - 0x0a + 'A', serial_reg);
}

/*********************************************
*           SERIAL RECEIVE                   *
*********************************************/
int serial_receive(SERIAL_REG_TYPE *serial_reg)
{
    /*
        serial_reg->Status_Register must not be read since
        the reception of the last character.  Reading
        serial_reg->Status_Register will clear all of its bits
        and cause the detected character to be lost.
    */

STATUS_REG_TYPE *status;
    unsigned serial_status;
    serial_status = serial_reg->Status_Register;
    status = (STATUS_REG_TYPE *) &serial_status;

if(!(status->Data_Ready))                 /* Might not have data yet */
    {
        /* Ensure ready to receive more data */
        serial_reg->Control_Register = CTS_Mode;
        while(!(status->Data_Ready))          /* Wait for received data */
        {
            serial_status = serial_reg->Status_Register;
            status = (STATUS_REG_TYPE *) &serial_status;
        }
        /* Not ready to receive any more */
        serial_reg->Control_Register = Stop_Mode;
    }
    return serial_data(serial_reg, status);
}

/*********************************************
*           SERIAL DATA                      *
*********************************************/
int serial_data(SERIAL_REG_TYPE *serial_reg, STATUS_REG_TYPE *status)
```

```
{
    /*
        serial_reg->Status_Register must be read prior to entering
        this routine.  This will ensure proper error processing
        and the return of received data.
    */
    int data;

if(status->Error)                        /* Test for errors */
        error_serial_input(serial_reg, status->Error);
    data = serial_reg->Data_Register;        /* data = received character */ serial_send(data, serial_reg);           /* Echo data back (full duplex) */ return data;
}

/************************************************
*              SERIAL SEND                      *
************************************************/
void serial_send(int data, SERIAL_REG_TYPE *serial_reg)
{
    STATUS_REG_TYPE *status;
    unsigned serial_status;

serial_status = serial_reg->Status_Register;
    status = (STATUS_REG_TYPE *) &serial_status;

serial_reg->Data_Register = data;    /* Send serial data */

/* Check for controlled communications */
    if(serial_reg->Control_Register == Stop_Mode)
        /* Wait until through sending */
        while (!(status->Transmitter_Empty))
        {
            serial_status = serial_reg->Status_Register;
            if(status->Error)            /* Did an error occur while waiting? */
            {
                send_message("\r\nSerial Receive Error\r\n", serial_reg);
                error_serial_input(serial_reg, status->Error);
            }
        }
    else                                 /* Free running communications */
    {
        /* Set Serial I/O so not ready to receive */
        serial_reg->Control_Register = Stop_Mode;
        /* Wait until data is sent */
        while (!(status->Transmitter_Empty))
        {
            serial_status = serial_reg->Status_Register;
            if(status->Error)            /* Did an error occur while waiting? */
            {
                send_message("\r\nSerial Receive Error\r\n", serial_reg);
                error_serial_input(serial_reg, status->Error);
            }
        }
        /* Set Serial I/O so ready to receive */
        serial_reg->Control_Register = CTS_Mode;
    }
}

/************************************************
*          SERIAL SEND STRING                   *
************************************************/
/* Display string message */
void serial_send_string(char *string, SERIAL_REG_TYPE *serial_reg)
{
    for(;*string != '\0';string++)           /* Send the string */
        serial_send(*string, serial_reg);
}
/* end */
```

```c
/*
    **********************
    *                    *
    *   DISPLAY MODULE   *
    *                    *
    **********************
*/

/* filename: DISPLAY.C */

/***********************************************************************
     *          WARNING!!!       DANGER!!!      WARNING!!!                 *
     *  This code MUST be compiled with the assembly language listing      *
     *  invoked.  The resulting assembly code MUST be edited to eliminate  *
     *  the ".text" assembly directive preceeding the data and string      *
     *  constants at the end of the file.  If this is not done the data    *
     *  constants will be located in the ROM section (.text section) that  *
     *  can be overwritten when reprogramming the RRT.  This requirement   *
     *  is necessary due to a short comming in the compiler that will not  *
     *  allow the data and string constants to be directed to the          *
     *  "pgm_entry" section.                                               *
     ***********************************************************************/

/* Locating this code in the "pgm_entry" section. */
    asm("   .sect   \"pgm_entry\"");     /* boot and rrt_main entry */

/*
    All definitions used by DISPLAY.C are defined in the
        following header files:
*/ include "rrt.h"                        /* RRT configuration */
include "dsp.h"                        /* DSP definitions */
#include "system.h"                     /* System definitions */
#include "timer.h"                      /* Timer definitions */
/*
    DISPLAY.C contains the following functions:
*/ void LCD_initialize(void);                        /* LCD initialize routine */
    void LCD_display(int location, char string[]);    /* LCD display routine */

/*
    Definitions of display control codes.
*/ define Control_Select      0x00    /* Clear control lines */
    #define Data_Select         0x04    /* Data Register Select */
    #define Control_Enable      0x08    /* Enable control signals to display */
    #define Data_Enable         0x0c    /* Enable data signals to display */ define Initialize          0x30    /* Initialize the display */
    #define Clear_Display       0x01    /* Clear display and return home */
    #define Entry_Mode_Set      0x06    /* Increment cursor, do not shift */
    #define Cursor_Off          0x0c    /* Cursor off */
    #define Function_Set        0x38    /* 2 lines of 5X7 dot characters */
    #define Address_Set         0x80    /* Character location */

/******************************************
 *      DISPLAY INITIALIZATION            *
 ******************************************/ void LCD_initialize(void)
{
    PPI1_REG_TYPE *control;             /* Pointer to LCD control lines */
    PPI3_REG_TYPE *display;             /* Pointer to LCD data lines */
    TIMER_REG_TYPE *timer;              /* Pointer to timer counter register */
    int i;

control = (PPI1_REG_TYPE *) &PPI1;
    display = (PPI3_REG_TYPE *) &PPI3;
    timer   = (TIMER_REG_TYPE *) &TIMER0;

/* 15 msec delay (required delay following power on) */
    for (i = 1; i <= 15; i++)
```

```c
{
    timer->Timer_Counter = MSEC1;      /* msec. delay */
    while(timer->Timer_Counter);       /* delay done when counter = 0 */
}

/* Insure all control lines are cleared */
control->LCD_Display_Control = Control_Select;

/* Initialize the display for valid busy flag */
display->RRT_Display = Initialize;
control->LCD_Display_Control = Control_Enable;
control->LCD_Display_Control = Control_Select;

/* 5 msec delay (must be >= 4.1 msec) */
for (i = 1; i <= 5; i++)
{
    timer->Timer_Counter = MSEC1;      /* msec. delay */
    while(timer->Timer_Counter);       /* delay done when counter = 0 */
}

/* Initialize command again */
control->LCD_Display_Control = Control_Enable;
control->LCD_Display_Control = Control_Select;

/* 100 usec delay */
timer->Timer_Counter = USEC100;
while(timer->Timer_Counter);       /* delay done when counter = 0 */

/* Initialize command again */
control->LCD_Display_Control = Control_Enable;
control->LCD_Display_Control = Control_Select;

/* 100 usec delay */
timer->Timer_Counter = USEC100;
while(timer->Timer_Counter);       /* delay done when counter = 0 */

/* Ensure the display is cleared */
display->RRT_Display = Clear_Display;
control->LCD_Display_Control = Control_Enable;
control->LCD_Display_Control = Control_Select;

/* 2 msec delay for display to clear (typically takes 1.64 msecs) */
for (i = 1; i <= 2; i++)
{
    timer->Timer_Counter = MSEC1;      /* msec. delay */
    while(timer->Timer_Counter);       /* delay done when counter = 0 */
}

/* Set the entry mode */
display->RRT_Display = Entry_Mode_Set;
control->LCD_Display_Control = Control_Enable;
control->LCD_Display_Control = Control_Select;

/* 50 usec delay to next character (typically takes 40 usecs)*/
timer->Timer_Counter = USEC50;
while(timer->Timer_Counter);       /* delay done when counter = 0 */

/* Cursor is off */
display->RRT_Display = Cursor_Off;
control->LCD_Display_Control = Control_Enable;
control->LCD_Display_Control = Control_Select;

/* 50 usec delay to next character (typically takes 40 usecs)*/
timer->Timer_Counter = USEC50;
while(timer->Timer_Counter);       /* delay done when counter = 0 */

/* Set the number of lines and the character size */
display->RRT_Display = Function_Set;
control->LCD_Display_Control = Control_Enable;
control->LCD_Display_Control = Control_Select;

/* 50 usec delay to next character (typically takes 40 usecs)*/
timer->Timer_Counter = USEC50;
while(timer->Timer_Counter);       /* delay done when counter = 0 */
```

```c
    /* Zero ASCII port */
    display->RRT_Display = 0;
}

/*****************************************
*          DISPLAY PROCESSING            *
*****************************************/ void LCD_display(int location, char string[])
{
    SERIAL_REG_TYPE *serial_reg;        /* Serial I/O register pointer */
    PPI1_REG_TYPE *control;             /* Pointer to LCD control lines */
    PPI3_REG_TYPE *display;             /* Pointer to LCD data lines */
    TIMER_REG_TYPE *timer;              /* Pointer to timer counter register */
    int i, serial_control_1, serial_control_2;
    /* Ensure All Serial I/O does not overrun */
    serial_reg = (SERIAL_REG_TYPE *) &RS232;
    serial_control_1 = serial_reg->Control_Register;
    serial_reg->Control_Register = Stop_Mode;
    serial_reg = (SERIAL_REG_TYPE *) &RS422;
    serial_control_2 = serial_reg->Control_Register;
    serial_reg->Control_Register = Stop_Mode;

control = (PPI1_REG_TYPE *) &PPI1;
    display = (PPI3_REG_TYPE *) &PPI3;
    timer   = (TIMER_REG_TYPE *) &TIMER0;

/* Put display in control mode */
    control->LCD_Display_Control = Control_Select;

if(location)                              /* Set character location */
    {
        display->RRT_Display = Address_Set + location;
        control->LCD_Display_Control = Control_Enable;
        control->LCD_Display_Control = Control_Select;

/* 50 usec delay to character (typically takes 40 usecs)*/
        timer->Timer_Counter = USEC50;
        while(timer->Timer_Counter);    /* delay done when counter = 0 */
    }
    else
    {                                         /* Clear the display */
        display->RRT_Display = Clear_Display;
        control->LCD_Display_Control = Control_Enable;
        control->LCD_Display_Control = Control_Select;

/* 2 msec delay for display to clear (typically takes 1.64 msecs) */
        for (i = 1; i <= 2; i++)
        {
            timer->Timer_Counter = MSEC1;    /* msec. delay */
            while(timer->Timer_Counter);    /* delay done when counter = 0 */
        }
    }

/* Now to display the data */
    control->LCD_Display_Control = Data_Select;

for(i = 0; string[i] != '\0'; i++)   /* Send characters to display */
    {
        if(string[i] == '\r')             /* Test for line #2 */
        {
            control->LCD_Display_Control = Control_Select;
            display->RRT_Display = Address_Set + DISPLAY_LINE2;
            control->LCD_Display_Control = Control_Enable;
            control->LCD_Display_Control = Control_Select;
            control->LCD_Display_Control = Data_Select;
        }
        else
        {
            /* Output the character */
            display->RRT_Display = string[i];
            control->LCD_Display_Control = Data_Enable;
            control->LCD_Display_Control = Data_Select;
        }
```

```c
        /* 50 usec delay to next character (typically takes 40 usecs)*/
        timer->Timer_Counter = USEC50;
        while(timer->Timer_Counter);   /* delay done when counter = 0 */
    }

/* Zero ASCII port */
    display->RRT_Display = 0;

/* Enable All Serial I/O */
    serial_reg = (SERIAL_REG_TYPE *) &RS232;
    serial_reg->Control_Register = serial_control_1;
    serial_reg = (SERIAL_REG_TYPE *) &RS422;
    serial_reg->Control_Register = serial_control_2;
}
/* end */
/*
    ******************************
    *                            *
    *   EEPROM PROGRAM MODULE    *
    *      Entry to "boot.c"     *
    *                            *
    ******************************
*/

/* filename: program.C */

/***********************************************************************
     *         WARNING!!!        DANGER!!!      WARNING!!!                 *
     *   This code MUST be compiled with the assembly language listing     *
     *   invoked.  The resulting assembly code MUST be edited to eliminate *
     *   the ".text" assembly directive preceeding the data and string     *
     *   constants at the end of the file.  If this is not done the data  *
     *   constants will be located in the ROM section (.text section) that *
     *   can be overwritten when reprogramming the RRT.  This requirement  *
     *   is necessary due to a short comming in the compiler that will not *
     *   allow the data and string constants to be directed to the        *
     *   "pgm_entry" section.                                              *
     ***********************************************************************/

/* Locating this code in the "pgm_entry" section */
    asm("   .sect   \"pgm_entry\"");    /* boot and rrt_main entry */
/*
    All definitions used by PROGRAM.C are defined in
        the following header files.
*/
#include "rrt.h"            /* RRT.configuration */
#include "dsp.h"            /* DSP definitions */
#include "system.h"         /* System definitions */
#include "serialio.h"       /* Serial I/O definitions */
#include "boot.h"           /* Boot definitions */

/**********************************************
 *              PROGRAM EEPROM                *
 **********************************************/
void program(SERIAL_REG_TYPE *serial_reg)
{
    int program_size;
    int i, *eeprom, *boot_program;

#ifdef LED_DISPLAY
        PPI3_REG_TYPE *display;                     /* Pointer to LEDs */
        display->RRT_Display &= ~ALL_LEDS_ON;       /* Turn off all LEDs */
    #endif ifndef LED_DISPLAY
        int location = DISPLAY_START;
        LCD_display(location, "Program Mode");   /* Display mode */
    #endif /* Program Prompt */
    serial_send_string("\r\nUpdate RRT Program\r\n", serial_reg);
```

```c
        program_size = &BOOT_STORE - &BOOT_RUN;   /* Allowed size for boot */
        eeprom = (int *) &BOOT_LOCATION;          /* Pointer to EEPROM location */
        boot_program = (int *) &BOOT_RUN;         /* Pointer to execute location */ for(i = 0; i < program_size; i++)         /* Move program to execute location */
            *(boot_program + i) = *(eeprom + i);

/* Execute boot ram routine */
        boot_main(serial_reg);
}
/* end */
/*
    *************************
    *                       *
    *   RRT BUILT IN TEST   *
    *                       *
    *************************
*/

/* filename: RRT_BIT.C */

/************************************************************************
     *           WARNING!!!        DANGER!!!       WARNING!!!               *
     *   This code MUST be compiled with the assembly language listing      *
     *   invoked.  The resulting assembly code MUST be edited to eliminate  *
     *   the ".text" assembly directive preceeding the data and string      *
     *   constants at the end of the file.  If this is not done the data   *
     *   constants will be located in the ROM section (.text section) that *
     *   can be overwritten when reprogramming the RRT.  This requirement  *
     *   is necessary due to a short comming in the compiler that will not *
     *   allow the data and string constants to be directed to the         *
     *   "pgm_entry" section.                                              *
     ************************************************************************/

/* Locating this code in the "pgm_entry" section. */
    asm("   .sect   \"pgm_entry\"");    /* boot and rrt_main entry */

/*
    All definitions used by RRT_BIT.C are defined in
        the following header files:
*/
include "rrt.h"            /* RRT configuration definitions */
#include "dsp.h"            /* DSP definitions */
#include "system.h"         /* System definitions */
#include "display.h"        /* LCD or LED display definitions */
#include "timer.h"          /* Timer definitions */
#include "program.h"        /* Program boot loader */
#include "error.h"          /* Error routines */
#include "rrt_main.h"       /* RRT main program definitions */

/* Functions used in the module */ void rrt_bit(void);
    int ms1553_test(int test_sync, int test_word);

void rrt_bit(void)
{
    int i, data, temp;
    char *string = "\r\nTesting 123\r\n";   /* RRT RS-232 and RS-422 test */
    TIMER_REG_TYPE *timer;                  /* Timer pointer */
    SERIAL_REG_TYPE *serial_reg;            /* Serial I/O register pointer */
    PPI3_REG_TYPE *switch_status;           /* Switch status pointer */ ifdef LED_DISPLAY
        PPI3_REG_TYPE *display;             /* RRT Display pointer */
        /* Test Display */
        display = (PPI3_REG_TYPE *) &PPI3;
        display->RRT_Display |= ALL_LEDS_ON;    /* Turn on all LEDs */
    #endif ifndef LED_DISPLAY
        int location = DISPLAY_START;
```

```c
    /* Initialize the LCD display */
    LCD_initialize();
    /* Display Revision # and date */
    LCD_display(location, "RRT  rev 1.01\r11/18/91");
endif /* Test internal timer and external 1MHz clock */
timer = (TIMER_REG_TYPE *) &TIMER0;
delay_timer(HALFSEC, timer);

/* Test Serial I/O */
serial_reg = (SERIAL_REG_TYPE *) &RS232;    /* First test RS-232 */
serial_reg->Control_Register = Test_Mode;
for (i = 0; *(string + i) != '\0'; i++)
{
    serial_reg->Data_Register = *(string + i);
    /* Trap until data checks */
    while(*(string + i) != serial_reg->Data_Register);
}
serial_reg->Control_Register = Stop_Mode;       /* RS-232 not receiving */ ifndef LED_DISPLAY                             /* RS-232 test OK */
    LCD_display(location, "RS-232 Test OK");
    delay_timer(HALFSEC, timer);
endif serial_reg = (SERIAL_REG_TYPE *) &RS422;    /* Next test RS-422 */
serial_reg->Control_Register = Test_Mode;
for (i = 0; *(string + i) != '\0'; i++)
{
    serial_reg->Data_Register = *(string + i);
    /* Trap until data checks */
    while(*(string + i) != serial_reg->Data_Register);
}
serial_reg->Control_Register = Stop_Mode;       /* RS-422 not receiving */ ifndef LED_DISPLAY                             /* RS-422 test OK */
    LCD_display(location, "RS-422 Test OK");
    delay_timer(HALFSEC, timer);
endif switch_status = (PPI3_REG_TYPE *) &PPI3;
if (!(switch_status->Not_Skip))     /* Update the RRT program */
{
    if(serial_reg->Terminal_Ready)  /* Is RS-422 terminal ready */
        /* Skip normal operation, Program RRT and Boot */
        program(serial_reg);
    serial_reg = (SERIAL_REG_TYPE *) &RS232;        /* Now try RS-232 */ if(serial_reg->Terminal_Ready)  /* Is the terminal ready */
        /* Skip normal operation, Program RRT and Boot */
        program(serial_reg);
}

/* Test MS-1553 encoder/decoder and transceiver */
data = 0x0561;
temp = ms1553_test(1, data);            /* Command word test */
if((temp <= data) || ((0xffff & temp) != data))
{
    #ifdef LED_DISPLAY
        display->RRT_Display |= ERROR_LED;  /* Turn Error LED On */
    #endif ifndef LED_DISPLAY
        LCD_display(location, "ERROR: MS-1553\rBIT Failure");
    #endif
    for(;;);
}
data = 0x029e;
temp = ms1553_test(0, data);            /* Data word test */
if(temp != data)
{
    #ifdef LED_DISPLAY
        display->RRT_Display |= ERROR_LED;  /* Turn Error LED On */
    #endif
```

```
        #ifndef LED_DISPLAY
            LCD_display(location, "ERROR: MS-1553\rBIT Failure");
        #endif
        for(;;);
    } ifndef LED_DISPLAY                         /* MS-1553 test OK */
        LCD_display(location, "MS-1553 Test OK");
        delay_timer(HALFSEC, timer);
    #endif /* Test Skip switch */
    while (!(switch_status->Not_Skip));

/* Test Execute switch */
    while (!(switch_status->Not_Execute));

#ifdef LED_DISPLAY
        display->RRT_Display &= ~ALL_LEDS_ON;   /* Turn off all LEDs */
    #endif rrt_main();                                 /* Execute main RRT program */
}

/************************************************
*              MS-1553 TEST                     *
************************************************/
/*
    This function sends a command or data word
    and retreives the echo for the BIT.
*/
int ms1553_test(int test_sync, int test_word)
{
    /* Register pointers for speed */
    register MS1553_DATA_REG_TYPE *data_reg;
    register MS1553_CNTL_REG_TYPE *control_reg;
    register TIMER_REG_TYPE *timer;

int temp;
    int location = DISPLAY_START;

#ifdef LED_DISPLAY
        PPI3_REG_TYPE *display;                 /* RRT Display pointer */
        display = (PPI3_REG_TYPE *) &PPI3;
    #endif data_reg = (MS1553_DATA_REG_TYPE *) &SERIAL0;
    control_reg = (MS1553_CNTL_REG_TYPE *) &SERIAL1;

timer = (TIMER_REG_TYPE *) &TIMER0;

/* Ensure shift register is empty, otherwise might lose data word */
    while(data_reg->Transmitter_Shifting);
    /* Write data to transmit data register */
    data_reg->Data_Transmit = test_word;        /* Send MS-1553 word */
    /* Ensure all previously received words are flushed */
    temp = data_reg->Data_Receive;

/* Set sync for transmit */
    if(test_sync)
    {
        /* Output Command Sync and pulse encoder enable > 1.0 usec */
        control_reg->Transmit_Control |= COMMAND_ENCODE;
        while(!(data_reg->Sending_Data));       /* Ensure sending */
        control_reg->Transmit_Control &= ~COMMAND_ENCODE;
    }
    else
    {
        control_reg->Transmit_Control |= DATA_ENCODE;   /* < 1.0 usec */
        while(!(data_reg->Sending_Data));       /* Ensure sending */
        control_reg->Transmit_Control &= ~DATA_ENCODE;
    }

/* Initilize timeout counter */
```

```c
    timer->Timer_Counter = USEC50;      /* Should respond within 50 usecs */
    /* Wait for valid sync */
    while(!(data_reg->Valid_Sync))
        if(!(timer->Timer_Counter))     /* Timeout when counter = 0 */
        {
            #ifdef LED_DISPLAY
                display->RRT_Display |= ERROR_LED;  /* Turn Error LED On */
            #endif
            #ifndef LED_DISPLAY
                LCD_display(location, "ERROR: MS-1553\rBIT No Response");
            #endif
            for(;;);
        } temp = control_reg->Command_Status_Sync;    /* Have sync */

/* Initilize timeout counter */
    timer->Timer_Counter = USEC50;      /* Should respond within 50 usecs. */
    /* Wait for valid word */
    while(!(control_reg->Valid_Word_Received))
        if(!(timer->Timer_Counter))     /* Timeout when counter = 0 */
        {
            #ifdef LED_DISPLAY
                display->RRT_Display |= ERROR_LED;  /* Turn Error LED On */
            #endif ifndef LED_DISPLAY
                LCD_display(location, "ERROR: MS-1553\rBIT No Response");
            #endif
            for(;;);
        } return ((temp << 16) | data_reg->Data_Receive);
}
/* end */
/*
    *************************************
    *                                   *
    *   RAPID REPROGRAMMING TERMINAL    *
    *                                   *
    *             (RRT)                 *
    *                                   *
    *       START OF MAIN PROGRAM       *
    *                                   *
    *************************************
*/

/* filename: RRT_MAIN.C */

/*
    All RRT I/O comes from one of the following six places:

1)  Polled RS-232 input and associated output.  The RRT will
        dialogue with Data Terminal Equipment (DTE).  If a proper
        sequence of ASCII characters (+++) is received the RRT will
        enter its command mode and transmit a menu of commands it
        will respond to for testing and/or data transferral.  While
        in the command mode all switch settings will be ignored.
    2)  Polled switch setting inputs and associated LED or LCD outputs.
        While the RRT is transferring data to/from a communications
        port (RS-232, RS-422, MS-1553, or GPIB) from/to the Memory Card,
        any activity on the other communications ports will be ignored.
    3)  Polled SRAM Memory Card status and when available Memory Card
        header information and corresponding ACFT discrete inputs
        with resulting LED or LCD outputs.
    4)  Polled MS-1553 I/O when enabled by appropriate RS-232 or
        RS-422 dialogue and/or Memory Card and ACFT discretes with
        associated switch settings.
    5)  Polled RS-422 input and associated output.  The RRT will
        dialogue with Data Terminal Equipment (DTE).  If a proper
        sequence of ASCII characters (+++) is received the RRT will
        enter its command mode and transmit a menu of commands it
        will respond to for testing and/or data transferral.  While
```

```
            in the command mode all switch settings will be ignored.
    6)    Polled GPIB input and associated output.
*/

/*
    All definitions used by RRT_MAIN.C are defined in
        the following header files:
*/ include "rrt.h"                        /* RRT configuration definitions */
include "dsp.h"                        /* DSP definitions */
#include "system.h"                     /* System definitions */
#include "serialio.h"                   /* Serial I/O definitions */
#include "display.h"                    /* LCD or LED display definitions */
#include "error.h"                      /* Error routines */
#include "cmdmode.h"                    /* Command mode definitions */
)#include "switches.h"                  /* Switch definitions */
#include "timer.h"                      /* Timer definitions */

/************************************
*           RRT_MAIN                *
*************************************/
void rrt_main(void)
{
    SERIAL_REG_TYPE *serial_reg;            /* Serial I/O register pointer */
    STATUS_REG_TYPE *status;                /* Serial I/O status pointer */
    PPI1_REG_TYPE *memory_card_status;      /* Memory card status pointer */
    PPI3_REG_TYPE *switch_status;           /* Switch status pointer */
    TIMER_REG_TYPE *timer;                  /* Pointer to timer counter register */ unsigned serial_status;
    int rs232_plus_count = 0;               /* RS-232 count */
    int rs422_plus_count = 0;               /* RS-422 count */
    int data;
    int location = DISPLAY_START;

timer = (TIMER_REG_TYPE *) &TIMER0;

for (;;)                                /* "Infinite" loop */
    {
        /* Point to RS-232 registers */
        serial_reg = (SERIAL_REG_TYPE *) &RS232;
        if (serial_reg->Terminal_Ready)     /* Test for RS-232 ready */
        {
            /* Ensure UART ready */
            serial_reg->Control_Register = CTS_Mode;
            /* Update serial communications status */
            serial_status = serial_reg->Status_Register;
            status = (STATUS_REG_TYPE *) &serial_status;
            if (status->Data_Ready)         /* Character received */
            {
                /* Process RS-232 input */
                data = serial_data(serial_reg, status);
                if (data == '+')            /* Test for command mode sequence */
                {
                    ++rs232_plus_count;
                    if (rs232_plus_count == 3)  /* Test for +++ */
                        command_mode(serial_reg);   /* Enter command mode */
                }
                else                        /* Not + character */
                    rs232_plus_count = 0;   /* Reset sequence count */
            }
        }

/* Point to RS-422 */
        serial_reg = (SERIAL_REG_TYPE *) &RS422;
        if (serial_reg->Terminal_Ready)     /* Test for RS-422 ready */
        {
            /* Ensure UART ready */
            serial_reg->Control_Register = CTS_Mode;
            /* Update serial communications status */
            serial_status = serial_reg->Status_Register;
            status = (STATUS_REG_TYPE *) &serial_status;
            if (status->Data_Ready)         /* Character received */
            {
```

```c
            /* Process RS-422 input */
            data = serial_data(serial_reg, status);
            if (data == '+')            /* Test for command mode sequence */
            {
                ++rs422_plus_count;
                if (rs422_plus_count == 3)  /* Test for +++ */
                    command_mode(serial_reg);   /* Enter command mode */
            }
            else                            /* Not + character */
                rs422_plus_count = 0;       /* Reset sequence count */
        }
    } memory_card_status = (PPI1_REG_TYPE *) &PPI1;
    switch_status = (PPI3_REG_TYPE *) &PPI3;
    if (memory_card_status->Card_Inserted)
    {
        if (!(memory_card_status->Battery_Good))
            warning_bad_battery();

#ifndef LED_DISPLAY
            else
            {
                LCD_display(location, "Card Detected\rExec to Continue");
            }
        #endif /* Test for Execute switch */
        if (!(switch_status->Not_Execute))
        {
            /* Allow time for switch to settle. */
            timer->Timer_Counter = SETTLE_TIME;
            while(timer->Timer_Counter)
                /* Make sure switches open */
                if(!(switch_status->Not_Execute))
                    timer->Timer_Counter = SETTLE_TIME;
            switches();         /* Respond to switch settings */
        }
    }
    #ifndef LED_DISPLAY
        else
        {
            LCD_display(location, "  WARNING\rCard Slot Empty");
        }
    #endif delay_timer(MSEC100, timer);
    }
}

/* end */
/*
    ************************
    *                      *
    *   TIMER.C MODULE     *
    *                      *
    ************************
*/

/* filename: TIMER.C */ include "rrt.h"                /* RRT configuration */
include "dsp.h"                /* DSP definitions */

/*
    All timer functions are listed below:
*/ void delay_timer(int time, TIMER_REG_TYPE *timer);   /* Delay timer */
void msec_timer(int amount, TIMER_REG_TYPE *timer);  /* msec. counter timer */

/*
    All timer definitions are defined below:
*/
```

```c
#define    USEC50  0xffffffce    /* Count for 50 us time */
#define    USEC100 0xffffff9c    /* Count for 100 us time */
#define    MSEC1   0xfffffc18    /* Count for 1 ms time */
#define    MSEC10  0xffffd8f0    /* Count for 10 ms time */
#define    MSEC100 0xfffe7960    /* Count for 100 ms time */
#define    HALFSEC 0xfff85ee0    /* Count for 1/2 sec time */
#define    SEC1    0xfff0bdc0    /* Count for 1 sec time */
#define    SEC2    0xffe17680    /* Count for 2 sec time */
#define    SEC10   0xff676980    /* Count for 10 sec time */
#define    MIN1    0xfc6c7900    /* Count for 1 minute time */
#define    MIN10   0xdc3cba00    /* Count for 10 minutes time */

/******************************************
*            DELAY TIMER                  *
******************************************/
void delay_timer(int time, TIMER_REG_TYPE *timer)
{
    timer->Timer_Counter = time;
    while(timer->Timer_Counter);
}

/*********************************************
*            MSEC TIMER                      *
*********************************************/
/* delay in msec */
void msec_timer(int time, TIMER_REG_TYPE *timer)
{
    int i;

for (i = 0; i < time; i++)
    {
        timer->Timer_Counter = MSEC1;    /* msec. delay */
        while(timer->Timer_Counter);     /* delay done when counter = 0 */
    }
}

/* end */
/*
    **********************
    *                    *
    *   MS-1553 MODULE   *
    *                    *
    **********************
*/

/* filename: MS1553.C */

/****************************************************************
*            WARNING!!!       DANGER!!!        WARNING!!!       *
*    This code MUST be compiled using TMS320C30 COMP/ASSEMBLER/LNK *
*    PACKAGE release 4.10, revision J, of 07 OCT 91 or later.  If *
*    this is not done labeling errors will be encountered.      *
*                                                               *
*    This code MUST be compiled using optimization to fully comply *
*    with the MS-1553A and MS-1553B response requirements.  If this *
*    is not done the ms1553_response function will not be fast enough *
*    to satisfy these requirements as specified by MS-2217.    *
*                                                               *
*    This code MUST be compiled with the assembly language listing *
*    invoked.  The resulting assembly code MUST be edited to eliminate *
*    the ".text" assembly directive preceeding the data and string *
*    constants at the end of the file.  If this is not done the data *
*    constants will be located in the ROM section (.text section). *
*    This will unnecessarily slow down the driver execution when *
*    accessing the data and string constants.                  *
****************************************************************/

/* The following code will be absolutely assembled to run in RAM */
    /* Run time label, section command, section stored, address executed */
    asm("        .asect     \"driver_rom\", 0809800h");
    /* Assigning the label "DRIVER_LOCATION" to the beginning of ROM where the
       "boot.c" routine will be stored. */
    /* label command, code location label */
    asm("        .label     DRIVER_LOCATION");
```

```c
/*
    This file provides the drivers needed for the MS-1553 bus interface.
*/
/*
    All definitions required by this program are contained in
    the following header files:
*/ include "rrt.h"              /* RRT configuration */
include "dsp.h"              /* DSP definitions */
#include "system.h"           /* System definitions */
#include "wordtype.h"         /* MS-1553 structures */
#include "timer.h"            /* Timer definitions */
#include "error.h"            /* Error definitions */

/*
    All functions contained in this file are listed below:
*/ int ms1553_send(int *message_pointer, int *status_pointer);
int ms1553_receive(int *command_pointer, int *message_pointer);
int ms1553_respond(int *command_pointer, int *message_pointer);

/** Definitions pertaining to MS-1553 usage **/ define    wait_time           0xffdd     /* Wait time (35 usecs.) */

/*************************************************
*                 MS-1553 SEND                   *
*************************************************/
/*
    This function sends a message to the RT and expects a status
    response back.  The message being sent is pointer to by the
    pointer passed as the 1st arguement in this function.

1st word is always a COMMAND word.
    The remaining words are data.

If all goes well, the STATUS word will be returned and
    pointed to by the second arguement in this function.

If a timeout error occurrs the return word will be a
    timeout error indicator.

arguments to ms1553_send are:
    int *message_pointer = pointer to command and message words
    int *status_pointer  = pointer to returned status word
    int value returned from ms1553_send is an error indicator
*/
int ms1553_send(register int *message_pointer, int *status_pointer)
{
    COMMAND_WORD_TYPE *word_field;     /* Pointer to field within word */
    int i, temp, word_count;

/* Register pointers for speed */
    /* Pointer to data registers */
    volatile register MS1553_DATA_REG_TYPE *data_reg;
    /* Pointer to control registers */
    volatile register MS1553_CNTL_REG_TYPE *control_reg;

data_reg    = (MS1553_DATA_REG_TYPE *) &SERIAL0;
    control_reg = (MS1553_CNTL_REG_TYPE *) &SERIAL1;

word_field = (COMMAND_WORD_TYPE *) message_pointer;
    word_count = word_field->Data_Word_Count;
    if (!(word_count))                    /* Value of 0 ==> count of 32 */
        word_count = 0x20;

/* Ensure not sending, otherwise might lose data word */
    while(data_reg->Sending_Data);

/* Write command to transmit data register */
    data_reg->Data_Transmit = *message_pointer++;   /* Send MS-1553 command */
    /* Set sync select for Command */
    /* Output Command Sync and pulse encoder enable > 1.0 usec */
```

```c
    control_reg->Transmit_Control |= COMMAND_ENCODE;
    while(!(data_reg->Sending_Data));        /* Ensure sending */
    control_reg->Transmit_Control &= ~COMMAND_ENCODE;
    control_reg->Transmit_Control |= DATA_ENCODE;    /* Begin data encoding */

/* Output data words */
    for(i = 1; i <= word_count; i++)
    {
        /* Write data to transmit data register */
        data_reg->Data_Transmit = *message_pointer++;   /* Send MS-1553 word */
        /* Ensure not sending, otherwise might lose data word */
        while(data_reg->Sending_Data);                  /* Wait til not sending */
        /* Pulse encoder enable, Sync select is set for Data by default */
        while(!(data_reg->Sending_Data));               /* Ensure sending data */
    }
    control_reg->Transmit_Control &= ~DATA_ENCODE;   /* End data encoding */

/* Initilize timeout counter */
    /* Will echo within wait_time. */
    data_reg->Xmit_Timer_Counter = wait_time;
    while(!(data_reg->Valid_Sync))           /* Wait for sync from last echo */
        if(!(data_reg->Xmit_Timer_Counter))   /* Timeout when counter = 0 */
            return TIMEOUT_ERROR;             /* Timeout error indication */

/* Wait for valid word flag from echo of last data word */
    while(!(control_reg->Valid_Word_Received));
    /* Flush receive from echoed word in receive buffer */
    temp = data_reg->Data_Receive;
    /* Flush receive from echoed word in receive shift register */
    temp = data_reg->Data_Receive;

/* Initilize timeout counter */
    /* Should respond within wait_time. */
    data_reg->Xmit_Timer_Counter = wait_time;
    /* Wait for valid sync */
    while(!(data_reg->Valid_Sync))
        if(!(data_reg->Xmit_Timer_Counter))   /* Timeout when counter = 0 */
            return TIMEOUT_ERROR;             /* Timeout error indication */

/* Wait for valid word flag */
    while(!(control_reg->Valid_Word_Received));

/* Return received Status word */
    *status_pointer = data_reg->Data_Receive;

return NO_ERROR;
}

/***********************************************
 *             MS-1553 RECEIVE                  *
 ***********************************************/
/*
    This function sends a command to the RT for the RT to send
    a message back to the RRT.

1st word of the return message is always a STATUS word.
    The remaining words are data.  No sync information is returned
    by this function as all data is expected to be correct when
    valid_word occurs and the word count is correct.

arguments to ms1553_receive are:
    int *command_pointer = pointer to MS-1553 command word
    int *message_pointer = pointer to Status word and message
    int value returned is an error indicator
*/
int ms1553_receive(int *command_pointer, register int *message_pointer)
{
    COMMAND_WORD_TYPE *word_field;    /* Pointer to field within word */
    int i, temp, word_count;

/* Register pointers for speed */
    /* Pointer to data registers */
    volatile register MS1553_DATA_REG_TYPE *data_reg;
    /* Pointer to control registers */
    volatile register MS1553_CNTL_REG_TYPE *control_reg;
```

```c
    data_reg = (MS1553_DATA_REG_TYPE *) &SERIAL0;
    control_reg = (MS1553_CNTL_REG_TYPE *) &SERIAL1;

word_field = (COMMAND_WORD_TYPE *) command_pointer;

if(!(word_field->Subaddress) || (word_field->Subaddress == 0X1f))
    {                                           /* Mode code designator */
        if(word_field->Data_Word_Count < 0x10)  /* Status only returned */
            word_count = 0;
        else
            word_count = 1;                     /* Data returned too */
    }
    else                                        /* Not mode code designator */
    {
        word_count = word_field->Data_Word_Count;
        if (!(word_count))                      /* Value of 0 ==> count of 32 */
            word_count = 0x20;
    }

/* Ensure not sending, otherwise might lose data word */
    while(data_reg->Sending_Data);

/* Write command to transmit data register */
    data_reg->Data_Transmit = *command_pointer;     /* Send MS-1553 command */
    /* Ensure all previously received words are flushed */
    temp = data_reg->Data_Receive;           /* Data buffer */
    temp = data_reg->Data_Receive;           /* Shift register */
    /* Set sync select for Command */
    /* Output Command Sync and pulse encoder enable > 1.0 usec */
    control_reg->Transmit_Control |= COMMAND_ENCODE;
    while(!(data_reg->Sending_Data));        /* Ensure sending */
    control_reg->Transmit_Control &= ~COMMAND_ENCODE;

/* Wait for valid word flag from echo */
    while(!(control_reg->Valid_Word_Received));
    /* Flush receive from echoed word in receive buffer */
    temp = data_reg->Data_Receive;

for(i = 0; i <= word_count; i++)         /* Status and data words */
    {
        /* Initilize timeout counter */
        /* Should respond within time. */
        data_reg->Xmit_Timer_Counter = wait_time;
        /* Wait for valid sync */
        while(!(data_reg->Valid_Sync))
            if(!(data_reg->Xmit_Timer_Counter)) /* Timeout when counter = 0 */
                return TIMEOUT_ERROR;            /* Timeout error indication */

/* Wait for valid data flag */
        while(!(control_reg->Valid_Word_Received));

*message_pointer++ = data_reg->Data_Receive;
    } return NO_ERROR;
}

/***********************************************
*          MS-1553 RESPOND                     *
***********************************************/
/*
    This function responds to the BC upon demand.
    The expected command to be received is pointed to
    by *command_pointer which is passed as the 1st
    arguement in this function.

The message being sent or received is pointed to
    by *message_pointer which is passed as the
    2nd arguement in this function.

The 1st word pointed to by message_pointer
    is the STATUS word for send messages or the
    COMMAND word for receive messages.
    The remaining words are data.
```

```
         If a timeout error occurrs the return word
         will be a timeout error indicator.

argument to ms1553_respond is:
         int *command_pointer = pointer to expected command
         int *message_pointer = pointer to message words
         int value returned is an error indicator
*/ asm("RECEIVE_CMD              .word    RECEIVE_COMMAND           ");
    asm("SEND_CMD                 .word    SEND_COMMAND              ");
    asm("ACTIVITY_CMD             .word    ACTIVITY_COMMAND          ");
    asm("KNOWN_RECEIVE_CMD        .word    KNOWN_RECEIVE_COMMAND     ");
    asm("KNOWN_SEND_CMD           .word    KNOWN_SEND_COMMAND        ");
    asm("MODE_CMD                 .word    MODE_COMMAND              ");
    asm("UNKNOWN_RECEIVE_CMD      .word    UNKNOWN_RECEIVE_COMMAND   ");
    asm("UNKNOWN_SEND_CMD         .word    UNKNOWN_SEND_COMMAND      ");
    asm("RESPONSE_TBL             .word    RESPONSE_TABLE            ");

asm("RESPONSE_TABLE           .space   64        ");  /* Vector table space */ int ms1553_respond(int *command_pointer, register int *message_pointer)
{
    COMMAND_RESPONSE_TYPE *command_field;   /* Pointer to field within word */
    int command_word;

/* Register pointers for speed */
    /* Pointer to data registers */
    volatile register MS1553_DATA_REG_TYPE *data_reg;
    /* Pointer to control registers */
    volatile register MS1553_CNTL_REG_TYPE *control_reg;
    /* Pointer to timer counter register */
    volatile register TIMER_REG_TYPE *timer0;

/* Register variables for speed */
    register int word_count, command_address;
    register int status_response, status_busy;
    register int status_service, data_service;
    register int i;

/* Setup pointers for quick response */
    data_reg = (MS1553_DATA_REG_TYPE *) &SERIAL0;
    control_reg = (MS1553_CNTL_REG_TYPE *) &SERIAL1;
    timer0 = (TIMER_REG_TYPE *) &TIMER0;

/*********************************************/
    /* The following "asm" statements setup a    */
    /* quick response vector table for           */
    /* incomming commands.                       */

/* Setup pointers to labels used to respond to commands */
    asm("   LDI     @RESPONSE_TBL,AR0       ");
    asm("   LDI     @UNKNOWN_RECEIVE_CMD,R0 ");
    for(i = 0; i < 32; i++)
        asm("   STI     R0,*AR0++   ");
    asm("   LDI     @UNKNOWN_SEND_CMD,R0    ");
    for(i = 32; i < 64; i++)
        asm("   STI     R0,*AR0++   ");

/* Customize pointers for desired commands */
    /* Address of expected command is first arguement of function */
    asm("   LDI     *-FP(2),AR0     ");  /* Expected command ptr */
    asm("   LDI     *AR0,IR0        ");  /* Expected command */
    asm("   LSH     21,IR0          ");  /* Extract table index */
    asm("   LSH     -26,IR0         ");  /* Table index */
    asm("   LDI     @RESPONSE_TBL,AR0 ");  /* Point to table */
    asm("   CMPI    32,IR0          ");  /* Test for send command */
    asm("   BGE     SEND_ENTRY      ");  /* Expect send command */ asm("   LDI     @RECEIVE_CMD,R0 ");  /* Pointer for receive */
    asm("   BR      RECEIVE_ENTRY   ");  /* Continue with table */ asm("SEND_ENTRY                 ");
    asm("   LDI     @SEND_CMD,R0    ");  /* Pointer for send */
    asm("RECEIVE_ENTRY              ");
```

```
asm("   STI     R0,*+AR0(IR0)                "); /* Update table */

/* Correct pointers for MODE, ACTIVITY, and other KNOWN commands */
asm("   LDI     @MODE_CMD,R0                 "); /* Mode commands */
asm("   STI     R0,*AR0                      ");
asm("   STI     R0,*+AR0(63)                 ");
asm("   LDI     @KNOWN_RECEIVE_CMD,R0        ");
asm("   STI     R0,*+AR0(19)                 "); /* Configuration command */
asm("   STI     R0,*+AR0(21)                 "); /* Verify command */
asm("   STI     R0,*+AR0(23)                 "); /* Reprogram Status */
asm("   LDI     @ACTIVITY_CMD,R0             ");
asm("   STI     R0,*+AR0(39)                 "); /* Unexpected Activity */
asm("   LDI     @KNOWN_SEND_CMD,R0           ");
asm("   STI     R0,*+AR0(52)                 "); /* Header command */
asm("   STI     R0,*+AR0(53)                 "); /* Load command */
asm("   STI     R0,*+AR0(54)                 "); /* Trailer command */
asm("   STI     R0,*+AR0(55)                 "); /* Error command */

/*********************************************/

/* Setup word count for expected command */
command_field = (COMMAND_RESPONSE_TYPE *) command_pointer;
word_count = command_field->Data_Word_Count;

/* Establish address of RRT */
command_address = 0xf800 & *command_pointer;

/* Setup status_response for acknowledge */
status_response = *message_pointer++;

/* Append busy for busy status */
status_busy = command_address + BUSY_STATUS;

/* Append service for service request status */
status_service = command_address + SERVICE_STATUS;
/* Generate service request data word from expected command */
data_service = 0x7ff & *command_pointer;

/* Setup structure pointer for receive command */
command_field = (COMMAND_RESPONSE_TYPE *) &command_word;

/* Clear receive register of previously received data */
command_word = data_reg->Data_Receive;
command_word = data_reg->Data_Receive;

/* Initilize timeout counter */
timer0->Timer_Counter = SEC2;          /* Should poll within 2 seconds */
while(!(control_reg->Command_Status_Sync))
{
    command_word = data_reg->Data_Receive;
    if(!(timer0->Timer_Counter))       /* Timeout when counter = 0 */
        return TIMEOUT_ERROR;          /* Timeout error indication */
}

/* Wait for valid command */
for(;;)                                /* Try until timeout occurs */
{
    /* Wait for valid word flag */
    while(!(control_reg->Valid_Word_Received));

/* Get word and test it for expected command */
    command_word = data_reg->Data_Receive;

if(command_address == (0xf800 & command_word))
    {
    /* The following "asm" commands implement the following
       illegal "C" goto command:
       goto command[command_field->Command_Response];
       The goto command requires a label as its arguement. */ asm("   LSH     21,IR0                "); 
            asm("   LSH     -26,IR0               ");
            asm("   LDI     @RESPONSE_TBL,AR0     ");
            asm("   LDI     *+AR0(IR0),AR0        ");
            asm("   BR      AR0                   ");
```

```c
        /* The following "if() goto" commands are inserted solely as
            place holders so the optimizing compiler will not discard
            the code associated with the label. */
            if(command_address == 1)
                goto receive_command;
            if(command_address == 2)
                goto send_command;
            if(command_address == 3)
                goto activity_command;
            if(command_address == 4)
                goto known_receive_command;
            if(command_address == 5)
                goto known_send_command;
            if(command_address == 6)
                goto mode_command;
            if(command_address == 7)
                goto unknown_receive_command;
            if(command_address == 8)
                goto unknown_send_command;
        } once_more:
        while(!(control_reg->Command_Status_Sync))
        {
            command_word = data_reg->Data_Receive;
            if(!(timer0->Timer_Counter))    /* Timeout when counter = 0 */
                return NOT_POLLED;          /* Timeout error indication */
        }
    }

/**************************************************************/
    /* All the following routines are executed through the above   */
    /* recreated "C" goto command.  If this code is not compiled   */
    /* with the above listed compiler labeling errors will be      */
    /* encountered.                                                */
    /**************************************************************/

/**********/
receive_command:
    asm("RECEIVE_COMMAND:");
    for(i = 1; i <= word_count; i++)
    {
        /* Initilize timeout counter */
        data_reg->Xmit_Timer_Counter = wait_time;
        /* Wait for valid sync */
        while(!(data_reg->Valid_Sync))
            if(!(data_reg->Xmit_Timer_Counter))
                return MISSING_DATA;
        /* Wait for valid word flag */
        while(!(control_reg->Valid_Word_Received));
        /* Get word and save for return */
        *message_pointer++ = data_reg->Data_Receive;
    }
    /* Write status to transmit data register */
    /* Send MS-1553 Status */
    data_reg->Data_Transmit = status_response;
    /* Set sync select for Status */
    control_reg->Transmit_Control |= COMMAND_ENCODE;
    /* Ensure sending */
    while(!(data_reg->Sending_Data));
    /* Clear Status sync */
    control_reg->Transmit_Control &= ~COMMAND_ENCODE;
    return NO_ERROR;

/**********/
send_command:
    asm("SEND_COMMAND:");
    /* Write status to transmit data register */
    data_reg->Data_Transmit = status_response;
    /* Set sync select for Status */
    control_reg->Transmit_Control |= COMMAND_ENCODE;
    /* Ensure sending */
    while(!(data_reg->Sending_Data));
    /* Clear command sync select */
    control_reg->Transmit_Control &= ~COMMAND_ENCODE;
```

```c
    /* Set sync select for Data */
    control_reg->Transmit_Control |= DATA_ENCODE;
    /* Output data words */
    for(i = 1; i <= word_count; i++)
    {
        /* Write data to transmit data register */
        data_reg->Data_Transmit = *message_pointer++;
        /* Ensure not sending */
        while(data_reg->Sending_Data);
        /* Ensure sending */
        while(!(data_reg->Sending_Data));
    }
    /* Clear data sync */
    control_reg->Transmit_Control &= ~DATA_ENCODE;
    return NO_ERROR;

/**********/
activity_command:
    asm("ACTIVITY_COMMAND:");
    data_reg->Data_Transmit = status_service;
    /* Set sync select for Status */
    control_reg->Transmit_Control |= COMMAND_ENCODE;
    /* Ensure sending */
    while(!(data_reg->Sending_Data));
    /* Clear command sync select */
    control_reg->Transmit_Control &= ~COMMAND_ENCODE;
    /* Set sync select for Data */
    control_reg->Transmit_Control |= DATA_ENCODE;
    /* Write data to transmit data register */
    data_reg->Data_Transmit = data_service;
    /* Ensure not sending */
    while(data_reg->Sending_Data);
    /* Ensure sending */
    while(!(data_reg->Sending_Data));
    /* Clear data sync */
    control_reg->Transmit_Control &= ~DATA_ENCODE;
    goto once_more;

/**********/
known_receive_command:
    asm("KNOWN_RECEIVE_COMMAND:");
    /* Setup word count */
    word_count = command_field->Data_Word_Count;
    for(i = 1; i <= word_count; i++)
    {
        /* Initilize timeout counter */
        data_reg->Xmit_Timer_Counter = wait_time;
        /* Wait for valid sync */
        while(!(data_reg->Valid_Sync))
            if(!(data_reg->Xmit_Timer_Counter))
                return MISSING_DATA;
        /* Wait for valid word flag */
        while(!(control_reg->Valid_Word_Received));
        /* Get word and save for return */
        *message_pointer++ = data_reg->Data_Receive;
    }
    /* Write status to transmit data register */
    /* Send MS-1553 Status */
    data_reg->Data_Transmit = status_busy;
    /* Set sync select for Status */
    control_reg->Transmit_Control |= COMMAND_ENCODE;
    /* Ensure sending */
    while(!(data_reg->Sending_Data));
    /* Clear Status sync */
    control_reg->Transmit_Control &= ~COMMAND_ENCODE;
    goto once_more;

/**********/
known_send_command:
    asm("KNOWN_SEND_COMMAND:");
    /* Write status to transmit data register */
    data_reg->Data_Transmit = status_busy;
    /* Set sync select for Status */
    control_reg->Transmit_Control |= COMMAND_ENCODE;
    /* Ensure sending */
```

```c
        while(!(data_reg->Sending_Data));
        /* Clear command sync select */
        control_reg->Transmit_Control &= ~COMMAND_ENCODE;
        /* Setup word count */
        word_count = command_field->Data_Word_Count;
        /* Set sync select for Data */
        control_reg->Transmit_Control |= DATA_ENCODE;
        /* Output data words */
        for(i = 1; i <= word_count; i++)
        {
            /* Write data to transmit data register */
            data_reg->Data_Transmit = *message_pointer++;
            /* Ensure not sending */
            while(data_reg->Sending_Data);
            /* Ensure sending */
            while(!(data_reg->Sending_Data));
        }
        /* Clear data sync */
        control_reg->Transmit_Control &= ~DATA_ENCODE;
        goto once_more;

/**********/
mode_command:
    asm("MODE_COMMAND:");
    switch(word_count)
    {
        case 0x00:      /* Dynamic bus control */
            /* Write status to transmit data register */
            /* Send MS-1553 Status */
            data_reg->Data_Transmit = status_response;
            /* Set sync select for Status */
            control_reg->Transmit_Control |= COMMAND_ENCODE;
            /* Ensure sending */
            while(!(data_reg->Sending_Data));
            control_reg->Transmit_Control &= ~COMMAND_ENCODE;
            return DYNAMIC_CONTROL;
        default:        /* Mode codes not implemented */
            /* Write status to transmit data register */
            /* Send MS-1553 Status */
            data_reg->Data_Transmit = status_busy;
            /* Set sync select for Status */
            control_reg->Transmit_Control |= COMMAND_ENCODE;
            /* Ensure sending */
            while(!(data_reg->Sending_Data));
            control_reg->Transmit_Control &= ~COMMAND_ENCODE;
            return NO_ERROR;
    }

/**********/
unknown_receive_command:
    asm("UNKNOWN_RECEIVE_COMMAND:");
    /* Setup word count */
    word_count = command_field->Data_Word_Count;
    for(i = 1; i <= word_count; i++)
    {
        /* Initilize timeout counter */
        data_reg->Xmit_Timer_Counter = wait_time;
        /* Wait for valid sync */
        while(!(data_reg->Valid_Sync))
            if(!(data_reg->Xmit_Timer_Counter))
                return MISSING_DATA;
        /* Wait for valid word flag */
        while(!(control_reg->Valid_Word_Received));
        /* Get word and save for return */
        *message_pointer++ = data_reg->Data_Receive;
    }
    /* Write status to transmit data register */
    /* Send MS-1553 Status */
    data_reg->Data_Transmit = status_busy;
    /* Set sync select for Status */
    control_reg->Transmit_Control |= COMMAND_ENCODE;
    /* Ensure sending */
    while(!(data_reg->Sending_Data));
    /* Clear Status sync */
    control_reg->Transmit_Control &= ~COMMAND_ENCODE;
    goto once_more;
```

```c
/*********/
unknown_send_command:
    asm("UNKNOWN_SEND_COMMAND:");
    /* Write status to transmit data register */
    data_reg->Data_Transmit = status_busy;
    /* Set sync select for Status */
    control_reg->Transmit_Control |= COMMAND_ENCODE;
    /* Ensure sending */
    while(!(data_reg->Sending_Data));
    /* Clear command sync select */
    control_reg->Transmit_Control &= ~COMMAND_ENCODE;
    /* Setup word count */
    word_count = command_field->Data_Word_Count;
    /* Set sync select for Data */
    control_reg->Transmit_Control |= DATA_ENCODE;
    /* Output data words */
    for(i = 1; i <= word_count; i++)
    {
        /* Write data to transmit data register */
        data_reg->Data_Transmit = *message_pointer++;
        /* Ensure not sending */
        while(data_reg->Sending_Data);
        /* Ensure sending */
        while(!(data_reg->Sending_Data));
    }
    /* Clear data sync */
    control_reg->Transmit_Control &= ~DATA_ENCODE;
    goto once_more;

}
/* end */
/*
    **********************************
    *                                *
    *   RRT COMMAND MODE PROCESSING  *
    *                                *
    **********************************
*/

/*
    Note:   There will be no response to any changes in the switch
            settings when the RRT is in the Command Mode.  All
            operations will be directed from the keyboard via the
            serial I/O link (RS-232 or RS-422).
*/

/*
    All definitions used by CMDMODE.C are defined in
        the following header files:
*/ include "rrt.h"            /* RRT configuration definitions */
include "system.h"         /* System definitions */
#include "serialio.h"       /* RS-232 definitions */
#include "upload.h"         /* Upload definitions */
#include "download.h"       /* Download definitions */
#include "program.h"        /* Program definitions */
#include "erase.h"          /* Erase definitions */
#include "display.h"        /* LCD display definitions */

/*********************************************
*               COMMAND MODE                 *
*********************************************/
void command_mode(SERIAL_REG_TYPE *serial_reg)
{
    int data;
    int location = DISPLAY_START;

#ifdef LED_DISPLAY
        PPI3_REG_TYPE *display;             /* RRT Display pointer */
        display = (PPI3_REG_TYPE *) &PPI3;
    #endif for (;;)                                /* Loop until get (ESC) character */
```

```c
{
    /* Display Menu */
    serial_send_string("\r\n\n   COMMAND MODE\r\n\n", serial_reg);
    serial_send_string("(ESC) = Exit\r\n", serial_reg);
    serial_send_string("  U   = Upload data to memory card\r\n",
        serial_reg);
    serial_send_string("  D   = Download data from memory card\r\n",
        serial_reg);
    serial_send_string("  E   = Erase memory card\r\n", serial_reg);
#ifdef BOOT_LOADABLE
    serial_send_string("  P   = Program update for RRT\r\n\n",
        serial_reg);
#endif
    serial_send_string("RRT>", serial_reg);

#ifndef LED_DISPLAY
    LCD_display(location,"Command Mode");   /* Display mode */
endif data = serial_receive(serial_reg);   /* Wait for serial input */ if (data == 0x1b)                /* Escape (ESC) from command mode */
    {
        /* Exit Command Mode */
        serial_send_string("\r\nExiting Command Mode\r\n", serial_reg);

#ifdef LED_DISPLAY
        display->RRT_Display &= ~ALL_LEDS_ON;
endif return;
    } if ((data == 'u') || (data == 'U'))  /* Upload command */
        upload(serial_reg);              /* Data to RRT Memory card */ if ((data == 'd') || (data == 'D'))  /* Download command */
        download(serial_reg);            /* Data from RRT Memory card */ if ((data == 'e') || (data == 'E'))  /* Erase command */
        erase(serial_reg);               /* Erase RRT Memory card */ ifdef BOOT_LOADABLE
    if ((data == 'p') || (data == 'P'))  /* RRT program command */
        program(serial_reg);             /* Update RRT program */
#endif
    }
}

/* end */
/*
    ********************************
    *                              *
    *   MEMORY CARD UPLOAD MODULE  *
    *                              *
    ********************************
*/

/* filename: UPLOAD.C */

/*
    All definitions used by UPLOAD.C are defined in
        the following header files:
*/ include "rrt.h"            /* RRT configuration */
include "dsp.h"            /* DSP definitions */
#include "system.h"         /* System definitions */
#include "serialio.h"       /* Serial I/O definitions */
#include "memcard.h"        /* Memory card definitions */
#include "display.h"        /* LCD display definitions */
```

```
/******************************************
 *              UP LOAD                    *
 ******************************************/
void upload(SERIAL_REG_TYPE *serial_reg)
{
    CARD_HEADER_TYPE *card_pointer;         /* Memory card pointer */
    PPI1_REG_TYPE *memory_card_status;      /* Memory card status pointer */
    PPI3_REG_TYPE *display;                 /* RRT Display pointer */ int i, data;
    int byte_count, low_address, record_type, checksum;
    int high_address, medium_address, card_address;
    int *data_buffer, *data_store;
    int location = DISPLAY_START;

card_pointer = (CARD_HEADER_TYPE *) &MEMCARD0;

#ifdef LED_DISPLAY
        display = (PPI3_REG_TYPE *) &PPI3;     /* Pointer to LEDs */
        display->RRT_Display &= ~ALL_LEDS_ON;  /* Turn off all LEDs */
    #endif ifndef LED_DISPLAY
        LCD_display(location, "Upload Mode");  /* Display mode */
    #endif /* Upload Prompt */
    serial_send_string("\r\nUpload data to Memory Card\r\n", serial_reg);

memory_card_status = (PPI1_REG_TYPE *) &PPI1;
    if (!(memory_card_status->Card_Inserted))
    {
        serial_send_string("\r\nNo Memory Card Detected\r\n", serial_reg);
        serial_send_string("Aborting Upload Mode\r\n", serial_reg);
        return;
    } if(card_pointer->No_Upload_To_Card)
    {
        serial_send_string("\r\nMemory Card Upload Protected\r\n",
            serial_reg);
        return;
    } data_buffer = (int *) &BOOT_STORE;        /* Data buffer location */ high_address = 0;
    medium_address = 0;

for(;;)
    {
        data = serial_receive(serial_reg);    /* Wait for character */
        while(data != ':')                    /* Wait for start of record */
        {
            if(data == 0x1b)                  /* (ESC), Abort upload */
            {
                serial_send_string("\r\nEscape from Upload\r\n", serial_reg);
                return;
            }
            data = serial_receive(serial_reg); /* Get another character */
        } byte_count = serial_get_byte(serial_reg);  /* Record byte count */
        checksum = byte_count;

low_address = serial_get_byte(serial_reg); /* Get record address */
        checksum += low_address;
        low_address = (low_address << 8) + serial_get_byte(serial_reg);
        checksum += 0x0ff & low_address;

record_type = serial_get_byte(serial_reg); /* Get the record type */
        checksum += record_type;                   /* Update the checksum */ if(record_type == 0x00)                    /* Have a data record */
        {
```

```c
#ifdef LED_DISPLAY
    display->RRT_Display |= LOAD_LED;    /* Indicate loading data */
endif ifndef LED_DISPLAY
    /* Display action */
    LCD_display(location, "Loading Record");
endif for(i = 0; i < byte_count; i++)
    {
        data = serial_get_byte(serial_reg); /* Get data byte */
        checksum += data;                   /* Update the checksum */
        *(data_buffer + i) = data;          /* Put data in buffer */
    }
    checksum += serial_get_byte(serial_reg);    /* Check checksum */
    if(checksum & 0xff)                         /* Test for error */
        error_checksum(serial_reg);

#ifndef LED_DISPLAY
    LCD_display(location, "\rRecord Verified");
endif ifdef LED_DISPLAY
    display->RRT_Display &= ~LOAD_LED;   /* Record load complete */
    display->RRT_Display |= VERIFY_LED;  /* Indicate verifying */
endif /* Start address of load */
    card_address = high_address + medium_address + low_address;

/* Transfer data to card */
    /* Data within first 4 Megs of card */
    data_store = card_address + (int *) &MEMCARD0;
    for(i = 0; ((i < byte_count)
        && (card_address + i < FOUR_MEG)); i++)
            *(data_store + i) = *(data_buffer + i);

/* Data within second 4 Megs of card */
    data_store = card_address
        + (int *) (&MEMCARD1 - FOUR_MEG) - i;
    for(; i < byte_count; i++)
        *(data_store + i) = *(data_buffer + i);

/* Verify data transferred to card */
    /* Data within first 4 Megs of card */
    data_store = card_address + (int *) &MEMCARD0;
    for(i = 0; ((i < byte_count)
        && (card_address + i < FOUR_MEG)); i++)
            if((0xff & *(data_store + i)) != *(data_buffer + i))
                error_card_verify(serial_reg);

/* Data within second 4 Megs of card */
    data_store = card_address
        + (int *) (&MEMCARD1 - FOUR_MEG) - i;
    for(; i < byte_count; i++)
        if((0xff & *(data_store + i)) != *(data_buffer + i))
            error_card_verify(serial_reg);

#ifdef LED_DISPLAY
    display->RRT_Display &= ~VERIFY_LED;    /* Verify OK */
endif ifndef LED_DISPLAY
    LCD_display(location, "\rData Verified");  /* Data verified */
#endif
}
else if(record_type == 0x01)            /* Have end of file record */
{
    checksum += serial_get_byte(serial_reg);
    if(!(byte_count) && !(low_address) && !(checksum & 0xff))
    {
#ifdef LED_DISPLAY
        display->RRT_Display |= DONE_LED;   /* File loaded */
#endif
```

```
                /* Clear flag preset in loaded card header */
                card_pointer->Loading_Card &= -1;   /* Through loading card */ return;                             /* Properly completed upload */
            }
            error_end_record(serial_reg);       /* End of File Record error */
        } else if(record_type == 0x02)            /* Have segment address record */
        {
            if(byte_count != 0x02)              /* Have 2 bytes for address */
                error_record_type(serial_reg);
            medium_address = serial_get_byte(serial_reg);
            checksum += medium_address;
            medium_address = (medium_address << 8)
                    + serial_get_byte(serial_reg);
            checksum += 0xff & medium_address;
            medium_address = medium_address << 4;
            checksum += serial_get_byte(serial_reg);
            if(checksum & 0xff)
                error_checksum(serial_reg);             /* Checksum error */
        } else if(record_type == 0x04)            /* Have linear address record */
        {
            if(byte_count != 0x02)              /* Have 2 byte for address */
                error_record_type(serial_reg);
            high_address = serial_get_byte(serial_reg);
            checksum += high_address;
            high_address = (high_address << 8) + serial_get_byte(serial_reg);
            checksum += 0xff & high_address;
            high_address = high_address << 16;
            checksum += serial_get_byte(serial_reg);
            if(checksum & 0xff)
                error_checksum(serial_reg);             /* Checksum error */
        } else
            error_record_type(serial_reg);
    }
}

/* end */
/*
    *********************************
    *                               *
    *   MEMORY CARD DOWNLOAD MODULE *
    *                               *
    *********************************
*/

/* filename: DOWNLOAD.C */

/*
    All definitions used by DOWNLOAD.C are defined in
        the following header files:
*/
include "rrt.h"            /* RRT configuration */
include "dsp.h"            /* DSP definitions */
#include "system.h"         /* System definitions */
#include "serialio.h"       /* Serial I/O definitions */
#include "memcard.h"        /* Memory card definitions */
#include "display.h"        /* LCD display definitions */

/*********************************************
*              DOWN LOAD                     *
*********************************************/
void download(SERIAL_REG_TYPE *serial_reg)
{
    CARD_HEADER_TYPE *card_pointer;             /* Memory card pointer */
    PPI1_REG_TYPE *memory_card_status;          /* Memory card status pointer */
    PPI3_REG_TYPE *display;                     /* RRT Display pointer */
```

```c
    int start_address, end_address;
    int byte_count, byte, checksum;
    int page, page_address;
    int location = DISPLAY_START;

#ifdef LED_DISPLAY
    display = (PPI3_REG_TYPE *) &PPI3;        /* Pointer to LEDs */
    display->RRT_Display &= ~ALL_LEDS_ON;     /* Turn off all LEDs */
endif ifndef LED_DISPLAY
    LCD_display(location, "Download Mode");  /* Display mode */
endif /* Prompt */
    serial_send_string("\r\nDownload data from Memory Card\r\n", serial_reg);

card_pointer = (CARD_HEADER_TYPE *) &MEMCARD0;
    memory_card_status = (PPI1_REG_TYPE *) &PPI1;

if (!(memory_card_status->Card_Inserted))
    {
        serial_send_string("\r\nNo Memory Card Detected\r\n", serial_reg);
        serial_send_string("Aborting Download Mode\r\n", serial_reg);
        return;
    } if(card_pointer->No_Download_To_PC)
    {
        serial_send_string("\r\nDownload to PC Prohibited\r\n", serial_reg);
        return;
    }

/* From address request */
    serial_send_string("\r\n    From (3 HEX bytes, hhhhhh): ", serial_reg);
    /* Get the start address (3 bytes) */
    start_address = serial_get_byte(serial_reg);
    start_address = (start_address << 8) + serial_get_byte(serial_reg);
    start_address = (start_address << 8) + serial_get_byte(serial_reg);
    page = 0;                              /* Start as if beginning at page 0 */
    page_address = start_address;

/* To address */
    serial_send_string("\r\n    To (3 HEX bytes, hhhhhh): ", serial_reg);
    /* Get the end address (3 bytes) */
    end_address = serial_get_byte(serial_reg);
    end_address = (end_address << 8) + serial_get_byte(serial_reg);
    end_address = (end_address << 8) + serial_get_byte(serial_reg);

if(end_address < start_address)        /* Addressing error */
    {
        serial_send_string("\r\nAddressing Error\r\n", serial_reg);
        return;                            /* Display menu and try again */
    }

/* Start at new line and sync up the xmit_ready flag */
    serial_send_string("\r\n", serial_reg);

for(;;)
    {
        /* Start record (Intel format) */
        serial_send_string("\r\n:", serial_reg);
        if((end_address - start_address) >= 0x20)   /* Determine byte count */
            byte_count = 0x20;
        else
            byte_count = end_address - start_address + 1;

if(!byte_count)                    /* End of data record (type 01) */
        {
            /* Output byte count (0x00) */
            serial_put_byte(byte_count, serial_reg);
            serial_put_byte(0x00, serial_reg);   /* Output null start address */
            serial_put_byte(0x00, serial_reg);
            serial_put_byte(0x01, serial_reg);   /* Output 0x01 record type */
```

```c
            serial_put_byte(0xff, serial_reg);   /* Output checksum */
            serial_send_string("\r\n\n", serial_reg);   /* New line */ ifdef LED_DISPLAY
                display->RRT_Display |= DONE_LED;        /* Indicate Done */
            #endif return;                              /* End of download to computer */
        } if(page_address >= 0x10000)      /* Output extended address record */
        {
            page += ((0xff0000 & page_address) >> 16);
            page_address &= 0xffff;
            checksum = - 0x06 - page;
            serial_put_byte(0x02, serial_reg);   /* Output byte count */
            serial_put_byte(0x00, serial_reg);   /* Output null start address */
            serial_put_byte(0x00, serial_reg);
            serial_put_byte(0x04, serial_reg);   /* Output 0x04 record type */
            serial_put_byte(0x00, serial_reg);   /* Extended address ... */
            serial_put_byte(page, serial_reg);   /* ... limited to 0x00ff */
            serial_put_byte(-0x06 - page, serial_reg);  /* Output checksum */
            serial_send_string("\r\n:", serial_reg);    /* Begin data record */
        }

/* Test for 64K boundary */
        if((0xffff & (page_address + byte_count - 1))
            < page_address)                      /* Can't cross boundary */
            byte_count = 0x10000 - page_address; /* New byte count */
        checksum = - byte_count;
        serial_put_byte(byte_count, serial_reg);    /* Output byte_count */ byte = 0xff & (page_address >> 8);       /* Output record address */
        checksum -= byte;
        serial_put_byte(byte, serial_reg);
        byte = 0xff & page_address;
        checksum -= byte;
        serial_put_byte(byte, serial_reg);

serial_put_byte(0x00, serial_reg);       /* Output record type (0x00) */ for(;byte_count; byte_count--)           /* Output data */
        {
            if(start_address < 0x400000)
                byte = *(int *)(&MEMCARD0 + start_address);
            else
                byte = *(int *)(&MEMCARD1 + start_address - 0x400000);
            start_address++;
            page_address++;
            serial_put_byte(byte, serial_reg);
            checksum -= byte;
        }
        serial_put_byte(0xff & checksum, serial_reg); /* Output checksum */
    }
}

/* end */
/*
    *********************************
    *                               *
    *    MEMORY CARD ERASE MODULE   *
    *                               *
    *********************************
*/

/* filename: ERASE.C */

/*
    All definitions used by ERASE.C are defined in
        the following header files:
*/ include "rrt.h"                    /* RRT configuration */
include "system.h"                 /* System definitions */
#include "serialio.h"               /* Serial I/O definitions */
```

```c
#include "display.h"                    /* LCD display definitions */

/*******************************************
 *             ERASE                       *
 *******************************************/
void erase(SERIAL_REG_TYPE *serial_reg)
{
    PPI1_REG_TYPE *memory_card_status;     /* Memory card status pointer */
    PPI3_REG_TYPE *display;                /* RRT Display pointer */ int i, data, *card_data;
    int location = DISPLAY_START;

#ifdef LED_DISPLAY
        display = (PPI3_REG_TYPE *) &PPI3;     /* Pointer to LEDs */
        display->RRT_Display &= -ALL_LEDS_ON;  /* Turn off all LEDs */
    #endif ifndef LED_DISPLAY
        /* Display mode */
        LCD_display(location, "  WARNING!!!\rErase Mode");
    #endif /* Erase Prompt */
    serial_send_string("\r\n  WARNING!!!\r\n", serial_reg);
    serial_send_string("Memory Card Erase Mode\r\n", serial_reg);
    serial_send_string("Erase Card? (Y/N): ", serial_reg);

data = 0;                                     /* Clear data */
    while((data != 'y') && (data != 'Y'))         /* Get character */
    {
        /* Get serial input */
        data = serial_receive(serial_reg);        /* Get character */
        if((data == 'n') || (data == 'N'))        /* If No abort */
            return;
    }
    /* Second Erase Prompt */
    serial_send_string("\r\n\r\nAre you ABSOLUTELY sure? (Y/N): ", serial_reg);

data = 0;                                     /* Clear character */
    while((data != 'y') && (data != 'Y'))         /* Get character */
    {
        /* Process serial input */
        data = serial_receive(serial_reg);        /* Get character */
        if((data == 'n') || (data == 'N'))        /* If No abort */
            return;
    } memory_card_status = (PPI1_REG_TYPE *) &PPI1;
    if (!(memory_card_status->Card_Inserted))
    {
        serial_send_string("\r\nNo Memory Card Detected\r\n", serial_reg);
        serial_send_string("Aborting Erase Mode\r\n", serial_reg);
        return;
    }
    if (memory_card_status->ROM_Card)
    {
        serial_send_string("\r\nMemory Card can not be erased\r\n",
            serial_reg);
        serial_send_string("Memory Card must be a RAM card\r\n",
            serial_reg);
        serial_send_string("Aborting Erase Mode\r\n", serial_reg);
        return;
    } serial_send_string("\r\nErasing Memory Card\r\n", serial_reg);

ifndef LED_DISPLAY
        /* Erasing Card */
        LCD_display(location, "Erasing Memory Card");
    #endif /* Erase first 4M byte section */
    card_data = (int *) &MEMCARD0;
```

```c
    for(i = 0; i < 0x400000; i++)
        *card_data++ = 0;                       /* Erase (zero) byte */

/* Erase second 4M byte section */
    card_data = (int *) &MEMCARD1;
    for(i = 0; i < 0x400000; i++)
        *card_data++ = 0;                       /* Erase (zero) byte */ serial_send_string("Verifying Memory Card Erase\r\n", serial_reg);

ifndef LED_DISPLAY
    /* Erasing Card */
    LCD_display(location, "Verifying Card Erase");
endif /* Verify first 4M byte section of card erased */
    card_data = (int *) &MEMCARD0;
    for(i = 0; i < 0x400000; i++)
        if(0xff & *card_data++)
        {
            serial_send_string("\r\nMemory Card Erase Failed\r\n", serial_reg);
            return;
        }

/* Verify second 4M byte section of card erased */
    card_data = (int *) &MEMCARD1;
    for(i = 0; i < 0x400000; i++)
        if(0xff & *card_data++)
        {
            serial_send_string("\r\nMemory Card Erase Failed\r\n", serial_reg);
            return;
        } serial_send_string("\r\nMemory Card Erased\r\n", serial_reg);
}
/* end */
/*
    ****************************
    *                          *
    *   RRT SWITCH PROCESSING  *
    *                          *
    ****************************
*/

/*  filename SWITCHES.C */

/*
    Switches:
        Exec            Execute the switch settings (active low).
        Skip            Skip the file or function (active low).
        Load/Verify     Load (active low)/Verify the data.
        Up/Down         Upload (active low)/Download the data.
        Direct/Mux      Direct (active low)/Mux interface.

The Memory Card must be in place when Exec switch is activated.
*/

/*
    All definitions used by SWITCHES.C are defined
        in the following header files:
*/ include "rrt.h"                /* RRT configuration */
include "dsp.h"                /* DSP definitions */
#include "system.h"             /* System definitions */
#include "timer.h"              /* Timer definitions */
#include "memcard.h"            /* Memory Card content definitions */
#include "lookup.h"             /* Lookup Table definitions */
#include "control.h"            /* Controller control functions */
#include "protocol.h"           /* All Protocol definitions */
#include "error.h"              /* Error routine definitions */
#include "display.h"            /* LCD display definitions */
```

```c
/*****************************************
*             SWITCHES                   *
*****************************************/
void switches(void)
{
    TIMER_REG_TYPE *timer;                  /* Pointer to timer counter register */
    PPI1_REG_TYPE *memory_card_status;      /* Memory Card status pointer */
    PPI1_REG_TYPE *ms1553_discretes;        /* MS-1553 discretes pointer */
    PPI2_REG_TYPE *equipment_discretes;     /* Equipment discretes pointer */
    PPI3_REG_TYPE *switch_status;           /* Switch status pointer */
    PPI3_REG_TYPE *discrete_pointer;        /* System discretes pointer */
    PPI3_REG_TYPE *display;                 /* RRT Display pointer */
    CARD_HEADER_TYPE *card_pointer;         /* Memory Card header pointer */
    LOOKUP_TABLE_TYPE *lookup_table_pointer;   /* Lookup table pointer */
    int i, temp, autoload, execute;
    int yes = 1, no = 0;
    int *pointer;                           /* Pointer to filename */
    int file_size;                          /* Size of binary file */
    char string[12];                        /* string to form filename */
    int return_word;
    int location = DISPLAY_START;

/* initialize structure pointers */
    timer = (TIMER_REG_TYPE *) &TIMER1;
    memory_card_status = (PPI1_REG_TYPE *) &PPI1;
    ms1553_discretes = (PPI1_REG_TYPE *) &PPI1;
    equipment_discretes = (PPI2_REG_TYPE *) &PPI2;
    switch_status = (PPI3_REG_TYPE *) &PPI3;
    discrete_pointer = (PPI3_REG_TYPE *) &PPI3;
    display = (PPI3_REG_TYPE *) &PPI3;
    card_pointer = (CARD_HEADER_TYPE *) &MEMCARD0;
    lookup_table_pointer = (LOOKUP_TABLE_TYPE *) (&MEMCARD0 +
        SIZE_CARD_HEADER);

#ifdef FLEET_VERSION
        if(!(card_pointer->Fleet_Releasable))
            error_display(NOT_RELEASED);
    #endif if(switch_status->Mux)                  /* Test ID if connected to Mux Bus */
        /* compare aircraft type against card actfid */
        if(card_pointer->Aircraft_ID != discrete_pointer->Aircraft_ID)
            error_display(ID_MISMATCH);

#ifdef LED_DISPLAY
        autoload = yes;
    #endif ifndef LED_DISPLAY
        if(card_pointer->Auto_Load_OK)
        {
            LCD_display(location, "Auto Load?");       /* Query user */
            while((switch_status->Not_Execute)  /* Wait for switch closure */
                && (switch_status->Not_Skip));
            if(!(switch_status->Not_Execute))
                autoload = yes;
            else
                autoload = no;

/* Allow time for switch to settle. */
            timer->Timer_Counter = SETTLE_TIME;
            while(timer->Timer_Counter)
                /* Make sure switches open */
                if(!(switch_status->Not_Execute)
                    || !(switch_status->Not_Skip))
                        timer->Timer_Counter = SETTLE_TIME;
            LCD_display(location, "");                 /* Clear display */
        }
        else
            autoload = no;
    #endif while (lookup_table_pointer->File_Name_MSC)        /* Execute for each file */
```

```c
{
    /* Test Aircraft Configuration Code against Aircraft Configuration */
    /* Ignore configuration if directly connected */
    if((lookup_table_pointer->Aircraft_Configuration
        == discrete_pointer->Aircraft_Configuration)
        || !(switch_status->Mux))
    {
        #ifdef LED_DISPLAY
            execute = yes;
            display->RRT_Display &= -ALL_LEDS_ON;   /* LEDS off */
        #endif ifndef LED_DISPLAY
            if(!(autoload))
            {
                /* Form filename */
                pointer = (int *) lookup_table_pointer;
                for(i = 0; i < 8; i++)
                    string[i] =  0xff & *(pointer + i);
                string[8] = '.';
                for(i = 8; i <= 10; i++)
                    string[i + 1] = 0xff & *(pointer + i);
                string[12] = 0;                /* End of string indicator */

/* Display filename and wait for response */
                LCD_display(location, &string[0]);
                while((switch_status->Not_Execute)   /* Wait for switch */
                    && (switch_status->Not_Skip));
                if(!(switch_status->Not_Execute))
                    execute = yes;
                else
                    execute = no;

/* Allow time for switch to settle. */
                timer->Timer_Counter = SETTLE_TIME;
                while(timer->Timer_Counter)
                    /* Make sure switches open */
                    if(!(switch_status->Not_Execute)
                        || !(switch_status->Not_Skip))
                            timer->Timer_Counter = SETTLE_TIME;
            }
            else
                execute = yes;
        #endif if(execute)                             /* Execute the operation */
        {
            /* Characterize MS-1553 bus */
            temp = ms1553_discretes->MS1553_Bus_Discretes;
            if(lookup_table_pointer->Center_Tap_Grounded)
                temp |= CENTERTAP_GND;
            if(lookup_table_pointer->Short_Stub_Coupled)
                temp |= SHORT_STUB;

ms1553_discretes->MS1553_Bus_Discretes = temp;
            delay_timer(SETTLE_TIME, timer);        /* Let relays settle */

/* Select MS-1553 bus */
            switch(lookup_table_pointer->Primary_Bus)
            {
                case 0x00:                      /* Not used at this time */
                    break;
                case 0x01:
                    ms1553_discretes->MS1553_Bus_Select = AV1_BUS;
                    break;
                case 0x02:
                    ms1553_discretes->MS1553_Bus_Select = AV2_BUS;
                    break;
                case 0x03:
                    ms1553_discretes->MS1553_Bus_Select = AV3_BUS;
                    break;
                case 0x04:
                    ms1553_discretes->MS1553_Bus_Select = AV4_BUS;
                    break;
```

```c
            case 0x05:
                ms1553_discretes->MS1553_Bus_Select = EW_BUS;
                break;
            default:                    /* Not used at this time */
                error_display(BUS_SELECT);
                break;
    }
    delay_timer(SETTLE_TIME, timer);        /* Let relays settle */

/* Check if an AYK-14 is the normal Bus Controller */
    if(lookup_table_pointer->AYK14_Normal_BC)
    {
        /* Set power off/on discretes */
        temp = equipment_discretes->AYK14_Discretes;
        temp |= lookup_table_pointer->AYK14_Power_Off;
        equipment_discretes->AYK14_Discretes = temp;
        delay_timer(SETTLE_TIME, timer);    /* Let relays settle */

/* Check if reprogramming an AYK14 */
        if(lookup_table_pointer->AYK14_AV)
        {
            /* Set IPL to reprogram AYK14 */
            temp = lookup_table_pointer->AYK14_IPL << 4;
            temp |= equipment_discretes->AYK14_Discretes;
            equipment_discretes->AYK14_Discretes = temp;
            /* Let relays settle */
            delay_timer(SETTLE_TIME, timer);

/* Release power off/on for AYK-14 */
            temp = equipment_discretes->AYK14_Discretes;
            temp &= -lookup_table_pointer->AYK14_AV;
            equipment_discretes->AYK14_Discretes = temp;
            /* Let relays settle */
            delay_timer(SETTLE_TIME, timer);

/* Release IPL */
            temp = -lookup_table_pointer->AYK14_IPL << 4;
            temp &= equipment_discretes->AYK14_Discretes;
            equipment_discretes->AYK14_Discretes = temp;
            /* Let relays settle */
            delay_timer(SETTLE_TIME, timer);
        }
        else
        {
            /* Set reprogram enable discretes */
            temp = ((lookup_table_pointer->AV_Reprogram_Enable_2
                << 1)
                + lookup_table_pointer->AV_Reprogram_Enable_1)
                << 4;
            temp |= equipment_discretes->EW_AV_Discretes;
            equipment_discretes->EW_AV_Discretes = temp;
            /* Let relays settle */
            delay_timer(SETTLE_TIME, timer);
        }
    }
    else
    {
        /* Activate discretes for BC initiated polling */
        temp =
            (lookup_table_pointer->EW_UDM_Repro_Enable << 1)
            + lookup_table_pointer->EW_OSM_Repro_Enable;
        equipment_discretes->EW_AV_Discretes = temp;

/* Check if operation begins as an RT */
        if((lookup_table_pointer->RRT_Terminal_Mode != ALWAYS_BC)
            && switch_status->Mux)
        {
            /* Check bus for polling */
            return_word = bus_polling(lookup_table_pointer);
            if(return_word)
                error_display(return_word);     /* Polling error */

/* Acquire control of bus if directed */
            switch(lookup_table_pointer->RRT_Terminal_Mode)
```

```
        {
            case CONVERTS_TO_BC:
                convert_to_BC(lookup_table_pointer);
                break;
            case ALWAYS_RT:
                break;
            case QUIETS_BC:
                quiet_BC(lookup_table_pointer);
                break;
            default:
                error_display(TERMINAL_MODE);
                break;
        }
    }
    else
    {
        /* Let relays settle */
        delay_timer(SETTLE_TIME, timer);
        /* Check for unwanted bus activity */
        return_word = bus_polling(lookup_table_pointer);
        if(return_word != TIMEOUT_ERROR)
            error_display(BUS_ACTIVE);
    }
}

/* Select the appropriate protocol and execute it */
switch(lookup_table_pointer->Protocol)   /* Select protocol */
{
    case 0x01:
        /* Appendix B protocol */
        protocol_b(lookup_table_pointer);
        break;
    case 0x02:
        /* Appendix C protocol */
        protocol_c(lookup_table_pointer);
        break;
    case 0x03:
        /* Appendix D protocol */
        protocol_d(lookup_table_pointer);
        break;
    case 0x04:
        /* Appendix E protocol */
        protocol_e(lookup_table_pointer);
        break;
    case 0x06:
        /* Appendix G protocol */
        protocol_g(lookup_table_pointer);
        break;
    case 0x07:
        /* Appendix H protocol */
        protocol_h(lookup_table_pointer);
        break;
    case 0x08:
        /* F SMS core protocol */
        protocol_f_core(lookup_table_pointer);
        break;
    case 0x09:
        /* F SMS EEPROM protocol*/
        protocol_f_eeprom(lookup_table_pointer);
        break;
    case 0x0a:
        /* Appendix F SDC protocol */
        protocol_f_sdc(lookup_table_pointer);
        break;
    default:
        /* Illegal protocol */
        error_display(PROTOCOL_SELECT);
        break;
}

/* Return control if an AYK-14 was not the Bus Controller */
if(!(lookup_table_pointer->AYK14_Normal_BC))
{
    /* Check if operation began as an RT */
```

```
            if((lookup_table_pointer->RRT_Terminal_Mode != ALWAYS_BC)
                && switch_status->Mux)
            {
                /* Release control of bus */
                switch(lookup_table_pointer->RRT_Terminal_Mode)
                {
                    case CONVERTS_TO_BC:
                        return_to_RT(lookup_table_pointer);
                        break;
                    case QUIETS_BC:
                        enable_BC(lookup_table_pointer);
                        break;
                    default:
                        error_display(TERMINAL_MODE);
                        break;
                }
            }
        }

/* Ensure all equipment discretes are cleared */
            equipment_discretes->EW_AV_Discretes = 0;
            equipment_discretes->AYK14_Discretes = 0;
            delay_timer(SETTLE_TIME, timer);        /* Let relays settle */
        }
    }

/* Point to next possible file's lookup table */
    file_size = (((((lookup_table_pointer->File_Size_MSB << 8)
            + lookup_table_pointer->File_Size_2SB) << 8)
        + lookup_table_pointer->File_Size_3SB) << 8)
        + lookup_table_pointer->File_Size_LSB;

temp = (int) lookup_table_pointer;
    lookup_table_pointer = (LOOKUP_TABLE_TYPE *) (temp
        + SIZE_LOOKUP_TABLE + file_size);
    }
    LCD_display(location, "All Files Processed\rExec to Continue");
    while(switch_status->Not_Execute);          /* Wait for switch */ return;
}

/* end */
/*
    **********************
    *                    *
    *   CONTROL MODULE   *
    *                    *
    **********************
*/

/* filename: CONTROL.C */

/*
    All definitions used by CONTROL.C are defined in the
        following header files:
*/ include "rrt.h"                /* RRT configuration */
include "dsp.h"                /* DSP definitions */
#include "system.h"             /* System definitions */
#include "memcard.h"            /* Memory card definitions */
#include "ms1553.h"             /* MS-1553 definitions */
#include "wordtype.h"           /* Word typed definitions */
#include "timer.h"              /* Timer definitions */
#include "error.h"              /* Error definitions */
#include "display.h"            /* LCD display definitions */
#include "lookup.h"

/*
    CONTROL.C contains the following functions:
*/ int bus_polling(LOOKUP_TABLE_TYPE *lookup_table_pointer);
```

```
    void convert_BC_to_RT(LOOKUP_TABLE_TYPE *lookup_table_pointer);
    void quiet_BC(LOOKUP_TABLE_TYPE *lookup_table_pointer);
    void enable_BC(LOOKUP_TABLE_TYPE *lookup_table_pointer);
    void return_BC_to_BC(LOOKUP_TABLE_TYPE *lookup_table_pointer);

/* Defined reprogram control codes */ define EXECUTE             0x01
    #define REVERT_TO_BC        0x02
    #define BC_QUIET            0x04
    #define BC_TO_RT            0x08 define dynamic_acceptance  0x0002    /* Acceptance of bus control */
    #define dynamic_offer       0x0400    /* Offer of bus control */

/*********************************
*          BUS POLLING           *
*********************************/ int bus_polling(LOOKUP_TABLE_TYPE *lookup_table_pointer)
{
    int message[33];                /* Allow for maximum return message size */
    int return_word;
    int command_word;

command_word = (lookup_table_pointer->RRT_RT_Address << 11) + ACTIVITY;

/* Busy response */
    message[0] = (lookup_table_pointer->RRT_RT_Address << 11) + BUSY_STATUS;
    message[1] = BUSY_DATA;

return_word = ms1553_respond(&command_word, &message[0]);
    /* Filter out DYNAMIC_CONTROL response */
    if(return_word == DYNAMIC_CONTROL)
        return NO_ERROR;

return return_word;
}

/*************************************
*        CONVERT BC TO RT            *
*************************************/ void convert_BC_to_RT(LOOKUP_TABLE_TYPE *lookup_table_pointer)
{
    TIMER_REG_TYPE *timer;
    int message[33];
    int return_word;
    int command_word;

/* MS-1553 routine uses TIMER0 */
    timer = (TIMER_REG_TYPE *) &TIMER1;

command_word = (lookup_table_pointer->RRT_RT_Address << 11) + ACTIVITY;

message[0] = (lookup_table_pointer->RRT_RT_Address << 11)
        + dynamic_acceptance;

/* Initilize timeout counter */
    timer->Timer_Counter = SEC2;        /* Should respond within 2 seconds */ while(timer->Timer_Counter)
    {
        return_word = ms1553_respond(&command_word, &message[0]);
        if(return_word == DYNAMIC_CONTROL)
            return;
    } error_display(DYNAMIC_CONTROL);     /* Unable to gain control of bus */
}

/*********************************
*           QUIET BC             *
*********************************/
```

```c
void quiet_BC(LOOKUP_TABLE_TYPE *lookup_table_pointer)
{
    int command, message[33], return_word;
    /* Reprogramming control message, quiet controller */
    /* Enter expected command */
    command = (lookup_table_pointer->RRT_RT_Address << 11)
        + REPROGRAM_CONTROL_REQ;

/* Status word containing RRT RT address */
    message[0] = 0xf800 & command;

/* Data */
    message[1] = (lookup_table_pointer->BC_Nomenclature_MSC << 8)
        + (lookup_table_pointer->BC_Nomenclature_2SC);   /* RT nomenclature */
    message[2] = (lookup_table_pointer->BC_Nomenclature_3SC << 8)
        + (lookup_table_pointer->BC_Nomenclature_4SC);
    message[3] = (lookup_table_pointer->BC_Nomenclature_5SC << 8)
        + (lookup_table_pointer->BC_Nomenclature_LSC);
    message[4] = (lookup_table_pointer->Area_1_Fill_Data << 10) + BC_QUIET;

/* Submit status and data words */
    return_word = ms1553_respond(&command, &message[0]);
    if(return_word)
        error_display(return_word);          /* Return MS-1553 error */
}

/*********************************
*          ENABLE BC             *
*********************************/ void enable_BC(LOOKUP_TABLE_TYPE *lookup_table_pointer)
{
    int command, message[33], return_word;

/* Reprogramming control message, quiet controller */
    /* Enter expected command */
    command = (lookup_table_pointer->RRT_RT_Address << 11)
        + REPROGRAM_CONTROL_REQ;

/* Status word containing RRT RT address */
    message[0] = 0xf800 & command;

/* Data */
    message[1] = (lookup_table_pointer->BC_Nomenclature_MSC << 8)
        + (lookup_table_pointer->BC_Nomenclature_2SC);   /* RT nomenclature */
    message[2] = (lookup_table_pointer->BC_Nomenclature_3SC << 8)
        + (lookup_table_pointer->BC_Nomenclature_4SC);
    message[3] = (lookup_table_pointer->BC_Nomenclature_5SC << 8)
        + (lookup_table_pointer->BC_Nomenclature_LSC);
    message[4] = (lookup_table_pointer->Area_1_Fill_Data << 10) + EXECUTE;

/* Submit status and data words */
    return_word = ms1553_respond(&command, &message[0]);
    if(return_word)
        error_display(return_word);          /* Return MS-1553 error */
}

/***************************************
*          RETURN BC TO BC             *
***************************************/ void return_BC_to_BC(LOOKUP_TABLE_TYPE *lookup_table_pointer)
{
    TIMER_REG_TYPE *timer;
    STATUS_WORD_TYPE *word_field;
    int command, return_word;
    int status;

/* MS-1553 routine uses TIMER0 */
    timer = (TIMER_REG_TYPE *) &TIMER1;

/* Bus Control Offer */
    command = (lookup_table_pointer->BC_RT_Address << 11)
        + dynamic_offer;
```

```c
    /* Initilize timeout counter */
    timer->Timer_Counter = SEC2;          /* Allow 2 seconds for turnover */ while(timer->Timer_Counter)
    {
        /* Get status and data words */
        return_word = ms1553_receive(&command, &status);
        if(return_word)
            error_display(return_word);       /* Return MS-1553 error */

/* Check return address */
        word_field = (STATUS_WORD_TYPE *) &status;
        if(word_field->Terminal_Address != lookup_table_pointer->RT_Address)
            error_display(ADDRESS_ERROR);     /* Address error */

/* Check for bus acceptance */
        if(word_field->Bus_Acceptance)
            return;
    }
    error_display(DYNAMIC_RETURN);
}

/* end */
```

```
;       *********************************
;       *                               *
;       *     INTERRUPT ROUTINES         *
;       *                               *
;       *     ASSEMBLY LANGUAGE          *
;       *                               *
;       *********************************
;
        .global DMA, ISR0, ISR1, ISR2, ISR3
        .global TIME0, TIME1, XMT0, RCV0, XMT1, RCV1
        .global TRP0, TRP1, TRP2
;
        .text                           ;This code resides in ROM
;
DMA
        RETI
;
ISR0
        RETI
;
ISR1
        RETI
;
ISR2
        RETI
;
ISR3
        RETI
;
TIME0
        RETI
;
TIME1
        RETI
;
XMT0
        RETI
;
RCV0
        RETI
;
XMT1
        RETI
;
RCV1
        RETI
;
TRP0
        RETI
;
```

```
TRP1
        RETI
;
TRP2
        RETI
;
        .end
/*
    *********************
    *                   *
    *   ERROR MODULE    *
    *                   *
    *********************
*/

/* filename: ERROR.C */

/*  This file has all the error functions */

/*
    All definitions used by ERROR.C are defined in the
        following header files:
*/ include "rrt.h"                        /* RRT configuration definitions */
include "system.h"                     /* System definitions */

/*
    All functions contained in this file are listed below:
/* void warning_bad_battery(void);
    void error_hex_character(SERIAL_REG_TYPE *serial_reg);
    void error_serial_input(SERIAL_REG_TYPE *serial_reg, int error);
    void error_checksum(SERIAL_REG_TYPE *serial_reg);
    void error_card_verify(SERIAL_REG_TYPE *serial_reg);
    void error_end_record(SERIAL_REG_TYPE *serial_reg);
    void error_record_type(SERIAL_REG_TYPE *serial_reg);
    void error_display(int error);

#define NO_ERROR            0x00000000  /* No error indication */
    #define TIMEOUT_ERROR       0x10000000  /* MS-1553 timeout indication */
    #define DYNAMIC_CONTROL     0x20000000  /* MS-1553 dynamic control */
    #define DYNAMIC_RETURN      0x30000000  /* MS-1553 dynamic return */
    #define NOT_POLLED          0x40000000  /* MS-1553 not being polled */
    #define MISSING_DATA        0x50000000  /* MS-1553 data missing */
    #define UNEXPECTED_COMMAND  0x60000000  /* MS-1553 unexpected command */
    #define BUSY_CONDITION      0x01000000  /* Message busy indication */
    #define ADDRESS_ERROR       0x02000000  /* Message address error */
    #define HEADER_ERROR        0x00100000  /* Protocol header error */
    #define VERIFY_ERROR        0x00200000  /* Protocol verify error */
    #define CHECKSUM_ERROR      0x00300000  /* Protocol checksum error */
    #define MEMORY_AREA         0x00400000  /* Protocol memory area error */
    #define DOWNLOAD_VERIFY     0x00500000  /* Protocol download or verify */
    #define TRANSFER_MODE       0x00600000  /* Protocol invalid mode */
    #define HEADER_TYPE         0x00700000  /* Protocol invalid header type */
    #define NO_CARD             0x00010000  /* Switches no memory card */
    #define ID_MISMATCH         0x00020000  /* Switches aircraft id error */
    #define BUS_SELECT          0x00030000  /* Switches bus selection error */
    #define TERMINAL_MODE       0x00040000  /* Switches terminal mode error */
    #define PROTOCOL_SELECT     0x00050000  /* Switches invalid protocol */
    #define FILE_SIZE           0x00060000  /* Switches file size error */
    #define NOT_RELEASED        0x00070000  /* Switches data not released */
    #define BUS_ACTIVE          0x00080000  /* Switches unwanted activity */

/**********************************************
*           RRT ERROR PROCESSING              *
**********************************************/ void warning_bad_battery(void)
{
    PPI3_REG_TYPE *switch_status;           /* RRT Switch pointer */ ifdef LED_DISPLAY
```

```c
        PPI3_REG_TYPE *display;              /* RRT Display pointer */
        display = (PPI3_REG_TYPE *) &PPI3;
        display->RRT_Display |= ERROR_LED;   /* Turn Error LED On */
    #endif ifndef LED_DISPLAY
        int location = DISPLAY_START;
        LCD_display(location, "WARNING: Card\rBad Battery");
    #endif /* Wait for Skip switch to continue */ switch_status = (PPI3_REG_TYPE *) &PPI3;
    while (switch_status->Not_Skip);

#ifdef LED_DISPLAY
        display->RRT_Display &= -ERROR_LED;  /* Turn LED OFF */
    #endif
} void error_hex_character(SERIAL_REG_TYPE *serial_reg)
{
    #ifdef LED_DISPLAY
        PPI3_REG_TYPE *display;              /* RRT Display pointer */
        display = (PPI3_REG_TYPE *) &PPI3;
        display->RRT_Display |= ERROR_LED;   /* Turn Error LED On */
    #endif ifndef LED_DISPLAY
        int location = DISPLAY_START;
        if(serial_reg == (SERIAL_REG_TYPE *) &RS232)
            LCD_display(location, "ERROR: RS-232\rBad HEX Char.");
        else
            LCD_display(location, "ERROR: RS-422\rBad HEX Char.");
    #endif serial_send_string("\r\nBad HEX Character\r\n", serial_reg);

for(;;);                                 /* Permanent trap */
} void error_serial_input(SERIAL_REG_TYPE *serial_reg, int error)
{
    #ifdef LED_DISPLAY
        PPI3_REG_TYPE *display;              /* RRT Display pointer */
        display = (PPI3_REG_TYPE *) &PPI3;
        display->RRT_Display |= ERROR_LED;   /* Turn Error LED On */
    #endif ifndef LED_DISPLAY
        int location = DISPLAY_START;
        switch(error)                        /* Determine error */
        {
            case Framing_Error:
                if(serial_reg == (SERIAL_REG_TYPE *) &RS232)
                    LCD_display(location, "ERROR: RS-232\rFraming Error");
                else
                    LCD_display(location, "ERROR: RS-422\rFraming Error");
                break;
            case Overrun_Error:
                if(serial_reg == (SERIAL_REG_TYPE *) &RS232)
                    LCD_display(location, "ERROR: RS-232\rOverrun Error");
                else
                    LCD_display(location, "ERROR: RS-422\rOverrun Error");
                break;
            case Parity_Error:
                if(serial_reg == (SERIAL_REG_TYPE *) &RS232)
                    LCD_display(location, "ERROR: RS-232\rParity Error");
                else
                    LCD_display(location, "ERROR: RS-422\rParity Error");
                break;
        }
    #endif switch(error)                            /* Determine error */
```

```c
    {
        case Framing_Error:
            serial_send_string("\r\nFraming Error\r\n", serial_reg);
            break;
        case Overrun_Error:
            serial_send_string("\r\nOverrun Error\r\n", serial_reg);
            break;
        case Parity_Error:
            serial_send_string("\r\nParity Error\r\n", serial_reg);
            break;
    } for(;;);                            /* Permanent trap */
} void error_checksum(SERIAL_REG_TYPE *serial_reg)
{
    #ifdef LED_DISPLAY
        PPI3_REG_TYPE *display;         /* RRT Display pointer */
        display = (PPI3_REG_TYPE *) &PPI3;
        display->RRT_Display |= ERROR_LED;  /* Indicate error */
    #endif ifndef LED_DISPLAY
        int location = DISPLAY_START;
        if(serial_reg == (SERIAL_REG_TYPE *) &RS232)
            LCD_display(location, "ERROR: RS-232\rRecord Checksum");
        else
            LCD_display(location, "ERROR: RS-422\rRecord Checksum");
    #endif serial_send_string("\r\nChecksum Error\r\n", serial_reg);
    serial_send_string("Abort Upload and Press RESET on RRT\r\n", serial_reg);

for(;;);                            /* Permanent Trap */
} void error_card_verify(SERIAL_REG_TYPE *serial_reg)
{
    #ifdef LED_DISPLAY
        PPI3_REG_TYPE *display;         /* RRT Display pointer */
        display = (PPI3_REG_TYPE *) &PPI3;
        display->RRT_Display |= ERROR_LED;  /* Indicate error */
    #endif ifndef LED_DISPLAY
        int location = DISPLAY_START;
        LCD_display(location, "ERROR: Card\rData Verify Failure");
    #endif serial_send_string("\r\nMemory Card Verify Error\r\n", serial_reg);
    serial_send_string("Abort Upload and Press RESET on RRT\r\n", serial_reg);

for(;;);                            /* Permanent Trap */
} void error_end_record(SERIAL_REG_TYPE *serial_reg)
{
    #ifdef LED_DISPLAY
        PPI3_REG_TYPE *display;         /* RRT Display pointer */
        display = (PPI3_REG_TYPE *) &PPI3;
        display->RRT_Display |= ERROR_LED;  /* Indicate error */
    #endif ifndef LED_DISPLAY
        int location = DISPLAY_START;
        if(serial_reg == (SERIAL_REG_TYPE *) &RS232)
            LCD_display(location, "ERROR: RS-232\rEnd of File Record");
        else
            LCD_display(location, "ERROR: RS-422\rEnd of File Record");
    #endif serial_send_string("\r\nEnd of File Record Error\r\n", serial_reg);
    serial_send_string("Abort Upload and Press RESET on RRT\r\n", serial_reg);
```

```c
        for(;;);                                    /* Permanent Trap */
} void error_record_type(SERIAL_REG_TYPE *serial_reg)
{
    #ifdef LED_DISPLAY
        PPI3_REG_TYPE *display;                     /* RRT Display pointer */
        display = (PPI3_REG_TYPE *) &PPI3;
        display->RRT_Display |= ERROR_LED;          /* Indicate error */
    #endif ifndef LED_DISPLAY
        int location = DISPLAY_START;
        if(serial_reg == (SERIAL_REG_TYPE *) &RS232)
            LCD_display(location, "ERROR: RS-232\rRecord Type");
        else
            LCD_display(location, "ERROR: RS-422\rRecord Type");
    #endif serial_send_string("\r\nRecord Type Error\r\n", serial_reg);
    serial_send_string("Abort Upload and Press RESET on RRT\r\n", serial_reg);

for(;;);                                        /* Permanent Trap */
} void error_display(int error)
{
    #ifdef LED_DISPLAY
        PPI3_REG_TYPE *display;                     /* RRT Display pointer */
        display = (PPI3_REG_TYPE *) &PPI3;
        display->RRT_Display |= ERROR_LED;          /* Turn Error LED On */
    #endif ifndef LED_DISPLAY
        int location = DISPLAY_START;
        switch(error)
        {
            case TIMEOUT_ERROR:
                LCD_display(location, "ERROR: MS-1553\rNo Response");
                break;
            case DYNAMIC_CONTROL:
                LCD_display(location, "ERROR: MS-1553\rDynamic Control");
                break;
            case DYNAMIC_RETURN:
                LCD_display(location, "ERROR: MS-1553\rDynamic Return");
                break;
            case NOT_POLLED:
                LCD_display(location, "ERROR: MS-1553\rNot Polled");
                break;
            case MISSING_DATA:
                LCD_display(location, "ERROR: MS-1553\rMissing Data");
                break;
            case UNEXPECTED_COMMAND:
                LCD_display(location, "ERROR: MS-1553\rCommand Not Utilized");
                break;
            case BUSY_CONDITION:
                LCD_display(location, "ERROR: MS-1553\rBusy Response");
                break;
            case ADDRESS_ERROR:
                LCD_display(location, "ERROR: MS-1553\rInvalid Address");
                break;
            case HEADER_ERROR:
                LCD_display(location, "ERROR: Card\rInvalid Header");
                break;
            case VERIFY_ERROR:
                LCD_display(location, "ERROR: MS-1553\rData Verify");
                break;
            case CHECKSUM_ERROR:
                LCD_display(location, "ERROR: MS-1553\rData Checksum");
                break;
            case MEMORY_AREA:
                LCD_display(location, "ERROR: Card\rMemory Area");
                break;
            case DOWNLOAD_VERIFY:
                LCD_display(location, "Download/Verify\rNot Allowed");
```

```c
                break;
            case TRANSFER_MODE:
                LCD_display(location, "ERROR: Card\rTransfer Mode");
                break;
            case HEADER_TYPE:
                LCD_display(location, "ERROR: Card\rHeader Type");
                break;
            case NO_CARD:
                LCD_display(location, "ERROR: Card\rMissing");
                break;
            case ID_MISMATCH:
                LCD_display(location, "ERROR: ACFT\rID Mismatch");
                break;
            case BUS_SELECT:
                LCD_display(location, "ERROR: Card\rInvalid Bus");
                break;
            case TERMINAL_MODE:
                LCD_display(location, "ERROR: Card\rTerminal Mode");
                break;
            case PROTOCOL_SELECT:
                LCD_display(location, "ERROR: Card\rInvalid Protocol");
                break;
            case FILE_SIZE:
                LCD_display(location, "ERROR: Card\rInvalid File Size");
                break;
            case NOT_RELEASED:
                LCD_display(location, "ERROR: Card\rNot Released");
                break;
            case BUS_ACTIVE:
                LCD_display(location, "ERROR: MS-1553\rBus Active");
                break;
            default:
                LCD_display(location, "ERROR: Program\rUnknown Error");
                break;
        }
    #endif for(;;);                                    /* Permanent Trap */
}

/* end */
} void protocol_f_core(LOOKUP_TABLE_TYPE *lookup_table_pointer)
{
    #ifdef LED_DISPLAY
        PPI3_REG_TYPE *display;                 /* RRT Display pointer */
        display = (PPI3_REG_TYPE *) &PPI3;
        display->RRT_Display |= ERROR_LED;      /* Turn Error LED On */
    #endif ifndef LED_DISPLAY
        int location = DISPLAY_START;
        LCD_display(location, "Protocol F Core\rNot Implemented");
    #endif for(;;);                                    /* Permanent trap */
} void protocol_f_eeprom(LOOKUP_TABLE_TYPE *lookup_table_pointer)
{
    #ifdef LED_DISPLAY
        PPI3_REG_TYPE *display;                 /* RRT Display pointer */
        display = (PPI3_REG_TYPE *) &PPI3;
        display->RRT_Display |= ERROR_LED;      /* Turn Error LED On */
    #endif ifndef LED_DISPLAY
        int location = DISPLAY_START;
        LCD_display(location, "Proto. F EEPROM\rNot Implemented");
    #endif for(;;);                                    /* Permanent trap */
}
```

```c
void protocol_f_sdc(LOOKUP_TABLE_TYPE *lookup_table_pointer)
{
    #ifdef LED_DISPLAY
        PPI3_REG_TYPE *display;              /* RRT Display pointer */
        display = (PPI3_REG_TYPE *) &PPI3;
        display->RRT_Display |= ERROR_LED;   /* Turn Error LED On */
    #endif ifndef LED_DISPLAY
        int location = DISPLAY_START;
        LCD_display(location, "Protocol F SDC\rNot Implemented");
    #endif for(;;);                                 /* Permanent trap */
} void protocol_g(LOOKUP_TABLE_TYPE *lookup_table_pointer)
{
    #ifdef LED_DISPLAY
        PPI3_REG_TYPE *display;              /* RRT Display pointer */
        display = (PPI3_REG_TYPE *) &PPI3;
        display->RRT_Display |= ERROR_LED;   /* Turn Error LED On */
    #endif ifndef LED_DISPLAY
        int location = DISPLAY_START;
        LCD_display(location, "Protocol G\rNot Implemented");
    #endif for(;;);                                 /* Permanent trap */
} void protocol_h(LOOKUP_TABLE_TYPE *lookup_table_pointer)
{
    #ifdef LED_DISPLAY
        PPI3_REG_TYPE *display;              /* RRT Display pointer */
        display = (PPI3_REG_TYPE *) &PPI3;
        display->RRT_Display |= ERROR_LED;   /* Turn Error LED On */
    #endif ifndef LED_DISPLAY
        int location = DISPLAY_START;
        LCD_display(location, "Protocol H\rNot Implemented");
    #endif for(;;);                                 /* Permanent trap */
}

/* end */
/*
    *************************
    *                       *
    *   PROTOCOL B MODULE   *
    *                       *
    *************************
*/

/* filename: PROTOB.C */

/*
    This file implements appendex B of MS-2217.
*/ include "rrt.h"            /* RRT configuration */
include "dsp.h"            /* DSP definitions */
#include "system.h"         /* System definitions */
#include "memcard.h"        /* Memory card definitions */
#include "lookup.h"         /* Lookup table definitions */
#include "wordtype.h"       /* Word definitions */
#include "messages.h"       /* Message definitions */
#include "display.h"        /* LCD display definitions */
#include "timer.h"          /* Timer definitions */
include "error.h"          /* Error definitions */ void protocol_b(LOOKUP_TABLE_TYPE *lookup_table_pointer);
```

```c
    void reprogram_b(LOOKUP_TABLE_TYPE *lookup_table_pointer, int memory_area);
    void verify_b(LOOKUP_TABLE_TYPE *lookup_table_pointer, int memory_area);

/*********************************************
*              PROTOCOL B                    *
*********************************************/
void protocol_b(LOOKUP_TABLE_TYPE *lookup_table_pointer)
{
    CARD_HEADER_TYPE *card_pointer;         /* Pointer into card header */
    PPI3_REG_TYPE *switch_status;           /* Switch status pointer */
    int return_word, return_message[3], data_word;
    int memory_area;

TIMER_REG_TYPE *timer;        /* Pointer to timer counter register */
    timer = (TIMER_REG_TYPE *) &TIMER0;

card_pointer = (CARD_HEADER_TYPE *) &MEMCARD0;
    switch_status = (PPI3_REG_TYPE *) &PPI3;

/* Reprogram if not Downloading or Verifying data */
    if(!(switch_status->Download) && !(switch_status->Verify))
    {
        /* check for memory configuration message usage */
        if(lookup_table_pointer->Use_Memory_Config_Msg)
        {
            /* Check if activity busy */
            return_word = activity_busy(lookup_table_pointer,
                &return_message[0]);
            if(return_word)
                error_display(return_word);         /* Some error occurred */

/* Delay next message */
            msec_timer(lookup_table_pointer->Delay, timer);

/* check memory configuration */
            return_word = memory_configuration_message(lookup_table_pointer,
                &return_message[0]);
            if(return_word)
                error_display(return_word);     /* Some error occurred */

/* Check configuration */
            switch(lookup_table_pointer->Memory_Word_Usage)
            {
                case CHECK_WORD_1:       /* Test word #1 */
                    data_word = ((lookup_table_pointer->Memory_Config_1_MSB)
                        << 8) + (lookup_table_pointer->Memory_Config_1_LSB);
                    if(data_word == return_message[1])
                        return;
                    break;
                case CHECK_WORD_2:       /* Test word #2 */
                    data_word = ((lookup_table_pointer->Memory_Config_2_MSB)
                        << 8) + (lookup_table_pointer->Memory_Config_2_LSB);
                    if(data_word == return_message[2])
                        return;
                    break;
                case CHECK_BOTH_WORDS:   /* Test word #1 and #2 */
                    data_word = ((lookup_table_pointer->Memory_Config_1_MSB)
                        << 8) + (lookup_table_pointer->Memory_Config_1_LSB);
                    if(data_word != return_message[1])
                        break;
                    data_word = ((lookup_table_pointer->Memory_Config_2_MSB)
                        << 8) + (lookup_table_pointer->Memory_Config_2_LSB);
                    if(data_word == return_message[2])
                        return;
                    break;
            }
            /* Delay next message */
            msec_timer(lookup_table_pointer->Delay, timer);
        } switch(lookup_table_pointer->Memory_Area_Type)
        {
            case SINGLE_AREA:                     /* Only one to program */
                if(lookup_table_pointer->EW_UDM_Repro_Enable
                    || lookup_table_pointer->AV_Reprogram_Enable_1)
```

```
                memory_area = AREA_1;
            else if(lookup_table_pointer->EW_OSM_Repro_Enable
                || lookup_table_pointer->AV_Reprogram_Enable_2)
                memory_area = AREA_2;
            else
                error_display(MEMORY_AREA);
            reprogram_b(lookup_table_pointer, memory_area);

if(lookup_table_pointer->Verify_After_Load)
                verify_b(lookup_table_pointer, memory_area);
            break;

case SEQUENTIAL_AREAS:          /* Program and verify 1 then 2 */
            memory_area = AREA_1;
            reprogram_b(lookup_table_pointer, memory_area);
            if(lookup_table_pointer->Verify_After_Load)
                verify_b(lookup_table_pointer, memory_area);

memory_area = AREA_2;
            reprogram_b(lookup_table_pointer, memory_area);
            if(lookup_table_pointer->Verify_After_Load)
                verify_b(lookup_table_pointer, memory_area);
            break;

case SIMULTANEOUS_AREAS:         /* Program 1 and 2 then verify */
            memory_area = AREA_1;
            reprogram_b(lookup_table_pointer, memory_area);
            memory_area = AREA_2;
            reprogram_b(lookup_table_pointer, memory_area);

if(lookup_table_pointer->Verify_After_Load)
            {
                memory_area = AREA_1;
                verify_b(lookup_table_pointer, memory_area);
                memory_area = AREA_2;
                verify_b(lookup_table_pointer, memory_area);
            }
            break;
    }
    return;
}

/* Download or stand alone verify */
if(!(card_pointer->No_Download_To_Card)
    || lookup_table_pointer->Stand_Alone_Verify)
{
    /* Stand alone verify allowed */
    switch(lookup_table_pointer->Memory_Area_Type)
    {
        case SINGLE_AREA:               /* Only one to program */
            if(lookup_table_pointer->EW_UDM_Repro_Enable
                || lookup_table_pointer->AV_Reprogram_Enable_1)
                memory_area = AREA_1;
            else if(lookup_table_pointer->EW_OSM_Repro_Enable
                || lookup_table_pointer->AV_Reprogram_Enable_2)
                memory_area = AREA_2;
            else
                error_display(MEMORY_AREA);

verify_b(lookup_table_pointer, memory_area);
            break;

case SEQUENTIAL_AREAS:          /* Verify 1 and 2 */
            memory_area = AREA_1;
            verify_b(lookup_table_pointer, memory_area);

memory_area = AREA_2;
            verify_b(lookup_table_pointer, memory_area);
            break;

case SIMULTANEOUS_AREAS:        /* Verify 1 and 2 */
            memory_area = AREA_1;
            verify_b(lookup_table_pointer, memory_area);

memory_area = AREA_2;
```

```c
            verify_b(lookup_table_pointer, memory_area);
            break;
    }
    return;
}
error_display(DOWNLOAD_VERIFY);
}

/***************************************
*           REPROGRAM B                *
***************************************/
/* send reprogramming messages */
void reprogram_b(LOOKUP_TABLE_TYPE *lookup_table_pointer, int memory_area)
{
    PPI3_REG_TYPE *display;                 /* RRT Display pointer */
    int i, return_word, return_message[2];
    int device_file_size, subpage_amount;
    int bus_transfer_count, bus_word_count;
    int *data_pointer, message[33], message_amount;
    int transfer_control, address, bus_words_sent;
    int bus_buffer_count, load_address, page_number;
    int first_subpage, subpage_count, checksum;
    int location = DISPLAY_START;

TIMER_REG_TYPE *timer;       /* Pointer to timer counter register */
    timer = (TIMER_REG_TYPE *) &TIMER0;

#ifdef LED_DISPLAY
        display = (PPI3_REG_TYPE *) &PPI3;  /* Point to display register */
    #endif /* Display Load indication (load process beginning) */
    #ifdef LED_DISPLAY
        display->RRT_Display |= LOAD_LED;        /* Turn Load LED On */
    #endif ifndef LED_DISPLAY
        LCD_display(location, "Uploading Data");    /* Display Load message */
    #endif /* Check if activity busy */
    return_word = activity_busy(lookup_table_pointer,
        &return_message[0]);
    if(return_word)
        error_display(return_word);         /* Some error occurred */

/* Delay next message */
    msec_timer(lookup_table_pointer->Delay, timer);

/* Send the Enter Load message */
    return_word = enter_load_message(lookup_table_pointer, memory_area);
    if(return_word)
        error_display(return_word);         /* Some error occurred */

/* Delay next message */
    msec_timer(lookup_table_pointer->Delay, timer);

/* File size measured in bytes */
    device_file_size = (((lookup_table_pointer->File_Size_MSB << 8)
        + lookup_table_pointer->File_Size_2SB << 8)
        + lookup_table_pointer->File_Size_3SB << 8)
        + lookup_table_pointer->File_Size_LSB;

/* Initial MS-1553 word transfer count */
    switch(lookup_table_pointer->Transfer_Mode)     /* MS-1553 word count */
    {
        case 0x01:                                  /* 1 byte per 16 bits */
            bus_transfer_count = device_file_size;
            break;
        case 0x02:                                  /* 2 bytes per word */
            bus_transfer_count = (device_file_size >> 1);
            break;
        case 0x03:                                  /* 2 bytes per 1/2 word */
            bus_transfer_count = (device_file_size >> 1);
            break;
```

```c
        default:
            error_display(TRANSFER_MODE);
} data_pointer = (int *) lookup_table_pointer + SIZE_LOOKUP_TABLE;

/* Get the buffer count (count of MS-1553 words) */
bus_buffer_count = (lookup_table_pointer->Buffer_Xfer_Count_MSN << 8)
      + lookup_table_pointer->Buffer_Xfer_Count_LSB;

/* Get the start location of the load */
load_address = (lookup_table_pointer->Load_Address_MSB << 8)
      + lookup_table_pointer->Load_Address_LSB;
page_number = (lookup_table_pointer->Page_Number_MSB << 8)
      + lookup_table_pointer->Page_Number_LSB;

/* Determine first_subpage and initial loop tracking items */
switch(lookup_table_pointer->Header_Type)
{
    case 0x00:              /* Buffer count = number of words */
        bus_word_count = bus_buffer_count;
        if(bus_word_count < bus_transfer_count)
        {
            transfer_control = 1;         /* More data to follow */
        }
        else                              /* Fewer words to send */
        {
            bus_word_count = bus_transfer_count;
            bus_buffer_count = bus_transfer_count;   /* New buffer count */
            transfer_control = 0;         /* Last group transfer */
        }
        break;
    case 0x01:              /* Buffer count = number of messages */
        bus_word_count = bus_buffer_count << 5;
        if(bus_word_count < bus_transfer_count)
        {
            transfer_control = 1;         /* More data to follow */
        }
        else                              /* Fewer words to send */
        {
            bus_word_count = bus_transfer_count;
            bus_buffer_count = (bus_word_count + 31) >> 5;   /* New count */
            transfer_control = 0;         /* Last group transfer */
        }
        break;
    default:                /* Header type not used */
        error_display(HEADER_TYPE);
        break;
}
if(lookup_table_pointer->Transfer_Mode == 0x03)   /* 1/2 word per 16 bits */
    subpage_amount = bus_word_count >> 1;   /* Amount of subpage words */
else
    subpage_amount = bus_word_count;        /* Amount of subpage words */
address = subpage_amount;                   /* Address of second subpage */
first_subpage = 0;                          /* Start first subpage loaded at 0 */
while(address < load_address)
{
    first_subpage++;                        /* Increment subpage */
    address += subpage_amount;              /* Address of next subpage */
}

/* Adjust bus_word_count for paging */
if((0xffff & (load_address + subpage_amount)) < load_address)
{                                           /* Page boundary encountered */
    /* Count up to page boundary */
    subpage_amount -= 0xffff & (load_address + subpage_amount);
    if(lookup_table_pointer->Transfer_Mode == 0x03)
        bus_word_count = subpage_amount << 1;
    else
        bus_word_count = subpage_amount;

transfer_control = 1;                   /* More data to follow */ if(lookup_table_pointer->Header_Type)
        bus_buffer_count = bus_word_count;  /* New buffer count */
```

```c
        else                                    /* New buffer count */
            bus_buffer_count = (bus_word_count + 31) >> 5;
}
/* Check for RT busy if status busy bit is not usable */
if(!(lookup_table_pointer->Status_Busy_Usable))
{
    /* Check RT for busy */
    return_word = activity_busy(lookup_table_pointer,
        &return_message[0]);
    if(return_word)
        error_display(return_word);         /* Some error occurred */

/* Delay next message */
    msec_timer(lookup_table_pointer->Delay, timer);
} subpage_count = 0;                              /* Clear subpage count */

/* Transfer data */
while(bus_transfer_count)                       /* Transfer all data */
{
    checksum = 0;                               /* Clear the checksum */

/* Send the Header message */
    return_word = header_message(lookup_table_pointer, bus_buffer_count,
        load_address, page_number, transfer_control, &checksum);
    if(return_word)
        error_display(return_word);         /* Some error occurred */

/* Delay next message */
    msec_timer(lookup_table_pointer->Delay, timer);

/* Send the Data Load messages */
    bus_words_sent = bus_word_count;
    while(bus_word_count)
    {
        message_amount = 32;                /* Maximum words per message */
        if(message_amount > bus_word_count)
        {                                   /* Fewer words left to send */
            message_amount = bus_word_count;
            bus_word_count = 0;             /* Amount of words sent */
        }
        else
            bus_word_count -= message_amount;   /* Count of words left */

/* Ready data for transfer, command inserted later */
        for(i = 1; i <= message_amount; i++)
        {
            message[i] = (0xff & *data_pointer++);
            if(lookup_table_pointer->Transfer_Mode != 0x01)
                message[i] += ((0xff & *data_pointer++) << 8);
            checksum += message[i];         /* Updata checksum */
        }

/* Check for RT busy if status busy bit is not usable */
        if(!(lookup_table_pointer->Status_Busy_Usable))
        {
            /* Check RT for busy */
            return_word = activity_busy(lookup_table_pointer,
                &return_message[0]);
            if(return_word)
                error_display(return_word); /* Some error occurred */

/* Delay next message */
            msec_timer(lookup_table_pointer->Delay, timer);

/* Test data word for service request */
            while(return_message[1])
            {
                return_word = service_message(lookup_table_pointer,
                    return_message[1]);
                if(return_word)
                    error_display(return_word); /* Some error occurred */

/* Delay next message */
```

```c
            msec_timer(lookup_table_pointer->Delay, timer);

/* Check RT for busy */
            return_word = activity_busy(lookup_table_pointer,
                &return_message[0]);
            if(return_word)
                error_display(return_word); /* Some error occurred */

/* Delay next message */
            msec_timer(lookup_table_pointer->Delay, timer);
        }
    } return_word = memory_data_load_message(lookup_table_pointer,
        &message[0], message_amount);
    if(return_word)
        error_display(return_word);     /* Some error occurred */

/* Delay next message */
    msec_timer(lookup_table_pointer->Delay, timer);
}

/* Check for RT busy if status busy bit is not usable */
if(!(lookup_table_pointer->Status_Busy_Usable))
{
    /* Check RT for busy */
    return_word = activity_busy(lookup_table_pointer,
        &return_message[0]);
    if(return_word)
        error_display(return_word);     /* Some error occurred */

/* Delay next message */
    msec_timer(lookup_table_pointer->Delay, timer);

/* Test data word for service request */
    while(return_message[1])
    {
        return_word = service_message(lookup_table_pointer,
            return_message[1]);
        if(return_word)
            error_display(return_word); /* Some error occurred */

/* Delay next message */
        msec_timer(lookup_table_pointer->Delay, timer);

/* Check RT for busy */
        return_word = activity_busy(lookup_table_pointer,
            &return_message[0]);
        if(return_word)
            error_display(return_word); /* Some error occurred */

/* Delay next message */
        msec_timer(lookup_table_pointer->Delay, timer);
    }
} return_word = trailer_message(lookup_table_pointer,
    subpage_count, first_subpage, &checksum);
if(return_word)
    error_display(return_word);     /* Some error occurred */

/* Delay next message */
msec_timer(lookup_table_pointer->Delay, timer);

/* Check for RT busy if status busy bit is not usable */
if(!(lookup_table_pointer->Status_Busy_Usable))
{
    /* Check RT for busy */
    return_word = activity_busy(lookup_table_pointer,
        &return_message[0]);
    if(return_word)
        error_display(return_word);     /* Some error occurred */

/* Delay next message */
    msec_timer(lookup_table_pointer->Delay, timer);
```

```c
    /* Test data word for service request */
    while(return_message[1])
    {
        return_word = service_message(lookup_table_pointer,
            return_message[1]);
        if(return_word)
            error_display(return_word); /* Some error occurred */

/* Delay next message */
        msec_timer(lookup_table_pointer->Delay, timer);

/* Check RT for busy */
        return_word = activity_busy(lookup_table_pointer,
            &return_message[0]);
        if(return_word)
            error_display(return_word); /* Some error occurred */
        /* Delay next message */
        msec_timer(lookup_table_pointer->Delay, timer);
    }
} if(lookup_table_pointer->Transfer_Mode == 0x03)
    subpage_amount = bus_words_sent > 1;    /* 2 words per address */
else
    subpage_amount = bus_words_sent;        /* 1 word per address */ if(!(0xffff & (load_address + subpage_amount)))
{                                           /* Crossed page boundary */
    load_address = 0;                       /* New page */
    page_number++;                          /* Next page */
    first_subpage = 0;                      /* First subpage in page */
    subpage_count = 0;                      /* First subpage in page sent */
}
else
{
    load_address += subpage_amount; /* New load address */
    first_subpage++;                /* Next subpage */
    subpage_count++;                /* Next subpage counted */
}

/* MS-1553 words left to send */
bus_transfer_count -= bus_words_sent;

/* Get the buffer count (count of MS-1553 words) */
bus_buffer_count = ((lookup_table_pointer->Buffer_Xfer_Count_MSN) << 8)
    + lookup_table_pointer->Buffer_Xfer_Count_LSB;

/* Determine word count */
if(lookup_table_pointer->Header_Type)
{                                           /* Count is message count */
    bus_word_count = bus_buffer_count << 5;
    if(bus_word_count < bus_transfer_count)
    {
        transfer_control = 1;               /* More data to follow */
    }
    else
    {                                       /* Fewer words to send */
        bus_word_count = bus_transfer_count;
        bus_buffer_count = (bus_word_count + 31) >> 5;  /* New count */
        transfer_control = 0;               /* Last group transfer */
    }
}
else
{                                           /* Count is word count */
    bus_word_count = bus_buffer_count;
    if(bus_word_count < bus_transfer_count)
    {
        transfer_control = 1;               /* More data to follow */
    }
    else
    {                                       /* Fewer words to send */
        bus_word_count = bus_transfer_count;
        bus_buffer_count = bus_word_count;  /* New buffer count */
        transfer_control = 0;               /* Last group transfer */
```

```c
            }
        }
        /* Check for 1/2 word per 16 bits (32 bit words) */
        if(lookup_table_pointer->Transfer_Mode == 0x03)
            subpage_amount = bus_word_count >> 1;    /* Subpage word amount */
        else
            subpage_amount = bus_word_count;          /* Subpage word amount */

/* Adjust bus_word_count for paging */
        if((0xffff & (load_address + subpage_amount)) < load_address)
        {                                        /* Page boundary encountered */
            /* Count up to page boundary */
            subpage_amount -= 0xffff & (load_address + subpage_amount);
            if(lookup_table_pointer->Transfer_Mode == 0x03)
                bus_word_count = subpage_amount << 1;
            else
                bus_word_count = subpage_amount;

transfer_control = 1;                 /* More data to follow */ if(lookup_table_pointer->Header_Type)  /* New buffer count */
                bus_buffer_count = bus_word_count;
            else
                bus_buffer_count = (bus_word_count + 31) >> 5;
        }
    } return_word = exit_load_message(lookup_table_pointer, memory_area);
    if(return_word)
        error_display(return_word);              /* Some error occurred */

/* Indicate load done */
    #ifdef LED_DISPLAY
        display->RRT_Display &= ~LOAD_LED;       /* Turn Load LED On */
    #endif ifndef LED_DISPLAY
        LCD_display(location, "Upload Done");    /* Display Load message */
        delay_timer(SEC1, timer);
    #endif
}

/************************************
*          VERIFY B                 *
************************************/
/*  receive verification data */
void verify_b(LOOKUP_TABLE_TYPE *lookup_table_pointer, int memory_area)
{
    PPI3_REG_TYPE *display;                 /* RRT Display pointer */
    PPI3_REG_TYPE *switch_status;           /* Switch status pointer */
    int i, return_word, return_message[33];
    int device_file_size, subpage_amount;
    int bus_transfer_count, bus_word_count;
    int *data_pointer, message_amount;
    int transfer_control, address, bus_words_sent;
    int bus_buffer_count, load_address, page_number;
    int first_subpage, subpage_count, checksum;
    int location = DISPLAY_START;

TIMER_REG_TYPE *timer;      /* Pointer to timer counter register */
    timer = (TIMER_REG_TYPE *) &TIMER0;

display = (PPI3_REG_TYPE *) &PPI3;         /* Point to display register */
    switch_status = (PPI3_REG_TYPE *) &PPI3;   /* Point to switches */

/* Test if loading Memory Card */
    if(!(switch_status->Verify) && switch_status->Download)
    {
        /* Display Download indication (download process beginning) */
        #ifdef LED_DISPLAY
            display->RRT_Display |= VERIFY_LED;  /* Turn Verify LED On */
            display->RRT_Display |= LOAD_LED;    /* Turn Load LED On */
        #endif ifndef LED_DISPLAY
```

```
            /* Display Download message */
            LCD_display(location, "Downloading Data");
    #endif
}
else
{
        /* Display Verify indication (verify process beginning) */
        #ifdef LED_DISPLAY
            display->RRT_Display |= VERIFY_LED;    /* Turn Verify LED On */
        #endif ifndef LED_DISPLAY
            /* Display Verify message */
            LCD_display(location, "Verifying Data");
        #endif
}

/* Check if activity busy */
return_word = activity_busy(lookup_table_pointer, &return_message[0]);
if(return_word)
    error_display(return_word);        /* Some error occurred */

/* Delay next message */
msec_timer(lookup_table_pointer->Delay, timer);

/* Verify transaction */
return_word = enter_verify_message(lookup_table_pointer, memory_area);
if(return_word)
    error_display(return_word);        /* Some error occurred */

/* Delay next message */
msec_timer(lookup_table_pointer->Delay, timer);
/* File size measured in bytes */
device_file_size = (((lookup_table_pointer->File_Size_MSB << 8)
    + lookup_table_pointer->File_Size_2SB << 8)
    + lookup_table_pointer->File_Size_3SB << 8)
    + lookup_table_pointer->File_Size_LSB;

/* Initial transfer count */
switch(lookup_table_pointer->Transfer_Mode)    /* MS-1553 word count */
{
    case 0x01:
        bus_transfer_count = device_file_size;    /* 1 byte per 16 bits */
        break;
    case 0x02:                                    /* 2 bytes per word */
        bus_transfer_count = (device_file_size >> 1);
        break;
    case 0x03:                                    /* 2 bytes per 1/2 word */
        bus_transfer_count = (device_file_size >> 1);
        break;
    default:
        error_display(TRANSFER_MODE);
} data_pointer = (int *) lookup_table_pointer + SIZE_LOOKUP_TABLE;

/* Get the buffer count */
bus_buffer_count = ((lookup_table_pointer->Buffer_Xfer_Count_MSN) << 8)
    + lookup_table_pointer->Buffer_Xfer_Count_LSB;

/* Get the start location of the transfer */
load_address = (lookup_table_pointer->Load_Address_MSB << 8)
    + lookup_table_pointer->Load_Address_LSB;
page_number = (lookup_table_pointer->Page_Number_MSB << 8)
    + lookup_table_pointer->Page_Number_LSB;

/* Determine first subpage and initial look tracking items */
switch(lookup_table_pointer->Header_Type)
{
    case 0x00:                            /* Buffer count = number of words */
        bus_word_count = bus_buffer_count;
        if(bus_word_count < bus_transfer_count)
        {
            transfer_control = 1;         /* More data to follow */
```

```c
        }
        else                                  /* Fewer words to send */
        {
            bus_word_count = bus_transfer_count;
            bus_buffer_count = bus_transfer_count;  /* New buffer count */
            transfer_control = 0;             /* Last group transfer */
        }
        break;
    case 0x01:                                /* Buffer count = number of messages */
        bus_word_count = bus_buffer_count << 5;
        if(bus_word_count < bus_transfer_count)
        {
            transfer_control = 1;             /* More data to follow */
        }
        else                                  /* Fewer words to send */
        {
            bus_word_count = bus_transfer_count;
            bus_buffer_count = (bus_word_count + 31) >> 5;  /* New count */
            transfer_control = 0;             /* Last group transfer */
        }
        break;
    default:                                  /* Header type not used */
        error_display(HEADER_TYPE);
        break;
}
if(lookup_table_pointer->Transfer_Mode == 0x03)  /* 1/2 word per 16 bits */
    subpage_amount = bus_word_count >> 1;    /* Amount in subpage */
else
    subpage_amount = bus_word_count;         /* Amount in subpage */
address = subpage_amount;                    /* Address of second subpage */
first_subpage = 0;                           /* Start first subpage loaded at 0 */
while(address < load_address)
{
    first_subpage++;                         /* Increment subpage */
    address += subpage_amount;               /* Address of next subpage */
}

/* Adjust bus_word_count for paging */
if((0xffff & (load_address + subpage_amount)) < load_address)
{                                            /* Page boundary encountered */
    /* Count up to page boundary */
    subpage_amount -= 0xffff & (load_address + subpage_amount);
    if(lookup_table_pointer->Transfer_Mode == 0x03)
        bus_word_count = subpage_amount << 1;
    else
        bus_word_count = subpage_amount;

transfer_control = 1;                    /* More data to follow */ if(lookup_table_pointer->Header_Type)    /* New buffer count */
        bus_buffer_count = bus_word_count;
    else
        bus_buffer_count = (bus_word_count + 31) >> 5;
}

/* Check for RT busy if status busy bit is not usable */
if(!(lookup_table_pointer->Status_Busy_Usable))
{
    /* Check RT for busy */
    return_word = activity_busy(lookup_table_pointer,
        &return_message[0]);
    if(return_word)
        error_display(return_word);          /* Some error occurred */

/* Delay next message */
    msec_timer(lookup_table_pointer->Delay, timer);
}
subpage_count = 0;                           /* Clear subpage count */

/* Transfer data */
while(bus_transfer_count)                    /* Transfer all data */
{
    checksum = 0;                            /* Clear the checksum */
```

```c
/* Send the Header message */
return_word = header_message(lookup_table_pointer, bus_buffer_count,
    load_address, page_number, transfer_control, &checksum);
if(return_word)
    error_display(return_word);      /* Some error occurred */

/* Delay next message */
msec_timer(lookup_table_pointer->Delay, timer);

/* Send the Data Verify messages */
bus_words_sent = bus_word_count;
while(bus_word_count)
{
    message_amount = 32;             /* Maximum words per message */
    if(message_amount > bus_word_count)
    {
        message_amount = bus_word_count;   /* Amount sending */
        bus_word_count = 0;                /* Count of words left */
    }
    else
        bus_word_count -= message_amount;  /* Amount of words left */

/* Check for RT busy if status busy bit is not usable */
    if(!(lookup_table_pointer->Status_Busy_Usable))
    {
        /* Check RT for busy */
        return_word = activity_busy(lookup_table_pointer,
            &return_message[0]);
        if(return_word)
            error_display(return_word);     /* Some error occurred */

/* Delay next message */
        msec_timer(lookup_table_pointer->Delay, timer);

/* Test data word for service request */
        while(return_message[1])
        {
            return_word = service_message(lookup_table_pointer,
                return_message[1]);
            if(return_word)
                error_display(return_word); /* Some error occurred */

/* Delay next message */
            msec_timer(lookup_table_pointer->Delay, timer);

/* Check RT for busy */
            return_word = activity_busy(lookup_table_pointer,
                &return_message[0]);
            if(return_word)
                error_display(return_word); /* Some error occurred */

/* Delay next message */
            msec_timer(lookup_table_pointer->Delay, timer);
        }
    } return_word = memory_data_verify_message(lookup_table_pointer,
        &return_message[0], message_amount);
    if(return_word)
        error_display(return_word);      /* Some error occurred */

/* Delay next message */
    msec_timer(lookup_table_pointer->Delay, timer);

/* Test if downloading to Memory Card */
    if(!(switch_status->Verify) && switch_status->Download)
        /* Download data into Memory Card */
        for(i = 1; i <= message_amount; i++)
        {
            *data_pointer++ = 0xff & return_message[i];
            /* Check for 8 bit transfer */
            if(lookup_table_pointer->Transfer_Mode != 0x01)
                /* Not 8 bit transfer */
                *data_pointer++ = 0xff & (return_message[i] >> 8);
            checksum += return_message[i];
```

```c
    }
    else
        /* Verify data with Memory Card */
        for(i = 1; i <= message_amount; i++)
        {
            if((0xff & *data_pointer++)
                != (0xff & return_message[i]))
                error_display(VERIFY_ERROR);
            /* Check for 8 bit transfer */
            if(lookup_table_pointer->Transfer_Mode != 0x01)
                /* Not 8 bit transfer */
                if((0xff & *data_pointer++)
                    != (0xff & (return_message[i] >> 8)))
                    error_display(VERIFY_ERROR);
            checksum += return_message[i];
        }
}

/* Check for RT busy if status busy bit is not usable */
if(!(lookup_table_pointer->Status_Busy_Usable))
{
    /* Check RT for busy */
    return_word = activity_busy(lookup_table_pointer,
        &return_message[0]);
    if(return_word)
        error_display(return_word); /* Some error occurred */
    /* Delay next message */
    msec_timer(lookup_table_pointer->Delay, timer);

/* Test data word for service request */
    while(return_message[1])
    {
        return_word = service_message(lookup_table_pointer,
            return_message[1]);
        if(return_word)
            error_display(return_word); /* Some error occurred */

/* Delay next message */
        msec_timer(lookup_table_pointer->Delay, timer);

/* Check RT for busy */
        return_word = activity_busy(lookup_table_pointer,
            &return_message[0]);
        if(return_word)
            error_display(return_word); /* Some error occurred */

/* Delay next message */
        msec_timer(lookup_table_pointer->Delay, timer);
    }
}

/* Send the Trailer message (end verify) */
return_word = trailer_message(lookup_table_pointer,
    subpage_count, first_subpage, &checksum);
if(return_word)
    error_display(return_word);      /* Some error occurred */

/* Delay next message */
msec_timer(lookup_table_pointer->Delay, timer);

/* Check for RT busy if status busy bit is not usable */
if(!(lookup_table_pointer->Status_Busy_Usable))
{
    /* Check RT for busy */
    return_word = activity_busy(lookup_table_pointer,
        &return_message[0]);
    if(return_word)
        error_display(return_word); /* Some error occurred */

/* Delay next message */
    msec_timer(lookup_table_pointer->Delay, timer);

/* Test data word for service request */
    while(return_message[1])
```

```c
        {
            return_word = service_message(lookup_table_pointer,
                return_message[1]);
            if(return_word)
                error_display(return_word); /* Some error occurred */

/* Delay next message */
            msec_timer(lookup_table_pointer->Delay, timer);

/* Check RT for busy */
            return_word = activity_busy(lookup_table_pointer,
                &return_message[0]);
            if(return_word)
                error_display(return_word); /* Some error occurred */

/* Delay next message */
            msec_timer(lookup_table_pointer->Delay, timer);
        }
    } if(lookup_table_pointer->Transfer_Mode == 0x03)
        subpage_amount = bus_words_sent > 1;    /* 2 words per address */
    else
        subpage_amount = bus_words_sent;         /* 1 word per address */ if(!(0xffff & (load_address + subpage_amount)))
    {                                       /* Crossed page boundary */
        load_address = 0;                   /* New page */
        page_number++;                      /* Next page */
        first_subpage = 0;                  /* First subpage in page */
        subpage_count = 0;                  /* First subpage in page sent */
    }
    else
    {
        load_address += subpage_amount;     /* New load address */
        first_subpage++;                    /* Next subpage */
        subpage_count++;                    /* Next subpage counted */
    }

/* MS-1553 words left to send */
    bus_transfer_count -= bus_words_sent;

/* Get the buffer count (count of MS-1553 words) */
    bus_buffer_count = ((lookup_table_pointer->Buffer_Xfer_Count_MSN) << 8)
        + lookup_table_pointer->Buffer_Xfer_Count_LSB;

/* Determine word count */
    if(lookup_table_pointer->Header_Type)
    {                                       /* Count is message count */
        bus_word_count = bus_buffer_count << 5;
        if(bus_word_count < bus_transfer_count)
        {
            transfer_control = 1;           /* More data to follow */
        }
        else
        {                                   /* Fewer words to send */
            bus_word_count = bus_transfer_count;
            bus_buffer_count = (bus_word_count + 31) >> 5;  /* New count */
            transfer_control = 0;           /* Last group transfer */
        }
    }
    else
    {                                       /* Count is word count */
        bus_word_count = bus_buffer_count;
        if(bus_word_count < bus_transfer_count)
        {
            transfer_control = 1;           /* More data to follow */
        }
        else
        {                                   /* Fewer words to send */
            bus_word_count = bus_transfer_count;
            bus_buffer_count = bus_word_count;  /* New buffer count */
            transfer_control = 0;           /* Last group transfer */
        }
```

```c
        }
        /* Check for 1/2 word per 16 bits (32 bit words) */
        if(lookup_table_pointer->Transfer_Mode == 0x03)
            subpage_amount = bus_word_count >> 1;        /* Words in subpage */
        else
            subpage_amount = bus_word_count;             /* Words in subpage */

/* Adjust bus_word_count for paging */
        if((0xffff & (load_address + subpage_amount)) < load_address)
        {                                                /* Page boundary encountered */
            /* Count up to page boundary */
            subpage_amount -= 0xffff & (load_address + subpage_amount);
            if(lookup_table_pointer->Transfer_Mode == 0x03)
                bus_word_count = subpage_amount << 1;
            else
                bus_word_count = subpage_amount;

transfer_control = 1;                        /* More data to follow */ if(lookup_table_pointer->Header_Type)
                bus_buffer_count = bus_word_count;       /* New buffer count */
            else
                bus_buffer_count = (bus_word_count + 31) >> 5;   /* New count */
        }
    }

/* Send the Exit verify message */
    return_word = exit_verify_message(lookup_table_pointer, memory_area);
    if(return_word)
        error_display(return_word);      /* Some error occurred */

/* Test if loaded Memory Card */
    if(!(switch_status->Verify) && switch_status->Download)
    {
        /* Display Download complete indication */
        #ifdef LED_DISPLAY
            display->RRT_Display &= ~LOAD_LED;       /* Turn Load LED Off */
            display->RRT_Display &= ~VERIFY_LED;     /* Turn Verify LED Off */
        #endif ifndef LED_DISPLAY
            LCD_display(location, "Download Done");
            delay_timer(SEC1, timer);
        #endif
    }
    else
    {
        /* Display Verify complete indication */
        #ifdef LED_DISPLAY
            display->RRT_Display &= ~VERIFY_LED;     /* Turn Verify LED Off */
        #endif ifndef LED_DISPLAY
            LCD_display(location, "Data Verified");
            delay_timer(SEC1, timer);
        #endif
    }
}
/* end */
/*
    ****************************************
    *                                      *
    *   PROTOCOLS NOT YET IMPLEMENTED      *
    *                                      *
    ****************************************
*/

/* filename: PROTOCOL.C */ include "rrt.h"
include "system.h"
#include "memcard.h"
#include "display.h"
```

```c
/* This file contains the following functions: */ void protocol_d(LOOKUP_TABLE_TYPE *lookup_table_pointer);
    void protocol_e(LOOKUP_TABLE_TYPE *lookup_table_pointer);
    void protocol_f_core(LOOKUP_TABLE_TYPE *lookup_table_pointer);
    void protocol_f_eeprom(LOOKUP_TABLE_TYPE *lookup_table_pointer);
    void protocol_f_sdc(LOOKUP_TABLE_TYPE *lookup_table_pointer);
    void protocol_g(LOOKUP_TABLE_TYPE *lookup_table_pointer);
    void protocol_h(LOOKUP_TABLE_TYPE *lookup_table_pointer);

void protocol_d(LOOKUP_TABLE_TYPE *lookup_table_pointer)
{
    #ifdef LED_DISPLAY
        PPI3_REG_TYPE *display;                /* RRT Display pointer */
        display = (PPI3_REG_TYPE *) &PPI3;
        display->RRT_Display |= ERROR_LED;     /* Turn Error LED On */
    #endif ifndef LED_DISPLAY
        int location = DISPLAY_START;
        LCD_display(location, "Protocol D\rNot Implemented");
    #endif for(;;);                                   /* Permanent trap */
} void protocol_e(LOOKUP_TABLE_TYPE *lookup_table_pointer)
{
    #ifdef LED_DISPLAY
        PPI3_REG_TYPE *display;                /* RRT Display pointer */
        display = (PPI3_REG_TYPE *) &PPI3;
        display->RRT_Display |= ERROR_LED;     /* Turn Error LED On */
    #endif ifndef LED_DISPLAY
        int location = DISPLAY_START;
        LCD_display(location, "Protocol E\rNot Implemented");
    #endif for(;;);                                   /* Permanent trap */
/*
    ************************
    *                      *
    *   PROTOCOL C MODULE  *
    *                      *
    ************************
*/

/* filename: PROTOC.C */

/*
    This file implements appendex C of MS-2217.
*/ include "rrt.h"               /* RRT configuration */
include "dsp.h"               /* DSP definitions */
#include "system.h"            /* System definitions */
#include "memcard.h"           /* Memory card definitions */
#include "lookup.h"            /* Lookup table definitions */
#include "wordtype.h"          /* Word definitions */
#include "messages.h"          /* Message definitions */
#include "display.h"           /* LCD display definitions */
#include "timer.h"             /* Timer definitions */
include "error.h"             /* Error definitions */ void protocol_c(LOOKUP_TABLE_TYPE *lookup_table_pointer);
    void reprogram_c(LOOKUP_TABLE_TYPE *lookup_table_pointer, int memory_area);
    void verify_c(LOOKUP_TABLE_TYPE *lookup_table_pointer, int memory_area);

/*********************************************
*                PROTOCOL C                  *
*********************************************/
void protocol_c(LOOKUP_TABLE_TYPE *lookup_table_pointer)
{
    CARD_HEADER_TYPE *card_pointer;            /* Pointer into card header */
```

```c
PPI3_REG_TYPE *switch_status;           /* Switch status pointer */
int return_word, return_message[3], data_word;
int memory_area;

card_pointer = (CARD_HEADER_TYPE *) &MEMCARD0;
switch_status = (PPI3_REG_TYPE *) &PPI3;

/* Reprogram if not Downloading or Verifying data */
if(!(switch_status->Download) && !(switch_status->Verify))
{
    /* check for memory configuration message usage */
    if(lookup_table_pointer->Use_Memory_Config_Msg)
    {
        /* check memory configuration */
        return_word = memory_configuration_response(lookup_table_pointer,
            &return_message[0]);
        if(return_word)
            error_display(return_word);     /* Some error occurred */

/* Check configuration */
        switch(lookup_table_pointer->Memory_Word_Usage)
        {
            case CHECK_WORD_1:      /* Test word #1 */
                data_word = ((lookup_table_pointer->Memory_Config_1_MSB)
                    << 8) + (lookup_table_pointer->Memory_Config_1_LSB);
                if(data_word == return_message[1])
                    return;
                break;
            case CHECK_WORD_2:      /* Test word #2 */
                data_word = ((lookup_table_pointer->Memory_Config_2_MSB)
                    << 8) + (lookup_table_pointer->Memory_Config_2_LSB);
                if(data_word == return_message[2])
                    return;
                break;
            case CHECK_BOTH_WORDS:  /* Test word #1 and #2 */
                data_word = ((lookup_table_pointer->Memory_Config_1_MSB)
                    << 8) + (lookup_table_pointer->Memory_Config_1_LSB);
                if(data_word != return_message[1])
                    break;
                data_word = ((lookup_table_pointer->Memory_Config_2_MSB)
                    << 8) + (lookup_table_pointer->Memory_Config_2_LSB);
                if(data_word == return_message[2])
                    return;
                break;
        }
    } switch(lookup_table_pointer->Memory_Area_Type)
    {
        case SINGLE_AREA:               /* Only one to program */
            if(lookup_table_pointer->EW_UDM_Repro_Enable
                || lookup_table_pointer->AV_Reprogram_Enable_1)
                memory_area = AREA_1;
            else if(lookup_table_pointer->EW_OSM_Repro_Enable
                || lookup_table_pointer->AV_Reprogram_Enable_2)
                memory_area = AREA_2;
            else
                error_display(MEMORY_AREA);
            reprogram_c(lookup_table_pointer, memory_area);

if(lookup_table_pointer->Verify_After_Load)
                verify_c(lookup_table_pointer, memory_area);
            break;

case SEQUENTIAL_AREAS:          /* Program and verify 1 then 2 */
            memory_area = AREA_1;
            reprogram_c(lookup_table_pointer, memory_area);
            if(lookup_table_pointer->Verify_After_Load)
                verify_c(lookup_table_pointer, memory_area);

memory_area = AREA_2;
            reprogram_c(lookup_table_pointer, memory_area);
            if(lookup_table_pointer->Verify_After_Load)
                verify_c(lookup_table_pointer, memory_area);
            break;
```

```c
            case SIMULTANEOUS_AREAS:         /* Program 1 and 2 then verify */
                memory_area = AREA_1;
                reprogram_c(lookup_table_pointer, memory_area);
                memory_area = AREA_2;
                reprogram_c(lookup_table_pointer, memory_area);

if(lookup_table_pointer->Verify_After_Load)
                {
                    memory_area = AREA_1;
                    verify_c(lookup_table_pointer, memory_area);
                    memory_area = AREA_2;
                    verify_c(lookup_table_pointer, memory_area):
                }
                break;
        }
        return;
    }

/* Download or stand alone verify */
    if(!(card_pointer->No_Download_To_Card)
        || lookup_table_pointer->Stand_Alone_Verify)
    {
        /* Stand alone verify allowed */
        switch(lookup_table_pointer->Memory_Area_Type)
        {
            case SINGLE_AREA:                 /* Only one to program */
                if(lookup_table_pointer->EW_UDM_Repro_Enable
                    || lookup_table_pointer->AV_Reprogram_Enable_1)
                    memory_area = AREA_1;
                else if(lookup_table_pointer->EW_OSM_Repro_Enable
                    || lookup_table_pointer->AV_Reprogram_Enable_2)
                    memory_area = AREA_2;
                else
                    error_display(MEMORY_AREA);

verify_c(lookup_table_pointer, memory_area);
                break;

case SEQUENTIAL_AREAS:            /* Verify 1 and 2 */
                memory_area = AREA_1;
                verify_c(lookup_table_pointer, memory_area);

memory_area = AREA_2;
                verify_c(lookup_table_pointer, memory_area);
                break;

case SIMULTANEOUS_AREAS:          /* Verify 1 and 2 */
                memory_area = AREA_1;
                verify_c(lookup_table_pointer, memory_area);

memory_area = AREA_2;
                verify_c(lookup_table_pointer, memory_area);
                break;
        }
        return;
    }
    error_display(DOWNLOAD_VERIFY);
}

/************************************
*           REPROGRAM C             *
************************************/
/* send reprogramming messages */
void reprogram_c(LOOKUP_TABLE_TYPE *lookup_table_pointer, int memory_area)
{
    PPI3_REG_TYPE *display;                  /* RRT Display pointer */
    int i, return_word, return_message[2];
    int device_file_size, subpage_amount;
    int bus_transfer_count, bus_word_count;
    int *data_pointer, message[33], message_amount;
    int transfer_control, address, bus_words_sent;
    int bus_buffer_count, load_address, page_number;
    int first_subpage, subpage_count, checksum;
    int location = DISPLAY_START;
```

```c
TIMER_REG_TYPE *timer;
timer = (TIMER_REG_TYPE *) &TIMER0;

#ifdef LED_DISPLAY
    display = (PPI3_REG_TYPE *) &PPI3;  /* Point to display register */
endif /* Display Load indication (load process beginning) */
ifdef LED_DISPLAY
    display->RRT_Display |= LOAD_LED;       /* Turn Load LED On */
endif ifndef LED_DISPLAY
    LCD_display(location, "Uploading Data");    /* Display Load message */
endif /* Send the Enter Load message */
return_word = enter_load_response(lookup_table_pointer, memory_area);
if(return_word)
    error_display(return_word);         /* Some error occurred */

/* File size measured bytes */
device_file_size = (((lookup_table_pointer->File_Size_MSB << 8)
    + lookup_table_pointer->File_Size_2SB << 8)
    + lookup_table_pointer->File_Size_3SB << 8)
    + lookup_table_pointer->File_Size_LSB;

/* Initial transfer count */
switch(lookup_table_pointer->Transfer_Mode)     /* MS-1553 word count */
{
    case 0x01:
        bus_transfer_count = device_file_size;  /* 1 byte per 16 bits */
        break;
    case 0x02:                                  /* 2 bytes per word */
        bus_transfer_count = (device_file_size >> 1);
        break;
    case 0x03:                                  /* 2 bytes per 1/2 word */
        bus_transfer_count = (device_file_size >> 1);
        break;
    default:
        error_display(TRANSFER_MODE);
} data_pointer = (int *) lookup_table_pointer + SIZE_LOOKUP_TABLE;

/* Get the buffer count (count of MS-1553 words) */
bus_buffer_count = ((lookup_table_pointer->Buffer_Xfer_Count_MSN) << 8)
    + lookup_table_pointer->Buffer_Xfer_Count_LSB;

/* Get the start location of the load */
load_address = (lookup_table_pointer->Load_Address_MSB << 8)
    + lookup_table_pointer->Load_Address_LSB;
page_number = (lookup_table_pointer->Page_Number_MSB << 8)
    + lookup_table_pointer->Page_Number_LSB;

/* Determine first_subpage and initial loop tracking items */
switch(lookup_table_pointer->Header_Type)
{
    case 0x00:                      /* Buffer count = number of words */
        bus_word_count = bus_buffer_count;
        if(bus_word_count < bus_transfer_count)
        {
            transfer_control = 1;           /* More data to follow */
        }
        else
        {
            bus_word_count = bus_transfer_count;    /* Fewer to send */
            bus_buffer_count = bus_transfer_count;  /* New buffer count */
            transfer_control = 0;           /* Last group transfer */
        }
        break;
    case 0x01:                      /* Buffer count = number of messages */
        bus_word_count = bus_buffer_count << 5;
        if(bus_word_count < bus_transfer_count)
        {
```

```
            transfer_control = 1;         /* More data to follow */
        }
        else
        {
            bus_word_count = bus_transfer_count;    /* Fewer to send */
            bus_buffer_count = (bus_word_count + 31) >> 5;  /* New count */
            transfer_control = 0;         /* Last group transfer */
        }
        break;
    default:                              /* Header type not used */
        error_display(HEADER_TYPE);
        break;
}
if(lookup_table_pointer->Transfer_Mode == 0x03)   /* 1/2 word per 16 bits */
    subpage_amount = bus_word_count >> 1;  /* Amount of subpage words */
else
    subpage_amount = bus_word_count;       /* Amount of subpage words */
address = subpage_amount;                  /* Address of second subpage */
first_subpage = 0;                         /* Start first subpage loaded at 0 */
while(address < load_address)
{
    first_subpage++;                       /* Increment subpage */
    address += subpage_amount;             /* Address of next subpage */
}

/* Adjust bus_word_count for paging */
if((0xffff & (load_address + subpage_amount)) < load_address)
{                                          /* Page boundary encountered */
    /* Count up to page boundary */
    subpage_amount -= 0xffff & (load_address + subpage_amount);
    if(lookup_table_pointer->Transfer_Mode == 0x03)
        bus_word_count = subpage_amount << 1;
    else
        bus_word_count = subpage_amount;

transfer_control = 1;                  /* More data to follow */ if(lookup_table_pointer->Header_Type)  /* New buffer count */
        bus_buffer_count = bus_word_count;
    else
        bus_buffer_count = (bus_word_count + 31) >> 5;
} subpage_count = 0;                         /* Clear subpage count */

/* Transfer data */
while(bus_transfer_count)                  /* Transfer all data */
{
    checksum = 0;                          /* Clear the checksum */

/* Send the Header message */
    return_word = header_response(lookup_table_pointer, bus_buffer_count,
        load_address, page_number, transfer_control, &checksum);
    if(return_word)
        error_display(return_word);        /* Some error occurred */

/* Send the Data Load messages */
    bus_words_sent = bus_word_count;
    while(bus_word_count)
    {
        message_amount = 32;               /* Maximum words per message */
        if(message_amount > bus_word_count)
        {
            message_amount = bus_word_count;  /* Fewer left to send */
            bus_word_count = 0;            /* Amount of words sent */
        }
        else
            bus_word_count -= message_amount;  /* Amount of words left */
        /* Ready data for transfer, command inserted later */
        for(i = 1; i <= message_amount; i++)
        {
            message[i] = (0xff & *data_pointer++);
            if(lookup_table_pointer->Transfer_Mode != 0x01)
                message[i] += ((0xff & *data_pointer++) << 8);
```

```c
        checksum += message[i];            /* Update checksum */
    } return_word = memory_data_load_response(lookup_table_pointer,
        data_pointer, message_amount);
    if(return_word)
        error_display(return_word);    /* Some error occurred */
} return_word = trailer_response(lookup_table_pointer,
    subpage_count, first_subpage, &checksum);
if(return_word)
    error_display(return_word);    /* Some error occurred */ if(lookup_table_pointer->Transfer_Mode == 0x03)
    subpage_amount = bus_words_sent > 1;    /* 2 words per address */
else
    subpage_amount = bus_words_sent;        /* 1 word per address */ if(!(0xffff & (load_address + subpage_amount)))
{                                   /* Crossed page boundary */
    load_address = 0;               /* New page */
    page_number++;                  /* Next page */
    first_subpage = 0;              /* First subpage in page */
    subpage_count = 0;              /* First subpage in page sent */
}
else
{
    load_address += subpage_amount; /* New load address */
    first_subpage++;                /* Next subpage */
    subpage_count++;                /* Next subpage counted */
}

/* MS-1553 words left to send */
bus_transfer_count -= bus_words_sent;

/* Get the buffer count (count of MS-1553 words) */
bus_buffer_count = ((lookup_table_pointer->Buffer_Xfer_Count_MSN) << 8)
    + lookup_table_pointer->Buffer_Xfer_Count_LSB;

/* Determine word count */
if(lookup_table_pointer->Header_Type)
{                                   /* Count is message count */
    bus_word_count = bus_buffer_count << 5;
    if(bus_word_count < bus_transfer_count)
    {
        transfer_control = 1;       /* More data to follow */
    }
    else                            /* Fewer words to send */
        bus_word_count = bus_transfer_count;
        bus_buffer_count = (bus_word_count + 31) >> 5;  /* New count */
        transfer_control = 0;       /* Last group transfer */
    }
}
else                                /* Count is word count */
{
    bus_word_count = bus_buffer_count;
    if(bus_word_count < bus_transfer_count)
    {
        transfer_control = 1;       /* More data to follow */
    }
    else                            /* Fewer words to send */
    {
        bus_word_count = bus_transfer_count;
        bus_buffer_count = bus_word_count;  /* New buffer count */
        transfer_control = 0;       /* Last group transfer */
    }
}
/* Check for 1/2 word per 16 bits (32 bit words) */
if(lookup_table_pointer->Transfer_Mode == 0x03)
    subpage_amount = bus_word_count >> 1;   /* Amount in subpage */
else
    subpage_amount = bus_word_count;        /* Amount in subpage */
```

```c
        /* Adjust bus_word_count for paging */
        if((0xffff & (load_address + subpage_amount)) < load_address)
        {                                       /* Page boundary encountered */
            /* Count up to page boundary */
            subpage_amount -= 0xffff & (load_address + subpage_amount);
            if(lookup_table_pointer->Transfer_Mode == 0x03)
                bus_word_count = subpage_amount << 1;
            else
                bus_word_count = subpage_amount;

transfer_control = 1;               /* More data to follow */ if(lookup_table_pointer->Header_Type)
                bus_buffer_count = bus_word_count;      /* New buffer count */
            else
                bus_buffer_count = (bus_word_count + 31) >> 5;  /* New count */
        }
    } return_word = exit_load_response(lookup_table_pointer, memory_area);
    if(return_word)
        error_display(return_word);     /* Some error occurred */

/* Indicate load done */
    #ifdef LED_DISPLAY
        display->RRT_Display &= ~LOAD_LED;   /* Turn Load LED On */
    #endif ifndef LED_DISPLAY
        LCD_display(location, "Upload Done");   /* Display Load message */
        delay_timer(SEC1, timer);
    #endif
}

/**************************************
*           VERIFY C                  *
**************************************/
/* receive verification data */
void verify_c(LOOKUP_TABLE_TYPE *lookup_table_pointer, int memory_area)
{
    PPI3_REG_TYPE *display;                 /* RRT Display pointer */
    PPI3_REG_TYPE *switch_status;           /* Switch status pointer */
    int i, return_word, return_message[33];
    int device_file_size, subpage_amount;
    int bus_transfer_count, bus_word_count;
    int *data_pointer, message_amount;
    int transfer_control, address, bus_words_sent;
    int bus_buffer_count, load_address, page_number;
    int first_subpage, subpage_count, checksum;
    int location = DISPLAY_START;

TIMER_REG_TYPE *timer;
    timer = (TIMER_REG_TYPE *) &TIMER0;

display = (PPI3_REG_TYPE *) &PPI3;      /* Point to display register */
    switch_status = (PPI3_REG_TYPE *) &PPI3;  /* Point to switches */

/* Test if loading Memory Card */
    if(!(switch_status->Verify) && switch_status->Download)
    {
        /* Display Download indication (download process beginning) */
        #ifdef LED_DISPLAY
            display->RRT_Display |= VERIFY_LED;    /* Turn Verify LED On */
            display->RRT_Display |= LOAD_LED;      /* Turn Load LED On */
        #endif ifndef LED_DISPLAY
            /* Display Download message */
            LCD_display(location, "Downloading Data");
        #endif
    }
    else
    {
        /* Display Verify indication (verify process beginning) */
```

```c
#ifdef LED_DISPLAY
    display->RRT_Display |= VERIFY_LED;     /* Turn Verify LED On */
endif ifndef LED_DISPLAY
    /* Display Verify message */
    LCD_display(location, "Verifying Data");
endif /* Verify transaction */
return_word = enter_verify_response(lookup_table_pointer, memory_area);
if(return_word)
    error_display(return_word);             /* Some error occurred */

/* File size measured bytes */
device_file_size = (((lookup_table_pointer->File_Size_MSB << 8)
    + lookup_table_pointer->File_Size_2SB << 8)
    + lookup_table_pointer->File_Size_3SB << 8)
    + lookup_table_pointer->File_Size_LSB;

/* Initial transfer count */
switch(lookup_table_pointer->Transfer_Mode)    /* MS-1553 word count */
{
    case 0x01:
        bus_transfer_count = device_file_size;  /* 1 byte per 16 bits */
        break;
    case 0x02:                                  /* 2 bytes per word */
        bus_transfer_count = (device_file_size >> 1);
        break;
    case 0x03:                                  /* 2 bytes per 1/2 word */
        bus_transfer_count = (device_file_size >> 1);
        break;
    default:
        error_display(TRANSFER_MODE);
} data_pointer = (int *) lookup_table_pointer + SIZE_LOOKUP_TABLE;

/* Get the buffer count */
bus_buffer_count = ((lookup_table_pointer->Buffer_Xfer_Count_MSN) << 8)
    + lookup_table_pointer->Buffer_Xfer_Count_LSB;

/* Get the start location of the transfer */
load_address = (lookup_table_pointer->Load_Address_MSB << 8)
    + lookup_table_pointer->Load_Address_LSB;
page_number = (lookup_table_pointer->Page_Number_MSB << 8)
    + lookup_table_pointer->Page_Number_LSB;

/* Determine first subpage and initial look tracking items */
switch(lookup_table_pointer->Header_Type)
{
    case 0x00:                              /* Buffer count = number of words */
        bus_word_count = bus_buffer_count;
        if(bus_word_count < bus_transfer_count)
        {
            transfer_control = 1;           /* More data to follow */
        }
        else
        {
            bus_word_count = bus_transfer_count;    /* Fewer to send */
            bus_buffer_count = bus_transfer_count;  /* New buffer count */
            transfer_control = 0;           /* Last group transfer */
        }
        break;
    case 0x01:                              /* Buffer count = number of messages */
        bus_word_count = bus_buffer_count << 5;
        if(bus_word_count < bus_transfer_count)
        {
            transfer_control = 1;           /* More data to follow */
        }
        else
        {
            bus_word_count = bus_transfer_count;    /* Fewer to send */
            bus_buffer_count = (bus_word_count + 31) >> 5;  /* New count */
            transfer_control = 0;           /* Last group transfer */
```

```
            }
            break;
        default:                        /* Header type not used */
            error_display(HEADER_TYPE);
            break;
    }
}
if(lookup_table_pointer->Transfer_Mode == 0x03)   /* 1/2 word per 16 bits */
    subpage_amount = bus_word_count >> 1;   /* Amount of subpage words */
else
    subpage_amount = bus_word_count;         /* Amount of subpage words */
address = subpage_amount;                    /* Address of second subpage */
first_subpage = 0;                           /* Start first subpage loaded at 0 */
while(address < load_address)
{
    first_subpage++;                         /* Increment subpage */
    address += subpage_amount;               /* Address of next subpage */
}

/* Adjust word_count for paging */
if((0xffff & (load_address + subpage_amount)) < load_address)
{                                            /* Page boundary encountered */
    /* Count up to page boundary */
    subpage_amount -= 0xffff & (load_address + subpage_amount);
    if(lookup_table_pointer->Transfer_Mode == 0x03)
        bus_word_count = subpage_amount << 1;
    else
        bus_word_count = subpage_amount;

transfer_control = 1;                    /* More data to follow */ if(lookup_table_pointer->Header_Type)    /* New buffer count */
        bus_buffer_count = bus_word_count;
    else
        bus_buffer_count = (bus_word_count + 31) >> 5;
} subpage_count = 0;                           /* Clear subpage count */

/* Transfer data */
while(bus_transfer_count)                    /* Transfer all data */
{
    checksum = 0;                            /* Clear the checksum */

/* Send the Header message */
    return_word = header_response(lookup_table_pointer, bus_buffer_count,
        load_address, page_number, transfer_control, &checksum);
    if(return_word)
        error_display(return_word);          /* Some error occurred */

/* Send the Data Verify messages */
    bus_words_sent = bus_word_count;
    while(bus_word_count)
    {
        message_amount = 32;                 /* Maximum words per message */
        if(message_amount > bus_word_count)
        {
            message_amount = bus_word_count; /* Fewer words to send */
            bus_word_count = 0;              /* Amount of words sent */
        }
        else
            bus_word_count -= message_amount;  /* Amount of words left */ return_word = memory_data_verify_response(lookup_table_pointer,
            &return_message[0], message_amount);
        if(return_word)
            error_display(return_word);      /* Some error occurred */

/* Test if downloading to Memory Card */
        if(!(switch_status->Verify) && switch_status->Download)
            /* Download data into Memory Card */
            for(i = 1; i <= message_amount; i++)
            {
                *data_pointer++ = 0xff & return_message[i];
                /* Check for 8 bit transfer */
                if(lookup_table_pointer->Transfer_Mode != 0x01)
```

```c
                /* Not 8 bit transfer */
                *data_pointer++ = 0xff & (return_message[i] >> 8);
            checksum += return_message[i];
        }
    else
        /* Verify data with Memory Card */
        for(i = 1; i <= message_amount; i++)
        {
            if((0xff & *data_pointer++)
                != (0xff & return_message[i]))
                error_display(VERIFY_ERROR);
            /* Check for 8 bit transfer */
            if(lookup_table_pointer->Transfer_Mode != 0x01)
                /* Not 8 bit transfer */
                if((0xff & *data_pointer++)
                    != (0xff & (return_message[i] >> 8)))
                    error_display(VERIFY_ERROR);
            checksum += return_message[i];
        }
}

/* Send the Trailer message (end verify) */
return_word = trailer_response(lookup_table_pointer,
    subpage_count, first_subpage, &checksum);

if(return_word)
    error_display(return_word);     /* Some error occurred */ if(!(checksum))
    error_display(CHECKSUM_ERROR);

if(lookup_table_pointer->Transfer_Mode == 0x03)
    subpage_amount = bus_words_sent > 1;    /* 2 words per address */
else
    subpage_amount = bus_words_sent;        /* 1 word per address */ if(!(0xffff & (load_address + subpage_amount)))
{                                   /* Crossed page boundary */
    load_address = 0;               /* New page */
    page_number++;                  /* Next page */
    first_subpage = 0;              /* First subpage in page */
    subpage_count = 0;              /* First subpage in page sent */
}
else
{
    load_address += subpage_amount; /* New load address */
    first_subpage++;                /* Next subpage */
    subpage_count++;                /* Next subpage counted */
}

/* MS-1553 words left to send */
bus_transfer_count -= bus_words_sent;

/* Get the buffer count (count of MS-1553 words) */
bus_buffer_count = ((lookup_table_pointer->Buffer_Xfer_Count_MSN) << 8)
    + lookup_table_pointer->Buffer_Xfer_Count_LSB;

/* Determine word count */
if(lookup_table_pointer->Header_Type)
{                                   /* Count is message count */
    bus_word_count = bus_buffer_count << 5;
    if(bus_word_count < bus_transfer_count)
    {
        transfer_control = 1;       /* More data to follow */
    }
    else
    {
        bus_word_count = bus_transfer_count;    /* Fewer to send */
        bus_buffer_count = (bus_word_count + 31) >> 5;  /* New count */
        transfer_control = 0;       /* Last group transfer */
    }
}
else                                /* Count is word count */
{
    bus_word_count = bus_buffer_count;
```

```c
            if(bus_word_count < bus_transfer_count)
            {
                transfer_control = 1;            /* More data to follow */
            }
            else
            {
                bus_word_count = bus_transfer_count;     /* Fewer to send */
                bus_buffer_count = bus_word_count;       /* New buffer count */
                transfer_control = 0;                    /* Last group transfer */
            }
        }
        /* Check for 1/2 word per 16 bits (32 bit words) */
        if(lookup_table_pointer->Transfer_Mode == 0x03)
            subpage_amount = bus_word_count >> 1;    /* Subpage word amount */
        else
            subpage_amount = bus_word_count;         /* Subpage word amount */

/* Adjust word_count for paging */
        if((0xffff & (load_address + subpage_amount)) < load_address)
        {                                            /* Page boundary encountered */
            /* Count up to page boundary */
            subpage_amount -= 0xffff & (load_address + subpage_amount);
            if(lookup_table_pointer->Transfer_Mode == 0x03)
                bus_word_count = subpage_amount << 1;
            else
                bus_word_count = subpage_amount;

transfer_control = 1;                    /* More data to follow */ if(lookup_table_pointer->Header_Type)
                bus_buffer_count = bus_word_count;   /* New buffer count */
            else
                bus_buffer_count = (bus_word_count + 31) >> 5;  /* New count */
        }
    }

/* Send the Exit verify message */
    return_word = exit_verify_response(lookup_table_pointer, memory_area);
    if(return_word)
        error_display(return_word);     /* Some error occurred */

/* Test if loaded Memory Card */
    if(!(switch_status->Verify) && switch_status->Download)
    {
        /* Display Download complete indication */
        #ifdef LED_DISPLAY
            display->RRT_Display &= ~LOAD_LED;      /* Turn Load LED Off */
            display->RRT_Display &= ~VERIFY_LED;    /* Turn Verify LED Off */
        #endif ifndef LED_DISPLAY
            LCD_display(location, "Download Done");
            delay_timer(SEC1, timer);
        #endif
    }
    else
    {
        /* Display Verify complete indication */
        #ifdef LED_DISPLAY
            display->RRT_Display &= ~VERIFY_LED;    /* Turn Verify LED Off */
        #endif ifndef LED_DISPLAY
            LCD_display(location, "Data Verified");
            delay_timer(SEC1, timer);
        #endif
    }
}
/* end */
```

```c
/*
    *************************
    *                       *
    *   MS-1553 MESSAGES    *
    *                       *
    *************************
*/

/* filename: MESSAGES.C */

/*
    This file provides functions to send and receive
    messages over the MS-1553 bus
*/ include "rrt.h"            /* RRT configuration */
include "dsp.h"            /* DSP definitions */
#include "system.h"         /* System definitions */
#include "memcard.h"        /* Memory Card content definitions */
#include "lookup.h"         /* Lookup table definitions */
#include "wordtype.h"       /* MS1553 word definitions */
#include "ms1553.h"         /* MS-1553 functions and definitions */
#include "timer.h"          /* Time function definitions */
#include "error.h"          /* Error definitions */
#include "display.h"        /* LCD display definitions */

/* BC messages */ int activity_busy(LOOKUP_TABLE_TYPE
        *lookup_table_pointer, int *message_pointer);
    int activity_message(LOOKUP_TABLE_TYPE
        *lookup_table_pointer, int *message_pointer);
    int memory_configuration_message(LOOKUP_TABLE_TYPE
        *lookup_table_pointer, int *message_pointer);
    int enter_load_message(LOOKUP_TABLE_TYPE
        *lookup_table_pointer, int memory_area);
    int header_message(LOOKUP_TABLE_TYPE *lookup_table_pointer,
        int buffer_count, int load_address, int page_number,
        int transfer_control, int *checksum);
    int memory_data_load_message(LOOKUP_TABLE_TYPE *lookup_table_pointer,
        int *data_pointer, int amount);
    int trailer_message(LOOKUP_TABLE_TYPE *lookup_table_pointer,
        int subpage_count, int first_subpage, int *checksum);
    int exit_load_message(LOOKUP_TABLE_TYPE
        *lookup_table_pointer, int memory_area);
    int enter_verify_message(LOOKUP_TABLE_TYPE
        *lookup_table_pointer, int memory_area);
    int memory_data_verify_message(LOOKUP_TABLE_TYPE
        *lookup_table_pointer, int *message_pointer, int amount);
    int exit_verify_message(LOOKUP_TABLE_TYPE
        *lookup_table_pointer, int memory_area);
    int service_message(LOOKUP_TABLE_TYPE *lookup_table_pointer,
        int request);
    int reprogram_status_message(LOOKUP_TABLE_TYPE *lookup_table_pointer);
    int rrt_error_message(LOOKUP_TABLE_TYPE
        *lookup_table_pointer, int action);
    int command_message(LOOKUP_TABLE_TYPE
        *lookup_table_pointer, int *send_message);

/* RT messages */ int memory_configuration_response(LOOKUP_TABLE_TYPE
        *lookup_table_pointer, int *message_pointer);
    int enter_load_response(LOOKUP_TABLE_TYPE
        *lookup_table_pointer, int memory_area);
    int header_response(LOOKUP_TABLE_TYPE *lookup_table_pointer,
        int buffer_count, int load_address, int page_number,
        int transfer_control, int *checksum);
    int memory_data_load_response(LOOKUP_TABLE_TYPE *lookup_table_pointer,
        int *data_pointer, int amount);
    int trailer_response(LOOKUP_TABLE_TYPE *lookup_table_pointer,
        int subpage_count, int first_subpage, int *checksum);
    int exit_load_response(LOOKUP_TABLE_TYPE
        *lookup_table_pointer, int memory_area);
```

```c
    int enter_verify_response(LOOKUP_TABLE_TYPE
        *lookup_table_pointer, int memory_area);
    int memory_data_verify_response(LOOKUP_TABLE_TYPE
        *lookup_table_pointer, int *message_pointer, int amount);
    int exit_verify_response(LOOKUP_TABLE_TYPE
        *lookup_table_pointer, int memory_area);
    int reprogram_status_response(LOOKUP_TABLE_TYPE *lookup_table_pointer);
    int rrt_error_response(LOOKUP_TABLE_TYPE
        *lookup_table_pointer, int action);

#define ABORT       0x0001  /* RRT should abort load/verify */
    #define RESTART     0x0002  /* RRT should completely reload unit */
    #define RETRY       0x0003  /* RRT should repeat last message sequence */
    #define AUTO_RETRY  0x0004  /* RRT has retried 3 times and should abort */

/* Data checksum used for HEADER, MEMORY DATA, and TRAILER messages */

/* BC messages */

/******************************************
*           ACTIVITY BUSY                 *
******************************************/
int activity_busy(LOOKUP_TABLE_TYPE
    *lookup_table_pointer, int *message_pointer)
{
    int return_word;
    int i, count;

TIMER_REG_TYPE *timer;          /* Pointer to timer counter register */
    timer = (TIMER_REG_TYPE *) &TIMER0;

return_word = activity_message(lookup_table_pointer,
        message_pointer);

if(return_word != BUSY_CONDITION)
        return return_word;
    /* keep trying */
    count = ((lookup_table_pointer->Auto_Busy_Count_MSB) << 8)
        + (lookup_table_pointer->Auto_Busy_Count_LSB);
    for(i = 0; i < count; i++)
    {
        msec_timer(lookup_table_pointer->Delay, timer); /* Delay next try */ return_word = activity_message(lookup_table_pointer,
            message_pointer);

if(return_word != BUSY_CONDITION)
            return return_word;
    }
    return BUSY_CONDITION;
}

/**********************************************
*           ACTIVITY MESSAGE                  *
**********************************************/
int activity_message(LOOKUP_TABLE_TYPE
    *lookup_table_pointer, int *message_pointer)
{
    STATUS_WORD_TYPE *status_field;
    ACTIVITY_DATA_TYPE *data_field;
    int command;
    int return_word;

/* Command for receiving status */
    command = (lookup_table_pointer->RT_Address << 11) + ACTIVITY;

/* Check Status message for no timeout */
    return_word = ms1553_receive(&command, message_pointer);

if(return_word)
        return return_word;                     /* Return MS-1553 error */ status_field = (STATUS_WORD_TYPE *) message_pointer;
    /* Check return address */
```

```c
    if(status_field->Terminal_Address !=
        lookup_table_pointer->RT_Address)
        return ADDRESS_ERROR;
    /* Check status and data words for busy */
    data_field = (ACTIVITY_DATA_TYPE *) (message_pointer + 1);
    if(!(status_field->Busy_Bit) && !(data_field->Busy_Bit))
        return NO_ERROR;                        /* Not busy */ return BUSY_CONDITION;              /* busy timeout */
}

/***********************************************
 *      MEMORY_CONFIGURATION_MESSAGE           *
 ***********************************************/
int memory_configuration_message(LOOKUP_TABLE_TYPE
    *lookup_table_pointer, int *message_pointer)
{
    STATUS_WORD_TYPE *word_field;
    int command, return_word;

/* Memory configuration command */
    command = (lookup_table_pointer->RT_Address << 11)
        + MEMORY_CONFIGURATION;

/* Get status and data words */
    return_word = ms1553_receive(&command, message_pointer);
    if(return_word)
        return return_word;                     /* Return MS-1553 error */

/* Check return address */
    word_field = (STATUS_WORD_TYPE *) message_pointer;
    if(word_field->Terminal_Address != lookup_table_pointer->RT_Address)
        return ADDRESS_ERROR;                   /* Address error */ return NO_ERROR;
}

/***********************************************
 *              ENTER LOAD                     *
 ***********************************************/
int enter_load_message(LOOKUP_TABLE_TYPE
    *lookup_table_pointer, int memory_area)
{
    int send_message[5];

/* Reprogramming control message, enable programming */
    /* Command */
    send_message[0] = (lookup_table_pointer->RT_Address << 11)
        + ENTER_LOAD;

/* Data */
    send_message[1] = (lookup_table_pointer->RT_Nomenclature_MSC << 8)
        + (lookup_table_pointer->RT_Nomenclature_2SC);  /* RT nomenclature */
    send_message[2] = (lookup_table_pointer->RT_Nomenclature_3SC << 8)
        + (lookup_table_pointer->RT_Nomenclature_4SC);
    send_message[3] = (lookup_table_pointer->RT_Nomenclature_5SC << 8)
        + (lookup_table_pointer->RT_Nomenclature_LSC);
    switch(memory_area)
    {
        case AREA_1:                            /* Memory area 1 */
            send_message[4] =
            (((((lookup_table_pointer->Area_1_Fill_Data << 2)
            + MEMORY_LOAD) << 2)
            + lookup_table_pointer->Area_1_Disc_Enable) << 6);
            break;
        case AREA_2:                            /* Memory area 2 */
            send_message[4] =
            (((((lookup_table_pointer->Area_2_Fill_Data << 2)
            + MEMORY_LOAD) << 2)
            + lookup_table_pointer->Area_2_Disc_Enable) << 6);
            break;
    }

/* Send the message */
    return command_message(lookup_table_pointer, &send_message[0]);
}
```

```c
/*********************************************
*           HEADER MESSAGE                   *
*********************************************/
/*
    Keep track of checksum for all data words
*/
int header_message(LOOKUP_TABLE_TYPE *lookup_table_pointer,
    int buffer_count, int load_address, int page_number,
    int transfer_control, int *checksum)
{
    int send_message[5];

/* Command */
    send_message[0] = (lookup_table_pointer->RT_Address << 11) + HEADER;

/* Data */
    send_message[1] = ((lookup_table_pointer->Transfer_Mode << 2)
        + lookup_table_pointer->Header_Type << 12)
        + buffer_count;
    *checksum += send_message[1];
    send_message[2] = (page_number << 3) + transfer_control;
    *checksum += send_message[2];
    send_message[3] = (lookup_table_pointer->Entry_Address_MSB << 8)
        + lookup_table_pointer->Entry_Address_LSB;
    *checksum += send_message[3];
    send_message[4] = load_address;
    *checksum += send_message[4];

/* Send the message */
    return command_message(lookup_table_pointer, &send_message[0]);
}

/*********************************************
*           MEMORY DATA LOAD                 *
*********************************************/
/*
    amount = number of words to transfer
*/
int memory_data_load_message(LOOKUP_TABLE_TYPE
    *lookup_table_pointer, int *data_pointer, int amount)
{
    int i;

/* Command */
    *data_pointer = (lookup_table_pointer->RT_Address << 11)
        + (MEMORY_DATA_LOAD << 5) + (0x1f & amount);

/* Send the data */
    return command_message(lookup_table_pointer, data_pointer);
}

/*********************************************
*           TRAILER MESSAGE                  *
*********************************************/
/*
    data word 1: the number of sub-pages and the first
        sub-page for units utilizing this form of paging.
    data word 2: the checksum
*/
int trailer_message(LOOKUP_TABLE_TYPE *lookup_table_pointer,
    int subpage_count, int first_subpage, int *checksum)
{
    int send_message[3];

/* Command */
    send_message[0] = (lookup_table_pointer->RT_Address << 11) + TRAILER;

/* Data */
    send_message[1] = (subpage_count << 8) + first_subpage;
    *checksum += send_message[1];
    send_message[2] = 0xffff & *checksum;

/* Send the message */
    return command_message(lookup_table_pointer, &send_message[0]);
}
```

```c
/*********************************************
*              EXIT LOAD                     *
*********************************************/
int exit_load_message(LOOKUP_TABLE_TYPE
    *lookup_table_pointer, int memory_area)
{
    int send_message[5];

/* Reprogramming control message, exit programming */
    /* Command */
    send_message[0] = (lookup_table_pointer->RT_Address << 11)
        + EXIT_LOAD;

/* Data */
    send_message[1] = (lookup_table_pointer->RT_Nomenclature_MSC << 8)
        + (lookup_table_pointer->RT_Nomenclature_2SC);   /* RT nomenclature */
    send_message[2] = (lookup_table_pointer->RT_Nomenclature_3SC << 8)
        + (lookup_table_pointer->RT_Nomenclature_4SC);
    send_message[3] = (lookup_table_pointer->RT_Nomenclature_5SC << 8)
        + (lookup_table_pointer->RT_Nomenclature_LSC);
    switch(memory_area)
    {
        case AREA_1:                            /* Memory area 1 */
            send_message[4] =
            ((lookup_table_pointer->Area_1_Fill_Data << 6)
            + lookup_table_pointer->Area_1_Disc_Disable) << 4;
            break;
        case AREA_2:                            /* Memory area 2 */
            send_message[4] =
            ((lookup_table_pointer->Area_2_Fill_Data << 6)
            + lookup_table_pointer->Area_2_Disc_Disable) << 4;
            break;
    }

/* Send the message */
    return command_message(lookup_table_pointer, &send_message[0]);
}

/*********************************************
*              ENTER VERIFY                  *
*********************************************/
int enter_verify_message(LOOKUP_TABLE_TYPE
    *lookup_table_pointer, int memory_area)
{
    int send_message[5];

/* Verify control message, enable verify */
    /* Command */
    send_message[0] = (lookup_table_pointer->RT_Address << 11)
        + ENTER_VERIFY;

/* Data */
    send_message[1] = (lookup_table_pointer->RT_Nomenclature_MSC << 8)
        + (lookup_table_pointer->RT_Nomenclature_2SC);   /* RT nomenclature */
    send_message[2] = (lookup_table_pointer->RT_Nomenclature_3SC << 8)
        + (lookup_table_pointer->RT_Nomenclature_4SC);
    send_message[3] = (lookup_table_pointer->RT_Nomenclature_5SC << 8)
        + (lookup_table_pointer->RT_Nomenclature_LSC);
    switch(memory_area)
    {
        case AREA_1:                            /* Memory area 1 */
            send_message[4] =
                (((lookup_table_pointer->Area_1_Fill_Data << 2)
                + MEMORY_VERIFY) << 8);
            break;
        case AREA_2:                            /* Memory area 2 */
            send_message[4] =
                (((lookup_table_pointer->Area_2_Fill_Data << 2)
                + MEMORY_VERIFY) << 8);
            break;
    }

/* Send the message */
    return command_message(lookup_table_pointer, &send_message[0]);
}
```

```c
/*********************************************
*           MEMORY DATA VERIFY              *
*********************************************/
/*
    word_count = number of words to transfer
*/
int memory_data_verify_message(LOOKUP_TABLE_TYPE
    *lookup_table_pointer, int *message_pointer, int amount)
{
    STATUS_WORD_TYPE *word_field;
    int command, return_word;

command = (lookup_table_pointer->RT_Address << 11)
        + (MEMORY_DATA_VERIFY << 5) + (0x1f & amount);

/* Check Status message for no timeout */
    return_word = ms1553_receive(&command, message_pointer);
    if(return_word)
        return return_word;                        /* Return MS-1553 error */
    else
    {
        word_field = (STATUS_WORD_TYPE *) message_pointer;
        /* Check return address */
        if(word_field->Terminal_Address != lookup_table_pointer->RT_Address)
            return ADDRESS_ERROR;
    } return NO_ERROR;
}

/*********************************************
*                EXIT VERIFY                *
*********************************************/
int exit_verify_message(LOOKUP_TABLE_TYPE
    *lookup_table_pointer, int memory_area)
{
    int send_message[5];

/* Verify control message, exit verify */
    /* Command */
    send_message[0] = (lookup_table_pointer->RT_Address << 11)
        + EXIT_VERIFY;

/* Data */
    send_message[1] = (lookup_table_pointer->RT_Nomenclature_MSC << 8)
        + (lookup_table_pointer->RT_Nomenclature_2SC);   /* RT nomenclature */
    send_message[2] = (lookup_table_pointer->RT_Nomenclature_3SC << 8)
        + (lookup_table_pointer->RT_Nomenclature_4SC);
    send_message[3] = (lookup_table_pointer->RT_Nomenclature_5SC << 8)
        + (lookup_table_pointer->RT_Nomenclature_LSC);
    switch(memory_area)
    {
        case AREA_1:                                /* Memory area 1 */
            send_message[4] =
                lookup_table_pointer->Area_1_Fill_Data << 10;
            break;
        case AREA_2:                                /* Memory area 2 */
            send_message[4] =
                lookup_table_pointer->Area_2_Fill_Data << 10;
            break;
    }
    /* Send the message */
    return command_message(lookup_table_pointer, &send_message[0]);
}

/*******************************************
*       SERVICE REQUEST MESSAGE           *
*******************************************/
int service_message(LOOKUP_TABLE_TYPE *lookup_table_pointer, int request)
{
    COMMAND_WORD_TYPE *command_field;
    STATUS_WORD_TYPE *status_field;
    int command, status, message[33];
    int return_word;
```

```c
    command_field = (COMMAND_WORD_TYPE *) &request;

command = (lookup_table_pointer->RT_Address << 11) + request;

if(command_field->RT_Transmit)       /* Requesting data from RT */
    {
        switch(request)
        {
            case REPROGRAM_STATUS:
                return reprogram_status_message(lookup_table_pointer);
                break;
            default:
                /* Data from remaining receive messages
                    is not used at this time */
                return_word = ms1553_receive(&command, &message[0]);
                if(return_word)
                    return return_word;         /* Return MS-1553 error */
                else
                {
                    status_field = (STATUS_WORD_TYPE *) &message[0];
                    /* Check return address */
                    if(status_field->Terminal_Address !=
                        lookup_table_pointer->RT_Address)
                        return ADDRESS_ERROR;
                }
                return NO_ERROR;
                break;
        }
    }
    else                                /* Send requested message */
    {
        message[0] = command;

/* No send messages have been implemented */
        return command_message(lookup_table_pointer, &message[0]);
    }
}

/**********************************************
*       REPROGRAM STATUS MESSAGE              *
**********************************************/
/*
    During reprogramming operations the RT may
    halt operations by sending a BUSY bit in the
    status responce word or in the activity message data
    word.  When the RRT receives a busy bit, it will
    transmit activity messages untill the busy bit is
    cleared.  (The request to transmit the reprogram
    status message will be honored after the first activity
    message responce with a busy bit cleared.)

Status codes include:  abort, restart, retry, and auto
        retry.

>>>> On entry busy bit has been cleared above.
*/
int reprogram_status_message(LOOKUP_TABLE_TYPE *lookup_table_pointer)
{
    STATUS_WORD_TYPE *word_field;
    REPROGRAM_STATUS_TYPE *status_field;
    int command, return_word, return_message[2];
    int location = 16;          /* Status display starts at line #1, char 17 */
    char ascii_string[5];       /* String of characters for LCD display */

/* Command */
    command = (lookup_table_pointer->RT_Address << 11)
        + REPROGRAM_STATUS;

/* Get status */
    return_word = ms1553_receive(&command, &return_message[0]);
    if(return_word)
        return return_word;                     /* Return MS-1553 error */ word_field = (STATUS_WORD_TYPE *) &return_message[0];
```

```c
    /* Check return address */
    if(word_field->Terminal_Address != lookup_table_pointer->RT_Address)
        return ADDRESS_ERROR;
    /* Check if busy */
    if(word_field->Busy_Bit)                    /* Check status busy bit */
        return BUSY_CONDITION;                  /* Not busy */ status_field = (REPROGRAM_STATUS_TYPE *) &return_message[1];
    if(!(status_field->Status_Flag))            /* Check status flag */
        return NO_ERROR;                        /* Ignore message */ if(status_field->Status_Indicator)          /* Check status indicator */
    {
        #ifndef LED_DISPLAY
            ascii_conversion(status_field->Status_Code, &ascii_string[0]);
            LCD_display(location, &ascii_string[0]);
        #endif
        return NO_ERROR;
    } return (status_field->Status_Code);
}
/************************************************
*              RRT ERROR                        *
************************************************/
/*
    this message is sent to the RT to indicate
    that the RRT has detected an error in the
    LOAD/VERIFY.

arguments:
    1 = abort, no further entries will be made
    2 = complete restart
    4 = last transaction will be repeated
*/
int rrt_error_message(LOOKUP_TABLE_TYPE
    *lookup_table_pointer, int action)
{
    int send_message[2];

/* Command */
    send_message[0] = (lookup_table_pointer->RT_Address << 11)
        + RRT_ERROR;
    send_message[1] = action;

/* Send message */
    return command_message(lookup_table_pointer, &send_message[0]);
}

/************************************************
*           COMMAND MESSAGE SEND                *
************************************************/
/*
    high level MIL 1553 interface. This function
    performs the following tasks:

- sends message transactions
    - includes required delay between messages
    - checks status word
    - errors out for busy retry count
    - repeats commands if required
    - errors out for too many repeats arguments to command_message are:
    *send_message = pointer to message to send
*/
int command_message(LOOKUP_TABLE_TYPE
    *lookup_table_pointer, int *send_message)
{
    STATUS_WORD_TYPE *status_field;
    int return_word, status;
    int return_message[2];
    int i, count;
```

```c
TIMER_REG_TYPE *timer;              /* Pointer to timer counter register */
timer = (TIMER_REG_TYPE *) &TIMER0;

/* Send message */
return_word = ms1553_send(send_message, &status);
if(return_word)
    return return_word;             /* Return MS-1553 error */

/* Check status for RT address mismatch */
status_field = (STATUS_WORD_TYPE *) &status;
/* Check return address */
if(status_field->Terminal_Address != lookup_table_pointer->RT_Address)
    return ADDRESS_ERROR;

/* Check if need to repeat last message due to busy */
if(lookup_table_pointer->Transmit_Next_Message)
    return NO_ERROR;                /* Do not repeat last */

/* Check for RT busy if status busy bit is usable */
if(lookup_table_pointer->Status_Busy_Usable)
    if(!(status_field->Busy_Bit))
        return NO_ERROR;            /* Not busy */
else
    /* The RT was not busy prior to sending the message */
    return NO_ERROR;

count = (lookup_table_pointer->Auto_Busy_Count_MSB) << 8
    + lookup_table_pointer->Auto_Busy_Count_LSB;
for(i = 0; i < count; i++)
{
    /* Delay next message */
    msec_timer(lookup_table_pointer->Delay, timer);

/* Check RT for busy */
    return_word = activity_busy(lookup_table_pointer,
        &return_message[0]);
    if(return_word)
        return return_word;         /* Still busy or Error */

/* Delay next message */
    msec_timer(lookup_table_pointer->Delay, timer);

/* Get reprogram status from RT */
    return_word = reprogram_status_message(lookup_table_pointer);
    if(return_word)
        return return_word;

/* Delay next message */
    msec_timer(lookup_table_pointer->Delay, timer);

/* Check for RT busy if status busy bit is not usable */
    if(!(lookup_table_pointer->Status_Busy_Usable))
    {
        /* Check RT for busy */
        return_word = activity_busy(lookup_table_pointer,
            &return_message[0]);
        if(return_word)
            return return_word;

/* Delay next message */
        msec_timer(lookup_table_pointer->Delay, timer);
    }

/* Send command message */
    return_word = ms1553_send(send_message, &status);
    if(return_word)
        return return_word;         /* Return MS-1553 error */

/* Check status for RT address mismatch */
    status_field = (STATUS_WORD_TYPE *) &status;
    /* Check return address */
    if(status_field->Terminal_Address !=
        lookup_table_pointer->RT_Address)
        return ADDRESS_ERROR;
```

```c
        /* Check for RT busy if status busy bit is usable */
        if(lookup_table_pointer->Status_Busy_Usable)
            if(!(status_field->Busy_Bit))
                return NO_ERROR;                /* Not busy */
        else
            /* The RT was not busy prior to sending the message */
            return NO_ERROR;
    } return BUSY_CONDITION;                      /* Still busy */
}
/*****************************************************************/
/* RT messages */
/*****************************************************************/

/**********************************************
 *      MEMORY CONFIGURATION RESPONSE         *
 **********************************************/
int memory_configuration_response(LOOKUP_TABLE_TYPE
    *lookup_table_pointer, int *message_pointer)
{
    int command, message[33], return_word;

/* Expected BC command */
    command = (lookup_table_pointer->RRT_RT_Address << 11) + ACTIVITY;
    /* Request for memory configuration message */
    message[0] = (lookup_table_pointer->RRT_RT_Address << 11) + SERVICE_STATUS;
    message[1] = MEMORY_CONFIG_REQ;

/* Submit request */
    return_word = ms1553_respond(&command, &message[0]);
    if(return_word)
        return return_word;                     /* Return MS-1553 error */

/* Memory configuration command */
    command = (lookup_table_pointer->RRT_RT_Address << 11)
        + MEMORY_CONFIG_REQ;

/* Get message containing command and data words */
    return_word = ms1553_respond(&command, &message[0]);
    if(return_word)
        return return_word;                     /* Return MS-1553 error */

/* Transfer response to message_pointer location */
    *message_pointer++ = message[0];
    *message_pointer++ = message[1];
    *message_pointer++ = message[2];

return NO_ERROR;
}

/**********************************************
 *          ENTER LOAD RESPONSE               *
 **********************************************/
int enter_load_response(LOOKUP_TABLE_TYPE
    *lookup_table_pointer, int memory_area)
{
    int command, message[33], return_word;

/* Expected BC command */
    command = (lookup_table_pointer->RRT_RT_Address << 11) + ACTIVITY;
    /* Request for enter load message */
    message[0] = (lookup_table_pointer->RRT_RT_Address << 11) + SERVICE_STATUS;
    message[1] = ENTER_LOAD_REQ;

/* Submit request */
    return_word = ms1553_respond(&command, &message[0]);
    if(return_word)
        return return_word;                     /* Return MS-1553 error */

/* Reprogramming control message, enable programming */
    /* Enter expected enter load command */
    command = (lookup_table_pointer->RRT_RT_Address << 11)
        + ENTER_LOAD_REQ;
```

```c
    /* Status word containing RRT RT address */
    message[0] = 0xf800 & command;

/* Data */
    message[1] = (lookup_table_pointer->BC_Nomenclature_MSC << 8)
        + (lookup_table_pointer->BC_Nomenclature_2SC);   /* RT nomenclature */
    message[2] = (lookup_table_pointer->BC_Nomenclature_3SC << 8)
        + (lookup_table_pointer->BC_Nomenclature_4SC);
    message[3] = (lookup_table_pointer->BC_Nomenclature_5SC << 8)
        + (lookup_table_pointer->BC_Nomenclature_LSC);
    switch(memory_area)
    {
        case AREA_1:                                /* Memory area 1 */
            message[4] =
                (((((lookup_table_pointer->Area_1_Fill_Data << 2)
                + MEMORY_LOAD) << 2)
                + lookup_table_pointer->Area_1_Disc_Enable) << 6);
            break;
        case AREA_2:                                /* Memory area 2 */
            message[4] =
                (((((lookup_table_pointer->Area_2_Fill_Data << 2)
                + MEMORY_LOAD) << 2)
                + lookup_table_pointer->Area_2_Disc_Enable) << 6);
            break;
    }

/* Submit status and data words */
    return_word = ms1553_respond(&command, &message[0]);
    if(return_word)
        return return_word;                         /* Return MS-1553 error */ return NO_ERROR;
}

/*******************************************
*           HEADER RESPONSE                *
********************************************/
int header_response(LOOKUP_TABLE_TYPE *lookup_table_pointer,
    int buffer_count, int load_address, int page_number,
    int transfer_control, int *checksum)
{
    int command, message[33], return_word;

/* Expected BC command */
    command = (lookup_table_pointer->RRT_RT_Address << 11) + ACTIVITY;
    /* Request for header message */
    message[0] = (lookup_table_pointer->RRT_RT_Address << 11) + SERVICE_STATUS;
    message[1] = HEADER_REQ;

/* Submit request */
    return_word = ms1553_respond(&command, &message[0]);
    if(return_word)
        return return_word;                         /* Return MS-1553 error */

/* Enter expected header command */
    command = (lookup_table_pointer->RRT_RT_Address << 11)
        + HEADER_REQ;

/* Status word containing RRT RT address */
    message[0] = 0xf800 & command;

/* Data */
    message[1] = ((lookup_table_pointer->Transfer_Mode << 2)
        + lookup_table_pointer->Header_Type << 12)
        + buffer_count;
    *checksum += message[1];
    message[2] = (page_number << 3) + transfer_control;
    *checksum += message[2];
    message[3] = (lookup_table_pointer->Entry_Address_MSB << 8)
        + lookup_table_pointer->Entry_Address_LSB;
    *checksum += message[3];
    message[4] = load_address;
    *checksum += message[4];
```

```c
        /* Submit status and data words */
        return_word = ms1553_respond(&command, &message[0]);
        if(return_word)
            return return_word;                         /* Return MS-1553 error */ return NO_ERROR;
}

/**********************************************
*       MEMORY DATA LOAD RESPONSE             *
**********************************************/
int memory_data_load_response(LOOKUP_TABLE_TYPE *lookup_table_pointer,
        int *data_pointer, int amount)
{
        int i, command, message[33], return_word;

/* Expected BC command */
        command = (lookup_table_pointer->RRT_RT_Address << 11) + ACTIVITY;
        /* Request for memory data load message */
        message[0] = (lookup_table_pointer->RRT_RT_Address << 11) + SERVICE_STATUS;
        message[1] = (MEMORY_DATA_LOAD_REQ << 5) + (0x1f & amount);

/* Submit request */
        return_word = ms1553_respond(&command, &message[0]);
        if(return_word)
            return return_word;                         /* Return MS-1553 error */

/* Enter expected memory data load command */
        command = (lookup_table_pointer->RRT_RT_Address << 11)
            + (MEMORY_DATA_LOAD_REQ << 5) + (0x1f & amount);

/* Status word containing RRT RT address */
        *data_pointer = 0xf800 & command;

/* Submit status and data words */
        return_word = ms1553_respond(&command, data_pointer);
        if(return_word)
            return return_word;                         /* Return MS-1553 error */ return NO_ERROR;
}

/**********************************************
*             TRAILER RESPONSE                *
**********************************************/
int trailer_response(LOOKUP_TABLE_TYPE *lookup_table_pointer,
        int subpage_count, int first_subpage, int *checksum)
{
        int command, message[33], return_word;

/* Expected BC command */
        command = (lookup_table_pointer->RRT_RT_Address << 11) + ACTIVITY;
        /* Request for trailer message */
        message[0] = (lookup_table_pointer->RRT_RT_Address << 11) + SERVICE_STATUS;
        message[1] = TRAILER_REQ;

/* Submit request */
        return_word = ms1553_respond(&command, &message[0]);
        if(return_word)
            return return_word;                         /* Return MS-1553 error */

/* Enter expected trailer command */
        command = (lookup_table_pointer->RRT_RT_Address << 11) + TRAILER_REQ;

/* Status word containing RRT RT address */
        message[0] = 0xf800 & command;

/* Data */
        message[1] = (subpage_count << 8) + first_subpage;
        *checksum += message[1];
        message[2] = 0xffff & *checksum;

/* Submit status and data words */
        return_word = ms1553_respond(&command, &message[0]);
```

```c
        if(return_word)
            return return_word;                         /* Return MS-1553 error */ return NO_ERROR;
}

/**********************************************
*           EXIT LOAD RESPONSE                *
**********************************************/
int exit_load_response(LOOKUP_TABLE_TYPE
    *lookup_table_pointer, int memory_area)
{
    int command, message[33], return_word;

/* Expected BC command */
    command = (lookup_table_pointer->RRT_RT_Address << 11) + ACTIVITY;
    /* Request for exit load message */
    message[0] = (lookup_table_pointer->RRT_RT_Address << 11) + SERVICE_STATUS;
    message[1] = EXIT_LOAD_REQ;

/* Submit request */
    return_word = ms1553_respond(&command, &message[0]);
    if(return_word)
        return return_word;                         /* Return MS-1553 error */

/* Enter expected exit load command */
    command = (lookup_table_pointer->RRT_RT_Address << 11) + EXIT_LOAD_REQ;

/* Status word containing RRT RT address */
    message[0] = 0xf800 & command;

/* Data */
    message[1] = (lookup_table_pointer->BC_Nomenclature_MSC << 8)
        + (lookup_table_pointer->BC_Nomenclature_2SC);   /* RT nomenclature */
    message[2] = (lookup_table_pointer->BC_Nomenclature_3SC << 8)
        + (lookup_table_pointer->BC_Nomenclature_4SC);
    message[3] = (lookup_table_pointer->BC_Nomenclature_5SC << 8)
        + (lookup_table_pointer->BC_Nomenclature_LSC);
    switch(memory_area)
    {
        case AREA_1:                                /* Memory area 1 */
            message[4] =
                ((lookup_table_pointer->Area_1_Fill_Data << 6)
                + lookup_table_pointer->Area_1_Disc_Disable) << 4;
            break;
        case AREA_2:                                /* Memory area 2 */
            message[4] =
                ((lookup_table_pointer->Area_2_Fill_Data << 6)
                + lookup_table_pointer->Area_2_Disc_Disable) << 4;
            break;
    }

/* Submit status and data words */
    return_word = ms1553_respond(&command, &message[0]);
    if(return_word)
        return return_word;                         /* Return MS-1553 error */ return NO_ERROR;
}

/**********************************************
*           ENTER VERIFY RESPONSE             *
**********************************************/
int enter_verify_response(LOOKUP_TABLE_TYPE
    *lookup_table_pointer, int memory_area)
{
    int command, message[33], return_word;

/* Expected BC command */
    command = (lookup_table_pointer->RRT_RT_Address << 11) + ACTIVITY;
    /* Request for enter verify message */
    message[0] = (lookup_table_pointer->RRT_RT_Address << 11) + SERVICE_STATUS;
    message[1] = ENTER_VERIFY_REQ;
```

```c
    /* Submit request */
    return_word = ms1553_respond(&command, &message[0]);
    if(return_word)
        return return_word;                          /* Return MS-1553 error */

/* Enter expected enter verify command */
    command = (lookup_table_pointer->RRT_RT_Address << 11) + ENTER_VERIFY_REQ;

/* Status word containing RRT RT address */
    message[0] = 0xf800 & command;

/* Data */
    message[1] = (lookup_table_pointer->BC_Nomenclature_MSC << 8)
        + (lookup_table_pointer->BC_Nomenclature_2SC);  /* RT nomenclature */
    message[2] = (lookup_table_pointer->BC_Nomenclature_3SC << 8)
        + (lookup_table_pointer->BC_Nomenclature_4SC);
    message[3] = (lookup_table_pointer->BC_Nomenclature_5SC << 8)
        + (lookup_table_pointer->BC_Nomenclature_LSC);
    switch(memory_area)
    {
        case AREA_1:                                 /* Memory area 1 */
            message[4] =
                (((lookup_table_pointer->Area_1_Fill_Data << 2)
                + MEMORY_VERIFY) << 8);
            break;
        case AREA_2:                                 /* Memory area 2 */
            message[4] =
                (((lookup_table_pointer->Area_2_Fill_Data << 2)
                + MEMORY_VERIFY) << 8);
            break;
    }

/* Submit status and data words */
    return_word = ms1553_respond(&command, &message[0]);
    if(return_word)
        return return_word;                          /* Return MS-1553 error */ return NO_ERROR;
}

/***********************************************
*       MEMORY DATA VERIFY RESPONSE            *
***********************************************/
int memory_data_verify_response(LOOKUP_TABLE_TYPE
    *lookup_table_pointer, int *message_pointer, int amount)
{
    int command, message[33], return_word;

/* Expected BC command */
    command = (lookup_table_pointer->RRT_RT_Address << 11) + ACTIVITY;
    /* Request for memory data verify message */
    message[0] = (lookup_table_pointer->RRT_RT_Address << 11) + SERVICE_STATUS;
    message[1] = (MEMORY_DATA_VERIFY_REQ << 5) + (0x1f & amount);

/* Submit request */
    return_word = ms1553_respond(&command, &message[0]);
    if(return_word)
        return return_word;                          /* Return MS-1553 error */

/* Enter expected memory data verify command */
    command = (lookup_table_pointer->RRT_RT_Address << 11)
        + (MEMORY_DATA_VERIFY_REQ << 5) + (0x1f & amount);

/* Wait for command and data words */
    return_word = ms1553_respond(&command, message_pointer);
    if(return_word)
        return return_word;                          /* Return MS-1553 error */ return NO_ERROR;
}

/***********************************************
*           EXIT VERIFY RESPONSE               *
***********************************************/
```

```
int exit_verify_response(LOOKUP_TABLE_TYPE
    *lookup_table_pointer, int memory_area)
{
    int command, message[33], return_word;

/* Expected BC command */
    command = (lookup_table_pointer->RRT_RT_Address << 11) + ACTIVITY;
    /* Request for exit verify message */
    message[0] = (lookup_table_pointer->RRT_RT_Address << 11) + SERVICE_STATUS;
    message[1] = EXIT_VERIFY_REQ;

/* Submit request */
    return_word = ms1553_respond(&command, &message[0]);
    if(return_word)
        return return_word;                           /* Return MS-1553 error */

/* Enter expected exit verify command */
    command = (lookup_table_pointer->RRT_RT_Address << 11)
        + EXIT_VERIFY_REQ;

/* Status word containing RRT RT address */
    message[0] = 0xf800 & command;

/* Data */
    message[1] = (lookup_table_pointer->BC_Nomenclature_MSC << 8)
        + (lookup_table_pointer->BC_Nomenclature_2SC);   /* RT nomenclature */
    message[2] = (lookup_table_pointer->BC_Nomenclature_3SC << 8)
        + (lookup_table_pointer->BC_Nomenclature_4SC);
    message[3] = (lookup_table_pointer->BC_Nomenclature_5SC << 8)
        + (lookup_table_pointer->BC_Nomenclature_LSC);
    switch(memory_area)
    {
        case AREA_1:                                  /* Memory area 1 */
            message[4] =
                lookup_table_pointer->Area_1_Fill_Data << 10;
            break;
        case AREA_2:                                  /* Memory area 2 */
            message[4] =
                lookup_table_pointer->Area_2_Fill_Data << 10;
            break;
    }

/* Submit status and data words */
    return_word = ms1553_respond(&command, &message[0]);
    if(return_word)
        return return_word;                           /* Return MS-1553 error */ return NO_ERROR;
}

/*********************************************
*       REPROGRAM STATUS RESPONSE            *
*********************************************/
int reprogram_status_response(LOOKUP_TABLE_TYPE *lookup_table_pointer)
{
    REPROGRAM_STATUS_TYPE *status_field;
    int command, message[33], return_word;
    int location = DISPLAY_START;
    char ascii_string[5];

/* Expected BC command */
    command = (lookup_table_pointer->RRT_RT_Address << 11) + ACTIVITY;
    /* Request for exit verify message */
    message[0] = (lookup_table_pointer->RRT_RT_Address << 11) + SERVICE_STATUS;
    message[1] = REPROGRAM_STATUS_REQ;

/* Submit request */
    return_word = ms1553_respond(&command, &message[0]);
    if(return_word)
        return return_word;                           /* Return MS-1553 error */

/* Enter expected exit verify command */
    command = (lookup_table_pointer->RRT_RT_Address << 11)
        + REPROGRAM_STATUS_REQ;
```

```c
    /* Get status, wait for command and data words */
    return_word = ms1553_respond(&command, &message[0]);
    if(return_word)
        return return_word;                           /* Return MS-1553 error */ status_field = (REPROGRAM_STATUS_TYPE *) &message[1];
    if(!(status_field->Status_Flag))         /* Check status flag */
        return NO_ERROR;                     /* Ignore message */ if(status_field->Status_Indicator)       /* Check status indicator */
    {
        #ifndef LED_DISPLAY
            ascii_conversion(status_field->Status_Code, &ascii_string[0]);
            LCD_display(location, &ascii_string[0]);
        #endif
        return NO_ERROR;
    } return (status_field->Status_Code);
}

/**********************************************
*          RRT ERROR RESPONSE                 *
**********************************************/
int rrt_error_response(LOOKUP_TABLE_TYPE
    *lookup_table_pointer, int action)
{
    int command, message[33], return_word;

/* Expected BC command */
    command = (lookup_table_pointer->RRT_RT_Address << 11) + ACTIVITY;

/* Request for error message */
    message[0] = (lookup_table_pointer->RRT_RT_Address << 11) + SERVICE_STATUS;
    message[1] = RRT_ERROR_REQ;

/* Submit request */
    return_word = ms1553_respond(&command, &message[0]);
    if(return_word)
        return return_word;                           /* Return MS-1553 error */

/* Enter expected error command */
    command = (lookup_table_pointer->RRT_RT_Address << 11)
        + RRT_ERROR_REQ;

/* Status word containing RRT RT address */
    message[0] = 0xf800 & command;

message[1] = action;

/* Submit status and data words */
    return_word = ms1553_respond(&command, &message[0]);
    if(return_word)
        return return_word;                           /* Return MS-1553 error */ return NO_ERROR;
}

/**********************************************
*       ASCII CONVERSION ROUTINE              *
**********************************************/
void ascii_conversion(int hex_number, int *ascii_string)
{
    int i, temp;

for(i = 0; i < 4; i++)
    {
        temp = 0x0f & hex_number;
        if(temp <= 9)
            temp += '0';
        else
            temp += ('A' - 0x0a);
        *(ascii_string + 3 - i) = temp;
        hex_number = hex_number >> 4;
    }
```

```
        *(ascii_string + 4) = 0;              /* End of string indicator */
}
/* end */
/*
    ********************
    *                  *
    *   RRT.H MODULE   *
    *                  *
    ********************
*/

/* filename: RRT.H */

/* Program configuration defined as follows: */ define    TMS320C30              /* TMS320C30 conditionals activated */
/*      #define    LED_DISPLAY       */   /* LED Display Conditionals activated */
        #define    BOOT_LOADABLE          /* Command Mode Program activated */
/*      #define    FLEET_VERSION     */   /* Fleet version of software */

/* END */
/*
    ********************
    *                  *
    *   BOOT.H MODULE  *
    *                  *
    ********************
*/

/* filename: BOOT.H */

/*
    BOOT.C contains the following functions:
*/ void boot_main(SERIAL_REG_TYPE *serial_reg);
    void boot(SERIAL_REG_TYPE *serial_reg);
    void write_eeprom(int word_count, int *data_store,
        int *data_buffer, SERIAL_REG_TYPE *serial_reg);
    void enable_eeprom_write(void);
    int fetch_byte(SERIAL_REG_TYPE *serial_reg);
    int fetch_nyble(SERIAL_REG_TYPE *serial_reg);
    int fetch_receive(SERIAL_REG_TYPE *serial_reg);
    void send_message(char *string, SERIAL_REG_TYPE *serial_reg);
    void send_serial(int data, SERIAL_REG_TYPE *serial_reg);
    void LCD_boot_display(char *string, SERIAL_REG_TYPE *serial_reg);

/* END */
/*
    ********************
    *                  *
    *   DSP.H MODULE   *
    *                  *
    ********************
*/

/* filename: DSP.H */

/* External definitions used for boot operation */ extern  BOOT_RUN;                    /* Execution location of boot.c */
    extern  BOOT_STORE;                  /* Storage location for boot.c data */

/* Definitions of variables internal to DSP */ extern  DMAREGS;
    extern  TIMER0;
    extern  TIMER1;
    extern  SERIAL0;
    extern  SERIAL1;

typedef struct         /* Variable definitions pertaining to DMA usage */
{
```

```c
        unsigned Not_Used_0[4];                     /* Not used by "C" Program */
        unsigned DMA_Source_Address;
        unsigned Not_Used_1;                        /* Not used by "C" Program */
        unsigned DMA_Destination_Address;
        unsigned Not_Used_2;                        /* Not used by "C" Program */
        unsigned DMA_Transfer_Counter;
        unsigned Not_Used_3[7];                     /* Not used by "C" Program */

} DMA_REG_TYPE;

typedef struct            /* Variable definitions pertaining to Timer usage */
{
        unsigned Not_Used_0[4];                     /* Not used by "C" Program */
        unsigned Timer_Counter;
        unsigned Not_Used_1[11];                    /* Not used by "C" Program */

} TIMER_REG_TYPE;

typedef struct  /* Variable definitions pertaining to Serial port 0 usage */
{
        unsigned Data_Received              :  1;   /* Data ready to read */
        unsigned Transmit_Buffer_Empty      :  1;   /* Ready for next word */
        unsigned Not_Used_0                 :  1;   /* Unused bit */
        unsigned Transmitter_Shifting       :  1;   /* Shift register not empty */
        unsigned Receiver_Overrun           :  1;   /* Receiver has overrun */
        unsigned Not_Used_1                 : 27;   /* Unused bits */ unsigned Not_Used_2;                        /* Not used by "C" Program */ unsigned Not_Used_3                 : 11;   /* Unused bits */ unsigned Sending_Data               :  1;   /* 1 ==> Sending */
        unsigned Not_Used_4                 : 20;   /* Unused bits */ unsigned Not_Used_5                 : 11;   /* Unused bits */
        unsigned Valid_Sync                 :  1;   /* 1 ==> Sync is valid */
        unsigned Not_Used_6                 : 20;   /* Unused bits */ unsigned Timer_Control;
        unsigned Xmit_Timer_Counter         : 16;   /* Transmit timer counter */
        unsigned Recv_Timer_Counter         : 16;   /* Receive timer counter */
        unsigned Xmit_Timer_Period          : 16;   /* Transmit timer period */
        unsigned Recv_Timer_Period          : 16;   /* Receive timer period */
        unsigned Not_Used_7;                        /* Not used by "C" Program */
        unsigned Data_Transmit;                     /* Data sent, limited to 16 bits */
        unsigned Not_Used_9[3];                     /* Not used by "C" Program */
        unsigned Data_Receive               : 16;   /* Data received */
        unsigned Not_Used_10                : 16;
        unsigned Not_Used_11[3];                    /* Not used by "C" Program */

} MS1553_DATA_REG_TYPE;

typedef struct  /* Variable definitions pertaining to Serial port 1 usage */
{
        unsigned Not_Used_0[2];                     /* Not used by "C" Program */ unsigned Transmit_Control;

unsigned Not_Used_1                 :  3;   /* Unused bits */
        unsigned Command_Status_Sync        :  1;   /* 1 ==> Command or Status Sync */
        unsigned Not_Used_2                 :  3;   /* Unused bits */
        unsigned Valid_Word_Received        :  1;   /* 1 ==> Received */
        unsigned Not_Used_3                 :  2;   /* Unused bits */
        unsigned Output_Control             :  1;   /* 1 ==> Output inhibited */
        unsigned Not_Used_4                 : 21;   /* Unused bits */ unsigned Timer_Control;
        unsigned Xmit_Timer_Counter         : 16;   /* Transmit timer counter */
        unsigned Recv_Timer_Counter         : 16;   /* Receive timer counter */
        unsigned Xmit_Timer_Period          : 16;   /* Transmit timer period */
        unsigned Recv_Timer_Period          : 16;   /* Receive timer period */
        unsigned Not_Used_5[8];                     /* Not used by "C" Program */
```

```c
} MS1553_CNTL_REG_TYPE;

#define DATA_ENCODE       0x00000040       /* Encode data word */
    #define COMMAND_ENCODE    0x00000440       /* Encode command or status word */

/* end */
/*
    ************************
    *                      *
    *   SYSTEM.H MODULE    *
    *                      *
    ************************
*/

/* filename: SYSTEM.H */

/* External definitions used for boot operation */ extern  BOOT_LOCATION;                /* Storage location for boot.c */
    extern  REPROGRAM;                    /* Reprogram starting boundary */

/* Definitions of variables external to DSP */ extern  MEMCARD0;
    extern  MEMCARD1;

extern  RS232;
    extern  PPI1;
    extern  PPI2;
    extern  PPI3;
    extern  RS422;
    extern  GPIBREGS;

typedef struct      /* Variable definitions pertaining to UART #1 & 2 usage. */
{
    unsigned Data_Register          :  8;   /* Input and Output Register */
    unsigned Unusable_0             : 24;   /* Unusable bits */ unsigned Status_Register;               /* I/O status */ unsigned Control_Register;              /* Modem control register */ unsigned Request_To_Send        :  1;   /* Terminal's Request to send */
    unsigned Terminal_Ready         :  1;   /* Terminal ready to receive */
    unsigned Not_Used_3             :  6;   /* Unused bits */
    unsigned Unusable_3             : 24;   /* Unusable bits */

} SERIAL_REG_TYPE;

typedef struct      /* Status Register bit definitions */
{
    unsigned Error                  :  3;   /* 0 ==> No Error */
    unsigned Received_Break         :  1;   /* 1 ==> Break received */
    unsigned Modem_Status_Change    :  1;   /* 1 ==> Status has changed */
    unsigned Transmitting           :  1;   /* 1 ==> Still Transmitting */
    unsigned Transmitter_Empty      :  1;   /* 1 ==> Buffer register empty */
    unsigned Data_Ready             :  1;   /* 1 ==> Data received */
    unsigned Unusable_1             : 24;   /* Unusable bits */

} STATUS_REG_TYPE;

/* Types of Errors */ define Parity_Error     0x01
    #define Framing_Error    0x02
    #define Overrun_Error    0x04

/* Definitions for Control Register */ define Stop_Mode        0x22    /* UART remote transmissions stopped */
    #define CTS_Mode         0x23    /* UART ready to receive */
    #define Test_Mode        0x3a    /* UART in loop test mode */ typedef struct      /* Variable definitions pertaining to PPI #1 usage. */
```

```c
{
    unsigned MS1553_Bus_Select;             /* MS-1553 bus selection port */ unsigned MS1553_Bus_Discretes;          /* Config. and boot discretes */ unsigned Battery_Good        : 1;       /* 1 ==> Memory card battery OK */
    unsigned Write_Enabled       : 1;       /* 1 ==> Write enabled */
    unsigned Card_Inserted       : 1;       /* 1 ==> Memory card inserted */
    unsigned ROM_Card            : 1;       /* 1 ==> Memory is ROM */
    unsigned LCD_Display_Control : 4;       /* Control signals to LCD */
    unsigned Unusable_2          : 24;      /* Unusable bits */

} PPI1_REG_TYPE;

/* Definitions for MS1553_Bus_Select Register */ define EW_BUS          0x01    /* EW MS-1553 bus select */
    #define AV1_BUS         0x02    /* Avionics bus #1 select */
    #define AV2_BUS         0x04    /* Avionics bus #2 select */
    #define AV3_BUS         0x08    /* Avionics bus #3 select */
    #define AV4_BUS         0x10    /* Avionics bus #4 select */

/* Definitions for MS1553_Bus_Discrete Register */ define SHORT_STUB       0x01   /* Short stub connection */
    #define CENTERTAP_GND    0x02   /* Grounded centertap connection */
    #define AV_SECOND_BUS    0x04   /* Secondary bus selected */
    #define BOOT_ENABLE_SMS  0x10   /* SMS boot enabled */
    #define BOOT_ENABLE_RDP  0x20   /* RDP boot enabled */
    #define MSDRS_PWR_OFF    0x40   /* MSDRS turned off */

/* Definitions pertaining to Memory Card Size */ define FOUR_MEG        0x400000    /* Size of both Memory Care areas */ typedef struct      /* Variable definitions pertaining to PPI #2 usage. */
{
    unsigned EW_AV_Discretes;               /* Equipment enables */ unsigned AYK14_Discretes;               /* Power and IPL discretes */ unsigned IPL_Fail_1     : 1;            /* #1 AYK-14 IPL fail */
    unsigned IPL_Fail_2     : 1;            /* #2 AYK-14 IPL fail */
    unsigned IPL_Fail_3     : 1;            /* #3 AYK-14 IPL fail */
    unsigned IPL_Fail_4     : 1;            /* #4 AYK-14 IPL fail */
    unsigned Not_Used_2     : 4;            /* Unused bits */
    unsigned Unusable_2     : 24;           /* Unusable bits */

} PPI2_REG_TYPE;

typedef struct      /* Variable definitions pertaining to PPI #3 usage. */
{
    unsigned Aircraft_ID         : 5;       /* Aircraft ID discretes */
    unsigned Not_Used_0          : 1;       /* Unused bit */
    unsigned Not_Execute         : 1;       /* 0 ==> Execute SW active */
    unsigned Not_Skip            : 1;       /* 0 ==> Skip SW active */
    unsigned Unusable_0          : 24;      /* Unusable bits */ unsigned Aircraft_Configuration : 4;    /* Aircraft config. discretes */
    unsigned Not_Used_1          : 1;       /* Unused bit */
    unsigned Mux                 : 1;       /* 1 ==> Set for direct load */
    unsigned Download            : 1;       /* 1 ==> Set for download */
    unsigned Verify              : 1;       /* 1 ==> Set for Verify only */
    unsigned Unusable_1          : 24;      /* Unusable bits */ unsigned RRT_Display;                   /* LCD display character */

} PPI3_REG_TYPE;

#define DONE_LED        0x01    /* Done LED on */
    #define VERIFY_LED      0x02    /* Verify LED on */
    #define NEXT_LED        0x04    /* Next LED on */
    #define LOAD_LED        0x08    /* Load LED on */
    #define ERROR_LED       0x10    /* Error LED on */
    #define ALL_LEDS_ON     0x1f    /* All LEDs on */
```

```c
#define DISPLAY_START    0x00            /* Blank display, line 1 start */
define DISPLAY_LINE2    0x40            /* Line 2 start location */ define SETTLE_TIME      MSEC100         /* Switch settling time */ typedef struct      /* Variable definitions pertaining to GPIB usage. */
{
    unsigned Not_Yet_Used;
} GPIB_REG_TYPE;
```

/* END */
/*
    ***************************
    *                         *
    *    SERIALIO.H MODULE    *
    *                         *
    ***************************
*/

/* filename: SERIALIO.H */

/*
    SERIALIO.C contains the following functions:
*/

```c
    int serial_get_byte(SERIAL_REG_TYPE *serial_reg);
    int serial_get_nyble(SERIAL_REG_TYPE *serial_reg);
    void serial_put_byte(int data, SERIAL_REG_TYPE *serial_reg);
    void serial_put_nyble(int data, SERIAL_REG_TYPE *serial_reg);
    int serial_receive(SERIAL_REG_TYPE *serial_reg);
    int serial_data(SERIAL_REG_TYPE *serial_reg, STATUS_REG_TYPE *status);
    void serial_send(int data, SERIAL_REG_TYPE *serial_reg);
    void serial_send_string(char *string, SERIAL_REG_TYPE *serial_reg);
```

/* END */
/*
    *************************
    *                       *
    *    DISPLAY.H MODULE   *
    *                       *
    *************************
*/

/* filename: DISPLAY.H */

/*
    DISPLAY.C contains the following functions:
*/

```c
    void LCD_initialize(void);                        /* LCD initialize routine */
    void LCD_display(int location, char string[]);    /* LCD display routine */
```

/* END */
/*
    *************************
    *                       *
    *    PROGRAM.H MODULE   *
    *                       *
    *************************
*/

/* filename: PROGRAM.H */

/*
    PROGRAM.C contains the following functions:
*/
```c
    void program(SERIAL_REG_TYPE *serial_reg);
```

/* END */
/*
    ***************************
    *                         *
    *    RRT_MAIN.H MODULE    *
    *                         *
    ***************************
*/

```
/* filename: RRT_MAIN.H */

/*
    RRT_MAIN.C contains the following functions:
*/ void rrt_main(void);

/* END */
/*
    **********************
    *                    *
    *   TIMER.H MODULE   *
    *                    *
    **********************
*/

/* filename: TIMER.H */

/*
    All functions defined in TIMER.C are defined below:
*/

/*
    All timer functions are listed below:
*/ void delay_timer(int time, TIMER_REG_TYPE *timer);   /* Delay timer */
void msec_timer(int amount, TIMER_REG_TYPE *timer);  /* msec. counter timer */

/*
    All timer definitions are defined below:
*/ define     USEC50   0xffffffce   /* Count for 50 us time */
define     USEC100  0xffffff9c   /* Count for 100 us time */
#define     MSEC1    0xffffffc18  /* Count for 1 ms time */
#define     MSEC10   0xffffd8f0   /* Count for 10 ms time */
#define     MSEC100  0xfffe7960   /* Count for 100 ms time */
#define     HALFSEC  0xfff85ee0   /* Count for 1/2 sec time */
#define     SEC1     0xfff0bdc0   /* Count for 1 sec time */
#define     SEC2     0xffe17680   /* Count for 2 sec time */
#define     SEC10    0xff676980   /* Count for 10 sec time */
#define     MIN1     0xfc6c7900   /* Count for 1 minute time */
#define     MIN10    0xdc3cba00   /* Count for 10 minutes time */

/* END */
/*
    **********************
    *                    *
    *   MS1553.H MODULE  *
    *                    *
    **********************
*/
/* filename: MS1553.H */ int ms1553_send(int *message_pointer, int *status_pointer);
    int ms1553_receive(int *command_pointer, int *message_pointer);
    int ms1553_respond(int *command_pointer, int *message_pointer);

/* end */
/*
    **********************
    *                    *
    *   CMDMODE.H MODULE *
    *                    *
    **********************
*/

/* filename: CMDMODE.H */

/*
```

```
    CMDMODE.C contains the following functions:
*/ void command_mode(SERIAL_REG_TYPE *serial_reg);

/* END */
/*
    ************************
    *                      *
    *   UPLOAD.H MODULE    *
    *                      *
    ************************
*/

/* filename: UPLOAD.H */

/*
    UPLOAD.C contains the following functions:
*/ void upload(SERIAL_REG_TYPE *serial_reg);

/* end */
/*
    ************************
    *                      *
    *   DOWNLOAD.H MODULE  *
    *                      *
    ************************
*/

/* filename: DOWNLOAD.H */

/*
    DOWNLOAD.C contains the following functions:
*/ void download(SERIAL_REG_TYPE *serial_reg);

/* end */
/*
    ************************************
    *                                  *
    *  . MEMORY CARD ERASE MODULE      *
    *                                  *
    ************************************
*/

/* filename: ERASE.H */

/*
    All functions contained in ERASE.C are listed as follows:
*/ void erase(SERIAL_REG_TYPE *serial_reg);

/* end */
/*
    ************************
    *                      *
    *   SWITCHES.H MODULE  *
    *                      *
    ************************
*/

/* filename: SWITCHES.H */

/*
    SWITCHES.C contains the following functions:
*/
    void switches(void);

/* END */
```

```
/*
     **********************
     *                    *
     *  CONTROL HEADER    *
     *                    *
     **********************
*/

/* filename: DISPLAY.H */

/*
    CONTROL.C contains the following functions:
*/ int bus_polling(LOOKUP_TABLE_TYPE *lookup_table_pointer);
    void convert_to_BC(LOOKUP_TABLE_TYPE *lookup_table_pointer);
    void quiet_BC(LOOKUP_TABLE_TYPE *lookup_table_pointer);
    void enable_BC(LOOKUP_TABLE_TYPE *lookup_table_pointer);
    void return_to_RT(LOOKUP_TABLE_TYPE *lookup_table_pointer);

/* end */

/*
     *********************
     *                   *
     *   ERROR.H MODULE  *
     *                   *
     *********************
*/

/* filename: ERROR.H */

/*
    ERROR.C contains the following functions:
*/ void warning_bad_battery(void);
    void error_hex_character(SERIAL_REG_TYPE *serial_reg);
    void error_serial_input(SERIAL_REG_TYPE *serial_reg, int error);
    void error_checksum(SERIAL_REG_TYPE *serial_reg);
    void error_card_verify(SERIAL_REG_TYPE *serial_reg);
    void error_end_record(SERIAL_REG_TYPE *serial_reg);
    void error_record_type(SERIAL_REG_TYPE *serial_reg);
    void error_display(int error);

#define NO_ERROR             0x00000000   /* No error indication */
        #define TIMEOUT_ERROR        0x10000000   /* MS-1553 timeout indication */
        #define DYNAMIC_CONTROL      0x20000000   /* MS-1553 dynamic control */
        #define DYNAMIC_RETURN       0x30000000   /* MS-1553 dynamic return */
        #define NOT_POLLED           0x40000000   /* MS-1553 not being polled */
        #define MISSING_DATA         0x50000000   /* MS-1553 data missing */
        #define UNEXPECTED_COMMAND   0x60000000   /* MS-1553 unexpected command */
        #define BUSY_CONDITION       0x01000000   /* Message busy indication */
        #define ADDRESS_ERROR        0x02000000   /* Message address error */
        #define HEADER_ERROR         0x00100000   /* Protocol header error */
        #define VERIFY_ERROR         0x00200000   /* Protocol verify error */
        #define CHECKSUM_ERROR       0x00300000   /* Protocol checksum error */
        #define MEMORY_AREA          0x00400000   /* Protocol memory area error */
        #define DOWNLOAD_VERIFY      0x00500000   /* Protocol download or verify */
        #define TRANSFER_MODE        0x00600000   /* Protocol invalid mode */
        #define HEADER_TYPE          0x00700000   /* Protocol invalid header type */
        #define NO_CARD              0x00010000   /* Switches no memory card */
        #define ID_MISMATCH          0x00020000   /* Switches aircraft id error */
        #define BUS_SELECT           0x00030000   /* Switches bus selection error */
        #define TERMINAL_MODE        0x00040000   /* Switches terminal mode error */
        #define PROTOCOL_SELECT      0x00050000   /* Switches invalid protocol */
        #define FILE_SIZE            0x00060000   /* Switches file size error */
        #define NOT_RELEASED         0x00070000   /* Switches data not released */
        #define BUS_ACTIVE           0x00080000   /* Switches unwanted activity */

/* end */
```

```
/*
    *************************
    *                       *
    *   PROTOCOL.H  MODULE  *
    *                       *
    *************************
*/

/* filename: PROTOCOL.H */

/*
    The following header files are for protocols that have been
        implemented (they are not contained in PROTOCOL.C):
*/ include "protob.h"
include "protoc.h"

/*
    PROTOCOL.C contains the following functions not yet implemented:
*/ void protocol_d(LOOKUP_TABLE_TYPE *lookup_table_pointer);
    void protocol_e(LOOKUP_TABLE_TYPE *lookup_table_pointer);
    void protocol_f_core(LOOKUP_TABLE_TYPE *lookup_table_pointer);
    void protocol_f_eeprom(LOOKUP_TABLE_TYPE *lookup_table_pointer);
    void protocol_f_sdc(LOOKUP_TABLE_TYPE *lookup_table_pointer);
    void protocol_g(LOOKUP_TABLE_TYPE *lookup_table_pointer);
    void protocol_h(LOOKUP_TABLE_TYPE *lookup_table_pointer);

/* end */

/*
    *************************
    *                       *
    *   PROTOB.H MODULE     *
    *                       *
    *************************
*/

/* filename: PROTOB.H */ void protocol_b(LOOKUP_TABLE_TYPE *lookup_table_pointer);

/* end */

/*
    *************************
    *                       *
    *   PROTOC.H MODULE     *
    *                       *
    *************************
*/

/* filename: PROTOC.H */ void protocol_c(LOOKUP_TABLE_TYPE *lookup_table_pointer);

/* end */

/*
    ***********************************
    *                                 *
    *   MS-1553 MESSAGES HEADER       *
    *                                 *
    ***********************************
*/

/* filename: MESSAGES.H */

/*
    This file indicates functions used to send
    and receive messages over the MS-1553 bus
*/
```

```c
/* BC messages */ int activity_busy(LOOKUP_TABLE_TYPE
        *lookup_table_pointer, int *message_pointer);
    int activity_message(LOOKUP_TABLE_TYPE
        *lookup_table_pointer, int *message_pointer);
    int memory_configuration_message(LOOKUP_TABLE_TYPE
        *lookup_table_pointer, int *message_pointer);
    int enter_load_message(LOOKUP_TABLE_TYPE
        *lookup_table_pointer, int memory_area);
    int header_message(LOOKUP_TABLE_TYPE *lookup_table_pointer,
        int buffer_count, int load_address, int page_number,
        int transfer_control, int *checksum);
    int memory_data_load_message(LOOKUP_TABLE_TYPE *lookup_table_pointer,
        int *data_pointer, int amount);
    int trailer_message(LOOKUP_TABLE_TYPE *lookup_table_pointer,
        int subpage_count, int first_subpage, int *checksum);
    int exit_load_message(LOOKUP_TABLE_TYPE
        *lookup_table_pointer, int memory_area);
    int enter_verify_message(LOOKUP_TABLE_TYPE
        *lookup_table_pointer, int memory_area);
    int memory_data_verify_message(LOOKUP_TABLE_TYPE
        *lookup_table_pointer, int *message_pointer, int amount);
    int exit_verify_message(LOOKUP_TABLE_TYPE
        *lookup_table_pointer, int memory_area);
    int service_message(LOOKUP_TABLE_TYPE *lookup_table_pointer,
        int request);
    int reprogram_status_message(LOOKUP_TABLE_TYPE *lookup_table_pointer);
    int rrt_error_message(LOOKUP_TABLE_TYPE
        *lookup_table_pointer, int action);
    int command_message(LOOKUP_TABLE_TYPE
        *lookup_table_pointer, int *send_message);

/* RT messages */ int activity_response(LOOKUP_TABLE_TYPE
        *lookup_table_pointer, int *message_pointer);
    int memory_configuration_response(LOOKUP_TABLE_TYPE
        *lookup_table_pointer, int *message_pointer);
    int enter_load_response(LOOKUP_TABLE_TYPE
        *lookup_table_pointer, int memory_area);
    int header_response(LOOKUP_TABLE_TYPE *lookup_table_pointer,
        int buffer_count, int load_address, int page_number,
        int transfer_control, int *checksum);
    int memory_data_load_response(LOOKUP_TABLE_TYPE *lookup_table_pointer,
        int *data_pointer, int amount);
    int trailer_response(LOOKUP_TABLE_TYPE *lookup_table_pointer,
        int subpage_count, int first_subpage, int *checksum);
    int exit_load_response(LOOKUP_TABLE_TYPE
        *lookup_table_pointer, int memory_area);
    int enter_verify_response(LOOKUP_TABLE_TYPE
        *lookup_table_pointer, int memory_area);
    int memory_data_verify_response(LOOKUP_TABLE_TYPE
        *lookup_table_pointer, int *message_pointer, int amount);
    int exit_verify_response(LOOKUP_TABLE_TYPE
        *lookup_table_pointer, int memory_area);
    int reprogram_status_response(LOOKUP_TABLE_TYPE *lookup_table_pointer);
    int rrt_error_response(LOOKUP_TABLE_TYPE
        *lookup_table_pointer, int action);

#define ABORT       0x0001  /* RRT should abort load/verify */
    #define RESTART     0x0002  /* RRT should completely reload unit */
    #define RETRY       0x0003  /* RRT should repeat last message sequence */
    #define AUTO_RETRY  0x0004  /* RRT has retried 3 times and should abort */

/* end */

/*
    *************************
    *                       *
    *    MEMCARD.H MODULE   *
    *                       *
    *************************
*/
```

```c
/* filename: MEMCARD.H */

/* Definitions pertaining to memory card contents */ typedef struct                          /* Structure form derived from MS-2217 */
{
    unsigned Aircraft_ID            : 5;    /* Aircraft ID discretes */
    unsigned Not_Used_0             : 3;    /* Unused bits */
#ifdef TMS320C30
        unsigned Unusable_0         : 24;   /* Unusable bits in word */
endif unsigned Memory_Card_Number     : 8;    /* Memory card sequence number */
ifdef TMS320C30
        unsigned Unusable_1         : 24;   /* Unusable bits in word */
endif unsigned Month_MSC              : 8;    /* Most Significant Character */
ifdef TMS320C30
        unsigned Unusable_2         : 24;   /* Unusable bits in word */
endif unsigned Month_LSC              : 8;    /* Least Significant Character */
ifdef TMS320C30
        unsigned Unusable_3         : 24;   /* Unusable bits in word */
endif unsigned Day_MSC                : 8;    /* Most Significant Character */
ifdef TMS320C30
        unsigned Unusable_4         : 24;   /* Unusable bits in word */
endif unsigned Day_LSC                : 8;    /* Least Significant Character */
ifdef TMS320C30
        unsigned Unusable_5         : 24;   /* Unusable bits in word */
endif unsigned Year_MSC               : 8;    /* Most Significant Character */
ifdef TMS320C30
        unsigned Unusable_6         : 24;   /* Unusable bits in word */
endif unsigned Year_2SC               : 8;    /* 2ND Significant Character */
ifdef TMS320C30
        unsigned Unusable_7         : 24;   /* Unusable bits in word */
endif unsigned Year_3SC               : 8;    /* 3RD Significant Character */
ifdef TMS320C30
        unsigned Unusable_8         : 24;   /* Unusable bits in word */
endif unsigned Year_LSC               : 8;    /* Least Significant Character */
ifdef TMS320C30
        unsigned Unusable_9         : 24;   /* Unusable bits in word */
endif unsigned Loading_Card           : 1;    /* Memory card load in progress */
    unsigned Auto_Load_OK           : 1;    /* Auto load permitted */
    unsigned No_Download_To_Card    : 1;    /* Download to card prohibited */
    unsigned No_Download_To_PC      : 1;    /* Download to PC prohibited */
    unsigned No_Upload_To_Card      : 1;    /* Upload to card prohibited */
    unsigned Not_Used_10            : 2;    /* Unused bits */
    unsigned Fleet_Releasable       : 1;    /* Memory card Fleet releasable */
#ifdef TMS320C30
        unsigned Unusable_10        : 24;   /* Unusable bits in word */
#endif
```

} CARD_HEADER_TYPE;

typedef struct                          /* Structure form listed in MS-2217 */
{
```
    unsigned File_Name_MSC              : 8;   /* Most Significant Character */
#ifdef TMS320C30
        unsigned Unusable_A             : 24;  /* Unusable bits in word */
endif unsigned File_Name_2SC              : 8;   /* 2ND Significant Character */
ifdef TMS320C30
        unsigned Unusable_B             : 24;  /* Unusable bits in word */
endif unsigned File_Name_3SC              : 8;   /* 3RD Significant Character */
ifdef TMS320C30
        unsigned Unusable_C             : 24;  /* Unusable bits in word */
endif unsigned File_Name_4SC              : 8;   /* 4TH Significant Character */
ifdef TMS320C30
        unsigned Unusable_D             : 24;  /* Unusable bits in word */
endif unsigned File_Name_5SC              : 8;   /* 5TH Significant Character */
ifdef TMS320C30
        unsigned Unusable_E             : 24;  /* Unusable bits in word */
endif unsigned File_Name_6SC              : 8;   /* 6TH Significant Character */
ifdef TMS320C30
        unsigned Unusable_F             : 24;  /* Unusable bits in word */
endif unsigned File_Name_7SC              : 8;   /* 7TH Significant Character */
ifdef TMS320C30
        unsigned Unusable_G             : 24;  /* Unusable bits in word */
endif unsigned File_Name_LSC              : 8;   /* Least Significant Character */
ifdef TMS320C30
        unsigned Unusable_H             : 24;  /* Unusable bits in word */
endif unsigned File_Name_EXT1             : 8;   /* Most Significant Character */
ifdef TMS320C30
        unsigned Unusable_E1            : 24;  /* Unusable bits in word */
endif unsigned File_Name_EXT2             : 8;   /* 2ND Significant Character */
ifdef TMS320C30
        unsigned Unusable_E2            : 24;  /* Unusable bits in word */
endif unsigned File_Name_EXT3             : 8;   /* Least Significant Character */
ifdef TMS320C30
        unsigned Unusable_E3            : 24;  /* Unusable bits in word */
endif unsigned File_Size_LSB              : 8;   /* Least Significant Byte */
ifdef TMS320C30
        unsigned Unusable_FS1           : 24;  /* Unusable bits in word */
endif unsigned File_Size_3SB              : 8;   /* 3RD Significant Byte */
ifdef TMS320C30
        unsigned Unusable_FS2           : 24;  /* Unusable bits in word */
endif unsigned File_Size_2SB              : 8;   /* 2ND Significant Byte */
ifdef TMS320C30
        unsigned Unusable_FS3           : 24;  /* Unusable bits in word */
#endif
```

```
    unsigned File_Size_MSB          :  8;    /* Most Significant Byte */
#ifdef TMS320C30
    unsigned Unusable_FS4           : 24;    /* Unusable bits in word */
endif /****************************************************
*   Beginning of Lookup Table derived from MS-2217   *
****************************************************/

/* Aircraft Bus Specification */
    unsigned Primary_Bus            :  3;    /* Primary MS-1553 Bus */
    unsigned Secondary_Bus          :  2;    /* Secondary MS-1553 Bus */
    unsigned Redundant_Bus_Usable   :  1;    /* 1 ==> Usable */
    unsigned Short_Stub_Coupled     :  1;    /* 1 ==> Short stub (direct) */
    unsigned Center_Tap_Grounded    :  1;    /* 1 ==> Grounded */ ifdef TMS320C30
    unsigned Unusable_0             : 24;    /* Unusable bits in word */
endif /* Discretes 1 */
    unsigned AYK14_Power_Off        :  4;    /* 1 ==> Power Off */
    unsigned ASPJ_Enabled           :  1;    /* 1 ==> ASPJ (AN/ALQ-165) On */
    unsigned MSDRS_Off              :  1;    /* 1 ==> MSDRS Off */
    unsigned RDP_SOC_CSC_CIT_Off    :  1;    /* 1 ==> Off */
    unsigned SMS_Off                :  1;    /* 1 ==> Off */
#ifdef TMS320C30
    unsigned Unusable_1             : 24;    /* Unusable bits in word */
endif /* Discretes 2 */
    unsigned AYK14_IPL              :  4;    /* 1 ==> Initiate Program Load */
    unsigned AV_Reprogram_Enable_1  :  1;    /* 1 ==> Enable AV Reprogram #1 */
    unsigned AV_Reprogram_Enable_2  :  1;    /* 1 ==> Enable AV Reprogram #2 */
    unsigned EW_UDM_Repro_Enable    :  1;    /* 1 ==> Enable EW UDM Reprogram */
    unsigned EW_OSM_Repro_Enable    :  1;    /* 1 ==> Enable EW OSM Reprogram */
#ifdef TMS320C30
    unsigned Unusable_2             : 24;    /* Unusable bits in word */
endif /* AYK-14 Discrete Bus Correlation */
    unsigned AYK14_AV               :  4;    /* 1 ==> Use discrete set #1 */
    unsigned Not_Used_3             :  4;    /* Unused bits */
#ifdef TMS320C30
    unsigned Unusable_3             : 24;    /* Unusable bits in word */
endif /* RRT Operational Status */
    unsigned RRT_Terminal_Mode      :  3;    /* 0 ==> Not used
                                                1 ==> RRT = RT
                                                      BC  --> RT
                                                      RRT --> BC
                                                2 ==> RRT = BC
                                                3 ==> RRT = RT
                                                4 ==> RRT = RT
                                                      BC  --> Quiet
                                                      RRT --> BC */
    unsigned Not_Used_4             :  4;    /* Unused bits */
    unsigned AYK14_Normal_BC        :  1;    /* 1 ==> AYK-14 is Normal BC */
#ifdef TMS320C30
    unsigned Unusable_4             : 24;    /* Unusable bits in word */
endif /* Remote Terminal Address */
    unsigned RT_Address             :  5;    /* Address */
    unsigned Not_Used_5             :  3;    /* Unused bits */
#ifdef TMS320C30
    unsigned Unusable_5             : 24;    /* Unusable bits in word */
endif /* Operational Mode */
```

```
unsigned Protocol              :  4;    /* MS-1553 Protocol used */
unsigned Not_Used_6            :  4;    /* Unused bits */
#ifdef TMS320C30
    unsigned Unusable_6        : 24;    /* Unusable bits in word */
endif /* Additional delay between Activity messages */
unsigned Delay                 :  8;    /* 0 to 255 msecs. */
#ifdef TMS320C30
    unsigned Unusable_7        : 24;    /* Unusable bits in word */
endif /* Busy Bit Usage */
unsigned Status_Busy_Usable    :  1;    /* 1 ==> Busy Bit Usable */
unsigned Not_Used_8            :  5;    /* Unused bits */
unsigned BC_Pause_After_Command:  1;    /* BC pauses after command */
unsigned Transmit_Next_Message :  1;    /* 0 ==> Repeat last message */
#ifdef TMS320C30
    unsigned Unusable_8        : 24;    /* Unusable bits in word */
endif /* Automatic Busy Retry Count Before Error */
unsigned Auto_Busy_Count_LSB   :  8;    /* Least Significant Byte */
#ifdef TMS320C30
    unsigned Unusable_9        : 24;    /* Unusable bits in word */
endif unsigned Auto_Busy_Count_MSB   :  8;    /* Most Significant Byte */
ifdef TMS320C30
    unsigned Unusable_10       : 24;    /* Unusable bits in word */
endif /* Manual Busy Retry Count Before Error */
unsigned Manual_Busy_Count_LSB :  8;    /* Least Significant Byte */
#ifdef TMS320C30
    unsigned Unusable_11       : 24;    /* Unusable bits in word */
endif unsigned Manual_Busy_Count_MSB :  8;    /* Most Significant Byte */
ifdef TMS320C30
    unsigned Unusable_12       : 24;    /* Unusable bits in word */
endif /* Nomenclature of RT */
unsigned RT_Nomenclature_MSC   :  8;    /* Most Significant Character */
#ifdef TMS320C30
    unsigned Unusable_13       : 24;    /* Unusable bits in word */
endif unsigned RT_Nomenclature_2SC   :  8;    /* 2ND Significant Character */
ifdef TMS320C30
    unsigned Unusable_14       : 24;    /* Unusable bits in word */
endif unsigned RT_Nomenclature_3SC   :  8;    /* 3RD Significant Character */
ifdef TMS320C30
    unsigned Unusable_15       : 24;    /* Unusable bits in word */
endif unsigned RT_Nomenclature_4SC   :  8;    /* 4TH Significant Character */
ifdef TMS320C30
    unsigned Unusable_16       : 24;    /* Unusable bits in word */
endif unsigned RT_Nomenclature_5SC   :  8;    /* 5TH Significant Character */
ifdef TMS320C30
    unsigned Unusable_17       : 24;    /* Unusable bits in word */
endif unsigned RT_Nomenclature_LSC   :  8;    /* Least Significant Character */
ifdef TMS320C30
    unsigned Unusable_18       : 24;    /* Unusable bits in word */
#endif
```

```c
/* Memory Configuration Word 1 */
unsigned Memory_Config_1_LSB    : 8;    /* Least Significant Byte */
#ifdef TMS320C30
    unsigned Unusable_19        : 24;   /* Unusable bits in word */
endif unsigned Memory_Config_1_MSB    : 8;    /* Most Significant Byte */
ifdef TMS320C30
    unsigned Unusable_20        : 24;   /* Unusable bits in word */
endif /* Memory Configuration Word 2 */
unsigned Memory_Config_2_LSB    : 8;    /* Least Significant Byte */
#ifdef TMS320C30
    unsigned Unusable_21        : 24;   /* Unusable bits in word */
endif unsigned Memory_Config_2_MSB    : 8;    /* Most Significant Byte */
ifdef TMS320C30
    unsigned Unusable_22        : 24;   /* Unusable bits in word */
endif /* Memory Configuration Message Implementation */
unsigned Memory_Word_Usage      : 2;    /* 0 ==> Check none
                                           1 ==> Check word 1 (area 1)
                                           2 ==> Check word 2 (area 2)
                                           3 ==> Check words 1 and 2 */
unsigned Not_Used_23            : 5;    /* Unused bits */
unsigned Use_Memory_Config_Msg  : 1;    /* 0 ==> Do not use */
#ifdef TMS320C30
    unsigned Unusable_23        : 24;   /* Unusable bits in word */
endif /* Memory Area 1 REPROGRAM CONTROL Message Data Word 4 */
unsigned Not_Used_24            : 2;    /* Unused bits */
unsigned Area_1_Fill_Data       : 6;    /* Fill data */
#ifdef TMS320C30
    unsigned Unusable_24        : 24;   /* Unusable bits in word */
endif /* Memory Area 1 Control Transfer */
unsigned Area_1_Transfer_Cntl   : 1;    /* 1 ==> Transfer after verify */
unsigned Not_Used_25            : 3;    /* Unused bits */
unsigned Area_1_Disc_Disable    : 2;    /* 0 ==> Do not disable
                                           1 ==> Disable discrete #2
                                           2 ==> Disable discrete #1
                                           3 ==> Disable discrete #1 & 2 */
unsigned Area_1_Disc_Enable     : 2;    /* 0 ==> Do not enable
                                           1 ==> Enable discrete #2
                                           2 ==> Enable discrete #1
                                           3 ==> Enable discrete #1 & 2 */
#ifdef TMS320C30
    unsigned Unusable_25        : 24;   /* Unusable bits in word */
endif /* Memory Area 2 REPROGRAM CONTROL Message Data Word 4 */
unsigned Not_Used_26            : 2;    /* Unused bits */
unsigned Area_2_Fill_Data       : 6;    /* Fill data */
#ifdef TMS320C30
    unsigned Unusable_26        : 24;   /* Unusable bits in word */
endif /* Memory Area 2 Control Transfer */
unsigned Area_2_Transfer_Cntl   : 1;    /* 1 ==> Transfer after verify */
unsigned Not_Used_27            : 3;    /* Unused bits */
unsigned Area_2_Disc_Disable    : 2;    /* 0 ==> Do not disable
                                           1 ==> Disable discrete #2
                                           2 ==> Disable discrete #1
                                           3 ==> Disable discrete #1 & 2 */
unsigned Area_2_Disc_Enable     : 2;    /* 0 ==> Do not enable
                                           1 ==> Enable discrete #2
                                           2 ==> Enable discrete #1
                                           3 ==> Enable discrete #1 & 2 */
```

```c
#ifdef TMS320C30
    unsigned Unusable_27        : 24;   /* Unusable bits in word */
endif /* Sequential or Simultaneous File Type */
unsigned Memory_Area_Type       : 2;    /* 0 ==> Single area
                                           1 ==> Sequential
                                           2 ==> Simultaneous */
unsigned Verify_After_Load      : 1;    /* 1 ==> Verify */
unsigned Stand_Alone_Verify     : 1;    /* 1 ==> Stand alone allowed */
unsigned Aircraft_Configuration : 4;    /* Aircraft configuration code used
                                                when loading from CCU */
#ifdef TMS320C30
    unsigned Unusable_28        : 24;   /* Unusable bits in word */
endif /* RT address of BC that can convert to RT */
unsigned BC_RT_Address          : 5;    /* Address */ unsigned Not_Used_29            : 3;    /* Unused bits */
ifdef TMS320C30
    unsigned Unusable_29        : 24;   /* Unusable bits in word */
endif /* RT address of RRT */
unsigned RRT_RT_Address         : 5;    /* Address */
unsigned Not_Used_30            : 3;    /* Unused bits */
#ifdef TMS320C30
    unsigned Unusable_30        : 24;   /* Unusable bits in word */
endif /* Nomenclature of unit when RRT is an RT */
unsigned BC_Nomenclature_MSC    : 8;    /* Most Significant Character */
#ifdef TMS320C30
    unsigned Unusable_31        : 24;   /* Unusable bits in word */
endif unsigned BC_Nomenclature_2SC    : 8;    /* 2ND Significant Character */
ifdef TMS320C30
    unsigned Unusable_32        : 24;   /* Unusable bits in word */
endif unsigned BC_Nomenclature_3SC    : 8;    /* 3RD Significant Character */
ifdef TMS320C30
    unsigned Unusable_33        : 24;   /* Unusable bits in word */
endif unsigned BC_Nomenclature_4SC    : 8;    /* 4TH Significant Character */
ifdef TMS320C30
    unsigned Unusable_34        : 24;   /* Unusable bits in word */
endif unsigned BC_Nomenclature_5SC    : 8;    /* 5TH Significant Character */
ifdef TMS320C30
    unsigned Unusable_35        : 24;   /* Unusable bits in word */
endif unsigned BC_Nomenclature_LSC    : 8;    /* Least Significant Character */
ifdef TMS320C30
    unsigned Unusable_36        : 24;   /* Unusable bits in word */
endif /* Fill Field of REPROGRAM CONTROL Message when RRT is an RT */
unsigned RRT_RT_Fill_Data       : 8;    /* Fill Data */
#ifdef TMS320C30
    unsigned Unusable_37        : 24;   /* Unusable bits in word */
endif /* ASPJ Control Time */
unsigned ASPJ_On_Time           : 8;    /* 1 to 256 seconds */
#ifdef TMS320C30
    unsigned Unusable_38        : 24;   /* Unusable bits in word */
#endif
```

```c
/* ASPJ User Response Time */
unsigned ASPJ_Response_Time    :  8;   /* 1 to 256 seconds */
#ifdef TMS320C30
    unsigned Unusable_39       : 24;   /* Unusable bits in word */
endif /*****************************************************
 * Additional information needed for header message  *
 *              Not found in MS-2217                 *
 *****************************************************/

/* File Specific Flags */
unsigned Imbeded_Header_Trailer :  1;  /* 0 ==> Use following data */
unsigned Not_Used_40            :  7;  /* Unused bits */
#ifdef TMS320C30
    unsigned Unusable_40        : 24;  /* Unusable bits in word */
endif /* Transfer Control Data */
unsigned Buffer_Xfer_Count_LSB  :  8;  /* Least Significant Byte */
#ifdef TMS320C30
    unsigned Unusable_41        : 24;  /* Unusable bits in word */
endif unsigned Buffer_Xfer_Count_MSN  :  4;  /* Most Significant Nyble */
unsigned Header_Type            :  2;  /* 0 ==> Word count
                                          1 ==> Message count
                                          2 ==> Undefined
                                          3 ==> Reserved */
unsigned Transfer_Mode          :  2;  /* 0 ==> No transfer
                                          1 ==> 8 bit transfer
                                          2 ==> 16 bit transfer
                                          3 ==> 32 bit transfer */
#ifdef TMS320C30
    unsigned Unusable_42        : 24;  /* Unusable bits in word */
endif /* Initial Load Address */
unsigned Load_Address_LSB       :  8;  /* Least Significant Byte */
#ifdef TMS320C30
    unsigned Unusable_43        : 24;  /* Unusable bits in word */
endif unsigned Load_Address_MSB       :  8;  /* Most Significant Byte */
ifdef TMS320C30
    unsigned Unusable_44        : 24;  /* Unusable bits in word */
endif /* Entry Address */
unsigned Entry_Address_LSB      :  8;  /* Least Significant Byte */
#ifdef TMS320C30
    unsigned Unusable_45        : 24;  /* Unusable bits in word */
endif unsigned Entry_Address_MSB      :  8;  /* Most Significant Byte */
ifdef TMS320C30
    unsigned Unusable_46        : 24;  /* Unusable bits in word */
endif /* Page Number */
unsigned Page_Number_LSB        :  8;  /* Least Significant Byte */
#ifdef TMS320C30
    unsigned Unusable_47        : 24;  /* Unusable bits in word */
endif unsigned Page_Number_MSB        :  5;  /* Most Significant Bits */
unsigned Not_Used_48            :  3;  /* Unused bits */
#ifdef TMS320C30
    unsigned Unusable_48        : 24;  /* Unusable bits in word */
#endif
```

} LOOKUP_TABLE_TYPE;

```
#define RoundUpDimension(value,radix)   \
    (((int) ((float) value / radix + .99999F)) * radix)

#define SIZE_CARD_HEADER RoundUpDimension(sizeof(CARD_HEADER_TYPE),2)
#define SIZE_LOOKUP_TABLE RoundUpDimension(sizeof(LOOKUP_TABLE_TYPE),2)
```

/* end */
/*
```
    ***********************
    *                     *
    *   LOOKUP.H MODULE   *
    *                     *
    ***********************
*/
/* filename: LOOKUP.H */

/* RRT operational status */
    #define CONVERTS_TO_BC     0x01
    #define ALWAYS_BC          0x02
    #define ALWAYS_RT          0x03
    #define QUIETS_BC          0x04

/* Memory area definitions */
    #define CHECK_NONE         0x00    /* Do not check memory config. */
    #define CHECK_WORD_1       0x01    /* Check config. word #1 */
    #define CHECK_WORD_2       0x02    /* Check config. word #2 */
    #define CHECK_BOTH_WORDS   0x03    /* Check both config. words */

/* Memory area types */
    #define SINGLE_AREA        0x00    /* Only one area to program */
    #define SEQUENTIAL_AREAS   0x01    /* Program and verify both */
    #define SIMULTANEOUS_AREAS 0x02    /* Program both and verify both */

/* Memory areas */
    #define AREA_1             0x01
    #define AREA_2             0x02

/* Header type definitions */
    #define WORD_COUNT         0x00    /* Word count used */
    #define MESSAGE_COUNT      0x01    /* Message count (32 words) used */

/* Transfer mode definitions */
    #define NO_XFER            0x00    /* No transfer done */
    #define BYTE_XFER          0x01    /* 8 bit transfer */
    #define WORD_XFER          0x02    /* 16 bit transfer */
    #define DOUBLE_WORD_XFER   0x03    /* 32 bit transfer */

/* Defined control message values */
    #define REPROGRAM_CONTROL  0x00
    #define MEMORY_LOAD        0x01
    #define MEMORY_VERIFY      0x02
```

/* end */
/*
```
    *************************
    *                       *
    *   WORDTYPE.H MODULE   *
    *                       *
    *************************
*/

/* filename: WORDTYPE.H */

/* Structure of MS-1553 command and status words */ typedef struct                          /* Command word */
{
    unsigned Data_Word_Count   : 5;     /* Number of data words returning */
    unsigned Subaddress        : 5;     /* Subaddress field */
    unsigned RT_Transmit       : 1;     /* RT transmit bit */
    unsigned Terminal_Address  : 5;     /* RT's address */
```

} COMMAND_WORD_TYPE;

/* Command type definitions */

```
    #define ACTIVITY                    0x4e1
    #define MEMORY_CONFIGURATION        0x662
    #define ENTER_LOAD                  0x3a4
    #define HEADER                      0x284
    #define MEMORY_DATA_LOAD            0x15
    #define TRAILER                     0x2c2
    #define EXIT_LOAD                   0x3a4
    #define ENTER_VERIFY                0x3a4
    #define MEMORY_DATA_VERIFY          0x35
    #define EXIT_VERIFY                 0x3a4
    #define REPROGRAM_STATUS            0x6e1
    #define RRT_ERROR                   0x271
/*********************************/
    #define REPROGRAM_CONTROL           0x7a4
    #define MEMORY_CONFIG_REQ           0x262
    #define ENTER_LOAD_REQ              0x7a4
    #define HEADER_REQ                  0x684
    #define MEMORY_DATA_LOAD_REQ        0x35
    #define TRAILER_REQ                 0x6c2
    #define EXIT_LOAD_REQ               0x7a4
    #define ENTER_VERIFY_REQ            0x7a4
    #define MEMORY_DATA_VERIFY_REQ      0x15
    #define EXIT_VERIFY_REQ             0x7a4
    #define REPROGRAM_STATUS_REQ        0x2e1
    #define RRT_ERROR_REQ               0x671
```

```
typedef struct                          /* Status word */
{
    unsigned Terminal_Flag      : 1;    /* 1 ==> Examine status code field */
    unsigned Bus_Acceptance     : 1;    /* Dynamic Bus Control Acceptance */
    unsigned Subsystem_Flag     : 1;    /* Subsystem Flag */
    unsigned Busy_Bit           : 1;    /* Terminal busy indication */
    unsigned Broadcast_Received : 1;    /* Broadcast Command Received */
    unsigned Reserved           : 3;    /* Reserved bits */
    unsigned Service_Request    : 1;    /* Service_Request */
    unsigned Instrumentation    : 1;    /* 1/0 ==> Command/Status word */
    unsigned Message_Error      : 1;    /* Message error occurred */
    unsigned Terminal_Address   : 5;    /* RT's address */

} STATUS_WORD_TYPE;

#define BUSY_STATUS     0x0008      /* Status busy response */
    #define SERVICE_STATUS  0x0101      /* Status service request */
    #define ERROR_STATUS    0x0401      /* Status busy response */ typedef struct                          /* Activity message data word */
{
    unsigned Data_Word_Count    : 5;    /* Number of data words returning */
    unsigned Subaddress         : 5;    /* Subaddress field */
    unsigned RT_Transmit        : 1;    /* RT transmit bit */
    unsigned Not_Used           : 4;    /* Bits not used */
    unsigned Busy_Bit           : 1;    /* RT's address */

} ACTIVITY_DATA_TYPE;

define BUSY_DATA       0x8000      /* Data associated with busy */ typedef struct                          /* Reprogram status message status */
{
    unsigned Status_Code        : 14;   /* Reprogram status code */
    unsigned Status_Indicator   : 1;    /* Reprogram status indicator */
    unsigned Status_Flag        : 1;    /* Reprogram status flag */

} REPROGRAM_STATUS_TYPE;

/* end */
```

What is claimed is:

1. An apparatus for reprogramming a plurality of remote terminals and a plurality of bus controllers connected to a first communications bus, said first communications bus being a command/response time division multiplex data bus, said reprogramming apparatus being adapated to interface with a second communications bus, said reprogramming apparatus comprising:

an integrated circuit memory card;

first transceiver means for receiving data from said second communications bus or transmitting data to said second communications bus, said first transceiver means formatting the data received thereby to a digital format, the data received from said second communications bus being used to reprogram said remote terminals and said bus controllers connected to said first communications bus;

digital signal processor means for providing a plurality of data transfer control signals, a plurality of address signals, a plurality of enable signals and a plurality of data bytes;

said digital signal processor means having direct access to said integrated circuit memory card such that data to or from said second communications bus is transferred between said integrated circuit memory card and said second communications bus via said first transceiver means and said digital signal processor means and data to or from said first communications bus is transferred between said integrated circuit memory card and said first communications bus via said digital signal processor means;

programmable array logic means for receiving said plurality of data transfer control signals and for decoding said data transfer control signals so as to control the transfer of said data between said second communications bus and said integrated circuit memory card, said integrated circuit memory card being adapted to store said data therein;

said programmable array logic means upon decoding said data transfer control signals generating at least one read signal and at least one write signal;

memory means electrically coupled to said digital signal processor means, said memory means containing software for said digital signal processor means, said software controlling the handling and interpretation of data to and from said first and second communications buses by enabling the operation of said digital signal processor means to accommodate the use of said digital signal processor means with the bus standards, data protocols and formats of said first and second communications buses;

programmable interface means for receiving said address signals, said enable signals and said data bytes from said digital signal processor means and for receiving said read signal and said write signal from said programmable array logic means;

said programmable interface means in response to said address signals, said enable signals, said data bytes and said read and write signals selectively enabling either one of said remote terminals or one of said bus controllers for reprogramming so as to allow said digital signal processor means to control the transfer of reprogramming data from said integrated circuit memory card to said remote terminal or said bus controller being reprogrammed; and means for providing an interface between said digital signal processor means and said first communications bus, said interface means being adapted to format the reprogramming data being supplied to said remote terminal or said bus controller being reprogrammed in accordance with the bus standards, data protocols and formats of said first communications bus.

2. The reprogramming apparatus of claim 1 wherein said first communications bus is a Military Standard 1553 multiplex data bus.

3. The reprogramming apparatus of claim 1 wherein said second communications bus is an RS-232 communications bus.

4. The reprogramming apparatus of claim 1 wherein said memory means comprises an electrically eraseable read only memory.

5. The reprogramming apparatus of claim 1 wherein said means for providing an interface between said digital signal processor means and said first communications bus comprises:

means for encoding said reprogramming data from said integrated circuit memory card so as to provide Manchester encoded data and for decoding Manchester encoded data from said first communications bus so as to provide digital data, said encoding/decoding means providing an interface between said digital signal processor and said first communications bus;

second transceiver means for transmitting the Manchester encoded data provided by said encoding/decoding means to said first communications bus and for receiving from said first communications bus Manchester encoded data for decoding to said digital format by said encoding/decoding means; and transformer means for electrically isolating said first communications bus from said digital signal processing means.

6. The reprogramming apparatus of claim 1 wherein said programmable interface means comprises:

first, second and third programmable peripheral interfaces, each of said programmable peripheral interfaces being electrically coupled to said digital signal processor means and said programmable array logic means so as to receive from said digital signal processor means said address signals, enable signals and said data bytes and to receive from said programmable array logic means said read signal and said write signal, each of said programmable peripheral interfaces being enabled by one of said enable signals; and each of said programmable interfaces having first, second and third eight bit output ports, said address signals controlling the selection of the output port to be enabled and said read and write signals enabling the selected output port;

said first, second and third programmable interfaces providing at each enabled output thereof between one and eight discrete logic signals in response to one of said data bytes;

said discrete logic signals when supplied to said first communications bus selectively enabling one of said remote terminals or one of said bus controllers for reprogramming so as to allow said selected remote terminal or said selected bus controller to be reprogrammed by said reprogramming apparatus.

7. The reprogramming apparatus of claim 1 wherein said bus controller being reprogrammed comprises an AN/ALR-67 Radar Warning Receiver.

8. The reprogramming apparatus of claim 1 wherein said remote terminal being reprogrammed comprises an AN/ALQ-126B Defensive Electronic Counter Measures Set.

9. An apparatus for reprogramming a plurality of remote terminals and a plurality of bus controllers connected to a first communications bus, said first communications bus being a command/response time division multiplex data bus, said reprogramming apparatus being adapted to interface with a second communications bus, said reprogramming apparatus comprising:
    an integrated circuit memory card;
    first transceiver means for receiving data from said second communications bus or transmitting data to said second communications bus, said first transceiver means formatting the data received thereby to a digital format, the data received from said second communications bus being used to reprogram said remote terminals and said bus controllers connected to said first communications bus;
    digital signal processor means for providing a plurality of data transfer control signals, a plurality of address signals, a plurality of enable signals and a plurality of data bytes;
    said digital signal processor means having direct access to said integrated circuit memory card such that data to or from said second communications bus is transferred between said integrated circuit memory card and said second communications bus via said first transceiver means and said digital signal processor means and data to or from said first communications bus is transferred between said integrated circuit memory card and said first communications bus via said digital signal processor means;
    programmable array logic means for receiving said plurality of data transfer control signals and for decoding said data transfer control signals so as to control the transfer of said data between said second communications bus and said integrated circuit memory card, said integrated circuit memory card being adapted to store said data therein;
    said programmable array logic means upon decoding said data transfer control signals generating at least one read signal and at least one write signal;
    memory means electrically coupled to said digital signal processor means, said memory means containing software for said digital signal processor means, said software controlling the handling and interpretation of data to and from said first and second communications buses by enabling the operation of said digital signal processor means to accommodate the use of said digital signal processor means with the bus standards, data protocols and formats of said first and second communications buses;
    first, second and third programmable peripheral interfaces, each of said programmable peripheral interfaces being electrically coupled to said digital signal processor means and said programmable array logic means so as to receive from said digital signal processor means said address signals, enable signals and said data bytes and to receive from said programmable array logic means said read signal and said write signal, each of said programmable peripheral interfaces being enabled by one of said enable signals;
    each of said programmable interfaces having first, second and third eight bit output ports, said address signals controlling the selection of the output port to be enabled and said read and write signals enabling the selected output port;
    said first, second and third programmable interfaces providing at each enabled output thereof between one and eight discrete logic signals in response to one of said data bytes;
    said discrete logic signals when supplied to said first communications bus selectively enabling one of said remote terminals or one of said bus controllers for reprogramming so as to allow said selected remote terminal or said selected bus controller to be reprogrammed by said reprogramming apparatus;
    means for encoding said reprogramming data from said integrated circuit memory card so as to provide Manchester encoded data and for decoding Manchester encoded data from said first communications bus so as to provide digital data, said encoding/decoding means providing an interface between said digital signal processor and said first communications bus;
    second transceiver means for transmitting the Manchester encoded data provided by said encoding/decoding means to said first communications bus and for receiving from said first communications bus Manchester encoded data for decoding to digital format by said encoding/decoding means; and
    transformer means for electrically isolating said first communications bus from said digital signal processing means.

10. The reprogramming apparatus of claim 9 wherein said first communications bus is a Military Standard 1553 multiplex data bus.

11. The reprogramming apparatus of claim 9 wherein said second communications bus is an RS-232 communications bus.

12. The reprogramming apparatus of claim 9 wherein said memory means comprises an electrically eraseable read only memory.

13. The reprogramming apparatus of claim 1 wherein said bus controller being reprogrammed comprises an AN/ALR-67 Radar Warning Receiver.

14. The reprogramming apparatus of claim 1 wherein said remote terminal being reprogrammed comprises an AN/ALQ-126B Defensive Electronic Counter Measures Set.

* * * * *